US012778071B2

(12) United States Patent
Cheng et al.

(10) Patent No.: US 12,778,071 B2
(45) Date of Patent: Nov. 3, 2026

(54) CARRIER

(71) Applicant: JANI INTERNATIONAL PTE. LTD., Singapore (SG)

(72) Inventors: Chinming Cheng, WanChai (HK); Kaiwen Cheng, WanChai (HK); Zhengwen Guo, WanChai (HK); Yingzhong Chen, WanChai (HK); Yenlin Lee, WanChai (HK); Kwanghao Liu, WanChai (HK); Lihung Lin, WanChai (HK)

(73) Assignee: JANI INTERNATIONAL PTE. LTD., Singapore (SG)

( * ) Notice: Subject to any disclaimer, the term of this patent is extended or adjusted under 35 U.S.C. 154(b) by 28 days.

(21) Appl. No.: 18/870,255

(22) PCT Filed: Jun. 1, 2023

(86) PCT No.: PCT/SG2023/050398
§ 371 (c)(1),
(2) Date: Nov. 27, 2024

(87) PCT Pub. No.: WO2023/234870
PCT Pub. Date: Dec. 7, 2023

(65) Prior Publication Data
US 2025/0331493 A1 Oct. 30, 2025

Related U.S. Application Data

(60) Provisional application No. 63/348,593, filed on Jun. 3, 2022.

(30) Foreign Application Priority Data

Jul. 14, 2022 (CN) ......................... 202210834612.5
Aug. 19, 2022 (CN) ......................... 202211000772.6

(51) Int. Cl.
*A01K 1/035* (2006.01)
*A01K 1/02* (2006.01)

(52) U.S. Cl.
CPC .................................. *A01K 1/0272* (2013.01)

(58) Field of Classification Search
CPC .. A01K 1/0272; A01K 1/0254; A01K 1/0245; A01K 27/002; A01K 1/0263; A01K 1/035; A01K 1/0281; B60R 22/10
(Continued)

(56) References Cited

U.S. PATENT DOCUMENTS 2,909,154 A * 10/1959 Thomas .................. B60R 22/10 119/771
4,512,286 A * 4/1985 Rux ..................... A01K 1/0272 119/771
(Continued)

FOREIGN PATENT DOCUMENTS

CN 2832620 Y 11/2006
CN 201018820 Y 2/2008
(Continued)

OTHER PUBLICATIONS

AU Examination Report No. 1; Appl No. 2023280730; Date Mailed: Sep. 18, 2025; pp. 1-8.
(Continued)

*Primary Examiner* — Shin H Kim
(74) *Attorney, Agent, or Firm* — CANTOR COLBURN LLP

(57) ABSTRACT

The present disclosure relates to a carrier. The carrier comprises a container body, which comprises a bottom portion and peripheral walls connected to the bottom portion, the bottom portion and the peripheral walls defining an accommodating space for accommodating a pet; and a first fixing device, which comprises: a main body frame, which
(Continued)

is connected to the bottom portion of the container body; a connection frame, which comprises a first connection support, the first connection support being connected to the main body frame and able to move relative to the main body frame; and a connection device, which is connected to one end of the first connection support, and extends out from a first side of the container body as the connection frame moves relative to the main body frame, wherein the carrier is connected to a seat of a vehicle by means of the connection device.

20 Claims, 117 Drawing Sheets

(58) Field of Classification Search
USPC .......................................... 119/453, 497, 771
See application file for complete search history.

(56) References Cited

U.S. PATENT DOCUMENTS

| | | | | |
|---|---|---|---|---|
| 4,597,359 | A | 7/1986 | Moorman | |
| 5,170,745 | A | 12/1992 | Burdette, Jr. | |
| 5,277,148 | A | 1/1994 | Rossignol et al. | |
| 5,479,892 | A * | 1/1996 | Edwards | B60R 21/02 297/250.1 |
| 5,540,365 | A | 7/1996 | Lamair | |
| 5,718,191 | A * | 2/1998 | O'Donnell | A01K 1/0281 119/771 |
| 6,058,529 | A | 5/2000 | Goysich | |
| 6,367,673 | B1 * | 4/2002 | Smith | B60R 9/00 224/403 |
| 6,899,057 | B1 | 5/2005 | Chrisco et al. | |
| 7,083,228 | B1 | 8/2006 | Al | |
| 7,201,452 | B1 * | 4/2007 | Franks | B60N 2/2803 297/253 |
| 7,735,456 | B2 * | 6/2010 | Wiley | A01K 1/0263 119/755 |
| 8,607,735 | B1 * | 12/2013 | Klinker | A01K 27/002 119/28.5 |
| 9,150,163 | B2 * | 10/2015 | Cronkright, II | B60R 11/02 |
| 9,616,782 | B2 * | 4/2017 | Cohen | B60N 2/2806 |
| 10,772,288 | B1 | 9/2020 | Sandiford | |
| 10,981,515 | B2 * | 4/2021 | Page | F41C 33/06 |
| 2004/0084939 | A1 * | 5/2004 | Boyle | B60N 2/2806 297/253 |
| 2005/0284415 | A1 * | 12/2005 | O'Donnell | B60R 22/10 119/771 |
| 2006/0213452 | A1 | 9/2006 | King | |
| 2008/0011234 | A1 * | 1/2008 | Wilkes | B60R 7/043 119/28.5 |
| 2009/0066071 | A1 * | 3/2009 | Singh | B60R 22/10 280/801.1 |
| 2009/0199770 | A1 * | 8/2009 | Jakubowski | A01K 1/0272 119/28.5 |
| 2010/0126427 | A1 | 5/2010 | Mcgrade | |
| 2010/0288204 | A1 | 11/2010 | Costello et al. | |
| 2011/0197823 | A1 | 8/2011 | Pietra | |
| 2014/0307310 | A1 | 10/2014 | Steiner et al. | |
| 2016/0057968 | A1 | 3/2016 | Chandler | |
| 2016/0059744 | A1 * | 3/2016 | Cohen | B60N 2/2806 297/463.1 |
| 2017/0320461 | A1 * | 11/2017 | Talevich | B60R 22/10 |
| 2019/0275949 | A1 | 9/2019 | Kubota | |
| 2019/0320613 | A1 | 10/2019 | Björnetun | |
| 2019/0343068 | A1 | 11/2019 | Depaulis | |
| 2020/0296919 | A1 | 9/2020 | Jakubowski et al. | |
| 2021/0084864 | A1 | 3/2021 | Torres et al. | |
| 2021/0127627 | A1 | 5/2021 | Jakubowski et al. | |
| 2021/0170985 | A1 | 6/2021 | Anderson | |
| 2021/0259199 | A1 | 8/2021 | Lin et al. | |
| 2021/0362765 | A1 | 11/2021 | Fan et al. | |
| 2021/0380155 | A1 | 12/2021 | Ma et al. | |
| 2022/0227330 | A1 * | 7/2022 | Klugo | B60R 22/30 |
| 2022/0295739 | A1 | 9/2022 | Yoskowitz | |
| 2024/0324548 | A1 * | 10/2024 | Lu | A01K 1/0272 |
| 2025/0331493 | A1 * | 10/2025 | Cheng | A01K 1/0272 |
| 2026/0084594 | A1 * | 3/2026 | Guo | A01K 1/0272 |

FOREIGN PATENT DOCUMENTS

| | | | |
|---|---|---|---|
| CN | 201022544 | Y | 2/2008 |
| CN | 101386275 | A | 3/2009 |
| CN | 102336154 | A | 2/2012 |
| CN | 202127690 | U | 2/2012 |
| CN | 102427965 | A | 4/2012 |
| CN | 102848940 | A | 1/2013 |
| CN | 102343842 | B | 4/2013 |
| CN | 103568891 | A | 2/2014 |
| CN | 103770828 | B | 1/2016 |
| CN | 106135022 | A | 11/2016 |
| CN | 106218459 | A | 12/2016 |
| CN | 106240525 | A | 12/2016 |
| CN | 106394337 | A | 2/2017 |
| CN | 107089172 | A | 8/2017 |
| CN | 107410083 | A | 12/2017 |
| CN | 107637531 | A | 1/2018 |
| CN | 206841220 | U | 1/2018 |
| CN | 108045425 | A | 5/2018 |
| CN | 108433443 | A | 8/2018 |
| CN | 108739438 | A | 11/2018 |
| CN | 109305074 | A | 2/2019 |
| CN | 109843643 | A | 6/2019 |
| CN | 110091774 | A | 8/2019 |
| CN | 209284725 | U | 8/2019 |
| CN | 209498187 | U | 10/2019 |
| CN | 209861910 | U | 12/2019 |
| CN | 110775133 | A | 2/2020 |
| CN | 110979441 | A | 4/2020 |
| CN | 212212287 | U | 12/2020 |
| CN | 213974155 | U | 8/2021 |
| CN | 113665659 | A | 11/2021 |
| CN | 113665660 | A | 11/2021 |
| CN | 214593477 | U | 11/2021 |
| CN | 215012471 | U | 12/2021 |
| CN | 114364571 | A | 4/2022 |
| CN | 216533131 | U | 5/2022 |
| CN | 114641409 | A | 6/2022 |
| CN | 217523534 | U | 10/2022 |
| CN | 218245043 | U | 1/2023 |
| CN | 218851568 | U | 4/2023 |
| CN | 117207866 | A | 12/2023 |
| DE | 102015226109 | A1 | 6/2017 |
| DE | 102018120395 | A1 | 2/2020 |
| DE | 102019005744 | A1 | 2/2021 |
| EP | 3387900 | A1 | 10/2018 |
| FR | 2736609 | A1 | 1/1997 |
| FR | 2789642 | A1 | 8/2000 |
| FR | 2914602 | A1 | 10/2008 |
| GB | 753337 | A | 7/1956 |
| GB | 2326101 | A | 12/1998 |
| GB | 2501178 | A | 10/2013 |
| GB | 2549526 | A | 10/2017 |
| GB | 2597331 | A | 1/2022 |
| JP | 2005245388 | A | 9/2005 |
| JP | 2007168581 | A | 7/2007 |
| JP | 2010263890 | A | 11/2010 |
| JP | 2017074849 | A | 4/2017 |
| JP | 2017205081 | A | 11/2017 |
| JP | 3218427 | U | 9/2018 |
| KR | 20060010115 | A | 2/2006 |
| KR | 20140052277 | A | 5/2014 |
| KR | 20190059559 | A | 5/2019 |
| KR | 20210080780 | A | 7/2021 |
| KR | 20210096845 | A | 8/2021 |
| KR | 20220049822 | A | 4/2022 |
| KR | 20220087355 | A | 6/2022 |
| KR | 102436990 | B1 | 8/2022 |
| TW | I645776 | B | 1/2019 |
| TW | I728113 | B | 5/2021 |
| TW | 202142151 | A | 11/2021 |
| TW | 202229047 | A | 8/2022 |

(56) References Cited

FOREIGN PATENT DOCUMENTS

| | | | |
|---|---|---|---|
| TW | 202233101 | A | 9/2022 |
| WO | 2019054652 | A1 | 3/2019 |
| WO | 2022160403 | A1 | 8/2022 |
| WO | 2024010527 | A2 | 1/2024 |
| WO | 2024054158 | A1 | 3/2024 |
| WO | 2024054160 | A1 | 3/2024 |
| WO | 2024155240 | A1 | 7/2024 |
| WO | 2024172762 | A1 | 8/2024 |

OTHER PUBLICATIONS

JP Office Action with English Translation; JP Appl No. 2024-570596; Date Mailed: Oct. 14, 2025; pp. 1-8.
JP Search Report with English Translation; JP Appl No. 2024-570596; Date Mailed: Oct. 10, 2025; pp. 1-42.
SureLoc Pet Carriers Using the Same Technology as Children's Safety Seats [viewed on internet on Sep. 17, 2025]<URL: https://www.youtube.com/watch?v=PpHBCcHrNDM >, published on Jun. 9, 2020; pp. 1-4.
EP Communication; Extended European Search Report; Application No. 23816485.9-1105 / 4512238 PCT/SG2023050398; Date Mailed: Jun. 25, 2025; pp. 1-14.
Chinese Application No. 2024202872653; 1st Office Action with English Translation dated Oct. 12, 2024; p. 1-3.
PCT International Search Report and Written Opinion w translation; International Application No. PCT/SG2023/050398; International Filing Date: Jun. 1, 2023; Date of Mailing: Nov. 23, 2023; pp. 1-18.
PCT International Search Report and Written Opinion w translation; International Application No. PCT/SG2023/050474; International Filing Date: Jul. 6, 2023; Date of Mailing: Dec. 7, 2023; pp. 1-19.
PCT International Search Report and Written Opinion w translation; International Application No. PCT/SG2023/050609; International Filing Date: Sep. 8, 2023; Date of Mailing: Jan. 22, 2024; pp. 1-23.
PCT International Search Report and Written Opinion w translation; International Application No. PCT/SG2023/050611; International Filing Date: Sep. 8, 2023; Date of Mailing: Jan. 26, 2024; pp. 1-22.
PCT International Search Report and Written Opinion w translation; International Application No. PCT/SG2024/050040; International Filing Date: Jan. 18, 2024; Date of Mailing: Apr. 24, 2024; pp. 1-19.
PCT International Search Report and Written Opinion w translation; International Application No. PCT/SG2024/050065; International Filing Date: Feb. 7, 2024; Date of Mailing: May 24, 2024; pp. 1-13.
PCT International Search Report and Written Opinion w translation; International Application No. PCT/SG2024/050385; International Filing Date: Jun. 7, 2024; Date of Mailing: Sep. 12, 2024; pp. 1-27.
Taiwanese Application No. 112120774; 1st Office Action with English Translation dated Jan. 8, 2024; 19 pages.
Taiwanese Application No. 112125296; 1st Office Action with English Translation dated May 27, 2024; 16 pages.
Taiwanese Application No. 112134349; 1st Office Action with English Translation dated Aug. 22, 2024; 34 pages.
Taiwanese Application No. 113104670; 1st Office Action with English Translation dated Sep. 23, 2024; 37 pages.
European Application No. 24202026.1; European Search Report dated Dec. 19, 2024; 9 pages.
European Application No. 24203319.9; Extended European Search Report dated Jan. 9, 2025; 9 pages.
International Search Report & Written Opinion for International Application No. PCT/SG2024/050617; International Filing Date: Sep. 24, 2024; Date of Mailing: Dec. 20, 2024; 39 pages.
Taiwanese Application No. 112134409; Office Action dated Dec. 9, 2024; 25 pages.
Taiwanese Application No. 113120902; Office Action dated Jan. 13, 2025; 22 pages.
EP Communication; Extended European Search Report: Application No. 23863590.8; Date Mailed: Apr. 22, 2025; pp. 1-9.
PCT International Search Report and Written Opinion w translation; International Application No. PCT/SG2024/050779; International Filing Date: Dec. 6, 2024; Date of Mailing: Mar. 11, 2025; pp. 1-8.
Taiwanese Application No. 113136062; Office Action w English Translation dated May 12, 2025; pp. 1-43.
CA Office Action; Application No. 3257706; Date Mailed: Jul. 30, 2026; pp. 1-9.
TW Office Action with English Translation; Application No. 115114411; Mail Date: Jul. 22, 2026; pp. 1-14.

* cited by examiner

2728

392

CARRIER

CROSS-REFERENCE TO RELATED APPLICATION

The present application is a national phase application under 35 U.S.C. 371 of International Application No. PCT/SG2023/050398 filed on Jun. 1, 2023, and claims priority to U.S. application Ser. No. 63/348,593 filed Jun. 3, 2022, Chinese application No. 202210834612.5 filed Jul. 14, 2022, and Chinese application No. 202211000772.6 filed Aug. 19, 2022, the entire contents of which are incorporated herein by reference.

TECHNICAL FIELD

The present disclosure relates to a carrier, and in particular, to a carrier installed in a vehicle for carrying a pet.

BACKGROUND

Recently, more and more people regard their animals (hereinafter collectively referred to as "pets") as their family members or companions, so they pay more and more attention to the companion and care of pets, including the safety of pets in vehicles. However, for pet owners, how to prevent their pets from accidentally jumping out of pet carriers and how to prevent their pets from being hit or injured due to sudden changes in vehicle speed are still urgent problems to be solved.

SUMMARY

The present disclosure relates to a carrier, including: a box body, including a bottom portion and a peripheral wall connected to the bottom portion, where the bottom portion and the peripheral wall define an accommodating space for accommodating a pet; and a first fixing device, including: a primary frame, connected to the bottom portion of the box body; a connecting frame, including a first connecting bracket, wherein the first connecting bracket is connected with the primary frame and movable relative to the primary frame; and a connector, connected to an end of the first connecting bracket and extending out of a first side of the box body along with a movement of the connecting frame relative to the primary frame, and the carrier is connected to a vehicle seat through the connector.

In an embodiment, a plurality of first connecting brackets and a plurality of connectors respectively connected with respective ends of the plurality of first connecting brackets are provided.

In an embodiment, the connecting frame further includes at least one second connecting bracket, and the at least one second connecting bracket is connected with the plurality of first connecting brackets.

In an embodiment, the first fixing device further includes a pulling belt, connected to the at least one second connecting bracket and may be pulled to drive the connecting frame to move relative to the primary frame.

In an embodiment, the box body further includes at least one positioning structure formed at the bottom portion to position at least one second connecting bracket of the connecting frame to combine the first fixing device with the box body.

In an embodiment, the plurality of first connecting brackets include two first connecting brackets, the at least one positioning structure includes a first positioning structure and a second positioning structure, and the at least one second connecting bracket includes a first positioning rod and a second positioning rod connected between the two first connecting brackets.

In an embodiment, the at least one positioning structure has a T-shaped structure, and a first positioning slot and a second positioning slot are formed on an outer surface of the bottom portion and the T-shaped structure.

In an embodiment, an inclined plane is formed on either side or both sides of the at least one positioning structure, so that the connecting frame slides into the first positioning slot and/or the second positioning slot from the inclined plane by using the second connecting bracket of the connecting frame.

In an embodiment, the carrier further includes a steering device, where the first fixing device is pivotally connected to the bottom portion of the box body through the steering device and is pivotable between the first region and the second region of the bottom portion.

In an embodiment, the first fixing device is provided with a steering lock release mechanism, and the steering lock release mechanism includes an operating element and a locking pin provided on the primary frame, the primary frame is positioned at the bottom portion of the box body through the locking pin, and the operating element is used for unlocking the locking pin to release the positioning of the primary frame in the box body.

In an embodiment, the box body includes an annular guide rail formed on the outer surface of the bottom portion of the box body.

In an embodiment, the steering device includes a pivot having two ends connected to the primary frame, and a pair of guide lugs provided on the pivot so that the pivot passes through the pair of guide lugs. The pair of guide lugs are jointed with the annular guide rail with their respective outer edges and may be displaced along the annular guide rail.

In an embodiment, the box body includes a circular groove formed on the outer surface of the bottom portion of the box body.

In an embodiment, the steering device includes a circular turntable accommodated in the circular groove and rotatable in the circular groove; and a pivot fixedly provided in a diameter direction of the circular turntable, and two ends of the pivot are connected to the primary frame.

In an embodiment, the first fixing device further includes a pulling belt, an end of the pulling belt is connected to the primary frame or the connecting frame, and the pulling belt extends between the pivot and the outer surface of the bottom portion.

In an embodiment, the first fixing device further includes a linkage assembly. The linkage assembly includes the pulling belt provided with a connecting belt and an adjusting end; a sliding block connected with the connecting belt and movable relative to the first connecting bracket; a locking pin linked with the sliding block to be engaged with or disengaged from an engagement hole of the first connecting bracket along with a movement of the sliding block; and a reset spring, acting on the sliding block and making the locking pin tend to be engaged with the engagement hole. The adjusting end may be operated to move the sliding block and drive the locking pin to disengage from an engagement with the first connecting bracket, to unlock an engagement between the first connecting bracket and the bottom portion of the box body, that is, to unlock an engagement between the first connecting bracket and the primary frame is released.

In an embodiment, two first connecting brackets and two connectors respectively connected with the respective ends of the two first connecting brackets are provided.

In an embodiment, the first fixing device further includes the pulling belt provided with two connecting belts and an adjusting end; a pair of sliding blocks connected with a corresponding one of the two connecting belts respectively and movable relative to a corresponding one of the two first connecting brackets; a pair of locking pins respectively linked with a corresponding one of the pair of sliding blocks to be respectively engaged with or disengaged from the engagement hole of the corresponding one of the two first connecting brackets along with the movement of the sliding blocks; and a reset spring provided between the pair of sliding blocks and making the pair of locking pins tend to engage with a corresponding engagement hole. The adjusting end may be operated to make the pair of sliding blocks relatively displace and drive the pair of locking pins to disengage from an engagement with the two first connecting brackets, to unlock an engagement between the two first connecting brackets and the bottom portion of the box body, that is, to unlock an engagement between the two first connecting brackets and the primary frame.

In an embodiment, the carrier further includes a second fixing device. The second fixing device includes a belt portion extending through the bottom portion of the box body; a connector connected to an end of the belt portion and extending out of the first side of the box body for connecting to a corresponding fixing point of the vehicle seat; and an adjuster fixedly provided at a second side opposite to the first side of the box body, and the other end of the belt portion is positioned by the adjuster.

In an embodiment, the carrier further includes an anchoring device configured to fix the carrier to an anchoring point of the vehicle seat.

In an embodiment, the anchoring device includes a tether having a first end connected to the bottom portion of the box body; an adjuster connected to the tether, and a second end of the tether extends through the adjuster and is exposed from the adjuster; a connecting strap having a first end connected to the adjuster; and a connecting element connected to a second end of the connecting strap for being fixed to the anchoring point.

In an embodiment, the bottom portion of the box body is provided with a through hole, the first end of the tether includes a fixing element, and the tether is engaged with the through hole through the fixing element.

In an embodiment, the first fixing device includes two first connecting brackets and two connectors respectively connected with the respective ends of the two first connecting brackets. The anchoring device is linked to the first fixing device.

In an embodiment, the anchoring device includes a first tether and a second tether, and the respective first ends of the first tether and the second tether are respectively connected to the respective combining ends of the two first connecting brackets; an adjuster, through which the respective second ends of the first tether and the second tether connected extend to be exposed from the adjuster; a connecting strap having the first end connected to the adjuster; and a connecting element connected to the second end of the connecting strap for being fixed to the anchoring point.

In an embodiment, the carrier further includes a handle, two ends of which may be movably connected to two sides of the box body; and at least one guide element, provided on the handle, and a width and a size of the at least one guide element can allow one of the first tether or the second tether of the anchoring device to pass through and to be positioned in the at least one guide element.

In an embodiment, the carrier further includes a plurality of guide elements provided on an outer surface of the peripheral wall of the box body, and widths and sizes of the plurality of guide elements are used for a safety belt of the vehicle seat to pass through and be positioned in the plurality of guide elements.

In an embodiment, the carrier further includes: a handle, pivotally connected to two opposite sides of the box body; and at least one guide element, provided on the handle, and a width and a size of at least one guide element may be used for the safety belt of the vehicle seat to pass through and be positioned in the at least one guide element.

In an embodiment, the carrier further includes an extension belt provided on the outer surface of the peripheral wall, and the extension belt connects the safety belt of the vehicle seat with a corresponding safety belt female buckle to fix the box body to the vehicle seat.

In an embodiment, two ends of the handle are pivots and are pivotally connected to the first side and the second side of the box body.

In an embodiment, the box body further includes at least one bottom opening, and the at least one bottom opening is formed at the bottom portion and penetrates through the bottom portion. The carrier further includes a binding device, and the binding device includes a binding webbing, and the binding webbing penetrates through the at least one bottom opening and is used for matching with a connecting element provided on a pet vest worn by the pet at a contact point, so that the pet is limited in the accommodating space.

In an embodiment, the box body further includes a positioning buckle provided at a side of the bottom portion and through which a free end of the binding webbing passes, and forms an adjusting end for adjusting tightness of the binding webbing.

In an embodiment, the binding device further includes a retractor, the bottom portion is further provided with a cavity communicating with the at least one bottom opening, the retractor is accommodated in the cavity, and the adjusting end of the binding webbing is connected with the retractor.

In an embodiment, the binding device further includes a buckle assembly. The buckle assembly includes a first buckle element provided at a free end of the binding webbing; and a second buckle element provided on the bottom portion, and the free end of the binding webbing is detachably connected with the bottom portion through a fastening of the first buckle element and the second buckle element.

In an embodiment, the binding device further includes a hook provided at a free end of the binding webbing, and the hook buckles the connecting element, so that the binding webbing and the connecting element are mutually matched.

In an embodiment, the binding webbing is a fastening belt, wherein the fastening belt protrudes through an interface between the bottom portion and a long side of the box body, passes through the contact point matched with the connecting element, and is connected with a fixing belt fixed at the other long side of the box body.

In an embodiment, the box body further includes a plurality of bottom openings, and the plurality of bottom openings are formed on the bottom portion and penetrate through the bottom portion. The carrier further includes a binding device. The binding device includes a plurality of binding webbings, and the plurality of binding webbings penetrate through the plurality of bottom openings and are respectively matched with a plurality of connecting elements provided on a pet vest worn by a pet at a plurality of contact points, so that the pet is limited in the accommodating space.

In an embodiment, the number of the plurality of bottom openings is greater than the number of the plurality of binding webbings. The box body further includes at least one box belt, passing through other bottom openings through which the plurality of binding webbing do not pass among the plurality of bottom openings, and fixed at the bottom portion of the box body, and respective free ends of the plurality of binding webbings are respectively connected to the at least one box belt, to bind the pet to the box body.

In an embodiment, the plurality of binding webbings include a plurality of fastening belts spaced apart from each other by a predetermined interval, extending out through an interface between the bottom portion and a long side of the box body, passing through the plurality of contact points matched with the connecting element, and respectively connected with a plurality of fixing belts fixed at the other long side of the box body.

In an embodiment, the plurality of fixing belts are provided at intervals at the other long side, and the plurality of fastening belts are respectively connected with corresponding fixing belts, so that the plurality of fastening belts extend parallel to each other.

In an embodiment, an end of each of the plurality of fixing belts passes through a corresponding positioning buckle provided on the box body, and the tightness of the fixing belt is adjustable by the positioning buckle.

The present disclosure further relates to a carrier, including a box body that includes a bottom portion and a peripheral wall connected to the bottom portion, and the bottom portion and the peripheral wall surrounding to define an accommodating space for accommodating a pet, and the bottom portion including at least one bottom opening; and a binding device that includes a binding webbing, and the binding webbing penetrates through the at least one bottom opening and is used for matching with at least one connecting element provided on a pet vest worn by the pet, so that the pet is limited in the accommodating space.

In an embodiment, the binding webbing penetrates through the connecting element, so that the binding webbing and the connecting element are mutually matched.

In an embodiment, the binding device further includes a buckle assembly. The buckle assembly includes a first buckle element provided at a free end of the binding webbing; and a second buckle element provided on the bottom portion, and the free end of the binding webbing is detachably connected with the bottom portion through a fastening of the first buckle element and the second buckle element.

In an embodiment, the binding device further includes a hook, the hook is provided at a free end of the binding webbing, and the hook buckles the connecting element, so that the binding webbing and the connecting element are mutually matched.

In an embodiment, the hook includes a connecting portion and a buckling portion. The connecting portion is connected with the free end of the binding webbing, and the buckling portion is fixedly connected or rotationally connected with the connecting portion.

In an embodiment, the binding device further includes an adjuster, the binding webbing penetrates through the adjuster, an adjusting end of the binding webbing is exposed out of the adjuster, and the adjuster is used for adjusting and locking the binding webbing, so that the binding webbing cannot move relative to the adjuster.

In an embodiment, the bottom opening penetrates through the bottom portion, and the adjuster is provided on an outer surface of the box body and close to a side of the bottom portion.

In an embodiment, the binding device further includes a retractor, and the bottom portion further includes a cavity communicated with the bottom opening, and the retractor is accommodated in the cavity, and the adjusting end of the binding webbing is connected with the retractor.

In an embodiment, the binding device further includes a guide element which is close to the retractor and used for guiding the binding webbing to be close to a turning section of the retractor.

In an embodiment, the binding device further includes a retractor, and the bottom portion also includes a cavity communicated with the bottom opening. The retractor is accommodated in the cavity, and the adjusting end of the binding webbing is connected with the retractor.

In an embodiment, the bottom portion further includes a body element and a rotating element which can rotate relative to the body element, the bottom opening and the cavity are formed in the rotating element, and the second buckle element is provided in the rotating element.

In an embodiment, the binding device further includes a locking device. The locking device is used for locking the retractor, and the retractor cannot rotate, so that the retractor cannot roll up or release the binding webbing.

In an embodiment, the locking device includes an operating element, a driving element, an elastic element, a first locking element and a second locking element. The second locking element is coaxially arranged with the retractor, the second locking element includes a locking notch, and the operating element may be switched between a locking position and an unlocking position; and when the operating element is switched from the unlocking position to the locking position, the elastic element drives the driving element, to drive the first locking element to engage with the locking notch, and when the first locking element engages with the locking notch, the retractor is unable to rotate.

In an embodiment, the locking device further includes a resetting element. The resetting element is connected with the first locking element and used for driving the first locking element to disengage from the locking notch.

In an embodiment, the operating element is rotatably provided on the bottom portion, and the operating element includes a cam structure sliding against the driving element when the operating element rotates.

In an embodiment, the binding device further includes a stopper, and the stopper is provided on the binding webbing and used for abutting against the bottom portion, to limit a winding length of the binding webbing wound by the retractor.

In an embodiment, the stopper is a webbing buckle, a webbing ring or a webbing clip.

In an embodiment, the carrier further includes a first engaging assembly provided on the bottom portion, and the carrier is installed on a base through cooperation between the first engaging assembly and the base.

In an embodiment, the first engaging assembly includes a first engaging element and a second engaging element, and the first engaging element and the second engaging element are provided in parallel and at intervals.

In an embodiment, the carrier further includes a second engaging assembly provided on the bottom portion, the first engaging assembly and the second engaging assembly are spaced from each other, and the carrier is installed on the base through cooperation between one of the first engaging assembly and the second engaging assembly and the base, and the second engaging assembly includes a third engaging assembly and a fourth engaging assembly, and the third engaging element and the fourth engaging element are provided in parallel and at intervals.

In an embodiment, the carrier further includes a structural reinforcement provided between the first engaging element and the second engaging element, and the structural reinforcement is approximately parallel to a short axis direction of the box body.

In an embodiment, the carrier further includes a handle, and two ends of the handle are respectively pivotally connected to two sides of the peripheral wall.

In an embodiment, the connecting element is a fixing ring.

In an embodiment, the pet vest used with the carrier includes a central strap, a first strap and a second strap. The first strap is provided around the pet, and the second strap is provided around the pet and spaced from the first strap.

In an embodiment, the central strip is connected between the first strap and the second strap, and the connecting element is formed on at least one of the first strap, the second strap and the central strip, and the binding webbing passes through the connecting element.

In an embodiment, the binding webbing passes through at least one of a gap between the pet and the first strap, a gap between the pet and the second strap, and at least one connecting element on the first strap and/or the second strap and/or the central strap. The binding webbing is connected with a box belt and/or a fixing belt fixed on the bottom portion of the box body.

In an embodiment, the binding webbing includes at least one fastening belt extending out through an interface between the bottom portion and a long side of the box body, passing through at least one connecting element on the first strap and/or the second strap, and connected with at least one fixing belt fixed at the other long side of the box body.

In an embodiment, the at least one fastening belt includes a first fastening belt and a second fastening belt, and the first fastening belt and the second fastening belt extend parallel to each other from a long side to an opposite long side of the box body, respectively. The first fastening belt and the first strap form a first linear contact region, and the second fastening belt and the second strap form a second linear contact region.

In an embodiment, a connecting element of the pet vest is a fixing ring, or a ring formed by the first strap, the second strap or the central strap and a corresponding webbing thereon.

In an embodiment, the binding webbing includes a first binding webbing and a second binding webbing, and the first binding webbing, the second binding webbing and the pet vest form at least one contact point. The at least one contact point includes at least one of at least one first contact point formed by at least one of the first binding webbing and the second binding webbing with the first strap, at least one second contact point formed by at least one of the first binding webbing and the second binding webbing with the second strap, and at least one third contact point formed by intersecting the first binding webbing and the second binding webbing with each other.

In an embodiment, the at least one contact point includes the at least one first contact point and the at least one second contact point, the at least one first contact point is on a shoulder or a chest of the pet, and the at least one second contact point is on a middle back of the pet.

In an embodiment, the at least one contact point includes the at least one third contact point, and the at least one third contact point is located at the central strip or at an intersection position around an annular member provided at one end of the central strip.

In an embodiment, the at least one contact point includes the at least one third contact point, and the at least one third contact point is on the chest or the shoulder of the pet, or the at least one third contact point is on a back of the pet.

In an embodiment, the at least one third contact point includes two third contact points, one of the two third contact points is formed on the chest or shoulder of the pet, and the other of the two third contact points is formed on the back of the pet.

In an embodiment, the second third contact point is located at an intersection position around an annular member provided at an end of the central strip.

In an embodiment, the at least one contact point includes the at least one first contact point and the at least one third contact point, the at least one first contact point is on a shoulder or a chest of the pet, and the at least one third contact point is at the central strap.

In an embodiment, the at least one third contact point is located at an intersection position around an annular member provided at least at one end of the central strip.

In an embodiment, the at least one third contact point includes two third contact points, one of the two third contact points is formed on the chest or the shoulder of the pet, and the other of the two third contact points is formed on the back of the pet.

In an embodiment, the binding webbing is a Y-belt. The Y-belt includes an extension section and two shoulder sections. The extension section penetrates through the bottom opening, and the two shoulder sections respectively correspond to the first binding webbing and the second binding webbing and are connected to the extension section through a connecting portion, and the connecting portion is used as the third contact point.

In an embodiment, the at least one contact point includes two third contact points, one of the two third contact points is on the chest or shoulder of the pet, and the other of which is on the back of the pet.

In an embodiment, the pet vest includes a chest pad and a back pad, and at least one connecting element is provided on the chest pad and/or the back pad, through which the binding webbing passes. The binding webbing includes a first binding webbing and a second binding webbing.

In an embodiment, the first binding webbing and the second binding webbing respectively form a first contact point and a fourth contact point with a connecting element provided on the chest pad. The first contact point is at the shoulder of the pet, and the fourth contact point is located around two sides of a hypogastrium of the pet.

In an embodiment, the connecting element is provided at the central region of the chest pad and/or the back pad, through which the first binding webbing and the second binding webbing pass and intersect to form the third contact point.

BRIEF DESCRIPTION OF THE DRAWINGS

To further understand the features and technical contents of the present disclosure, the following detailed description of the embodiments of the present disclosure and the accompanying drawings are provided. The detailed description and accompanying drawings are only for reference and explanation, and are not intended to limit the present disclosure; in which, FIGS. 1A to 1E schematically illustrate a carrier with an integrated fixing device according to an embodiment of a first aspect of the present disclosure;

FIGS. 33A and 33B schematically show enlarged views of a positioning buckle of the pet carrier shown in FIG. 33.

DETAILED DESCRIPTION

Figure 1A:
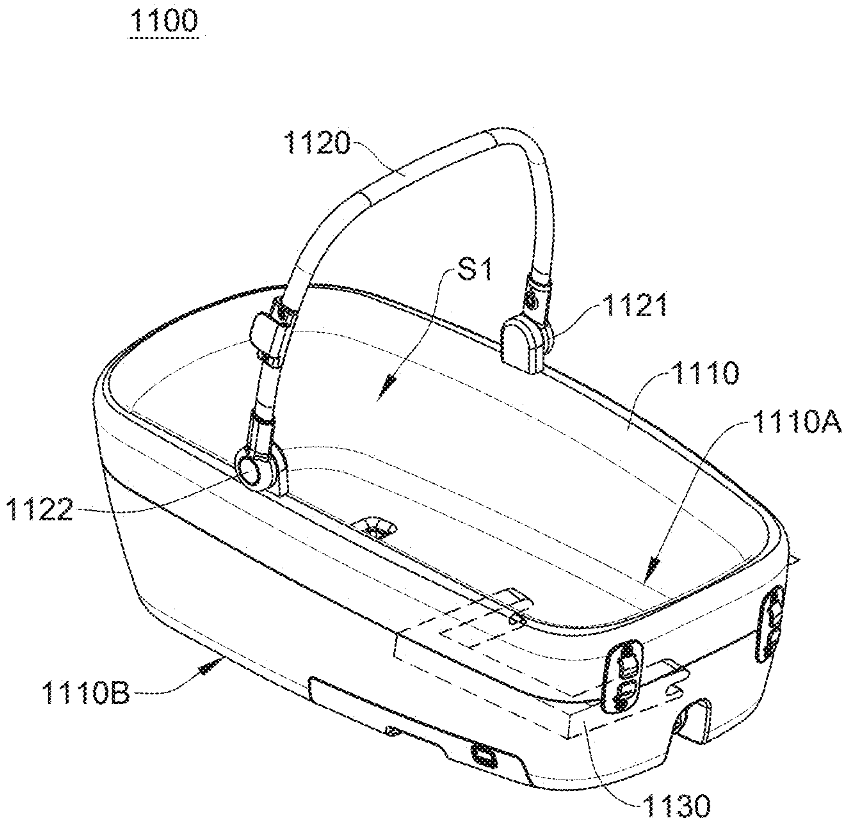

Hereinafter, the technical concept and connotation of the present disclosure will be described by way of examples with reference to the drawings. In the accompanying drawings or descriptions, the same or similar parts are denoted by the same or corresponding reference numerals. Furthermore, the accompanying drawings are drawn for the convenience of understanding, and the size and shape of each component in the accompanying drawings are not the actual size or proportional relationship of the component.

In addition, the following descriptions of the accompanying drawings and embodiments are not meant to limit the scope of implementation of the present disclosure to a single implementation. Other implementations are also possible by replacing part or all of the components described or shown. Furthermore, in the case that some components of the disclosed embodiments can use part or all of the known components, in some cases, only those parts of such known components that are necessary for understanding the embodiments of the present disclosure are described, and detailed descriptions of other parts of these known components are omitted to avoid confusing the concepts and embodiments of the present disclosure.

In the first aspect of the present disclosure, a carrier 1100 with an integrated fixing device is provided for fixing the carrier 1100 to a vehicle seat.

Figure 1B:
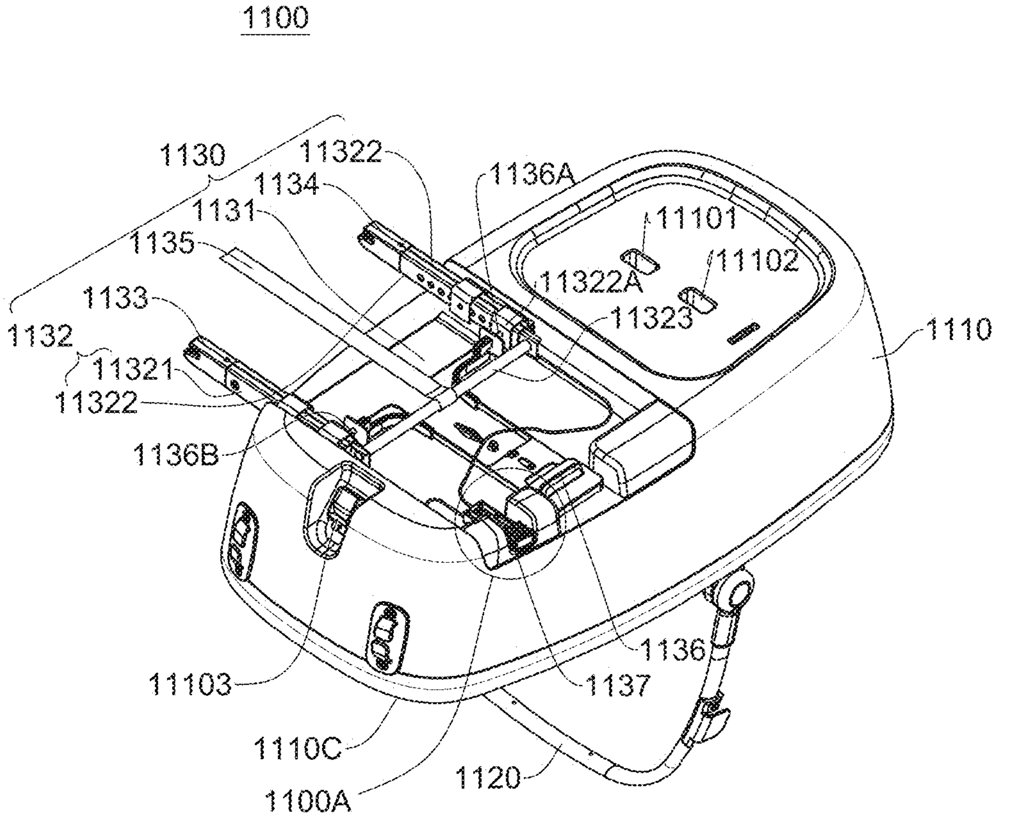
Figure 1C:
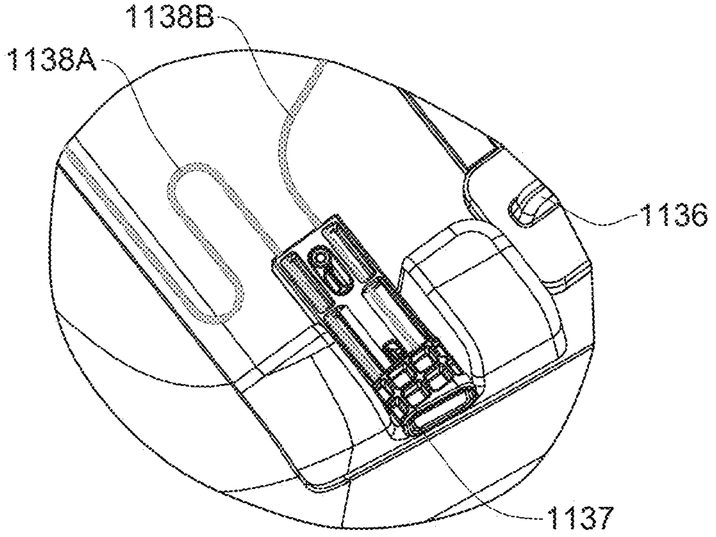
Figure 1D:
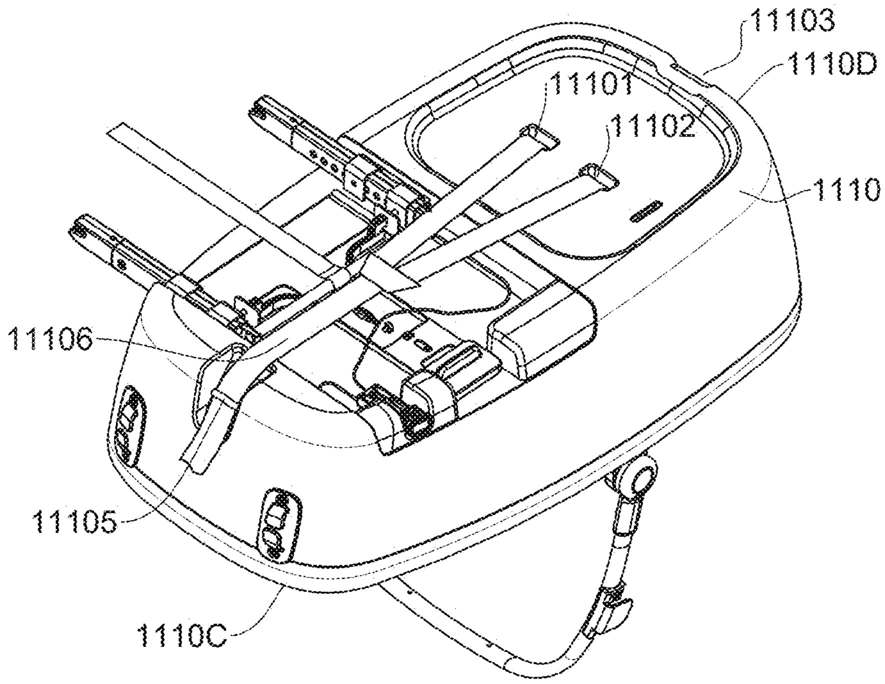
Figure 1E:
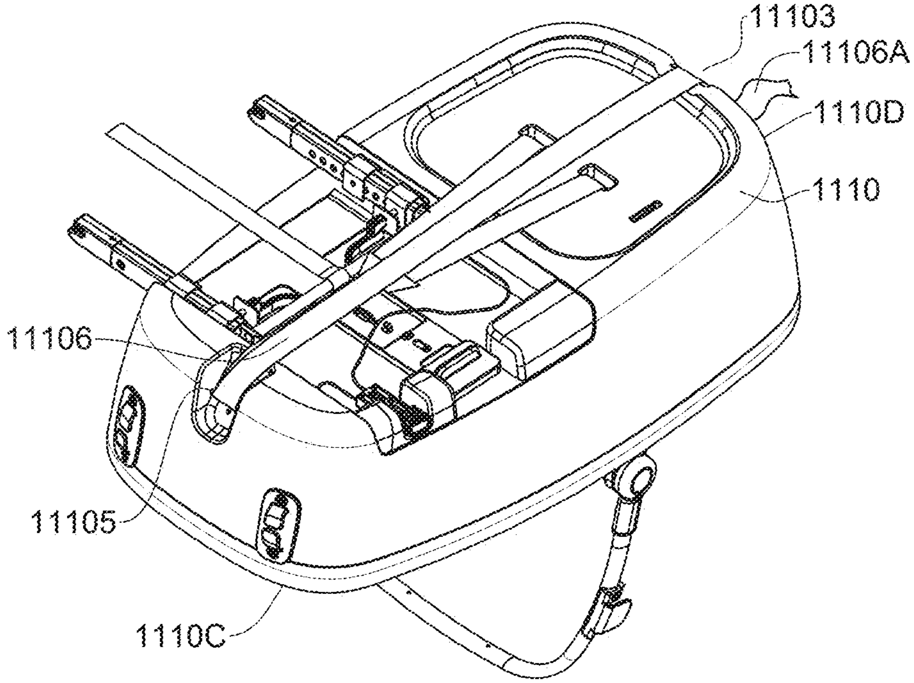

Referring to FIGS. 1A to 1E, a carrier 1100 with an integrated fixing device according to an embodiment of the first aspect of the present disclosure is schematically illustrated. FIG. 1A is a perspective view of the carrier 1100 of this embodiment, FIG. 1B is a perspective view of the carrier 1100 viewed from bottom portion, FIG. 1C is an enlarged view of a dashed-line framed area 1100A in FIG. 1B, and FIGS. 1D and 1E are perspective views of variations of the aforementioned embodiment viewed from bottom portion.

As shown in FIG. 1A, the carrier 1100 of this embodiment mainly includes a box body (also called "main body") 1110, a handle 1120 and a fixing device 1130 (also referred to as a "first fixing device"). The box body 1110 is a box-shaped structure with a raised peripheral wall to enclose and define a carrying space S1, which may carry an animal (or a pet). The box body 1110 has two opposite long sides 1110A and 1110B (for example, a first side 1110A, and a second side 1110B). The long side 1110A is a side where the box body 1110 abuts against a backrest of a vehicle seat (e.g., a rear seat). The handle 1120 is approximately in a U-shaped structure, which is linked to the box body 1110 in a movable or detachable way, so that a user (such as an animal owner) can conveniently draw and carry the carrier 1100 of this embodiment. In this embodiment, two ends of the handle 1120 are pivotally connected to two respective long sides of the box body 1110, that is, the two ends of the handle 1120 may rotate to an upper edge of a peripheral wall of the box body 1110 along pivots 1121, 1122 to a direction of the box body 1110, to be stacked on the peripheral wall of the box body 1110 and be convenient for storage. Alternatively, in other embodiments, the handle 1120 may also be detached from the box body 1110. Alternatively, in other embodiments, the pivots of the handle 1120 may also be provided on outer surfaces of the two sides of the box body 1110, instead of upper edges of the two long sides of the box body 1110, to reduce the chance of the handle 1120 and its pivots colliding with an animal in the box body 1110, and avoid the animal from colliding with the handle 1120 due to the change of vehicle speed during driving, and then being frightened or injured.

In this embodiment, the carrier 1100 is fixed to the vehicle seat by a fixing device 1130. Referring to FIG. 1B, the carrier 1100 of this embodiment has a fixing device 1130 combined with the box body 1110, that is, the fixing device 1130 is directly provided (e.g., embedded) at a bottom portion of the box body 1110. Specifically, in this embodiment, the fixing device 1130 may be, for example, a rigid ISOFIX system, which includes a primary frame 1131, a connecting frame 1132, connectors 1133, 1134 (e.g., ISOFIX connectors), and a pulling belt 1135. The primary frame 1131 is directly fixed to the bottom portion of the box body 1110, for example, but not limited to, by a fixing way of embedding, locking or welding, etc. The connecting frame 1132 is U-shaped and consists of a pair of longitudinal connecting brackets 11321, 11322 and a transverse rod 11323 connecting the longitudinal connecting brackets 11321, 11322. Respective ends (or referred to as "back ends") of the two longitudinal connecting brackets 11321, 11322 are movably connected to the primary frame 1131, for example, by a socket mode, to enable the connecting frame 1132 to be telescopically moved relative to the primary frame 1131, so that the connectors 1133 and 1134 provided at a front end of the connecting frame 1132 may act between a position at the bottom portion of the box body 1110 and a position exposed from the long side 1110A of the box body 1110. The pulling belt 1135 is connected to a transverse rod 11323 of the U-shaped connecting frame 1132 for a user (such as an animal owner) to pull to drive the connecting frame 1132 to move relative to the primary frame 1131. The connectors 1133 and 1134 are used to connect to a corresponding fixing system at the vehicle seat, such as an ISOFIX fixing point, to stably fix the carrier 1100 of this embodiment to the vehicle seat. Alternatively, in another embodiment, the fixing device 1110 of the carrier 1100 does not include the pulling belt 1135, and the user may adjust the positions of the connectors 1133 and 1134 by directly pulling the connectors 1133 and 1134. It should be noted that the "longitudinal" and "transverse" of the "longitudinal connecting bracket" and "transverse rod" here correspond to the relative direction of the carrier, which is convenient to distinguish some parts and/or elements, that is, the "longitudinal connecting bracket" and the "transverse rod" may also be called a "first connecting bracket" and a "second connecting bracket".

In this embodiment, as shown in FIG. 1B, the bottom portion of the box body 1110 of the carrier 1100 is provided with bottom board openings 11101 and 11102 (also referred to as "bottom openings") penetrating through the bottom portion, through which a fixing pulling belt (not shown) of the carrier 1100 passes, to fix an animal in a carrying space S1 of the carrier 1100 (which is further illustrated in FIGS. 10A and 10B, and FIGS. 11A and 11B). In addition, a short side 1110C of the box body 1110 far away from the bottom board openings 11101 and 11102 is provided with a positioning buckle, through which a free end (not shown) of the fixing pulling belt may passes, and an adjusting end is formed there for the user to adjust the tightness of the fixing pulling belt.

More specifically, as shown in FIG. 1B, in this embodiment, the fixing device 1130 of the carrier 1100 further includes a lock release handgrip 1136, which is also directly provided at the bottom portion of the box body 1110 of the carrier 1100. When the lock release handgrip 1136 is pulled, engagement pins 1136A and 1136B may be disengaged from an engagement hole (for example, an engagement hole 11322A) on the primary frame 1131 and one of engagement holes on the connector 11322 corresponding to the engagement hole of the primary frame 1131, respectively. By pulling the pulling belt 1135, the user may make the connecting frame 1132 be stretched to move toward an outside of the box body 1110 relative to the primary frame 1131. After the stretching adjustment is completed, the adjusting handgrip 1136 is loosened, so that the engaging pins 1136A and 1136B may be reset and inserted into the corresponding engagement holes of the primary frame and the connecting frame for positioning, and further movement of the connecting frame 1132 can be avoided. Similarly, after pulling the lock release handgrip 1136 to disengage the engagement pins 1136A and 1136B from the engagement holes, the connecting frame 1132 may be pushed to be folded, so that the connectors 1133 and 1134 may be disengaged from a rear seat fixing point after the lock is released (as described below).

In addition, as shown in FIG. 1C, the fixing device 1130 of the carrier 1100 of this embodiment further includes a lock release device, which is also directly provided at the bottom portion of the box body 1110 of the carrier 1100 and is composed of a lock release mechanism 1137 connected with lock release linkage steel wires 1138A, 1138B. One end of each of the lock release linkage steel wires 1138A, 1138B is connected to the lock release mechanism 1137, and the other end of each of the lock release linkage steel wires 1138A and 1138B is connected to a lock block (not shown) of each of the connectors 1133, 1134. When the user presses the lock release mechanism 1137, the lock block may be driven by the lock release linkage steel wires 1138A, 1138B to disengage from the ISOFIX fixing point at the vehicle seat, and the connectors 1133, 1134 may be unlocked, so that the carrier 1100 of this embodiment may be disengaged from the ISOFIX fixing point at the vehicle seat for unloading.

According to this embodiment, the fixing device 1130 of the carrier 1100 is directly fixed or embedded in the bottom portion of the box body 1110, so the box body 1110 of the carrier 1100 may be directly and stably fixed to the vehicle seat without matching with another fixing base or a base with supporting leg, and thereby completing a stable installation of the carrier 1100 in the vehicle.

Referring to FIGS. 1D and 1E, a variation of the aforementioned embodiment is schematically illustrated. As shown in the figures, a positioning buckle 11103 of the carrier 1100 may be provided at the bottom portion of the box body 1110 and on a short side 1110D near the bottom board openings 11101, 11102. In this embodiment, two ends of a Y-shaped fixing pulling belt pass through the bottom board openings 11101, 11102 respectively and are exposed out of a carrying space of the box body 1110 for fixing an animal (which will be further illustrated in FIGS. 10A and 10B, and FIGS. 11A and 11B). A belt body part (also called a fixing strap) 11106 of the Y-shaped fixing pulling belt extends through a guide structure 11105 provided at the short side 1110C to change its extending direction, extends toward the short side 1110D and further passes through the positioning buckle 11103 provided at the short side 1110D. An adjusting end 11106A is formed for the user to adjust the tightness of the fixing pulling belt. In this embodiment, as the short side 1110D is a side close to the head of an animal, and also a side close to a caregiver in the rear seat. The carrier 1100 of this embodiment can facilitate the caregiver to adjust the tightness of the fixing belt according to the actual situation during driving, and to avoid the animal in the carrying space from being excessively pressed by the fixing belt.

According to this embodiment, the box body 1110 may be made of a suitable material according to the use needs, including but not limited to plastic, wood, metal, or any material with certain hardness to provide support, and may also include but not limited to a cushioning material or a foaming material, such as expanded polypropylene (EPP) or expanded polystyrene (EPS). Preferably, the box body 1110 may be made of a hard plastic material.

Figure 2A:
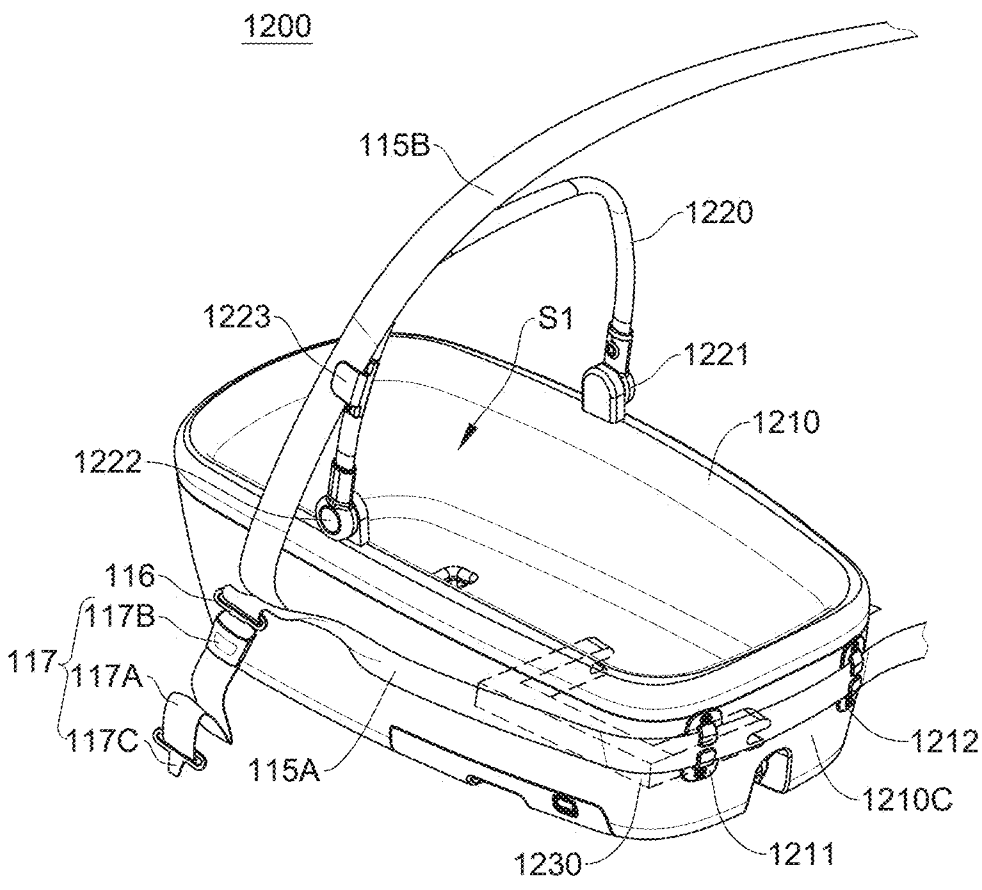
FIGS. 2A to 2B schematically illustrate a carrier with an integrated fixing device according to another embodiment of the first aspect of the present disclosure.
Figure 2B:
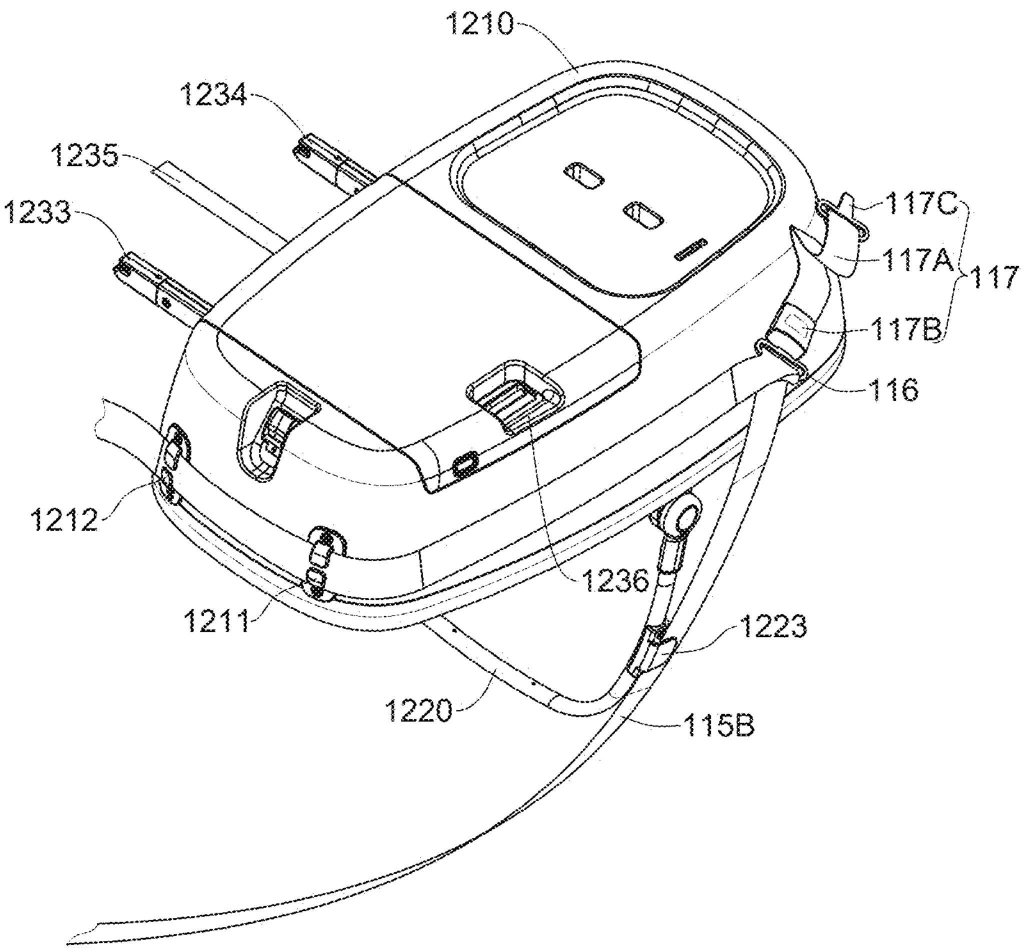

Referring to FIGS. 2A to 2B, a carrier 1200 with an integrated fixing device according to another embodiment of the first aspect of the present disclosure is schematically illustrated. FIG. 2A is a perspective view of the carrier 1200 of this embodiment, and FIG. 2B is a perspective view of the carrier 1200 viewed from the bottom portion.

The carrier 1200 shown in FIG. 2A has a similar structure and composition to the carrier 1100 of the foregoing embodiment, including a box body 1210, a handle 1220 and a fixing device 1230. The box body 1210 is a box-shaped structure with a raised peripheral wall to enclose and define a carrying space S1. The handle 1220 is approximately in a U-shaped structure, which is linked to the box body 1210 in a movable or detachable way, so that a user (such as an animal owner) can conveniently draw and carry the carrier 1200 of this embodiment. In this embodiment, two ends of the handle 1220 are pivotally connected above or outside the two respective long sides of the box body 1210, that is, the two ends of the handle 1220 may rotate to an upper edge of a peripheral wall of the box body 1210 along pivots 1221, 1222, to be stacked on the peripheral wall of the box body 1210 for convenience of storage. The fixing device 1230 may be, for example, a rigid ISOFIX system, which includes a primary frame, a connecting frame, connectors 1233 and 1234, and a pulling belt 1235. In this embodiment, the fixing device 1230 is also directly provided at the bottom portion of the box body 1210, and is fixed to the bottom portion of the box body 1210, for example by embedding, locking or welding of the primary frame of the fixing device 1230 to the box body 1210. In this embodiment, the structures of the primary frame and the connecting frame of the fixing device 1230 are the same as those of the primary frame 1131 and the connecting frame 1132 of the foregoing embodiment, that is, the integrated fixing device of the carrier 1200 is formed by a fixing combination of the primary frame and the box body 1210. In this embodiment, the fixing device 1230 also includes structures like a lock release handgrip 1236 and a lock release device (not shown).

The carrier 1200 of this embodiment may be further fixed at the rear seat of the vehicle by using the rear safety belt of the vehicle through the structural design of the carrier. Specifically, in this embodiment, at least one guide element (guide elements 1211, 1212 in this embodiment) is provided on a periphery of the peripheral wall of the box body 1210 of the carrier 1200 (e.g., on a periphery of the peripheral wall of the short side 1210C of the box body 1210), and a guide element 1223 is also provided on the handle 1220. A width and a size of the guide element are designed for the rear safety belt of the vehicle to pass through and be positioned therein.

Generally speaking, the rear safety belt of the vehicle includes a belly belt (or a waist belt) extending through the passenger's belly, and a shoulder belt extending downward from the passenger's shoulder. The shoulder belt and the belly belt are jointly connected to a safety belt male buckle (such as a tongue piece), and the tongue piece is inserted into a corresponding female buckle at the rear seat to be buckled. As shown in the figure, in this embodiment, in addition to the carrier 1200 being fixed to the corresponding ISOFIX fixing point of the rear seat of the vehicle by the fixing device 1230, and when the carrier is provided on the rear seat of the vehicle, the carrier may also be fastened by using the safety belt belly belt (or the waist belt) 115A of the rear seat of the vehicle passing through the guide elements 1211, 1212 on the periphery of the short side 1210C of the box body 1210, and the shoulder belt 115B of the safety belt passing through the guide element 1223 on the handle 1220, which are connected together and inserted into a corresponding female buckle (not shown) at the rear seat by means of their jointly connected tongue piece 116. Therefore, the combination of the safety belt in the rear seat of the vehicle with the box body 1210 and the handle 1220 may provide the stable and fixed effect for the carrier 1200 of this embodiment. Especially, in this embodiment, the guide element 1223 on the handle 1220 limits the shoulder belt 115B of the safety belt on the handle 1220, which is beneficial to make the shoulder belt 115B of the safety belt fit with a part of the handle 1220 and extend along it. Therefore, the handle 1220 may also provide auxiliary support for the shoulder belt 115B of the safety belt and prevent the shoulder belt 115B from moving randomly when the vehicle is traveling.

According to this embodiment, the fixing device 1230 of the carrier 1200 is directly fixed or embedded in the bottom portion of the box body 1210, and the guide elements 1211, 1212 and 1223 are also directly formed (or provided) on the box body 1210 and on the handle 1220 to be combined and fixed with the safety belt of the rear seat of the vehicle, so that the carrier 1200 may be directly fixed to the rear seat of the vehicle without matching with another fixing base provided or a fixing base with a supporting leg.

In an embodiment, the carrier 1200 of this embodiment further includes an extension belt 117 provided on an outer surface of the box body. When a volume of the carrier 1200 is large, or when a belly belt 115A and a shoulder belt 115B of the safety belt of the rear seat of the vehicle are not long enough to be connected to a safety belt female buckle under the rear seat, after passing through the guide elements 1211, 1212 on the box body 1210 and the guide element 1223 on the handle 1220, respectively, the extension belt 117 may be used to lengthen a length of the rear seat safety belt. Specifically, the extension belt 117 includes an extension strap 117A, the ends of which are respectively connected with a female buckle fastening element 117B and a male buckle fastening element (e.g., a tongue piece) 117C. After passing through the guide elements 1211, 1212 on the box body 1210 and the guide element 1223 on the handle 1220 respectively, the belly belt 115A and the shoulder belt 115B of the safety belt of the rear seat of the vehicle are inserted into the female buckle fastening element 117B of the extension belt 117 by their jointly connected tongue piece 116, and further inserted into the female buckle of the vehicle safety belt by the male buckle fastening element 117C (e.g., a tongue piece) of the extension belt 117, so that the seat belt of the rear seat of the vehicle is used to fix the rear seat of the vehicle to complete the stable installation of the carrier 1200 in the embodiment.

Figure 3:
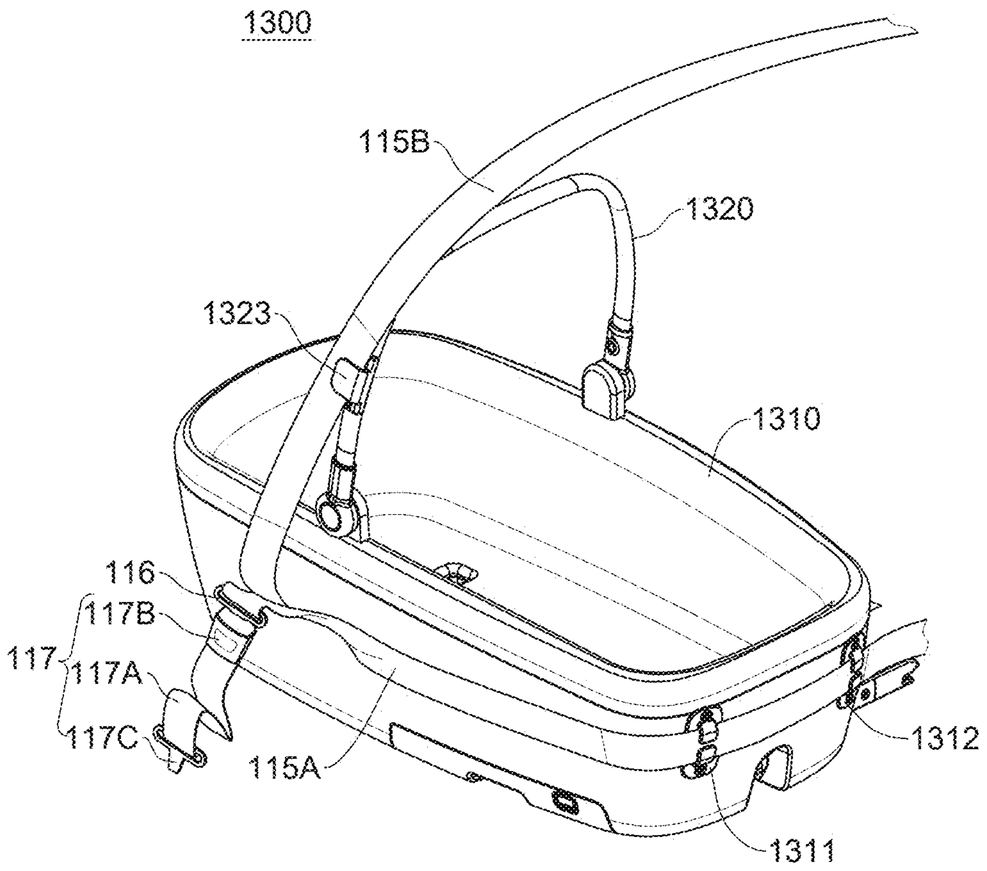
FIG. 3 schematically illustrates a carrier with an integrated fixing device according to yet another embodiment of the first aspect of the present disclosure.

In an embodiment, as shown in FIG. 3, the carrier 1300 has a structure and composition similar to those of the carriers 1100, 1200 of the foregoing embodiment, including a box body 1310, a handle 1320, guides 1311, 1312 and 1323, and an extension belt 117, an extension strap 117A, a female buckle fastening element 117B, a male buckle fastening element 117C, etc. In this embodiment, similar reference numerals are used to indicate the same functions or components, and the same parts will not be repeated to avoid confusing the inventive concept. This embodiment is different from the carrier 1200 shown in FIGS. 2A and 2B in that the carrier 1300 is not provided with the ISOFIX fixing device 1230, but is directly fixed to the rear seat of the vehicle by the rear seat safety belt. In this embodiment, the carrier 1300 may be fixedly installed in the vehicle by fixing the rear seat of the vehicle with the rear seat safety belt of the vehicle.

Figure 4A:
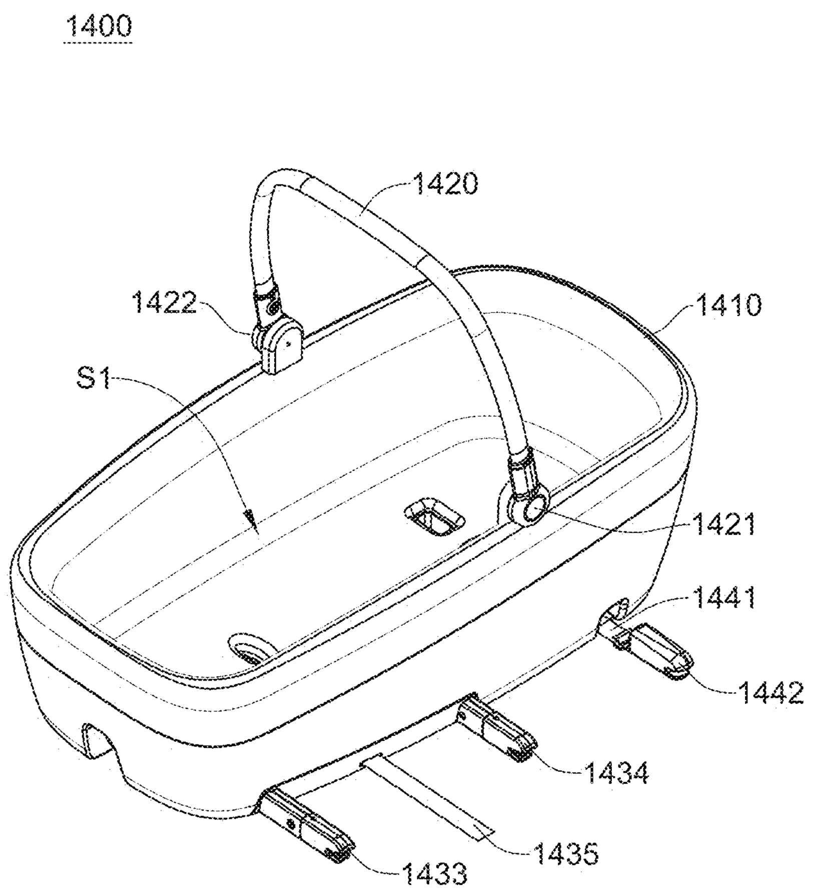
FIGS. 4A to 4C schematically illustrate a carrier with an integrated fixing device according to an embodiment of the first aspect of the present disclosure.
Figure 4B:
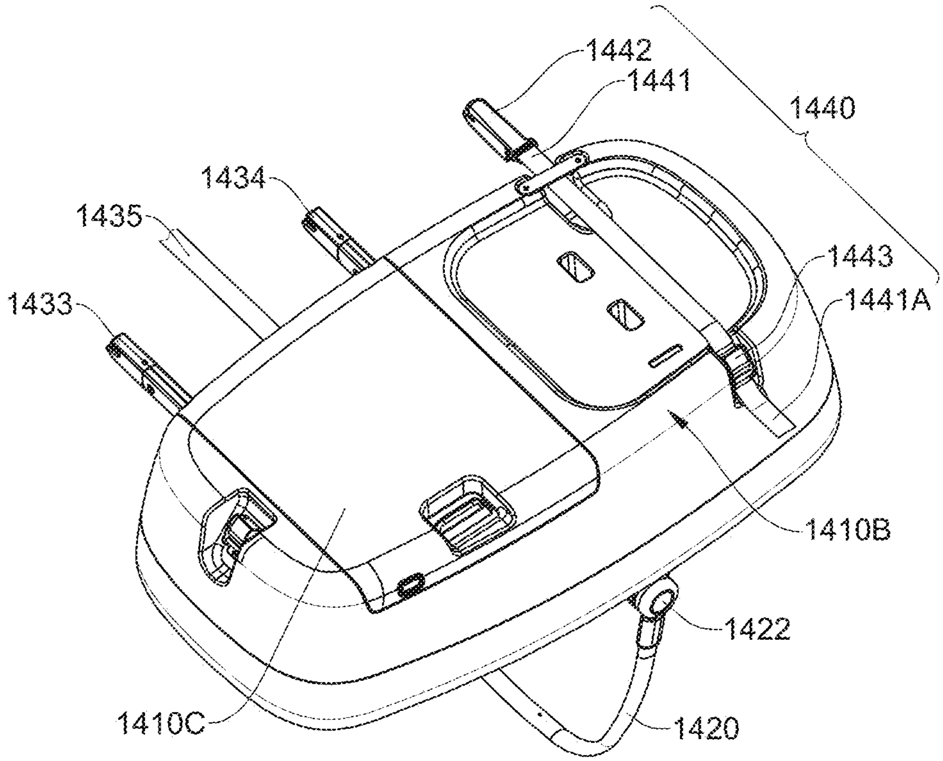
Figure 4C:
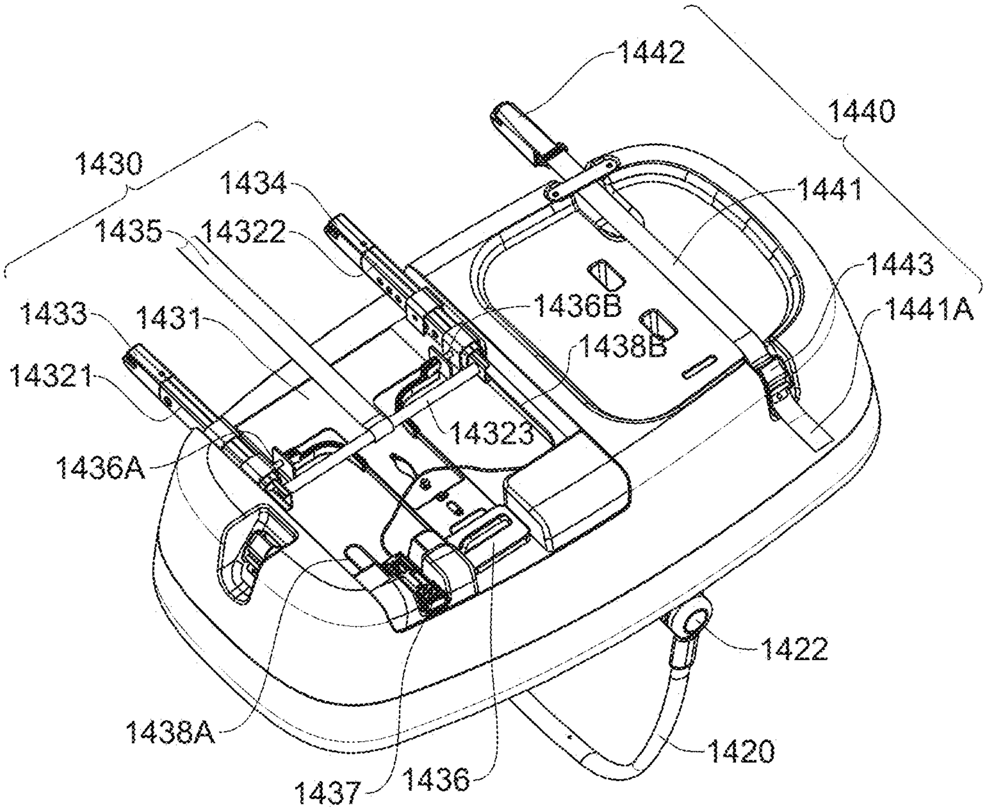

Referring to FIGS. 4A to 4C, a carrier 1400 with an integrated fixing device according to an embodiment of the first aspect of the present disclosure is schematically illustrated. FIG. 4A is a perspective view of the carrier 1400 of this embodiment, FIG. 4B is a perspective view of the carrier 1400 viewed from bottom portion, and FIG. 4C is also a perspective view of the carrier 1400 viewed from bottom portion. A bottom cover 1410C of the box body 1410 is removed to reveal the composition and assembly of the fixing device 1430 of the carrier 1400.

The carrier 1400 shown in FIGS. 4A to 4C has a similar structure and composition to the carriers 1100, 1200 of the foregoing embodiments, including a box body 1410, a handle 1420 and a fixing device 1430. The box body 1410 is a box-shaped structure with a raised peripheral wall to enclose and define a carrying space S1. The handle 1420 includes pivots 1421, 1422. The fixing device 1430 includes a primary frame 1431, longitudinal connecting brackets 14321, 14322 connecting to the frame, connectors 1433, 1434, a transverse rod 14323, a pulling belt 1435, a lock release handgrip 1436, engagement pins 1436A, 1436B, a lock release mechanism 1437, and lock release linkage steel wires 1438A, 1438B.

The difference between the carrier 1400 and the foregoing embodiment is that in this embodiment, the carrier 1400 includes not only the above-mentioned fixing device 1430 as the first fixing device, but also a second fixing device 1440, which is, for example, a soft ISOFIX system, to provide another fixing point for the carrier 1400 to the rear seat.

Specifically, as shown in FIGS. 4B and 4C, the second fixing device 1440 includes a belt portion 1441 (e.g., a webbing) and a connector 1442 connected to an end of the belt portion 1441. In this embodiment, the connector 1442 may be, for example, an ISOFIX connector, which may be connected to a corresponding ISOFIX fixing point of the rear seat of the vehicle. The belt portion 1441 extends at the bottom portion of the box body 1410, and the other end (an adjustment end) 1441A is exposed outside the box body 1410 through an adjuster 1443 provided at a long side 1410B of the box body 1410, so that the user can quickly and simply adjust a belt length of the belt portion 1441 of the flexible (soft) connection fixing system 1440.

In this embodiment, the adjuster 1443 of the second fixing device 1440 may be selected from any belt length adjusting buckle made by those skilled in the art to which the present disclosure belongs, such as, but not limited to, an adjusting buckle ring, a length adjusting buckle, a tri-glide buckle (such as "θ"-shaped buckle), a stair buckle, a one-way adjusting buckle, a cam buckle and the like.

In this embodiment, the carrier 1400 may also include guide elements correspondingly provided on the outer surface of the box body 1410 and the handle 1420, as like the guide elements 1211, 1212 and 1223 in the foregoing embodiment, through which the safety belt (not shown) of the vehicle seat pass and positioned therein, to provide further stable and fixed effect for the carrier 1400.

Figure 5A:
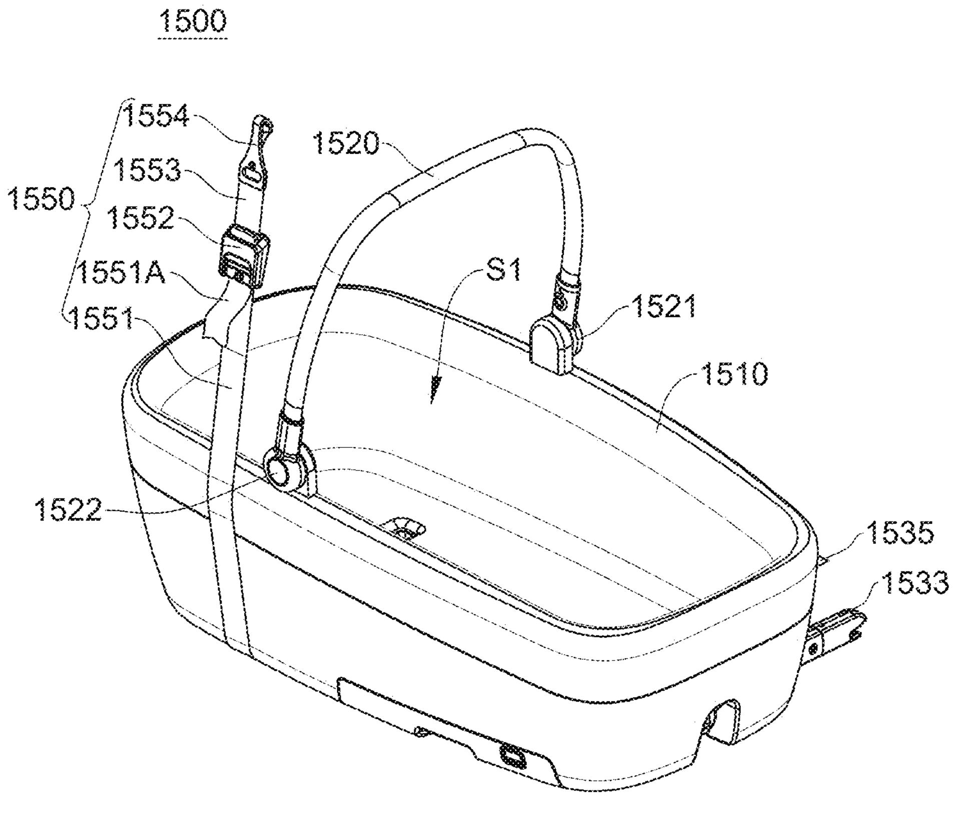
FIGS. 5A to 5D schematically illustrate a carrier with an integrated fixing device according to an embodiment of the first aspect of the present disclosure.
Figure 5B:
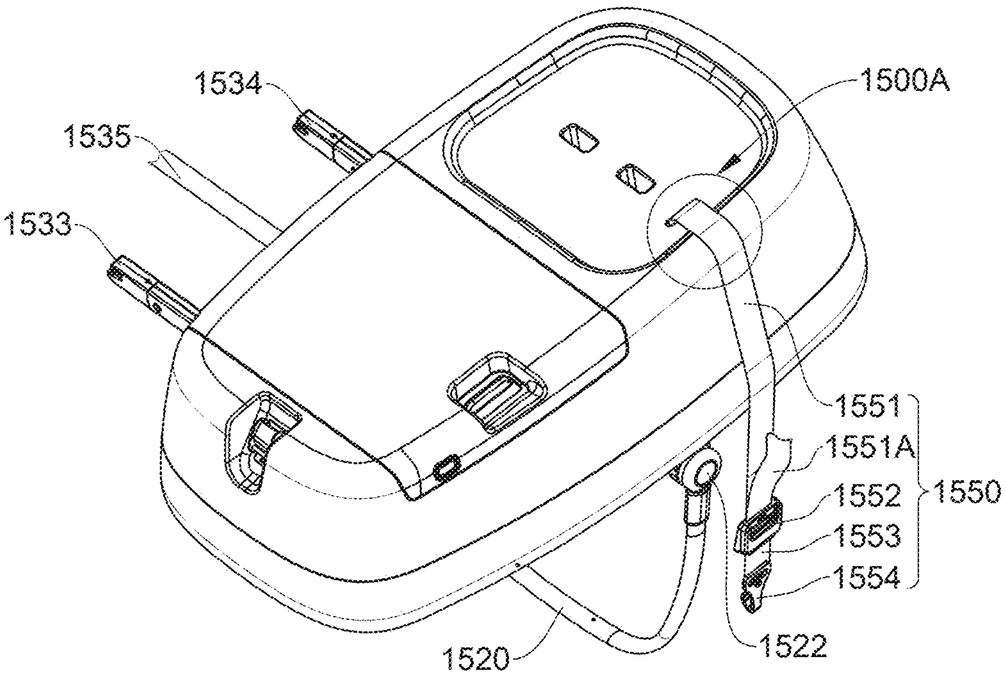
Figure 5C:
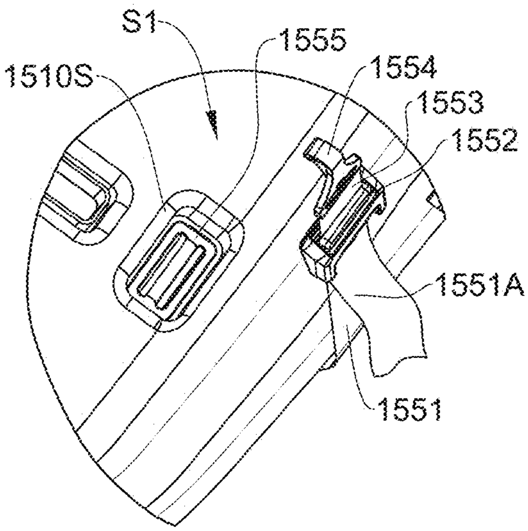
Figure 5D:
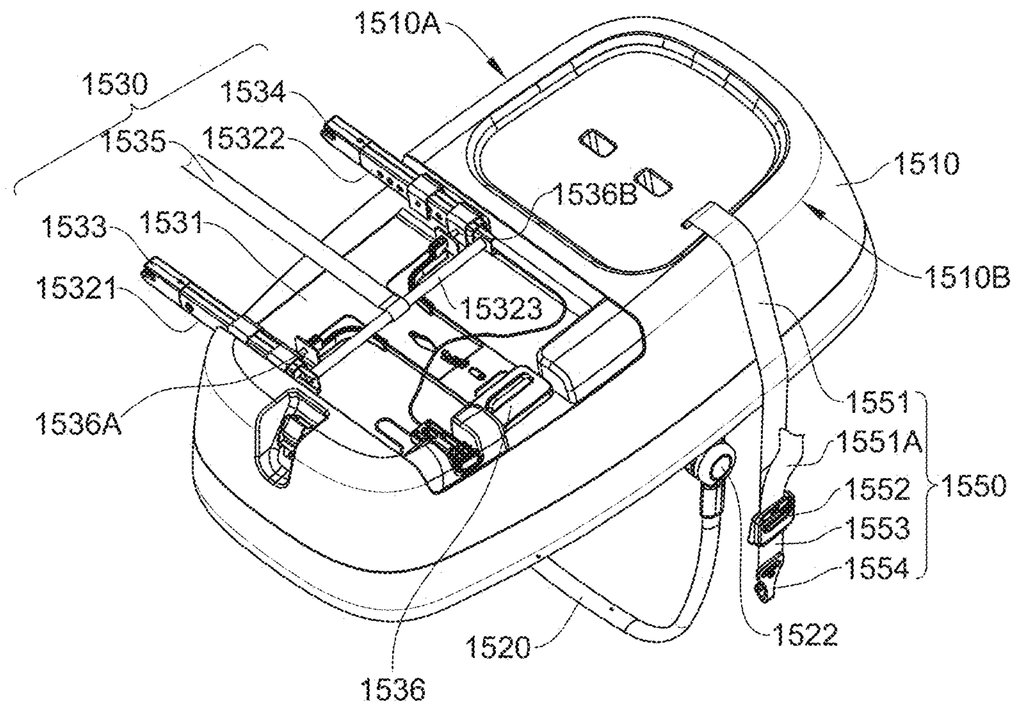

Referring to FIGS. 5A to 5D, a carrier 1500 with an integrated fixing device according to an embodiment of the first aspect of the present disclosure is schematically illustrated. FIG. 5A is a perspective view of the carrier 1500 of this embodiment, FIG. 5B is a perspective view of the carrier 1500 viewed from bottom portion, FIG. 5C is an enlarged view of a bearing surface in the box body carrying space corresponding to a dashed-line area 1500A in FIG. 5B, and FIG. 5D is a schematic view of the carrier 1500 of this embodiment showing the composition and components of the fixing device 1530 after removing a bottom cover of the box body 1510.

The carrier 1500 shown in FIGS. 5A to 5D has a similar structure and composition to the carriers 1100, 1200 and 1400 of the foregoing embodiments, including a box body 1510, a handle 1520 and a fixing device 1530. The box body 1510 is a box-shaped structure with a raised peripheral wall to enclose and define a carrying space S1. The handle 1520 includes pivots 1521, 1522. The fixing device 1530 includes a primary frame 1531, a connecting frame 1532, longitudinal connecting brackets 15321, 15322, connectors 1533, 1534, a transverse rod 15323, a pulling belt 1535, a lock release handle 1536, locking pins 1536A, 1536B, a lock release mechanism, a lock release linkage steel wire and the like.

The difference between the carrier 1500 and the foregoing embodiment is that in this embodiment, the carrier 1500 further includes an anchoring device (a top tether) 1550 in addition to the above-mentioned fixing device 1530 to further fix the carrier 1500 to an anchoring point (not shown) in the rear seat of the vehicle. As shown in the figure, the anchoring device 1550 includes a tether 1551, an adjuster 1552, a connecting strap 1553 and a connecting element 1554 (such as a hook element). An end of the tether 1551 is connected to and extends through a side of the adjuster 1552, and the end is exposed outside the adjuster 1552 to form a tether adjusting end 1551A, and the other side of the adjuster 1552 is connected to an end of a connecting strap 1553. A relatively remote end of the connecting strap 1553 is connected to a connecting element 1554 for fixing to a corresponding fixing point (not shown) above the rear seat of the vehicle or crossing the seat to the rear bottom portion as an anchoring point.

In this embodiment, a length of the connecting strap 1553 is fixed, and the user may pull the tether adjusting end 1551A passing through the adjuster 1552 to adjust a length of the tether 1551 in coordination with the fixing of the adjuster 1552, to adjust the overall belt length of the anchoring device 1550 to adapt to a position of the fixing point. Alternatively, in other embodiments, the length of the tether 1551 may be fixed, and the user uses the adjuster 1552 to adjust the length of the connecting strap 1553, thereby adjusting the overall belt length of the anchoring device 1550 to adapt to the fixing point of the rear seat of the vehicle.

As shown in FIG. 5C, in this embodiment, an end of the tether 1551 of the anchoring device 1550 passes through a through hole 1510S on the box body 1510 inward from an outer surface of the bottom portion of the box body 1510, and is abutted against an inner surface of the box body 1510 by a fixing element (for example, but not limited to, a tri-glide buckle, such as a fixing element 1555) connected to the end of the tether 1551. The fixing element 1555 is exposed from the inner surface of the box body 1510 out of the carrying space S1 surrounded by the peripheral wall of the box body 1510.

In this embodiment, the carrier 1500 may also include guide elements correspondingly provided on the outer surface of the box body 1510 and the handle 1520, as like the guide elements 1211, 1212 and 1223 in the foregoing embodiment, through which the safety belt (not shown) of the vehicle seat or the tether 1551 of the anchoring device 1550 may pass and be positioned therein, to provide further stable and fixed effect for the carrier 1500.

Figure 6:
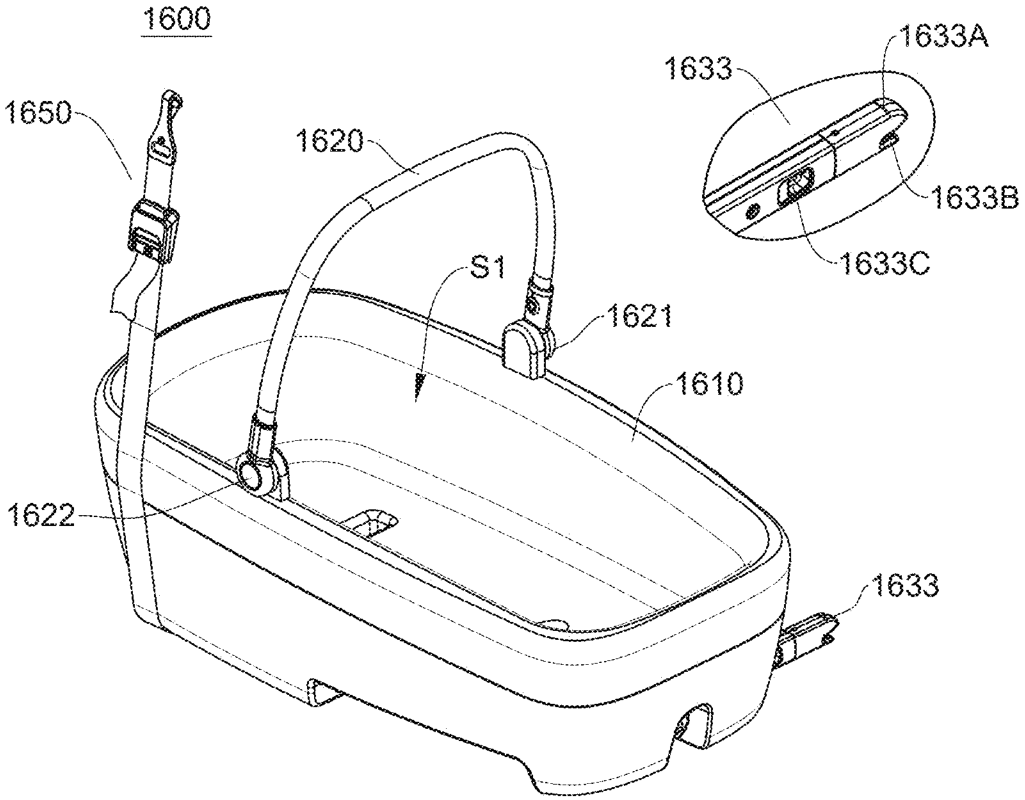
FIG. 6 schematically illustrates a carrier with an integrated fixing device according to an embodiment of the first aspect of the present disclosure.

Referring to FIG. 6, a carrier 1600 with an integrated fixing device according to an embodiment of the first aspect of the present disclosure is schematically illustrated. The carrier 1600 shown in FIG. 6 has a structure and composition similar to that of the carrier 1500 of the foregoing embodiment, including a box body 1610, a carrying space S1 defined by the box body 1610, a handle 1620, pivots 1621, 1622 of the handle 1620, a fixing device including a connector 1633 and other components, and an anchoring device 1650. As shown in a partial enlarged view of the figure, the connector 1633 is an ISOFIX connector, and connecting ends of which have directionality, that is, a thick end 1633A located above and a relatively thin end 1633B located below. The connector 1633 also includes a lock release button 1633C for the user to press to release the connector 1633, so that it may be separated from the ISOFIX fixing point of the vehicle seat.

The difference between the carrier 1600 and the foregoing embodiment is that in this embodiment, the fixing device of the carrier may change its connection direction to be adaptively fixed to a corresponding fixing point of a left vehicle seat (i.e., behind a driver's seat) or a right vehicle seat (i.e., behind an assistant seat). As described in detail in FIGS. 7A to 7D below.

Referring to FIGS. 7A to 7E, the detailed structure and action of the fixing device in the carrier 1600 of the embodiment shown in FIG. 6 are schematically illustrated.

Figure 7A:
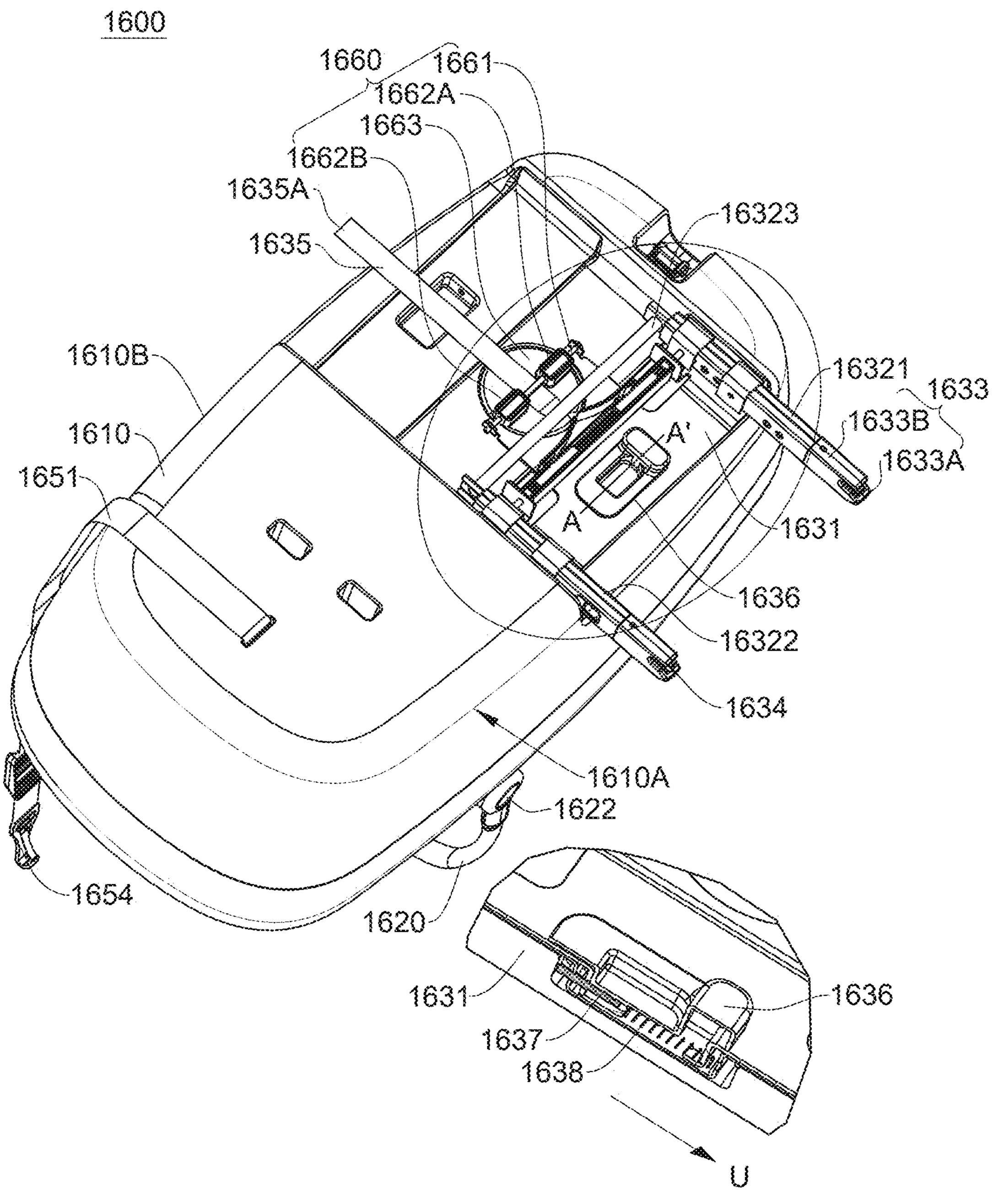
FIGS. 7A to 7F schematically illustrate a detailed structure and action of the integrated fixing device in the embodiment shown in FIG. 6.

As shown in FIG. 7A, the carrier 1600 of this embodiment has a fixing device combined with a box body 1610. That is, the fixing device is directly provided at the bottom portion of the box body 1610, so that the carrier 1600 of this embodiment may be directly and fixedly installed to the rear seat of the vehicle without any additional fixing base or base with supporting leg.

Figure 7B:
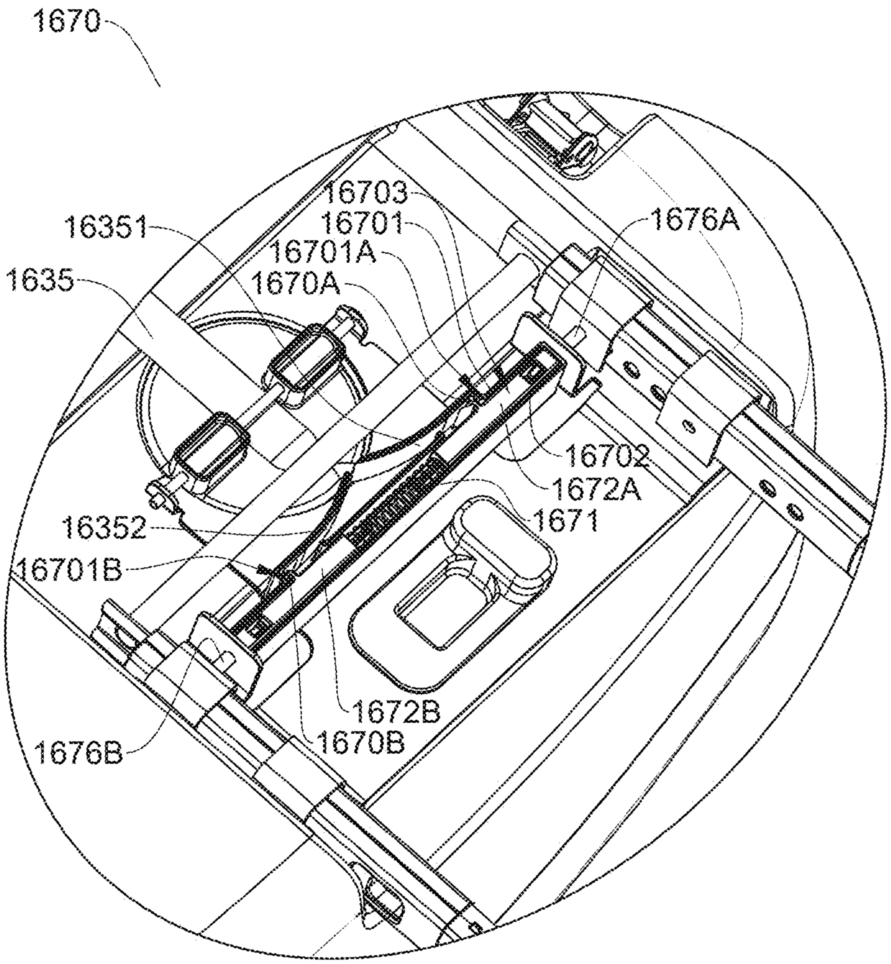
Figure 7C:
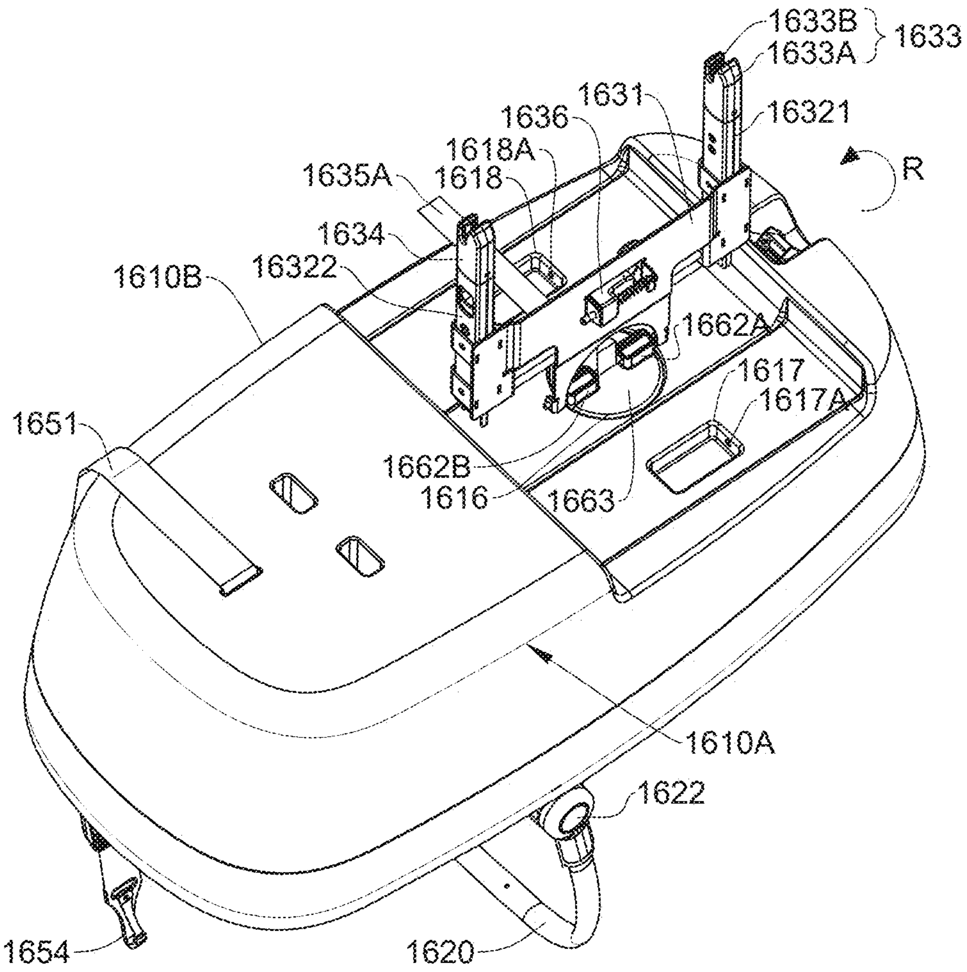
Figure 7D:
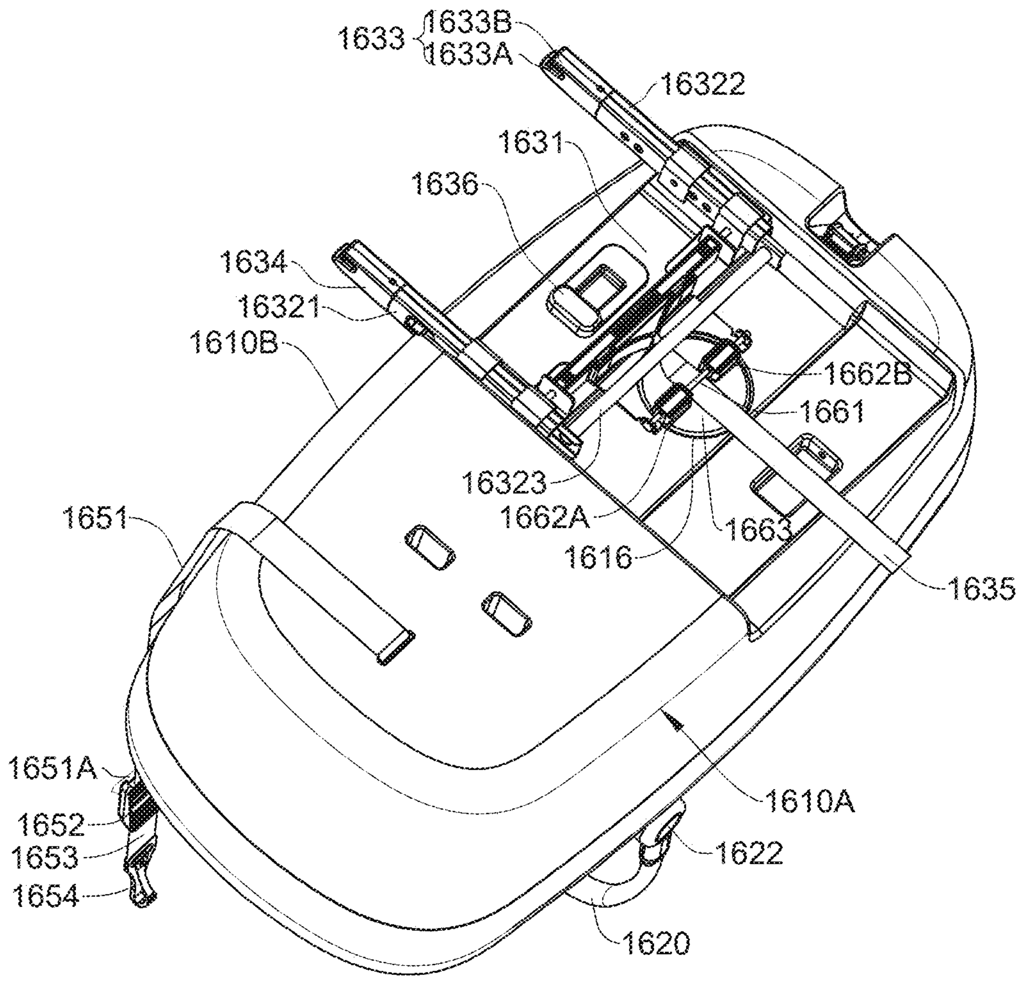

Specifically, in this embodiment, the fixing device may be, for example, a rigid ISOFIX system, which includes a primary frame 1631, a connecting frame including longitudinal connecting brackets 16321, 16322, and a transverse rod 16323, connectors 1633, 1634, and a linkage assembly 1670 including a pulling belt 1635. The carrier 1600 of this embodiment further includes a steering device 1660, and the fixing device is connected to the steering device 1660 through the primary frame 1631 to pivot to the bottom portion of the box body 1610, and the fixing device may pivot from an original first region to a second region at the bottom portion of the box body 1610 through the steering device 1660. With the assistance and function of the steering device 1660, the fixing device may change its connection direction to the rear seat of the vehicle, to be adaptively fixed to the corresponding fixing point on the left side (i.e., behind the driver's seat) or the right side (i.e., behind the assistant seat) of the rear seat. Referring to FIG. 7F, it schematically illustrates the detailed structure of the steering device of this embodiment. In this embodiment, the steering device 1660 includes a pivot 1661, lugs 1662A and 1662B, and a circular turntable 1663. A circular groove 1616 is formed at the bottom portion of the box body of the carrier 1600, which accommodates the circular turntable 1663 of the steering device 1660 and serves as a space for the steering device 1660 to act. The circular turntable 1663 may rotate in the circular groove with a rotation center 1663A. In this embodiment, the rotation center 1663A is a central axis where a center of the circular groove 1616 (not shown) and a center of the circular turntable 1663 are coincided. The pivot 1661 is fixed in a diameter direction of the circular turntable 1663 through lugs 1662A and 1662B (marked in FIG. 7A), so that the pivot 1661 may rotate with the rotation of the circular turntable 1663. In this embodiment, the pivot 1661 passes through the lugs 1662A and 1662B and has a gap with the bottom portion of the box body, so that the primary frame 1631 connected to the pivot 1661 also has a gap with the bottom portion of the box body without contacting with the outer surface of the bottom portion of the box body. This gap provides an appropriate space for the primary frame 1631 to turn over (as described below).

Alternatively, in other embodiments, an annular guide rail may also be formed at the bottom portion of the box body 1610. The steering device 1660 includes a pivot, and a pair of guide lugs at the outer side of the pivot and close to two ends of the pivot. The guide lugs are respectively engaged with the annular guide rail with their outer edges and may move along the annular guide rail, thereby driving the pivot to rotate around a center of the annular guide rail.

In this embodiment, a side of the primary frame 1631 of the fixing device is connected to the pivot 1661. As there is a gap between the pivot 1661 and the outer surface of the bottom portion of the box body 1610, the primary frame 1631 also has a gap from the outer surface of the bottom portion of the box body 1610, so that the primary frame 1631 may rotate along the pivot 1661 to drive the connecting frame, connectors 1633, 1634 to turn toward a relative long side of the box body 1610 (further explained below). In this embodiment, the primary frame 1631 of the fixing device is provided with a steering lock release mechanism, which includes an operating element 1636, a locking pin 1637 and a reset spring 1638 sleeved outside the locking pin 1637. In this embodiment, the locking pin 1637 may engage with an engagement hole (to be described later) on the inside of an accommodating slot at the bottom portion of the box body 1610, and the primary frame 1631 is positioned at the bottom portion of the box body 1610 by engaging the locking pin 1637 with the engagement hole. When the user pulls or pushes an operating element 1636 of the steering lock release handgrip in an arrow direction U shown in the enlarged view of FIG. 7A, the locking pin 1637 is driven to move in the same direction, thereby unlocking the primary frame 1631, and the primary frame 1631 is released from its position on the bottom portion of the box body 1610 and is in an operable state. When the user releases the operating element 1636, the locking pin 1637 is restored by a restoring elastic force of a reset spring 1638, and may be engaged with the corresponding engagement hole, so that the primary frame 1631 may be positioned relative to the box body 1610.

Specifically, in the state shown in FIG. 7A, the carrier 1600 of this embodiment may be fixed to the ISOFIX fixing point of a left vehicle seat (i.e., behind the driver's seat) with connectors 1633, 1634 provided on a long side 1610A (such as a first side) of the carrier 1600, and may be further fixed to a corresponding fixing point above the rear seat of the vehicle or over the seat to the rear bottom portion through a tether 1651, a connecting strap and a connecting element (e.g., a hook element) 1654 of an anchoring device of the carrier 1600, taken as an anchoring point.

When the user wants to fix the carrier 1600 to the right vehicle seat according to the actual application, the user first presses the lock release button 1633C of the connector 1633 (as shown in FIG. 6) to release the connector 1633 and presses the lock release button 1634 of the connector 1634 (not shown) to release the connector 1634, so that the connectors 1633, 1634 are separated from the ISOFIX fixing point of the vehicle seat. Then, the operating element 1636 of the steering lock release mechanism is pushed or pulled, so that the locking pin 1637 is disengaged from the engagement hole 1617A (as shown in FIG. 7C) in the accommodating slot 1617, and the primary frame 1631 may be released. Further, the primary frame 1631 together with the connecting frame and connectors 1633, 1634 may be pulled up, so that the primary frame 1631 of the fixing device together with the connecting frames and connectors 1633, 1634 may be turned over from the originally located first region to a vertical plane at the bottom portion of the box body 1610 along the pivot 1661, so that the primary frame 1631 of the fixing device together with the connecting frame and connectors 1633, 1634 presents an upright state as shown in FIG. 7C.

Then, the circular turntable 1663 of the steering device 1660 rotates along the central axis 1663A in the circular groove 1616 of the box body 1610 or moves in the annular guide rail by using the guide lug, which drives the primary frame 1631 connected with the steering device 1660 to rotate counterclockwise (as shown by the arrow direction R in FIG. 7C) by 180 degrees, and the pulling belt 1635 rotates with the primary frame 1631, and the adjusting end 1635A of the pulling belt 1635 is shifted from extending out of the long side 1610B (i.e., the second side) to extending out of the long side 1610A (i.e., the first side). Finally, the primary frame 1631 is turned over to a parallel plane of the bottom portion of the box body 1610 along the pivot 1661 and then abuts against a second region of the bottom portion of the box body 1610. The user can pull the operating element 1636 of the steering lock release mechanism, and the locking pin 1637 is reset and locked in the engagement hole 1618A of the accommodating slot 1618, so that the fixing device presents a state as shown in FIG. 7D, which is convenient for fixing the carrier 1600 to the vehicle seat through the long side 1610B of the box body 1610.

Figure 7E:
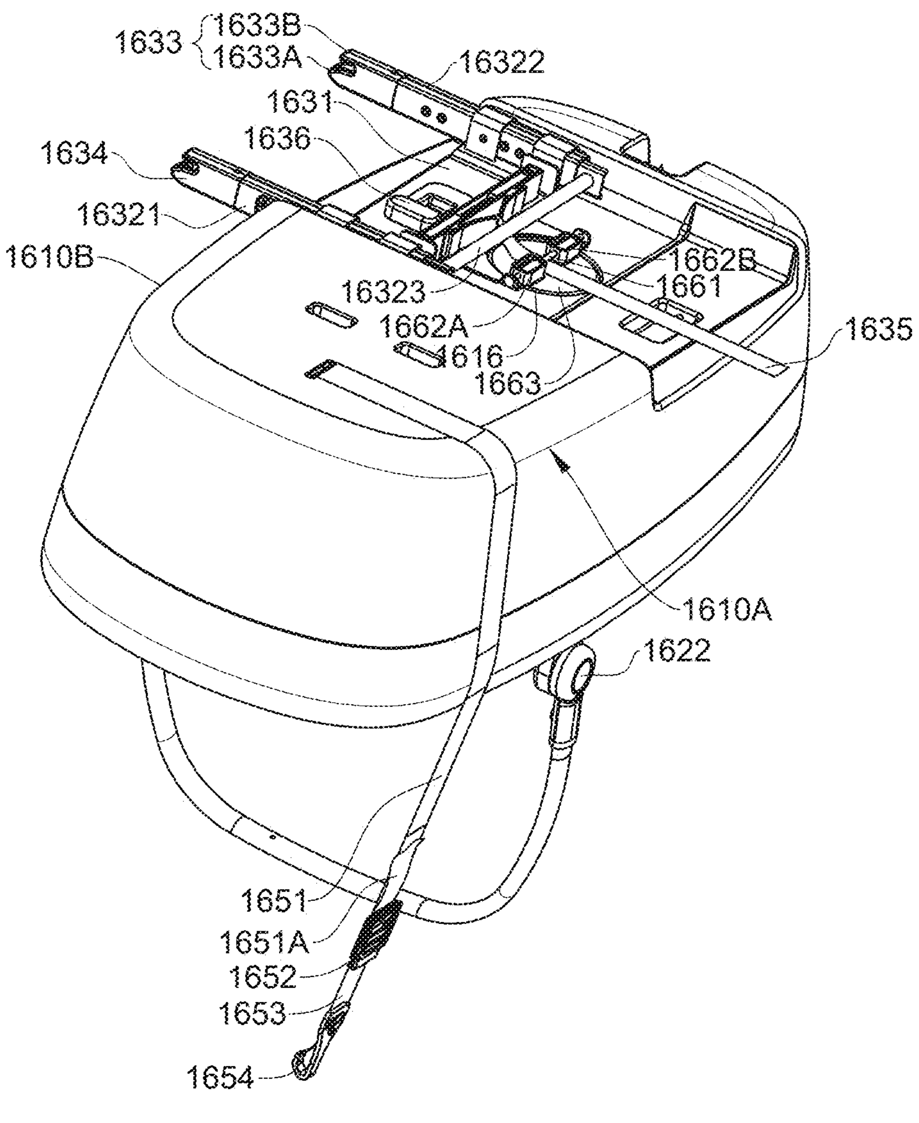
Figure 7F:
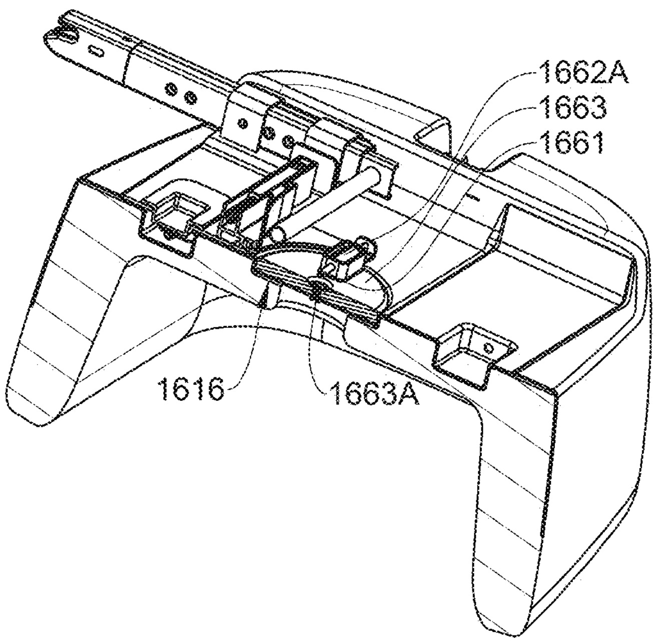

Finally, a direction of the tether 1651 of the anchoring device 1650 is adjusted so that the tether 1651, an adjuster 1652, a connecting strap 1653 and a connecting element 1654 extend from the periphery of the bottom portion of the box body 1610 toward the long side 1610A, as shown in FIG. 7E. In the state shown in FIG. 7E, the positions of the connectors 1633, 1634 have been changed from extending out of the long side 1610A to extending out of the long side 1610B, so that the carrier 1600 of this embodiment may be fixed to the ISOFIX fixing point of the right vehicle seat (that is, behind the assistant seat) with the connectors 1633, 1634 provided on the long side 1610B, and may be further fixed to a corresponding fixing point above the rear seat of the vehicle or over the seat to the rear bottom portion through a tether 1651, a connecting strap 1653 and a connecting element 1654 the an anchoring device of the carrier 1600, taken as an anchoring point.

On the other hand, the user pulls the adjusting end 1635A of the pulling belt 1635, to release the linkage assembly 1670.

Specifically, as shown in FIG. 7B, in this embodiment, the linkage assembly 1670 includes a pair of sliding blocks 1672A, 1672B, a reset spring 1671 provided between the sliding blocks 1672A, 1672B, and a pulling belt 1635. The pulling belt 1635 has a Y-shaped structure, and connecting belts 16351, 16352 at both ends are connected with the sliding blocks 1672A, 1672B respectively, so that the sliding blocks 1672A, 1672B may be driven, and the sliding blocks 1672A, 1672B are pushed by the pulling belt 1635 to press the reset spring 1671 and move toward each other, thereby disengaging the locking pins 1676A, 1676B of the linkage assembly 1670 from the engagement holes (not shown) of the longitudinal connecting brackets 16321, 16322, respectively, and releasing the longitudinal connecting brackets 16321, 16322 of the connecting frames, so that the longitudinal connecting brackets 16321, 16322 are movable relative to the primary frame 1631. For example, the connecting belts 16351, 16352 at both ends of the pulling belt 1635 may be connected with corresponding ring elements 1670A, 1670B on the sliding blocks 1672A and 1672B respectively, for example, by threading and sewing, to move the sliding blocks 1672A, 1672B when being pulled to release the engagement of the connecting frame with the primary frame 1631.

When the pulling belt 1635 is pulled to move the longitudinal connecting brackets 16321, 16322 to a suitable position relative to the primary frame 1631, the pull strap 1635 is loosened, the sliding blocks 1672A, 1672B of the linkage assembly 1670 are reset to both sides by the restoring force of the reset spring 1671 to push the locking pins 1676A, 1676B to engage with the engagement holes of the longitudinal connecting brackets 16321, 16322, respectively. Further, the linkage assembly 1670 further includes a first wall 16701 and a second wall 16702, and the first wall 16701 has two openings 16701A, 16701B. In this embodiment, the first wall 16701 and the second wall 16702 form a track 16703 for the sliding blocks 1672A, 1672B to move stably, and the openings 16701A, 16701B of the first wall 16701 may be used for the webbing fixing portions of the sliding blocks 1672A, 1672B to expose respectively, so that the connecting belts 16351, 16352 may be connected to the sliding blocks 1672A, 1672B through two webbing fixing portions, respectively.

Similarly, by adjusting the adjusting end 1651A of the tether 1651, the length of the tether 1651 of the anchoring device 1650 may be adjusted to adapt to the fixing point position of the vehicle.

In this embodiment, the carrier 1600 may also include guide elements correspondingly provided on the outer surface of the box body 1610 and the handle 1620, as like the guide elements 1211, 1212 and 1223 in the foregoing embodiment, through which the safety belt (not shown) of the vehicle seat or the tether 1651 of the anchoring device 1650 may pass and be positioned therein, to provide further stable and fixed effect for the carrier 1600.

Referring to FIGS. 8A to 8D, a carrier 1800 with an integrated fixing device according to an embodiment of the first aspect of the present disclosure is schematically illustrated. The carrier 1800 of this embodiment has a similar structure and composition to the carrier 1500 of the foregoing embodiment, including a box body 1810 and a handle 1820. The box body 1810 is a box-shaped structure with a raised peripheral wall to enclose and define a carrying space S1. The box body 1810 has two opposite long sides 1810A, 1810B, and in the state shown in FIGS. 8A and 8B, the carrier 1800 abuts against a backrest of the rear seat of the vehicle with the long sides 1810A. The handle 1820 has a U-shaped structure, which is movably or detachably connected to the box body 1810, so that a user (such as an animal owner) may conveniently draw and carry the carrier 1800 of this embodiment. In this embodiment, two ends of the handle 1820 are pivotally connected to two respective long sides of the box body 1810. That is, the two ends of the handle 1820 may rotate to an upper edge of a peripheral wall of the box body 1810 along pivots 1821, 1822, to be stacked on the peripheral wall of the box body 1810, for convenience of storage. Alternatively, in an alternative embodiment, the handle 1820 may also be detached from the box body 1810.

Figure 8A:
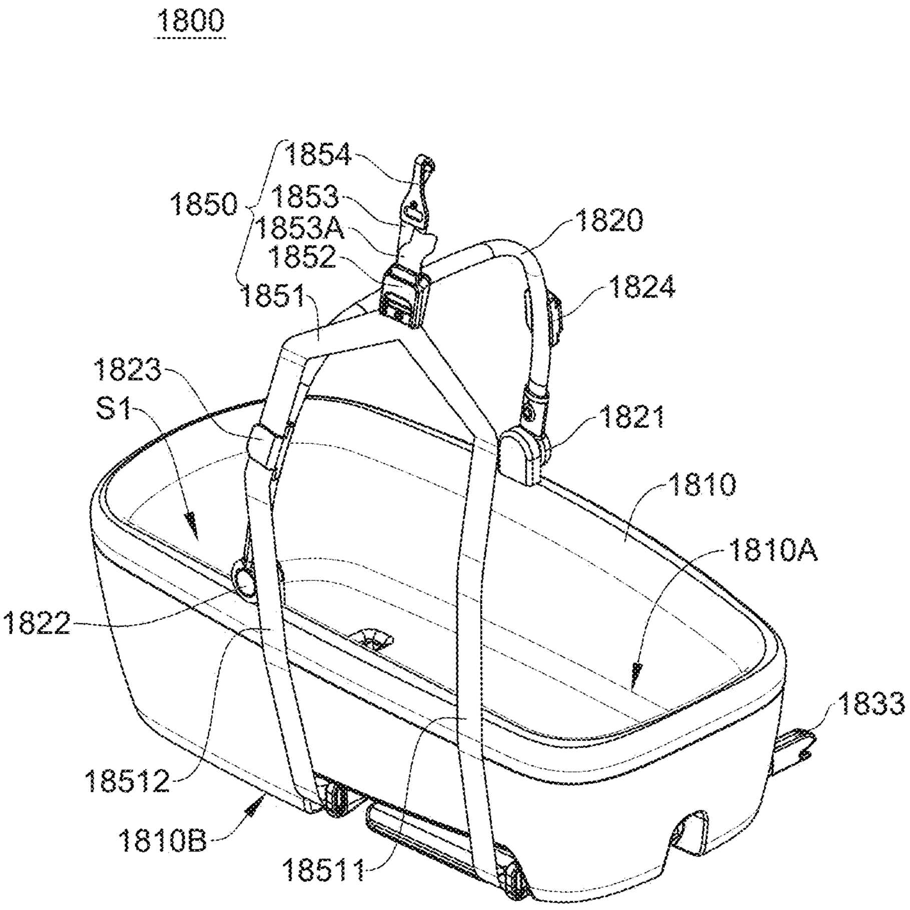
FIGS. 8A to 8D schematically illustrate a carrier with an integrated fixing device according to an embodiment of the first aspect of the present disclosure.

The difference between the carrier 1800 and the foregoing embodiment is that, as shown in FIG. 8A, in this embodiment, an anchoring device 1850 of the carrier 1800 is formed in a Y-shaped structure. In detail, the anchoring device 1850 mainly includes a first tether 18511 and a second tether 18512, an adjuster 1852 and a connecting strap 1853. An end of the first tether 18511 and an end of the second tether 18512 are connected to the same side of the adjuster 1852, or the end of the first tether 18511 and the end of the second tether 18512 are combined (e.g., by sewing) into a tether 1851 in order to be connected to the same side of the adjuster 1852. In this embodiment, the connecting strap 1853 of the anchoring device 1850 extends through the other side of the adjuster 1852 with one end to form an adjusting end 1853A. The opposite end of the adjusting end 1853A of the connecting strap 1853 is connected with a connecting element (e.g., a hook element) 1854 for being fixed to a corresponding fixing point (not shown) above the rear seat of the vehicle or over the seat to the rear bottom portion, taken as an anchoring point.

As shown in FIG. 8A, in this embodiment, both sides of the U-shaped handle 1820 of the carrier 1800 are respectively provided with a first guide element 1823 and a second guide element 1824, and widths and sizes of the guide elements 1823, 1824 are designed to allow the first tether 18511 or the second tether 18512 of the anchoring device 1850 to pass through and be positioned therein.

As shown in the figure, in this embodiment, the carrier 1800 is fixed to the corresponding ISOFIX fixing point of the rear seat of the vehicle by the fixing device (e.g., through the connector 1833 of the fixing device) of the carrier 1800, and when carrier 1800 is provided on the rear seat of the vehicle, the combination of the tether of the anchoring device 1850 with the box body 1810 and the handle 1820 may further provide a stable and fixed effect of the carrier 1800 of this embodiment. Especially, in this embodiment, the guide element 1823 on the handle 1820 positions the second tether 18512 of the anchoring device 1850 on the handle 1820, which is beneficial to make the second tether 18512 fit to a part of the handle 1820 and extend along handle 1820, thereby the handle 1820 may also provide auxiliary support for the anchoring device 1850, and prevent the second tether 18512 from moving randomly when the vehicle travels.

Figure 8B:
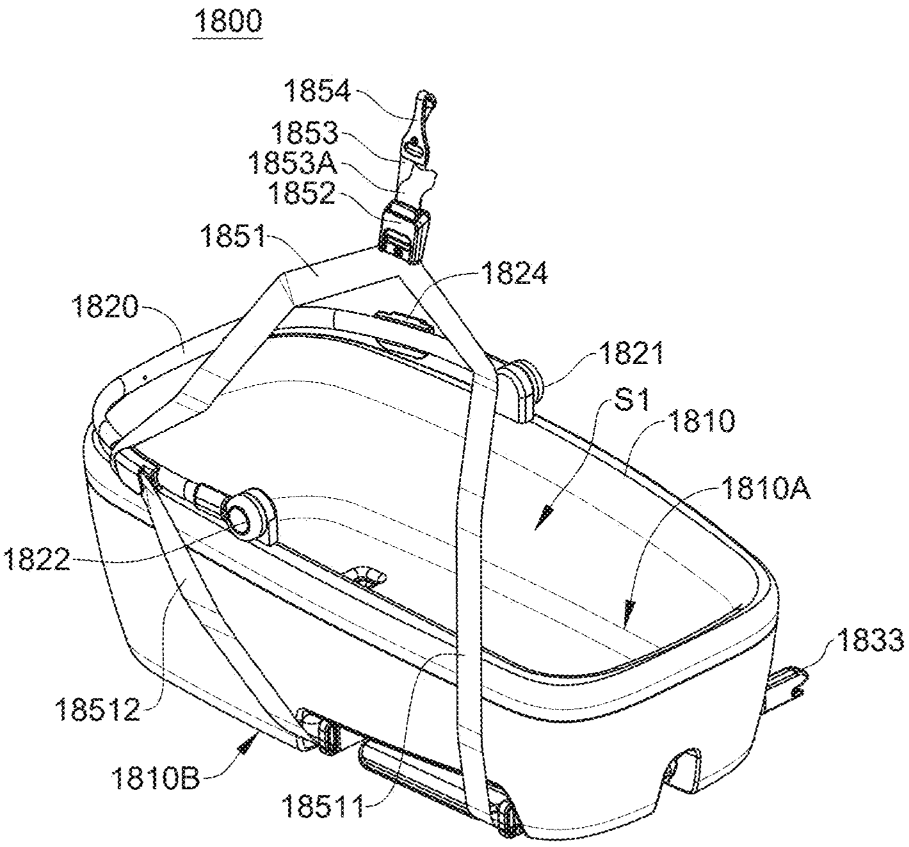

As mentioned above, in this embodiment, the handle 1820 of the carrier 1800 is pivoted at its two ends to the two respective long sides of the box body 1810, and the handle 1820 may be rotated at its two ends along the pivots 1821, 1822 to the upper edge of the peripheral wall of the box body 1810 to be stacked on the peripheral wall of the box body 1810, as shown in FIG. 8B. In the state shown in FIG. 8B, since the handle 1820 is stacked on the upper edge of the peripheral wall of the box body 1810, the guide element 1823 on the handle 1820 moves in a short side direction of the box body 1810 with the handle 1820, thereby increasing a distance between the positions where the second tether 18512 and the first tether 18511 respectively are in contact with the upper edge of the peripheral wall of the box body 1810. This increased spacing may make the supporting force of the anchoring device 1850 to the box body 1810 more evenly distributed, and thereby being beneficial to further stabilizing the fixing of the carrier 1800 in the rear seat of the vehicle and avoiding the carrier 1800 from tilting easily due to vehicle steering or speed change.

Figure 8C:
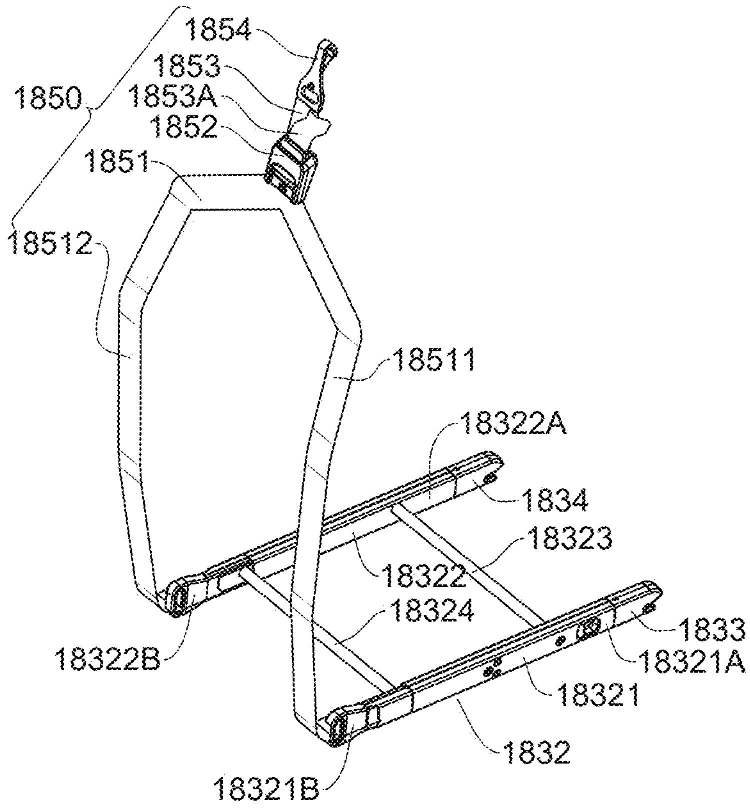

Referring to FIG. 8C, another difference between the carrier 1800 of this embodiment and the foregoing embodiment is schematically illustrated. As shown in FIG. 8C, in this embodiment, the anchoring device 1850 of the carrier 1800 and the connecting frame 1832 of the fixing device are integrated. As shown in the figure, the connecting frame 1832 of the fixing device includes two longitudinal connecting brackets 18321, 18322, and at least one transverse positioning rod, which is also called as "positioning rod" or "transverse rod", similar to the "transverse rod" in the foregoing embodiment, and in the embodiment shown in FIG. 8C, two transverse positioning rods 18323, 18324. Connectors (e.g., ISOFIX connectors) 1833, 1834 are respectively connected to respective connecting ends 18321A, 18322A of the connecting brackets 18321, 18322, thereby being fixed to corresponding fixing points of the rear seat of the vehicle. Respective combining ends 18321B, 18322B of the connecting brackets 18321, 18322 are respectively integrated with the first tether 18511 and the second tether 18512 of the anchoring device 1850, for example, but not limited to by sewing and riveting. In this embodiment, the transverse positioning rods 18323, 18324 of the connecting frame 1832 are positioned in positioning slots (described further below) at the bottom portion of the box body 1810, so that the anchoring device 1850 and the fixing device are integrated with the box body 1810.

In this embodiment, the carrier 1800 may also include guide elements correspondingly provided on the outer surface of the box body 1810, as like the guide elements 1211, 1212 in the foregoing embodiment, through which the safety belt (not shown) of the vehicle seat may pass through and be positioned therein, to provide further stable and fixed effect for the carrier 1800.

It should be noted that in this embodiment, the fixing device and the anchoring device 1850 are integrated through a connection of the tether and the connecting bracket. Alternatively, in other embodiments, the fixing device and the anchoring device 1850 may also be independent devices or components, which provide the carrier with fixing and anchoring functions respectively.

Figure 8D:
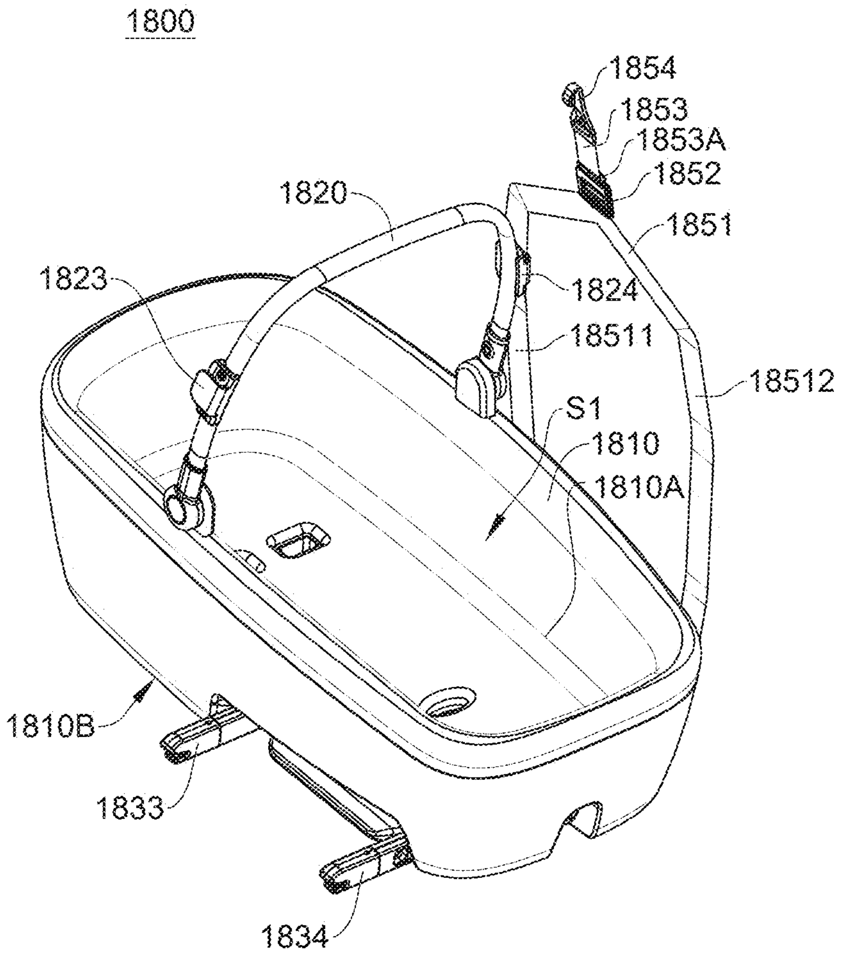

With the fixing device, the anchoring device and the positioning slot at the bottom portion of the box body of the carrier of this embodiment, the user may easily change a fixing direction and position of the carrier 1800 to the rear seat of the vehicle. As shown in FIG. 8D, in this embodiment, the integrated fixing device and the anchoring device may be integrally disassembled and fixed to the box body 1810 in an opposite direction, and thereby forming the state shown in the figure. Specifically, in the state shown in FIG. 8D, the carrier 1800 abuts against the seat backrest of the rear seat of the vehicle with the long side 1810B of the carrier 1800, and is anchored to corresponding fixing points of the rear seat of the vehicle through connectors 1833, 1834 extending out of the long side 1810B, so that the carrier 1800 is fixed to a right side of the rear seat of the vehicle, that is, behind the assistant seat. In this embodiment, in addition to the carrier 1800 that is fixed to the corresponding ISOFIX fixing point in the rear seat of the vehicle by the fixing device, for example, through its ISOFIX connectors 1833, 1834 of the fixing device, when the carrier 1800 is provided on the rear seat of the vehicle, the combination of the tether of the anchoring device 1850 with the box body 1810 and the handle 1820 may also be used to further provide the stable and fixed effect for the carrier 1800 of this embodiment. Especially, in this embodiment, the guide element 1824 on the handle 1820 buckles the first tether 18511 of the anchoring device 1850 on the handle 1820, which is beneficial to make the first tether 18511 fit a part of the handle 1820 and extend along the handle 1820, and the handle 1820 may also provide an auxiliary support for the anchoring device 1850 and prevent the first tether 18511 from moving randomly when the vehicle is traveling.

Figure 9A:
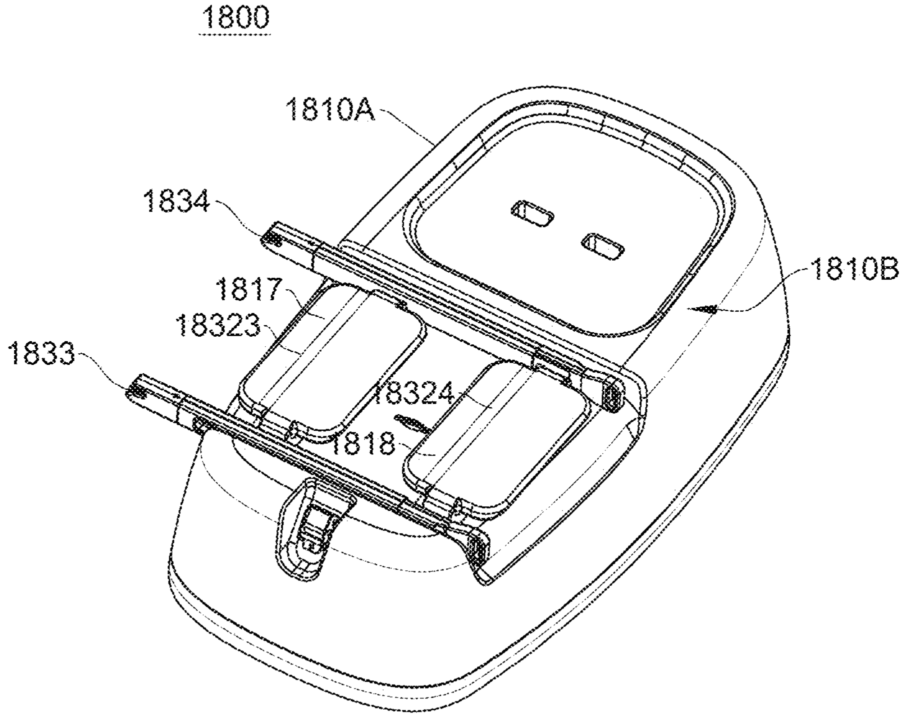
FIGS. 9A to 9C schematically illustrate a function and configuration of a transverse positioning rod of a connecting frame and a positioning slot at a bottom portion of a box body of the carrier in the embodiment shown in FIGS. 8A to 8D.
Figure 9B:
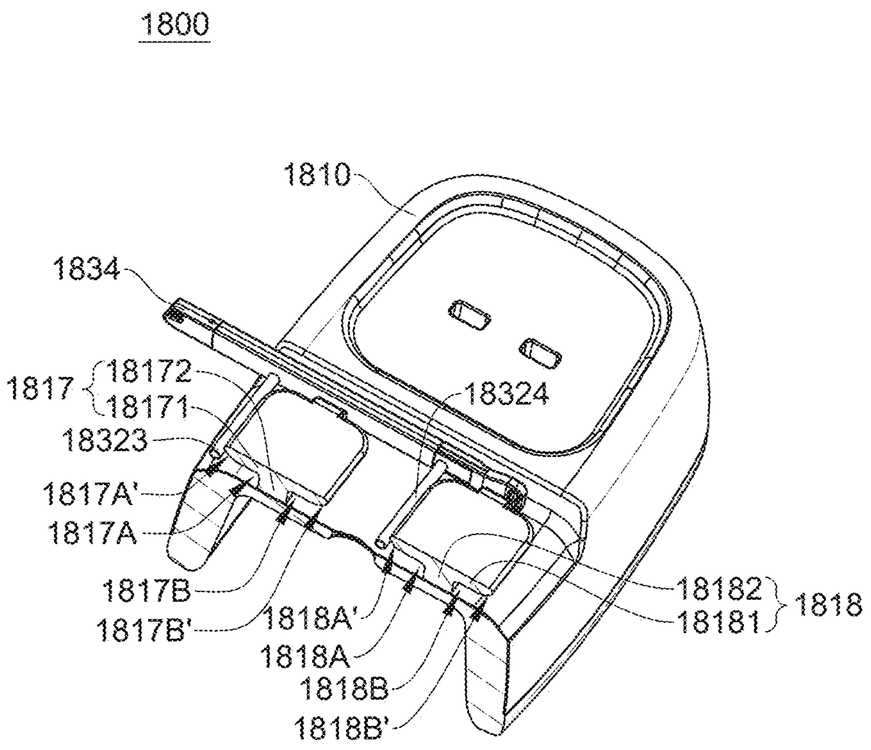
Figure 9C:
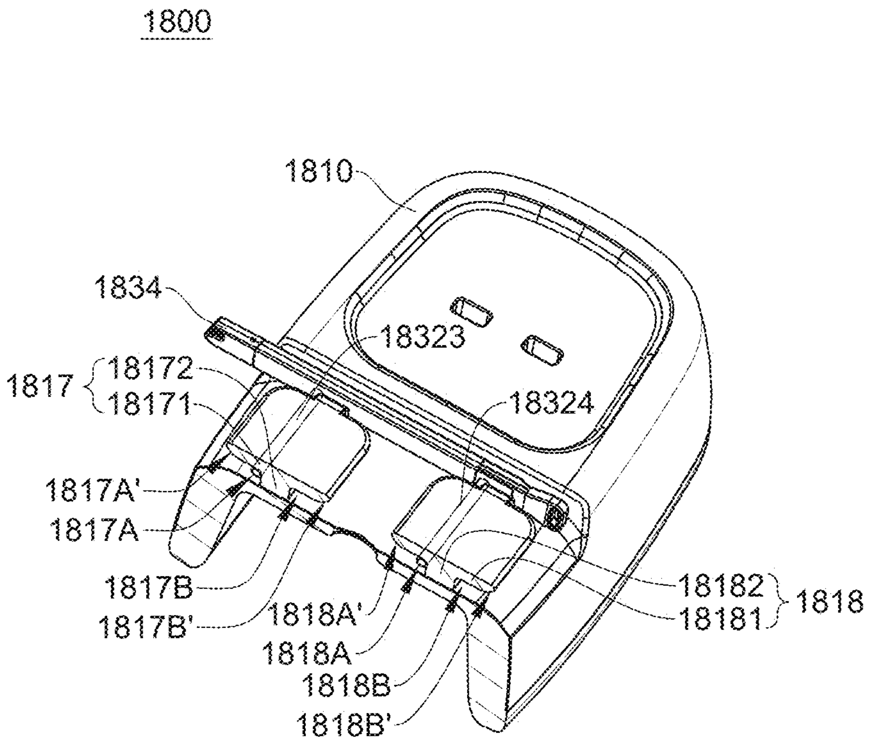

Referring to FIGS. 9A to 9C, the function and configuration of the connecting frame positioning rod and the bottom portion positioning slot of the box body of the carrier in the embodiment shown in FIGS. 8A to 8D are schematically illustrated.

As shown in the figure, a first positioning structure 1817 and a second positioning structure 1818 are formed at the bottom portion of the box body 1810, so that the first positioning rod (e.g., a transverse positioning rod 18323) and the second positioning rod (e.g., a transverse positioning rod 18324) of the connecting frame 1832 may be respectively positioned therein, so that the fixing device of this embodiment may be stably combined with the box body 1810. As viewed from the short side direction of the carrier 1800, the positioning structures 1817, 1818 each presents a T-shaped structure formed by their respective transverse portion and longitudinal portion. Specifically, the first positioning structure 1817 is formed with a transverse portion 18171 and a longitudinal portion 18172, and the longitudinal portion 18172 is connected at a center of the transverse portion 18171 and has a narrow width, so that a left positioning slot 1817A and a right positioning slot 1817B are formed on both sides of the longitudinal portion 18172 at the joint of the transverse portion 18171 and the longitudinal portion 18172. Similarly, the longitudinal portion 18182 of the second positioning structure 1818 is connected to the center of a transverse portion 18181 and has a relatively narrow width, so that a left positioning slot 1818A and a right positioning slot 1818B are formed on both sides of the longitudinal portion 18182 at the joint of the transverse portion 18181 and the longitudinal portion 18182.

In this embodiment, a lower edge of the transverse portion 18171 of the first positioning structure 1817, which faces the bottom portion of the box body 1810, and a lower edge of the transverse portion 18181 of the second positioning structure 1818, which faces the bottom portion of the box body 1810, are formed as respective inclined planes, that is, a left inclined plane 1817A' and a right inclined plane 1817B' of the first positioning structure 1817, and a left inclined plane 1818A' and a right inclined plane 1818B' of the second positioning structure 1818. As shown in FIG. 9B and FIG. 9C, with this inclined plane design, the connecting frame 1832 may slide into corresponding left positioning slots 1817A, 1818A from the left inclined planes 1817A', 1818A' by using its positioning rods 18323, 18324, so that the fixing device of this embodiment may be stably combined with the box body 1810, as shown in FIG. 9C. Alternatively, when the position and direction of the carrier 1800 fixed to the vehicle seat of this embodiment are changed, for example, when the carrier 1800 is fixed to the right side of the vehicle rear seat in a way as shown in FIG. 8D, that is, behind the assistant seat, the positioning rods 18323, 18324 may be slid into the corresponding right positioning slots 1817B, 1818B from the right inclined planes 1817B', 1818B' respectively and positioned therein.

It should be noted that although the embodiment shown in FIGS. 8A to 8D and the embodiment shown in FIGS. 9A to 9C are exemplified that the connecting frame 1832 includes two transverse positioning rods 18323, 18324, in other embodiments, the connecting frame 1832 may only include one transverse positioning rod connected between the two longitudinal connecting brackets 18321, 18322 near a midpoint. That is, the carrier 1800 may slide into the right positioning slot 1817B and the left positioning slot 1818A from the inclined plane 1817B' or 1818A' at the bottom portion of the box body 1810 for positioning, and thereby achieving the effect of fixing the carrier 1800 to the rear seat of the vehicle in a selected position and direction.

According to the present disclosure, the carrier with the integrated fixing device as provided may be used as a flat-lying vehicle safety seat device for a general infant or provided as a vehicle transport device for transporting an animal or a pet.

Figure 10A:
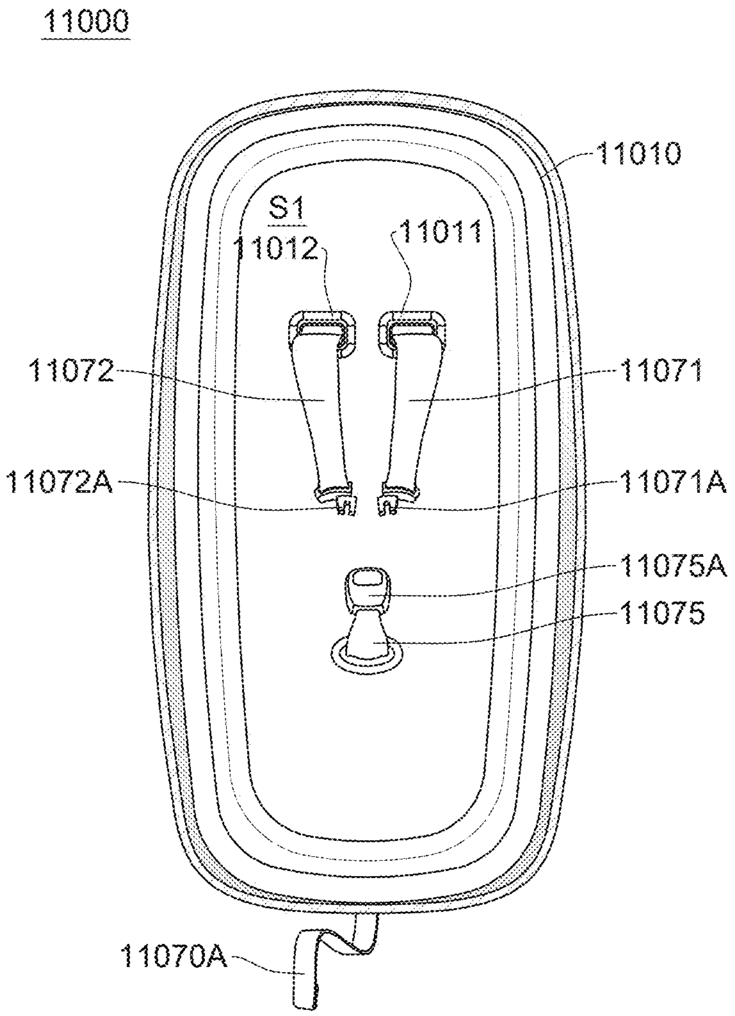
FIGS. 10A and 10B schematically illustrate a carrier for accommodating an infant according to an embodiment of the first aspect of the present disclosure.
Figure 10B:
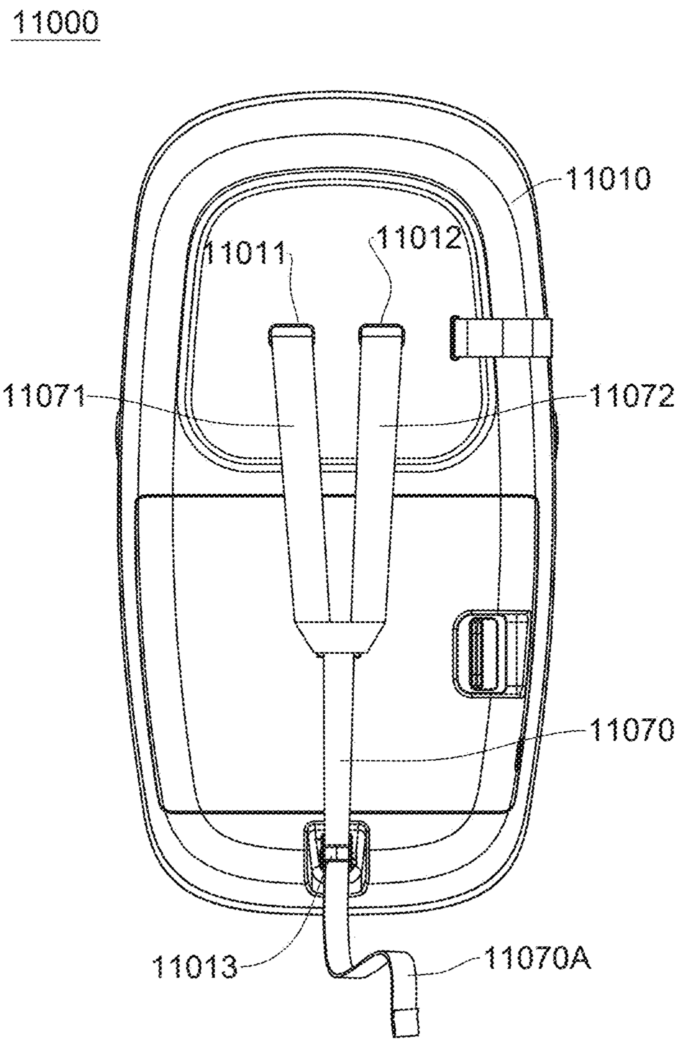

Referring to FIGS. 10A and 10B, a carrier for accommodating an infant according to an embodiment of the first aspect of the present disclosure is schematically illustrated. FIG. 10A is a front schematic view of the carrier 11000 of this embodiment, and FIG. 10B is a back schematic view of the carrier 11000 of this embodiment. In this embodiment, a fixing pulling belt of the carrier 11000 includes a first belt 11071, a second belt 11072, and a main pulling belt 11070 (similar to the "belt body part 11106" in the foregoing embodiment, which may also be called a "fixed strap") connected to the respective fixed ends of the first belt 11071 and the second belt 11072, and thereby presenting a Y-shaped structure. The first belt 11071 and the second belt 11072 respectively protrude from a first bottom board opening 11011 and a second bottom board opening 11012 which are formed at the bottom portion of the box body 11010 and penetrate through the bottom portion, and ends of which are connected with respective fastening elements 11071A, 11072A, for example, a tongue piece or other forms of male buckle fastening elements. The first belt 11071 and the second belt 11072 are respectively buckled with a buckle (such as a safety belt female buckle) 11075A on the fixing buckle belt (also called "box belt") 11075 through their respective fastening elements 11071A, 11072A, and thereby forming a closed fixing structure and providing corresponding fixing and support for the shoulder of the infant. As shown in FIG. 10B, the first belt 11071 and the second belt 11072 extend on the back of the box body 11010 and are jointly connected to one end of the main pulling belt 11070, and the other end (i.e., a free end) of the main pulling belt 11070 further extends through the positioning buckle 11013 provided on the short side of the box body 11010, and an adjusting end 11070A is exposed there, so that the user may adjust a tightness of the fixing pulling belt by pulling the adjusting end 11070A and positioning the positioning buckle 11013.

Figure 11A:
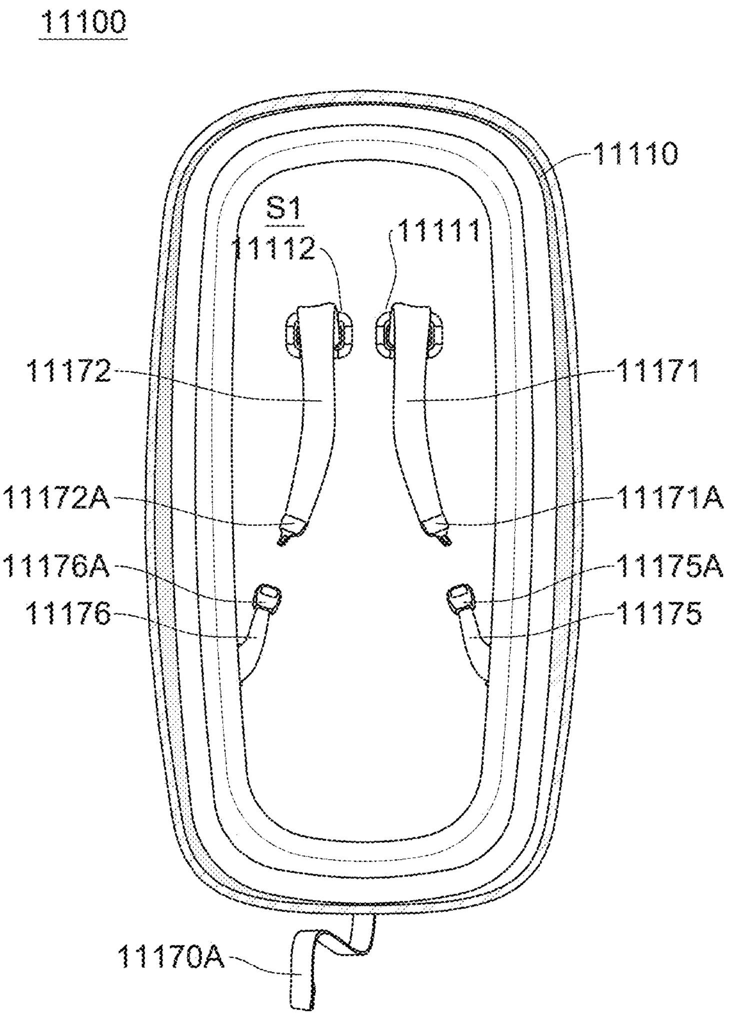
FIGS. 11A and 11B schematically illustrate a carrier for accommodating an animal according to an embodiment of the first aspect of the present disclosure.
Figure 11B:
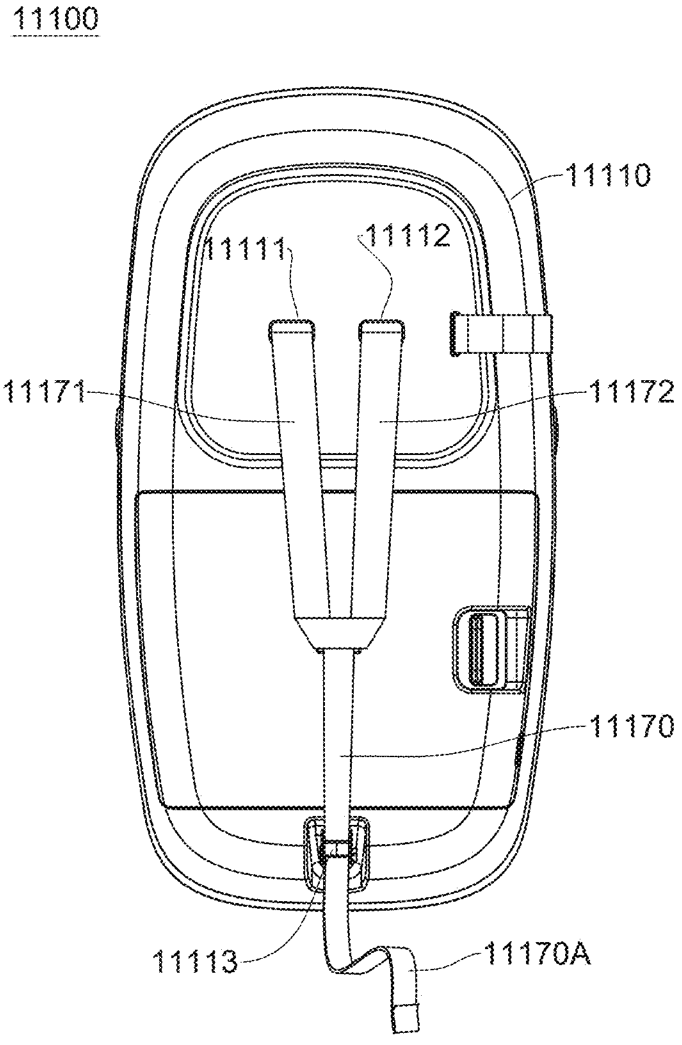

Referring to FIGS. 11A and 11B, a carrier for transporting an animal or a pet according to an embodiment of the first aspect of the present disclosure is schematically illustrated. FIG. 11A is a schematic front view of the carrier 11100 of this embodiment, and FIG. 11B is a schematic back view of the carrier 11100 of this embodiment. In this embodiment, a fixing pulling belt of the carrier 11100 includes a first belt 11171 and a first belt 11172 (also called a "back belt"), and a main pulling belt 11170 (similar to the "belt body part 11106" in the foregoing embodiment, also called a "fixing strap") connected to the respective fixing ends of the first belt 11171 and the second belt 11172, and thereby presenting a Y structure. The first belt 11171 and the second belt 11172 respectively protrude from a first bottom board opening 11111 and a second bottom board opening 11112, which are formed at the bottom portion of the box body 11110 and penetrate through the bottom portion, and ends of the belts are connected with respective fastening elements (i.e., a tongue piece or other forms of male buckle fastening elements) 11171A, 11172AB. The first belt 11171 and the second belt 11172 are respectively buckled with buckles (i.e., safety belt female buckles) 11175A, 11176A at one end of fixing buckle belts 11175, 11176 through their respective fastening elements 11171A, 11172A, and thereby forming a closed fixing structure and providing corresponding fixing and support for the shoulder and back of the animal. As shown in FIG. 11B, the first belt 11171 and the second belt 11172 extend on the back of the box body 11110 and are jointly connected to one end of the main pulling belt 11170, and the other end (i.e., a free end) of the main pulling belt 11170 further extends through the positioning buckle 11113 provided on the short side of the box body 11110, and an adjusting end 1170*a* is exposed there, so that the user may adjust the tightness of the fixing pulling belt by pulling the adjusting end 1170*a* and positioning the positioning buckle 11113.

In an embodiment, the carrier 11000 and the fixing pulling belt in the carrier 11100 may be applied to the carriers of the above-mentioned multiple embodiments, and the present disclosure does not limit to the possible combined embodiments of the above-mentioned carriers. In addition, for the carriers of the above embodiments, the positioning buckle on the short side of the box body may also be replaced by the guide structure 11105 shown in FIGS. 1D and 1E, and a positioning buckle 11103 is provided on the other short side, so that it is convenient for the caregiver to adjust the tightness of the fixing pulling belt at any time. Furthermore, in the above-mentioned embodiments, although the box body shapes of the carriers are all cuboids, the present disclosure does not limit to the shape of the box body of the carrier, and they may also be cubes, instead of having two long sides and two short sides, they have four sides with roughly equal lengths.

In the present disclosure, the term "integrated fixing device" or "integrated-type fixing device" means that the fixing device of the carrier of the present disclosure is directly fixed or embedded in the bottom portion of the box body and combined with the box body of the carrier, so that the carrier of the present disclosure may be directly fixed on the vehicle seat with the box body itself.

To this end, the first aspect of the present disclosure provides a carrier with an integrated fixing device and a corresponding fixing device. According to the present disclosure, the fixing device of the carrier is directly fixed or embedded in the bottom portion of the box body, so the box body may be directly and stably fixed to the rear seat of the vehicle without matching with an additional fixing base, and thereby completing the stable installation of the carrier in the vehicle.

The first aspect of the present disclosure also provides a carrier with changeable fixing direction. With the fixing device of the carrier of the present disclosure, the user can quickly and easily fix the carrier to the left side (i.e., behind the driver's seat) or the right side (i.e., behind the assistant seat) of the rear seat of the vehicle according to the actual application requirements.

In the second aspect of the present disclosure, a carrier, in particular a pet carrier, is provided. For the convenience of understanding, similar structures in the following different embodiments have similar reference numerals. For example, the reference numerals of pet carriers in the first embodiment to the eighth embodiment according to the second aspect of the present disclosure are "2100" to "2800" respectively.

Figure 12A:
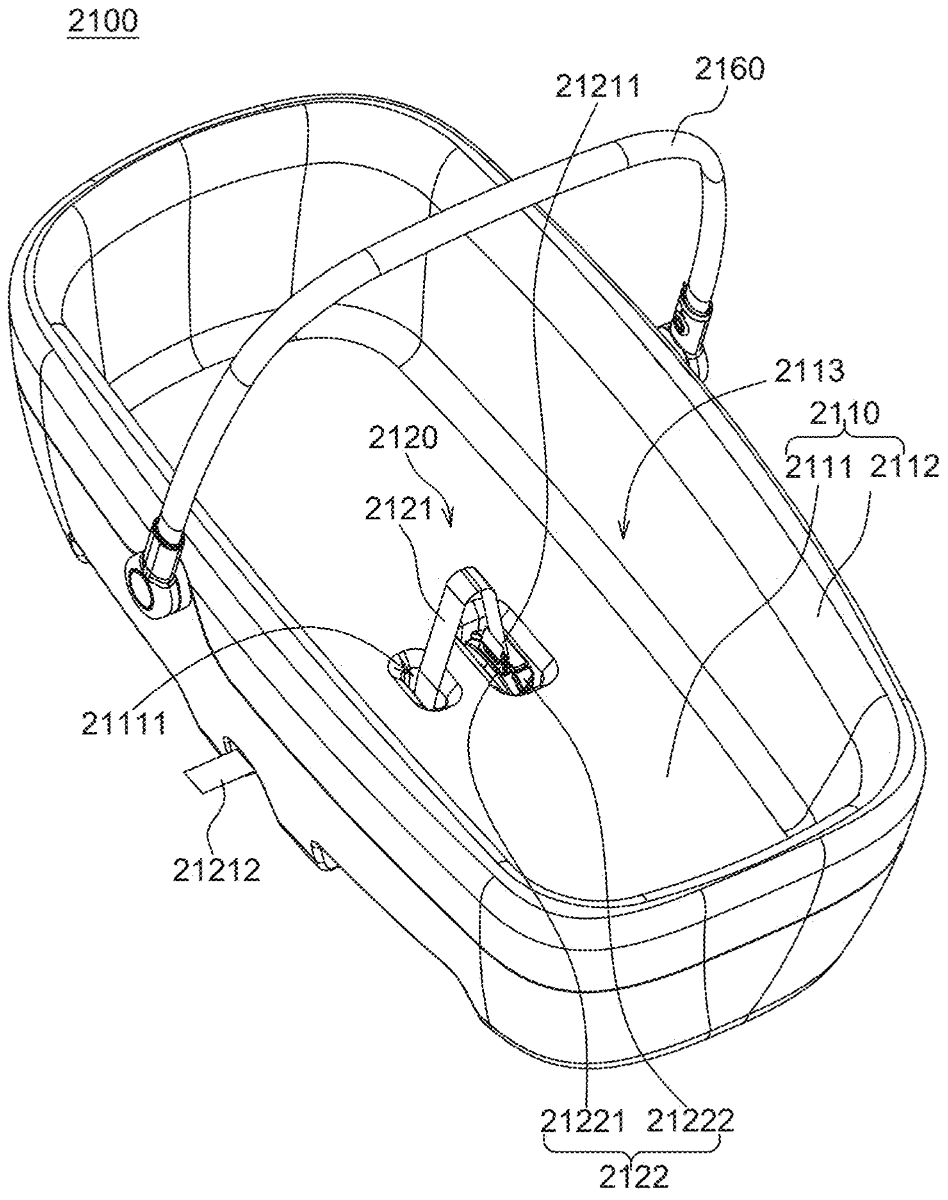
FIGS. 12A and 12B are schematic appearance views of a pet carrier according to a first embodiment of a second aspect of the present disclosure from different views.
Figure 12B:
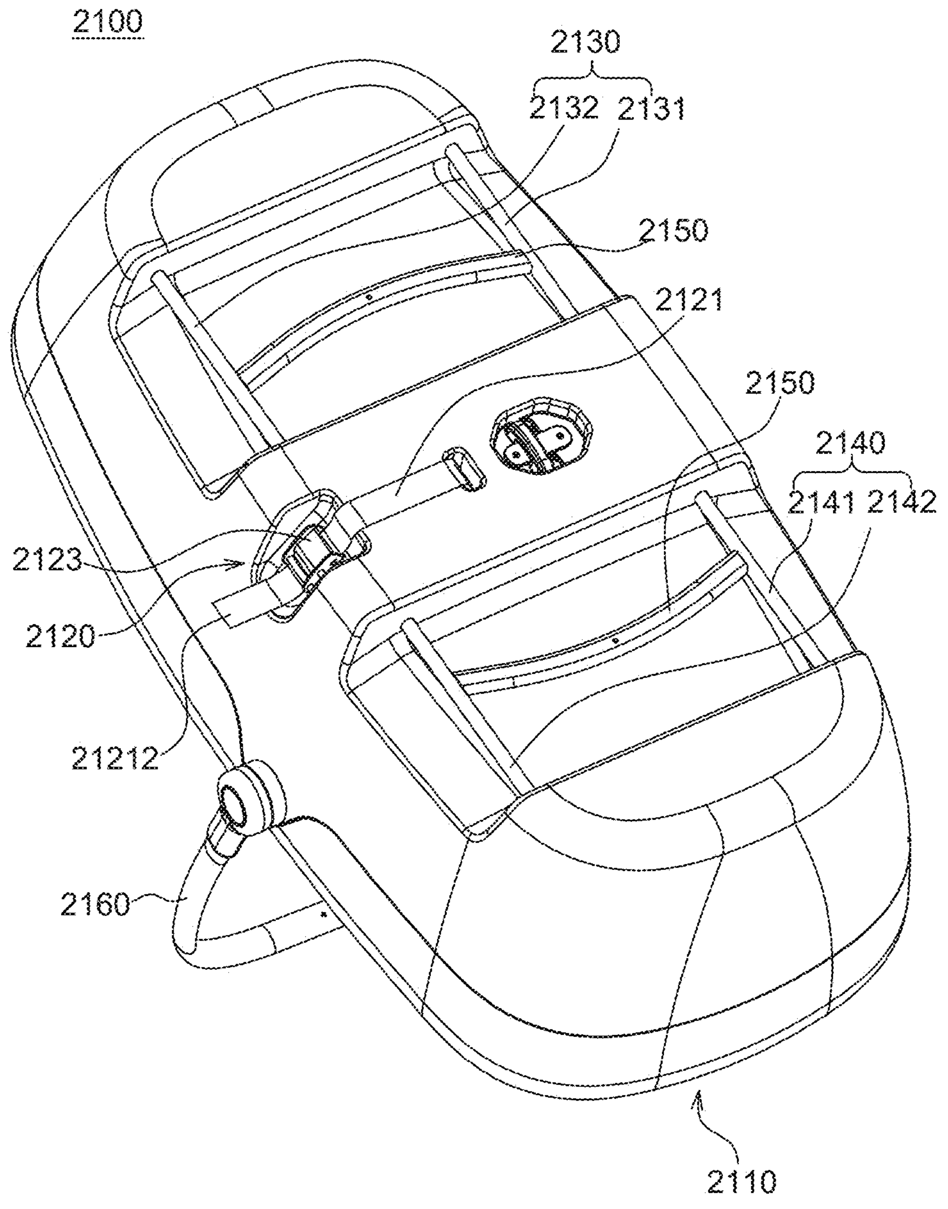
Figure 12C:
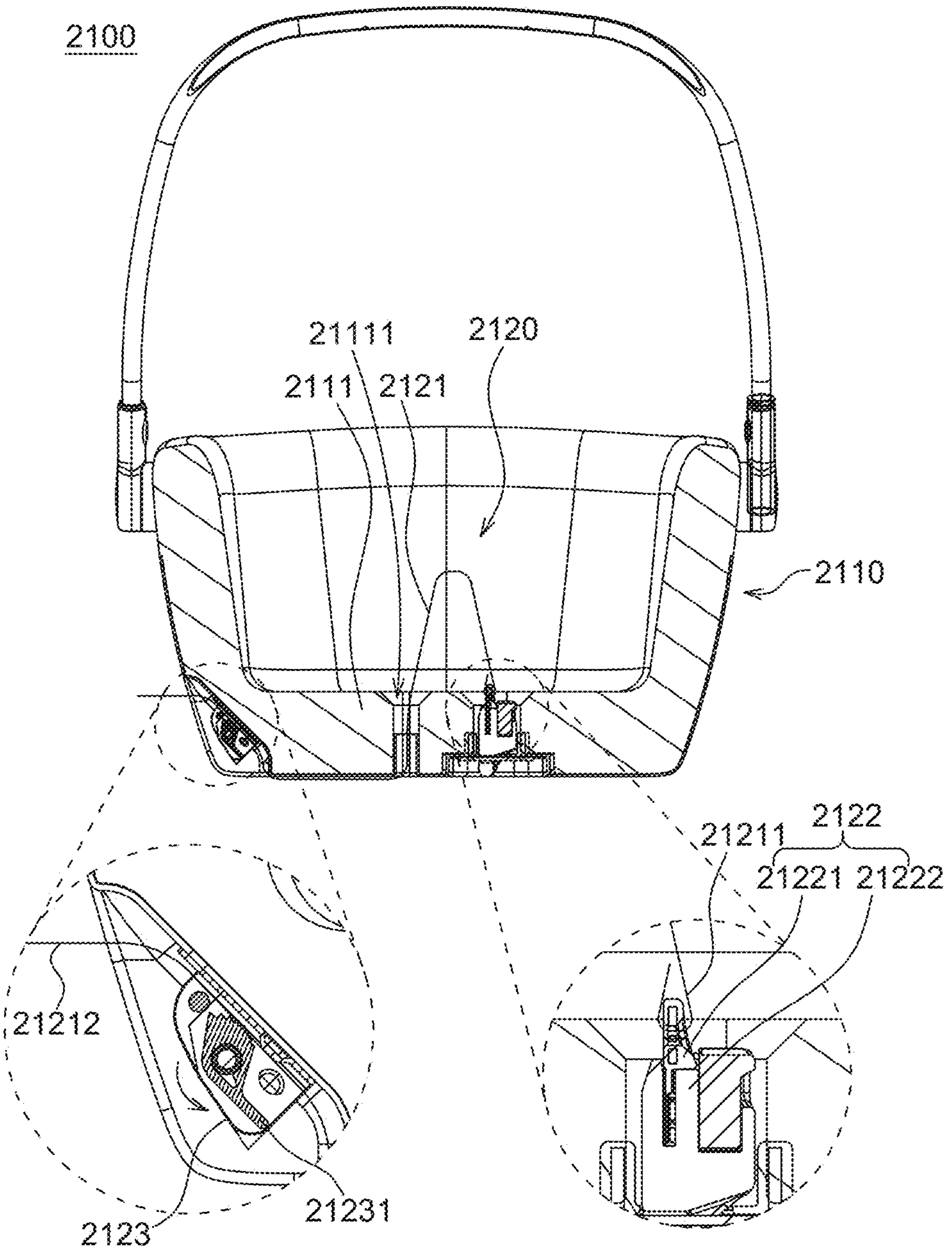
FIG. 12C is a schematic sectional view of the pet carrier according to the first embodiment of the second aspect of the present disclosure.
Figure 12D:
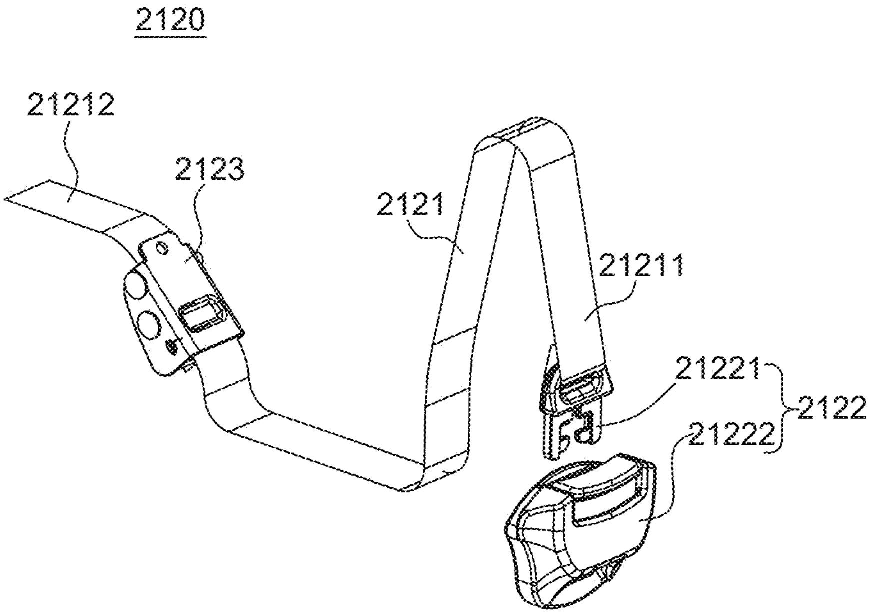
FIG. 12D is a schematic view of a binding device according to the first embodiment of the second aspect of the present disclosure.
Figure 12E:
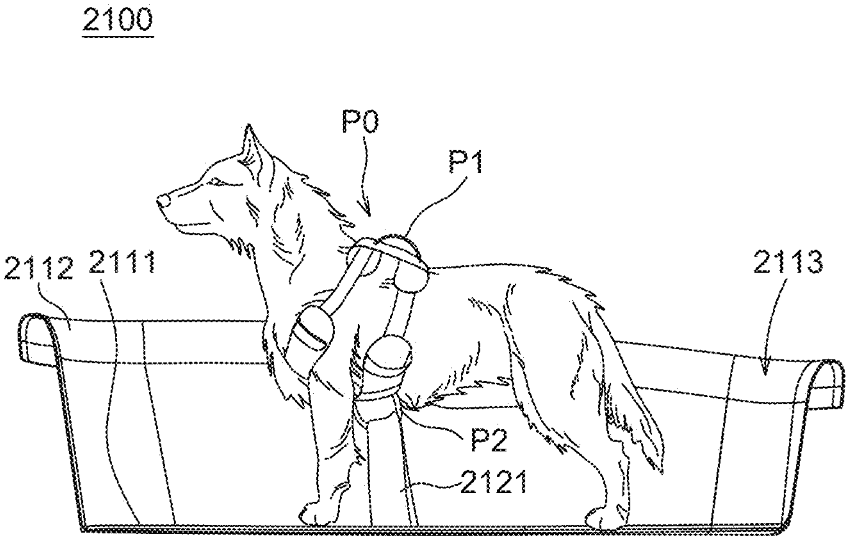
FIG. 12E and FIG. 12F are schematic view of the pet carrier in different use states according to the first embodiment of the second aspect of the present disclosure.
Figure 12F:
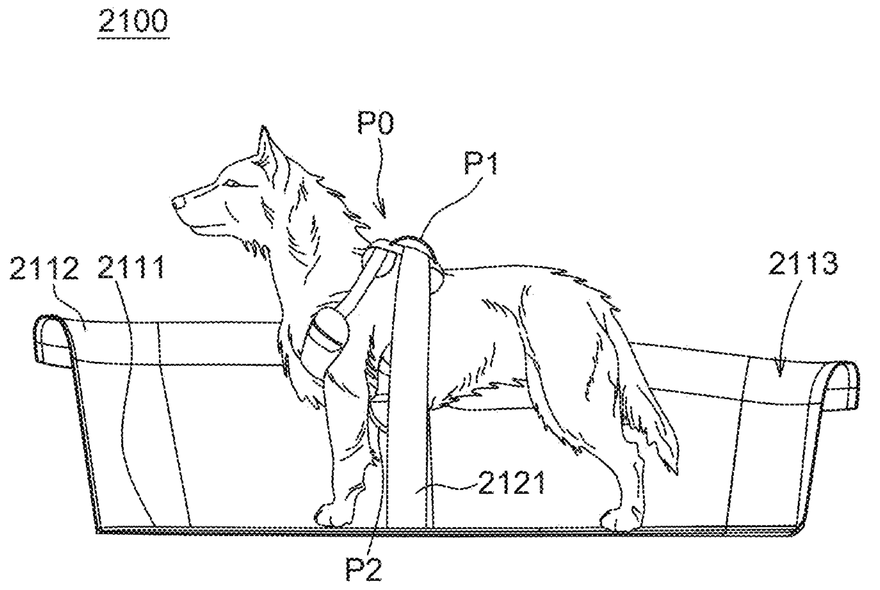
Figure 12G:
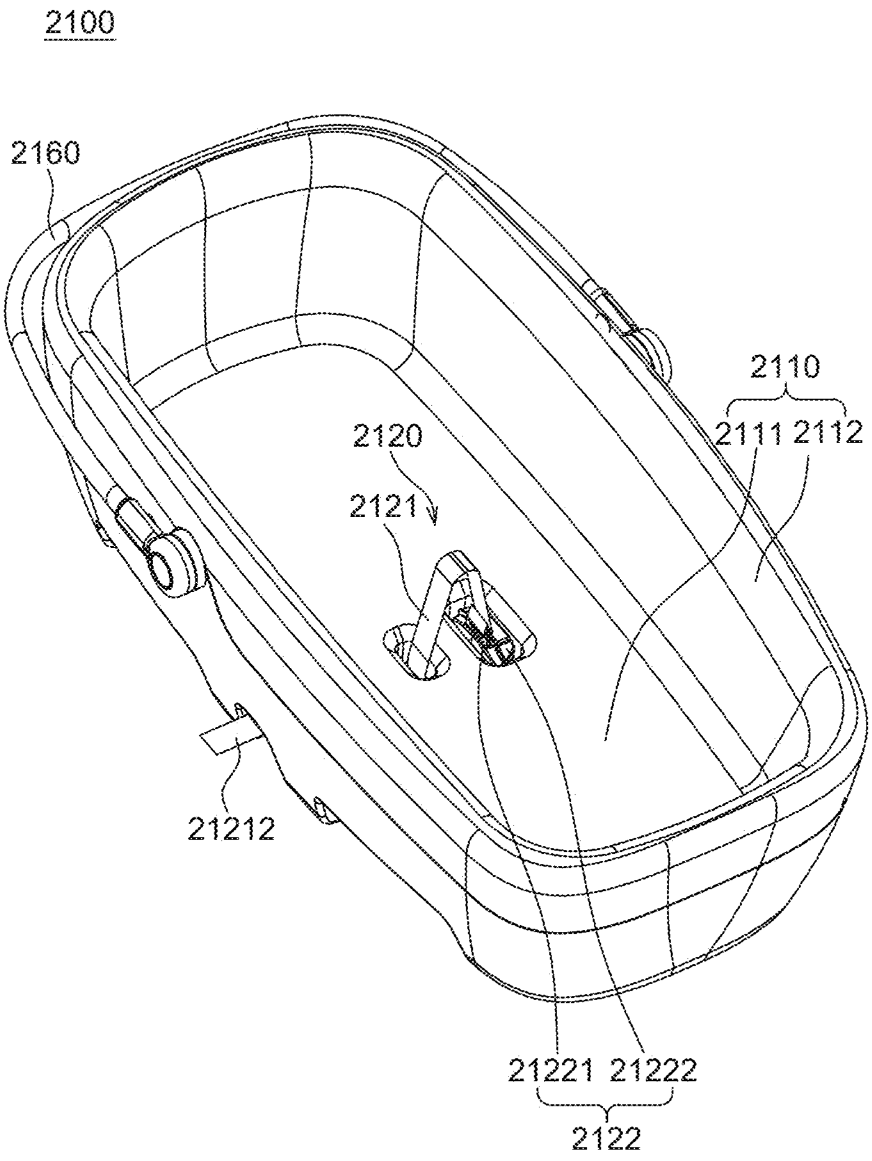
FIG. 12G is a schematic view of the pet carrier according to the first embodiment of the second aspect of the present disclosure when the handle is folded.

Referring to FIG. 12A to FIG. 12G, FIGS. 12A and 12B are schematic appearance views of a pet carrier 2100 according to a first embodiment in the second aspect of the present disclosure from different view angles. FIG. 12C is a schematic sectional view of the pet carrier according to the first embodiment of the second aspect of the present disclosure. FIG. 12D is a schematic view of a binding device 2120 according to the first embodiment of the second aspect of the present disclosure. FIGS. 12E and 12F are schematic views of the pet carrier in different use states according to the first embodiment of the second aspect of the present disclosure. FIG. 12G is a schematic view of the pet carrier according to the first embodiment of the second aspect of the present disclosure when the handle is folded. As shown in FIG. 12A to FIG. 12G, the pet carrier 2100 includes a box body 2110 and a binding device 2120, and the box body 2110 includes a bottom portion 2111 and a peripheral wall 2112 connected with the bottom portion 2111, the bottom portion 2111 and the peripheral wall 2112 surround to define an accommodation space 2113 for accommodating a pet, the bottom portion 2111 includes a bottom opening 21111, and the binding device 2120 includes a binding webbing 2121. The binding webbing 2121 passes through the bottom opening 21111 and is at least partially located in the accommodating space 2113. The binding webbing 2121 may be used to cooperate with a connecting element provided on a pet vest P0 worn by the pet, to limit the pet in the accommodating space 2113, and the connecting element may be a fixing ring, such as a metal ring, a webbing ring or a buckle ring made of other materials that can bear high tension. In addition, in this embodiment, the box body 2110 may have a substantially rectangular structure, but the present disclosure is not limited thereto. In another embodiment, the box body may have a substantially square structure.

As shown in FIG. 12E and FIG. 12F, the binding webbing 2121 may pass through a connecting element P1 on the pet vest P0 near a back of the pet or the connecting element P2 on the pet vest P0 near a chest or belly of the pet, so that the binding webbing 2121 may cooperate with the corresponding connecting element, but the present disclosure is not limited thereto, and the binding webbing may pass through any connecting element on the pet vest.

As shown in FIG. 12A to FIG. 12D and FIG. 12G, the binding device 2120 further includes a buckle assembly 2122 that includes a first buckle element 21221 and a second buckle element 21222. Specifically, the first buckle element 21221 and the second buckle element 21222 may be a male buckle and a female buckle, respectively. The first buckle element 21221 is provided at a free end 21211 of the binding webbing 2121. The second buckle element 21222 is provided at the bottom portion 2111 of the box body 2110. The free end 21211 of the binding webbing 2121 is detachably connected with the bottom portion 2111 of the box body 2110 through an engagement of the first buckle element 21221 and the second buckle element 21222.

In addition, the binding device 2120 further includes an adjuster 2123, through which the binding webbing 2121 penetrates. An adjusting end 21212 of the binding webbing 2121 is exposed out of the adjuster 2123. The adjuster 2123 is used to lock the binding webbing 2121 so that the binding webbing 2121 cannot move relative to the adjuster 2123, and the adjuster 2123 is also used to release the binding webbing 2121, so that the binding webbing 2121 can move relative to the adjuster 2123, to allow the user to pull the free end 21211 or the adjusting end 21212 according to actual needs (such as the size of a pet) to adjust the length of the binding webbing 2121 in the accommodating space 2113.

Specifically, as shown in FIGS. 12A to 12C, the bottom opening 21111 may penetrate through the bottom portion 2111 of the box body 2110, and the adjuster 2123 may be provided on the outer surface of the box body 2110 and close to the long side of the bottom portion 2111 of the box body 2110, to facilitate the user's operation and avoid being touched by the pet mistakenly.

The user may first operate the adjuster 2123 (e.g., press a button 21231 of the adjuster 2123 to pivot in an arrow direction as shown in FIG. 12C) to release the binding webbing 2121, and then penetrate the binding webbing 2121 through the connecting element P1 on the pet vest P0 near the back of the pet or the connecting element P2 on the pet vest P0 near the chest or belly of pet, so that the binding webbing 2121 may cooperate with the connecting element P1 or the connecting element P2. When the binding webbing 2121 penetrates through the connecting element P1 on the pet vest P0 near the back of the pet or the connecting element P2 on the pet vest P0 near the chest or belly of pet, the user may fasten the first buckle element 21221 to the second buckle element 21222, so that the free end 21211 of the binding webbing 2121 may be detachably connected to the bottom portion 2111 of the box body 2110. Then, the adjuster 2123 is operated (for example, the button 21231 of the adjuster 2123 is released to pivot in the direction opposite to the arrow as shown in FIG. 12C) to lock the binding webbing 2121, thereby achieving the purpose of limiting the pet in the accommodating space 2113 and improving the pet's riding safety.

Figure 12H:
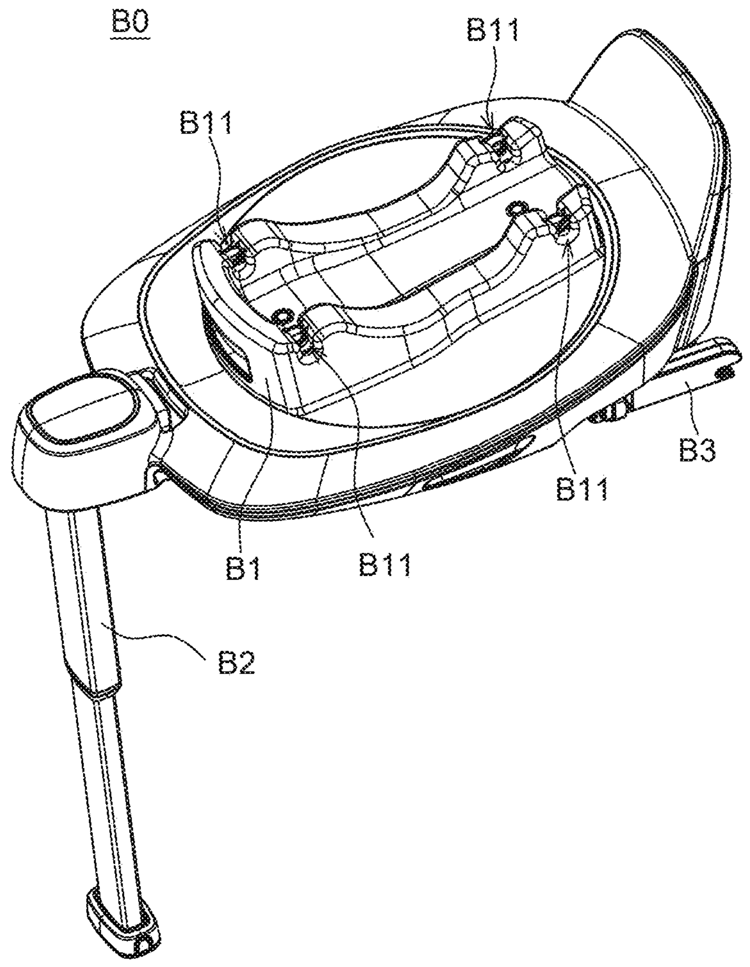
FIG. 12H is a schematic view of a base used with the pet carrier according to the first embodiment of the second aspect of the present disclosure.
Figure 12I:
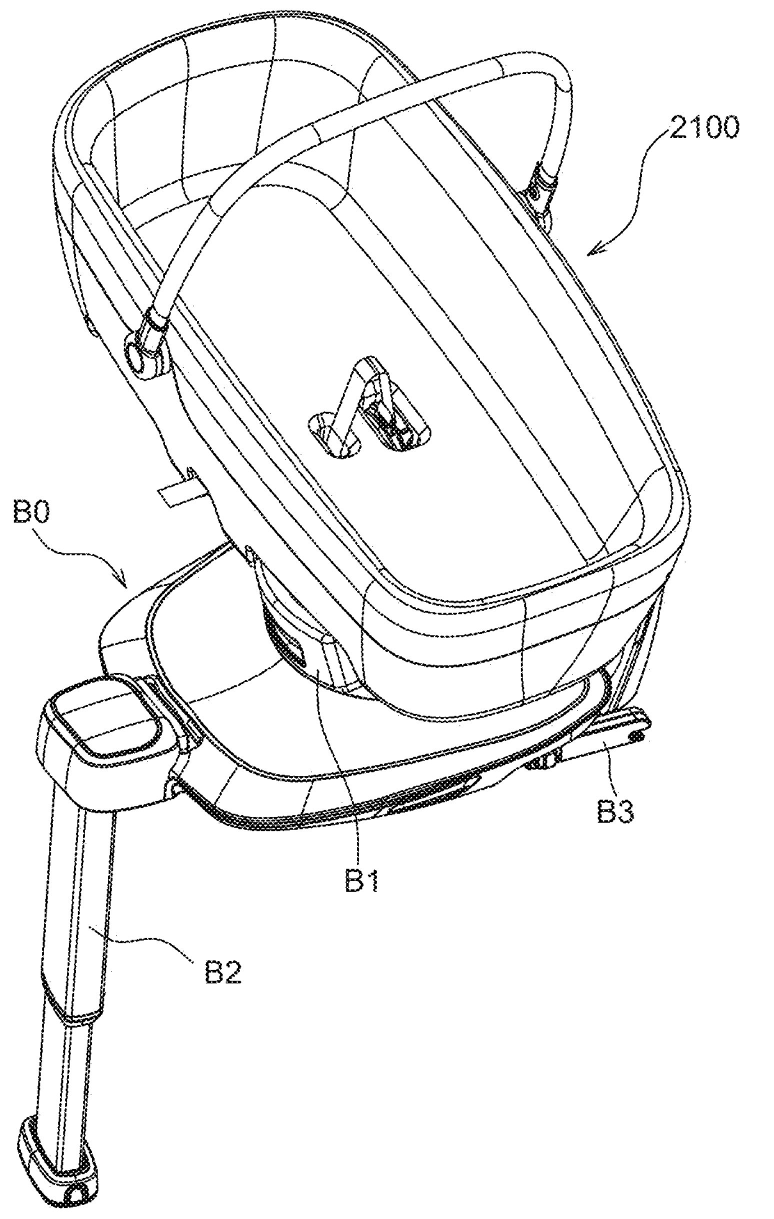
FIG. 12I is a schematic view of the pet carrier according to the first embodiment of the second aspect of the present disclosure when the pet carrier is installed on the base.

Referring to FIG. 12B, FIG. 12H and FIG. 12I again, FIG. 12H is a schematic view of a base B0 used with the pet carrier 2100 according to the first embodiment of the second aspect of the present disclosure, and FIG. 12I is a schematic view when the pet carrier 2100 according to the first embodiment of the second aspect of the present disclosure is installed on the base B0. As shown in FIGS. 12B, 12H and 12I, the pet carrier 2100 further includes at least one engaging assembly. Specifically, at least one engaging assembly includes a first engaging assembly 2130 and a second engaging assembly 2140, which are provided at the bottom portion 2111 of the box body 2110 and spaced apart from each other along a long axis direction of the box body 2110. The pet carrier 2100 may be mounted on the base B0 through a cooperation between one of the first engaging assembly 2130 and the second engaging assembly 2140 and an engaging structure B1 of the base B0, so that the pet carrier 2100 may be mounted on the vehicle seat (not shown) through the base B0, and the base B0 may be mounted on the vehicle seat through a supporting leg B2 and a fixing device B3 (such as international standards organization fix). In another embodiment, the base may also be installed on the vehicle seat through a vehicle safety belt.

More specifically, the first engagement assembly 2130 includes a first engaging element 2131 and a second engaging element 2132. The second engagement assembly 2140 includes a third engaging element 2141 and a fourth engaging element 2142, which are spaced apart from each other along a short axis direction of the box body 2110. The first engaging element 2131 and the third engaging element 2141 are aligned with each other along a long axis direction of the box body 2110, and the second engaging element 2132 and the fourth engaging element 2142 are aligned with each other along the long axis direction of the box body 2110. According to the installation position, the user may selectively adjust an installation orientation of the pet carrier 2100 with respect to the base B0 by making the first engaging element 2131 and the second engaging element 2132 engage into a corresponding engaging portion B11 of the engaging structure B1 or making the third engaging element 2141 and the fourth engaging element 2142 engage into a corresponding engaging portion B11 of the engaging structure B1, respectively. For example, when the pet carrier 2100 is arranged behind the driver's seat of a left-hand drive vehicle, the user may choose to make the first engaging element 2131 and the second engaging element 2132 engage into the corresponding engaging portion B11 of the engaging structure B1, so that the pet carrier 2100 may be positioned at a position relative to the base B0 as shown in FIG. 12I. When the pet carrier 2100 is arranged behind the assistant seat of a left-hand drive vehicle, the user may choose to make the third engaging element 2141 and the fourth engaging element 2142 engage into the corresponding engaging portion B11 of the engaging structure B1, so that the pet carrier 2100 is located at another position relative to the base B0, thereby avoiding the interference between the box body 2110 and the vehicle door or other structures, and also avoiding the adjuster 2123 from being blocked when the pet carrier 2100 is installed in the vehicle seat. It should be understood that in another embodiment, at least one engaging assembly may only include the first engaging assembly or the second engaging assembly. Alternatively, in another embodiment, at least one engaging assembly may include a first engaging assembly, a first engaging assembly and a third engaging assembly arranged between the first engaging assembly and the second engaging assembly.

In addition, as shown in FIG. 12A, FIG. 12B and FIG. 12G, the pet carrier 2100 further includes two structural reinforcements 2150 and a handle 2160. The two structural reinforcements 2150 are provided at the bottom portion 2111 of the box body 2110 at intervals, and each structural reinforcement 2150 may be a convex rib with its long axis direction roughly parallel to the short axis direction of the box body 2110. The structural reinforcements 2150 may enhance a structural strength of the pet carrier 2100, in order to improve its impact resistance. Two ends of the handle 2160 are respectively pivoted to two long sides of the peripheral wall 2112 of the box body 2110, so that the handle 2160 may be pivoted and unfolded relative to the peripheral wall 2112 to facilitate the lifting of the pet carrier 2100 or may be pivoted and folded to facilitate the storage of the pet carrier 2100. In another embodiment, the structural reinforcement may also be a transverse rod protruding along a short axis direction of the box body 2110.

In addition, it can be understood that the structure of the pet carrier of the present disclosure is not limited thereto. For example, in another embodiment, the pet carrier may only include one structural reinforcement. Alternatively, in another embodiment, at least one of the structural reinforcements and the handle may be omitted. Alternatively, in another embodiment, the handle may be detached from the peripheral wall.

Figure 13A:
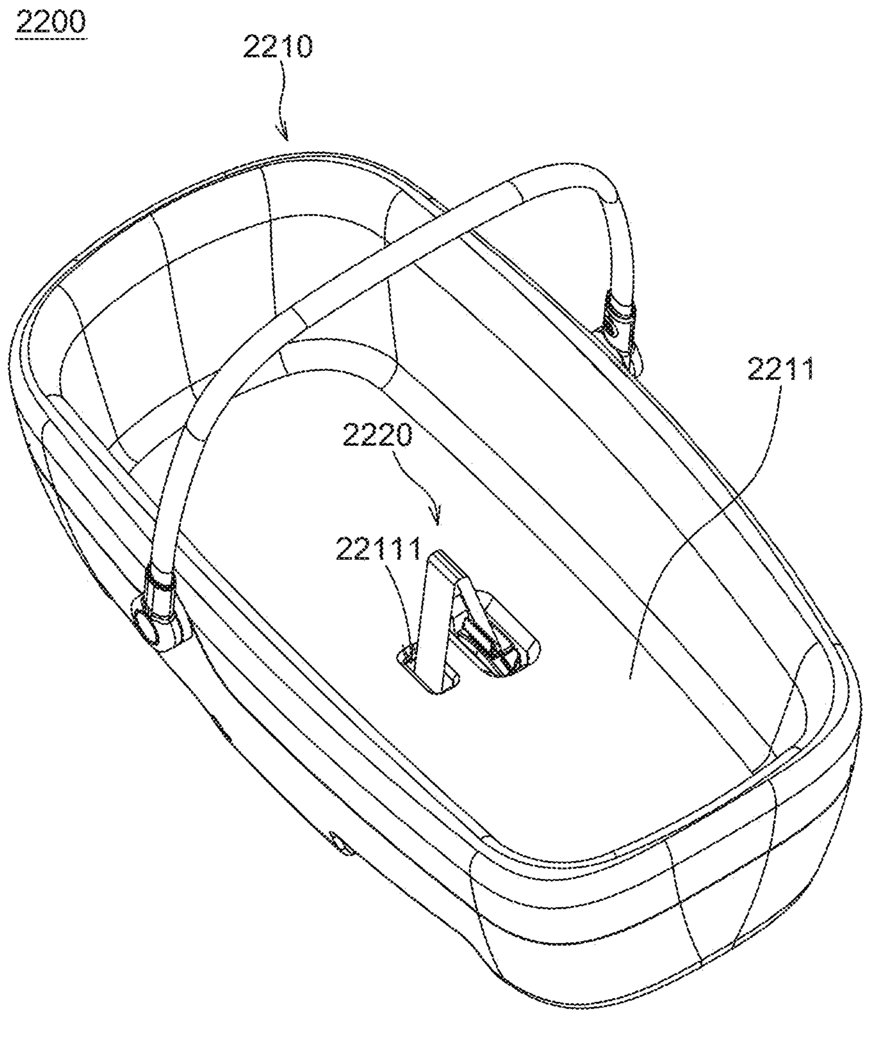
FIGS. 13A and 13B are schematic appearance views of a pet carrier according to a second embodiment of the second aspect of the present disclosure from different view angles.
Figure 13B:
Figure 13C:
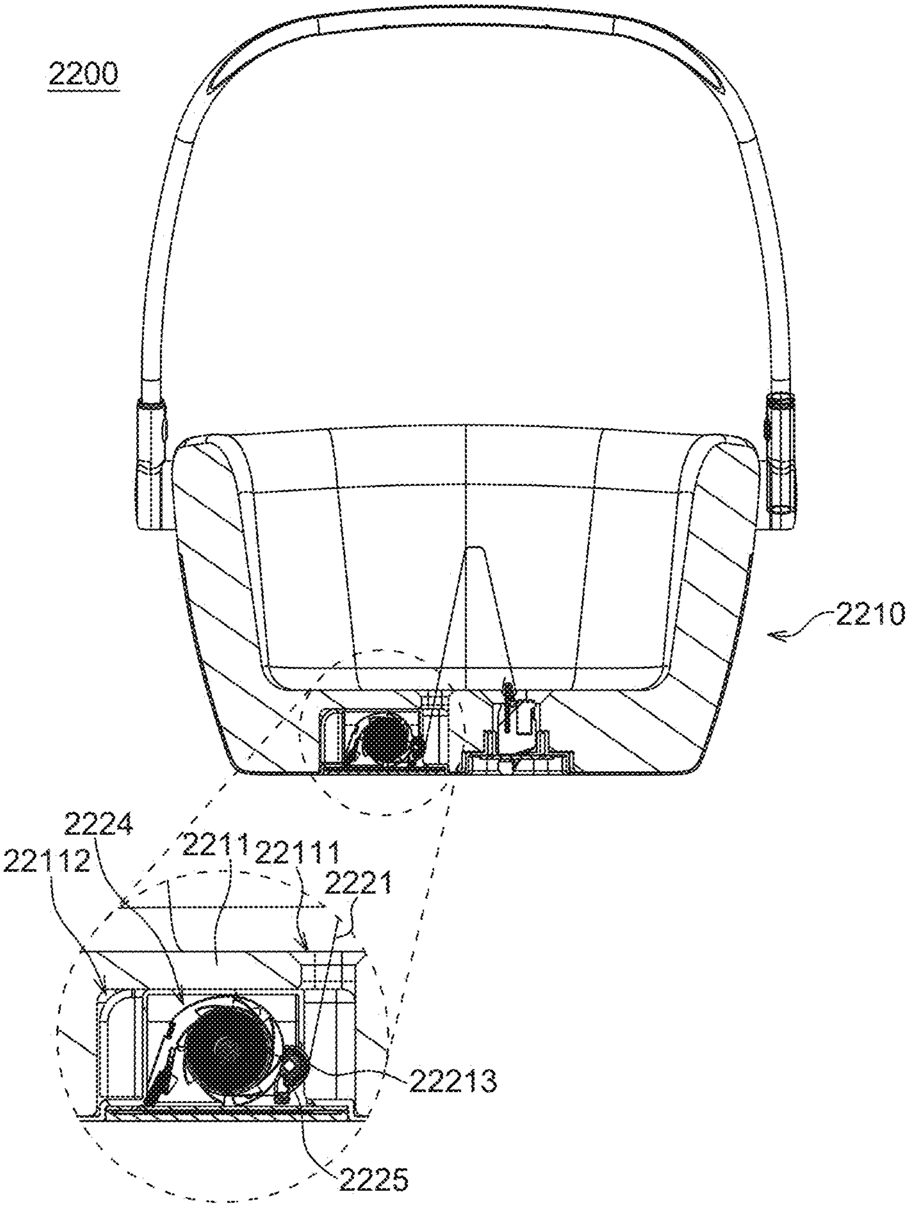
FIG. 13C is a schematic sectional view of the pet carrier according to the second embodiment of the second aspect of the present disclosure.
Figure 13D:
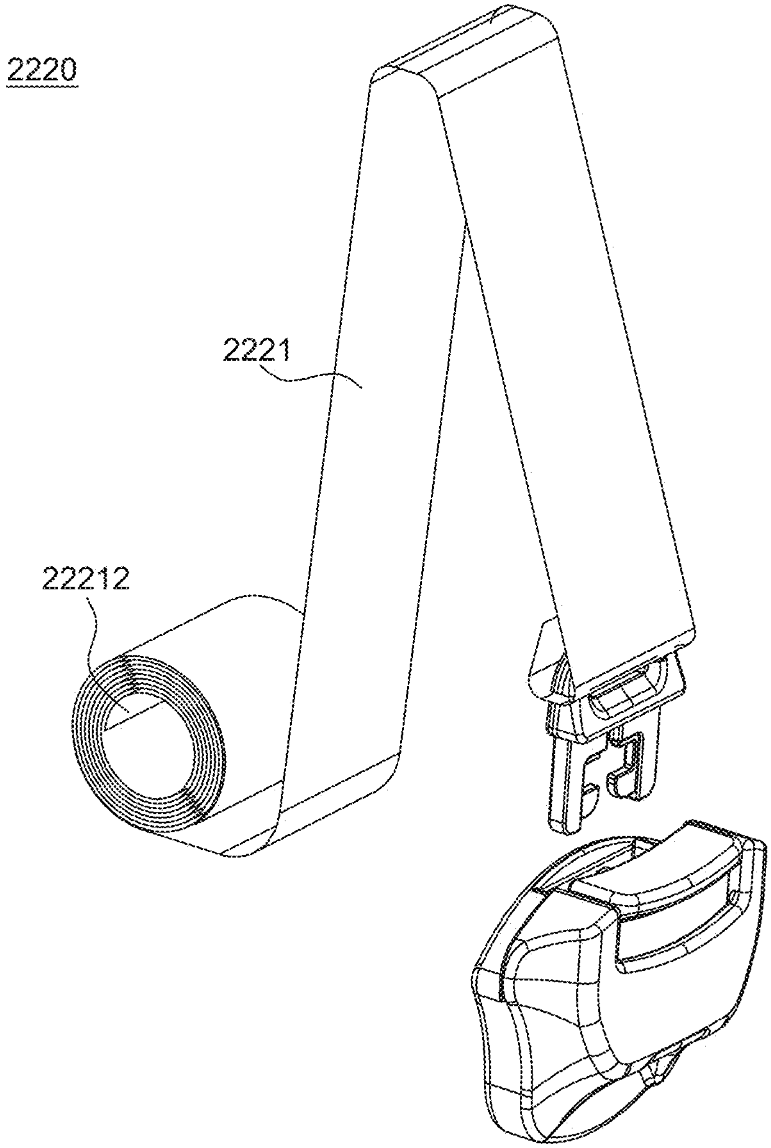
FIG. 13D is a partial structural schematic view of a binding device according to the second embodiment of the second aspect of the present disclosure.

Referring to FIGS. 13A to 13D, FIGS. 13A and 13B are schematic appearance views of a pet carrier according to a second embodiment of the second aspect of the present disclosure from different view angles. FIG. 13C is a schematic sectional view of the pet carrier according to the second embodiment of the second aspect of the present disclosure. FIG. 13D is a partial structural schematic view of a binding device according to the second embodiment of the second aspect of the present disclosure. As shown in FIGS. 13A to 13D, the pet carrier 2200 of this embodiment includes a box body 2210 and a binding device 2220. Different from the pet carrier 2100 of the first embodiment, the binding device 2220 of this embodiment includes a retractor 2224, but not include an adjuster. A bottom portion 2211 of the box body 2210 includes a cavity 22112 communicating with the bottom opening 22111. The retractor 2224 is accommodated in the cavity 22112, and an adjusting end 22212 of the binding webbing 2221 is connected with the retractor 2224, which may allow the binding webbing 2221 to be retracted or extended, that is, the user may extend by a length of the binding webbing 2221 in the accommodating space by pulling the binding webbing 2221 and release the binding webbing 2221 to allow the retractor 2224 to retract the binding webbing 2221. Furthermore, the retractor 2224 may also lock the binding webbing 2221 when it is quickly pulled and extended, so that the binding webbing 2221 cannot be extended. A structure of the retractor 2224 may be similar to that of the well-known vehicle safety belt retractor, which is not repeated here.

In addition, the binding device 2220 further includes a guide element 2225 that is close to the retractor 2224 and used for guiding the binding webbing 2221 to approach a turning section 22213 of the retractor 2224. The guide element 2225 has an arc surface for contacting with the binding webbing 2221, so that the turning section 22213 of the binding webbing 2221 has a smooth path, so that the winding or extension operation of the binding webbing is smoother. However, the present disclosure is not limited thereto. For example, in another embodiment, the binding device does not include a guide element.

Other structures of this embodiment are similar to those of the first embodiment and have similar variety, they are not repeated here.

Figure 14A:
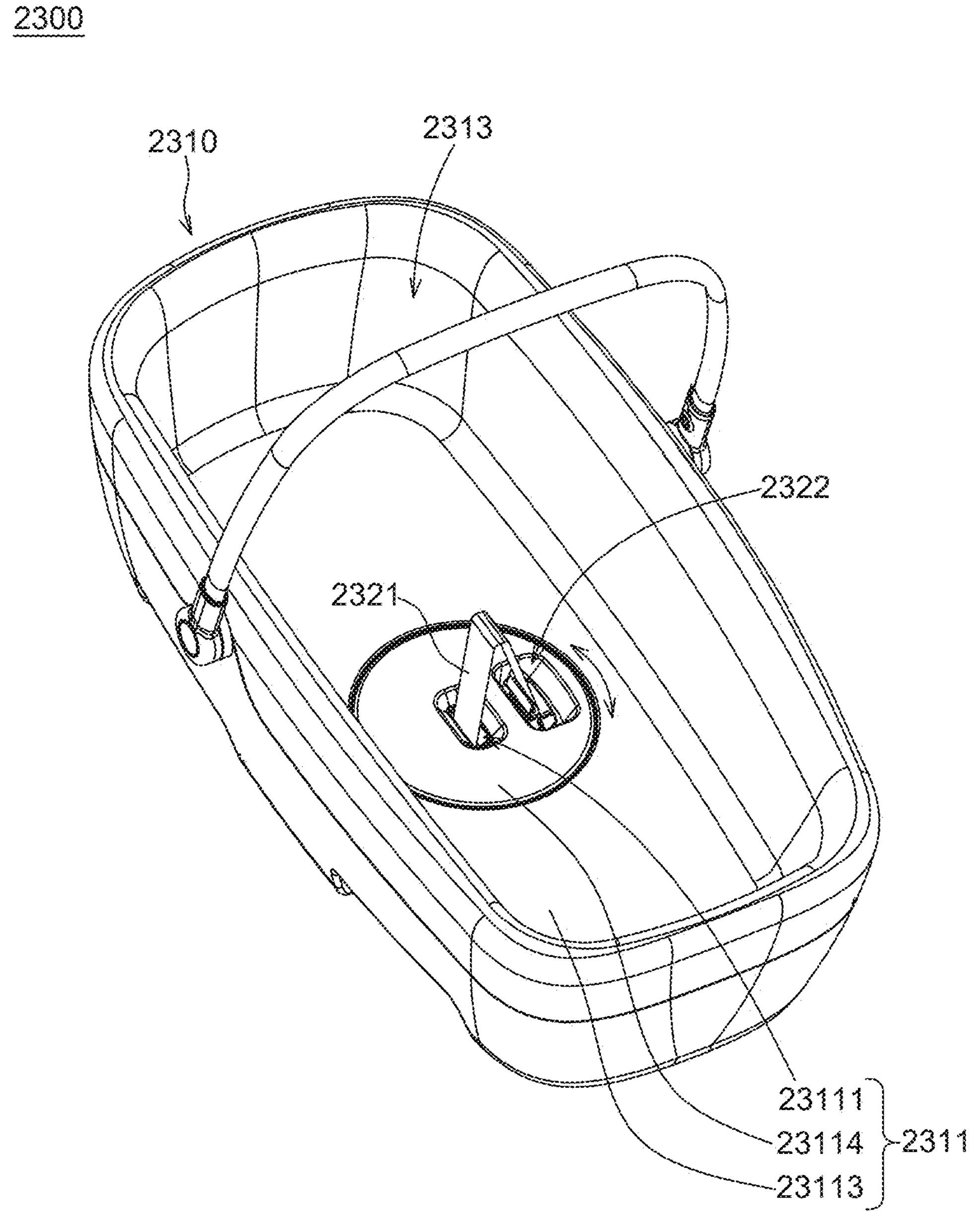
FIGS. 14A and 14B are schematic appearance views of a pet carrier according to a third embodiment of the second aspect of the present disclosure from different view angles.
Figure 14B:
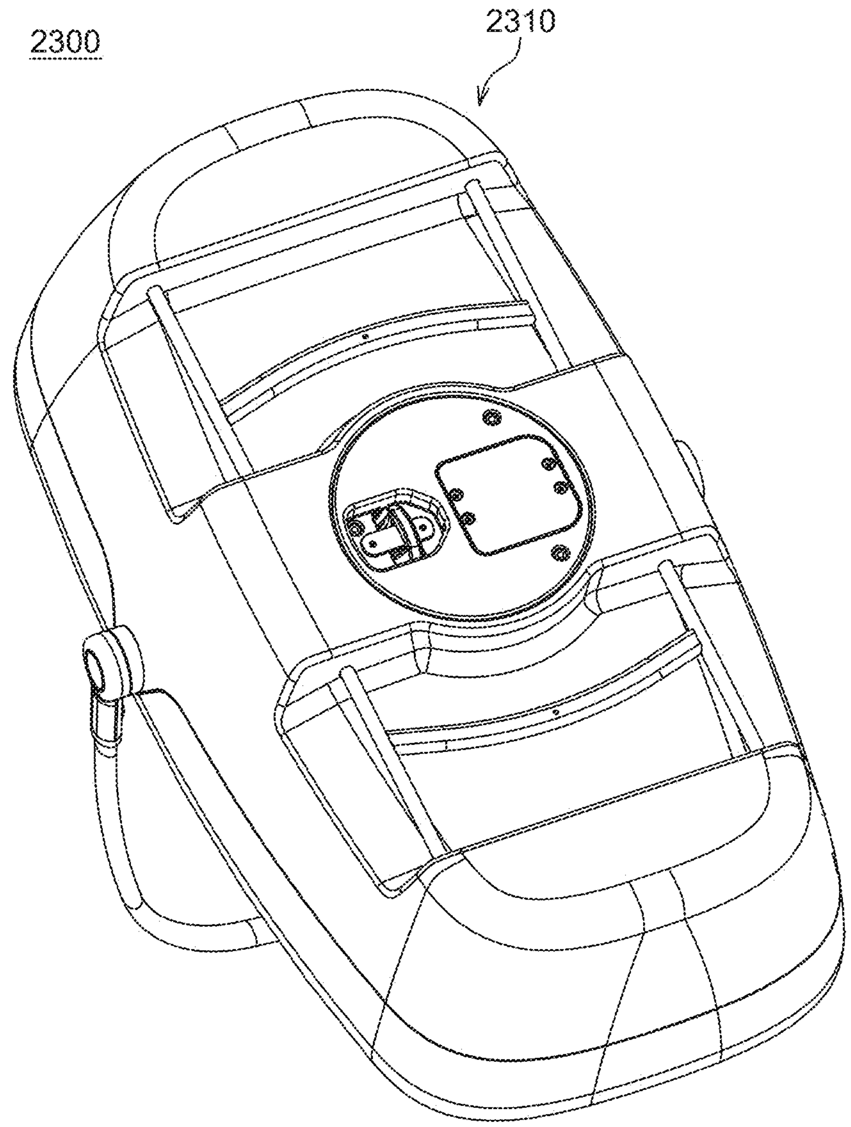
Figure 14C:
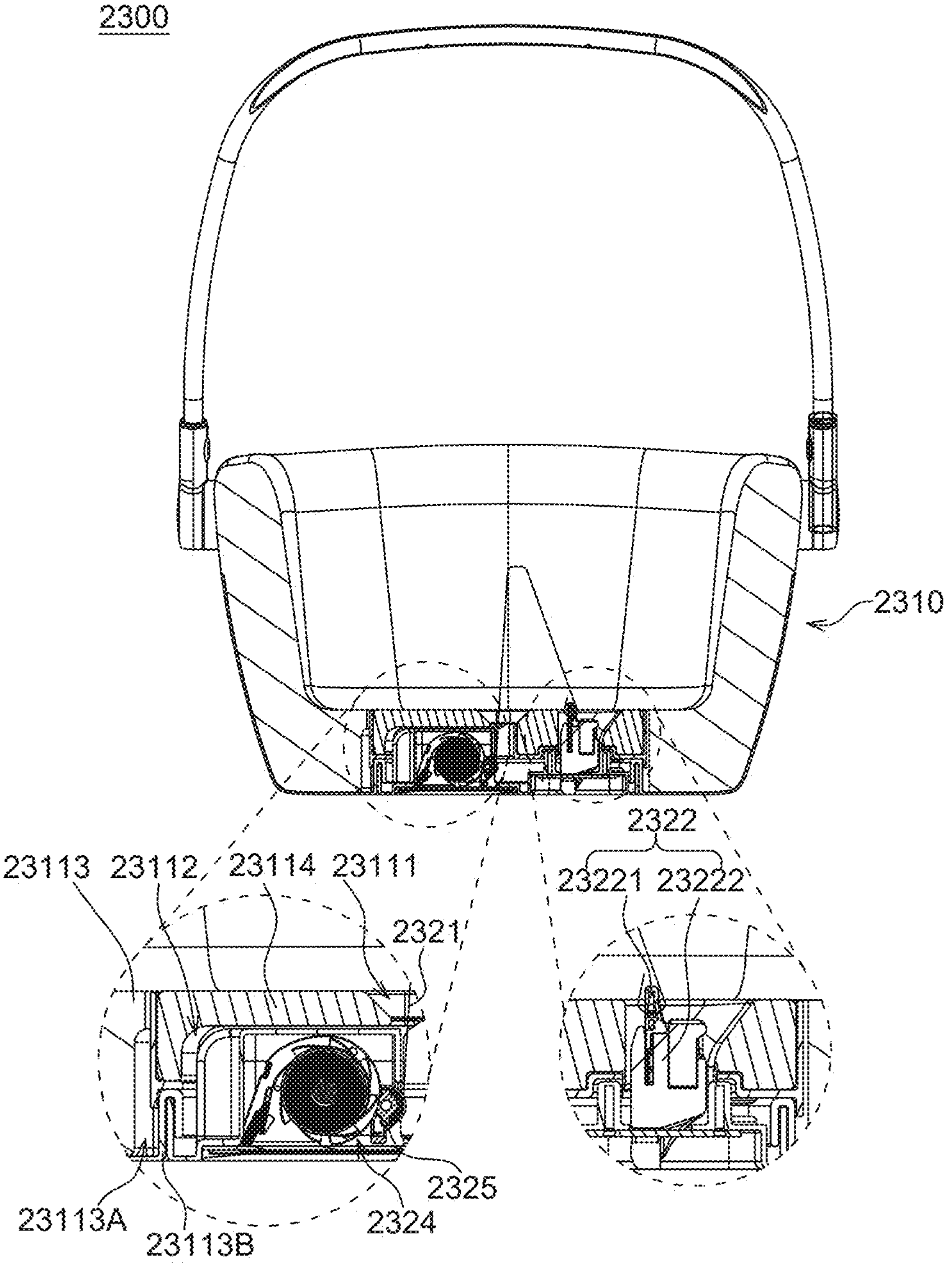
FIG. 14C is a schematic sectional view of the pet carrier according to the third embodiment of the second aspect of the present disclosure.

Referring to FIGS. 14A to 14C, FIGS. 14A and 14B are schematic appearance views of a pet carrier according to a third embodiment of the second aspect of the present disclosure from different view angles, and FIG. 14C is a schematic sectional view of the pet carrier according to the third embodiment of the second aspect of the present disclosure. As shown in FIGS. 14A to 14C, the pet carrier 2300 of this embodiment includes a box body 2310 and a binding device 2320. Different from the pet carrier 2200 of the second embodiment, the bottom portion 2311 of the box body 2310 of this embodiment includes a body element 23113 and a rotating element 23114 that is rotatable relative to the body element 23113. The body element 23113 may be formed with a rotating slot 23113A for accommodating the rotating element 23114, the rotating slot 23113A may be provided with a guide rail 23113B for positioning and guiding the rotation of the rotating element 23114. A bottom opening 23111 and a cavity 23112 are formed in the rotating element 23114. A first buckle 23221 and a second buckle 23222 of the buckle assembly 2322 are respectively provided on the binding webbing 2321 and the rotating element 23114. When the pet moves in the accommodating space 2313, the binding webbing 2321 may be forced to rotate the rotating element 23114, the buckle assembly 2322, the retractor 2324 and the guide element 2325 along an arrow direction as shown in FIG. 14A. It can be understood that in another embodiment, the body element and the rotating element may be pivotally connected to each other merely by the pivot or by the guide rail and the pivot.

Other structures of this embodiment are similar to those of the second embodiment, and also have similar diverse changes, which are not repeated here.

Figure 15A:
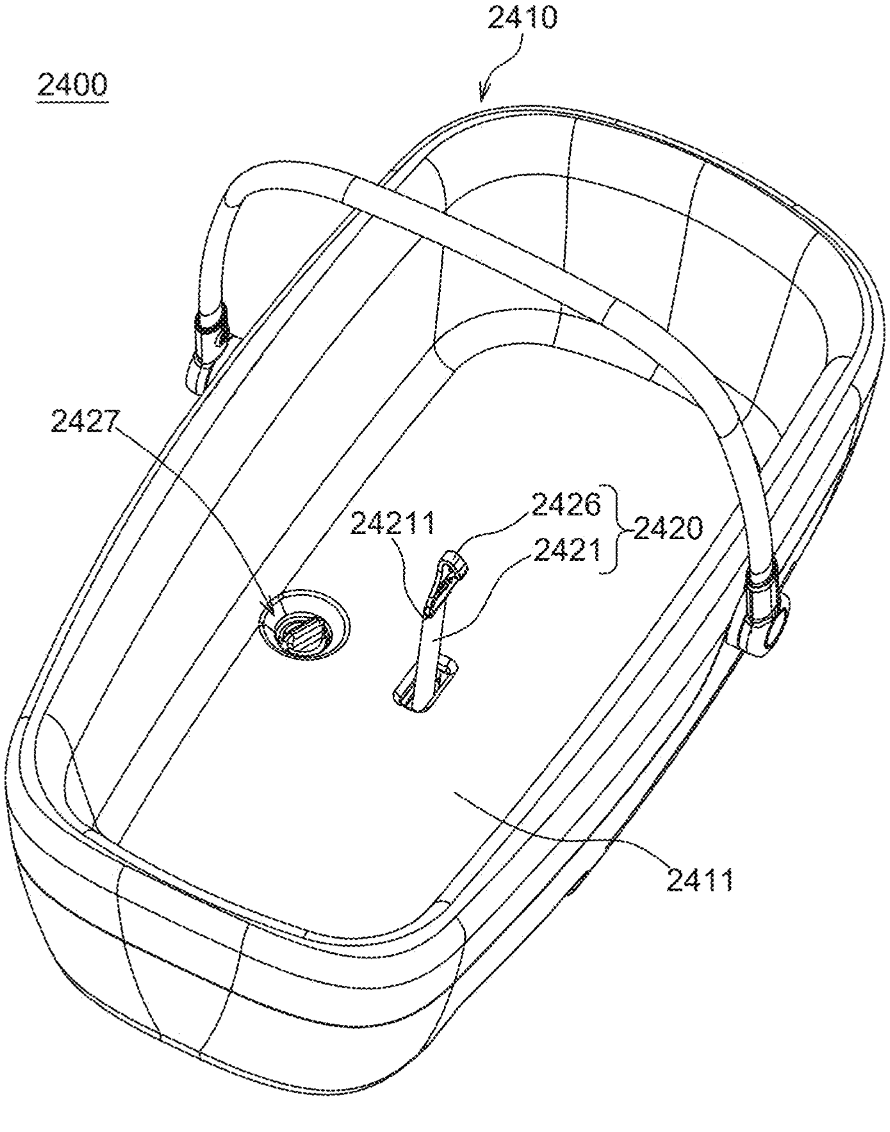
FIGS. 15A and 15B are schematic appearance views of a pet carrier according to a fourth embodiment of the second aspect of the present disclosure from different view angles.
Figure 15B:
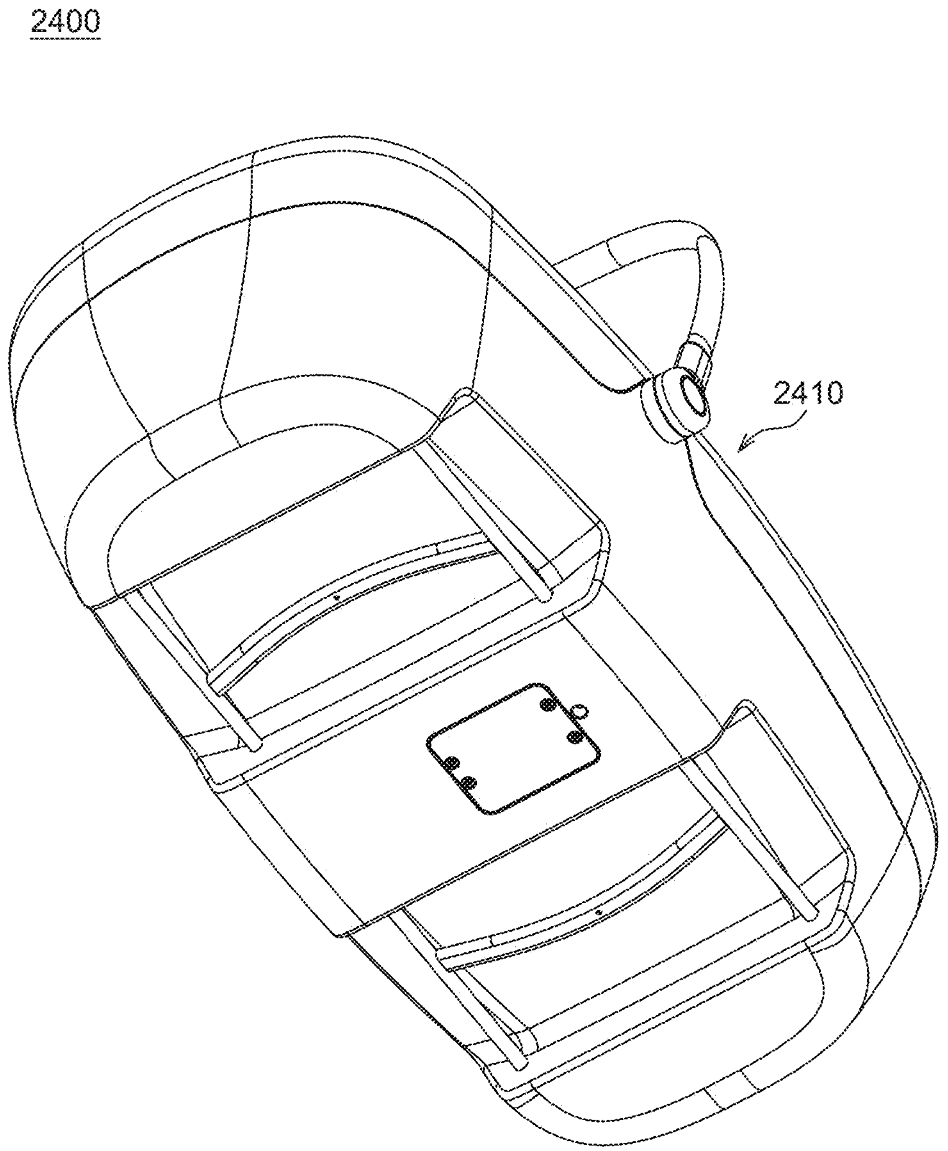
Figure 15C:
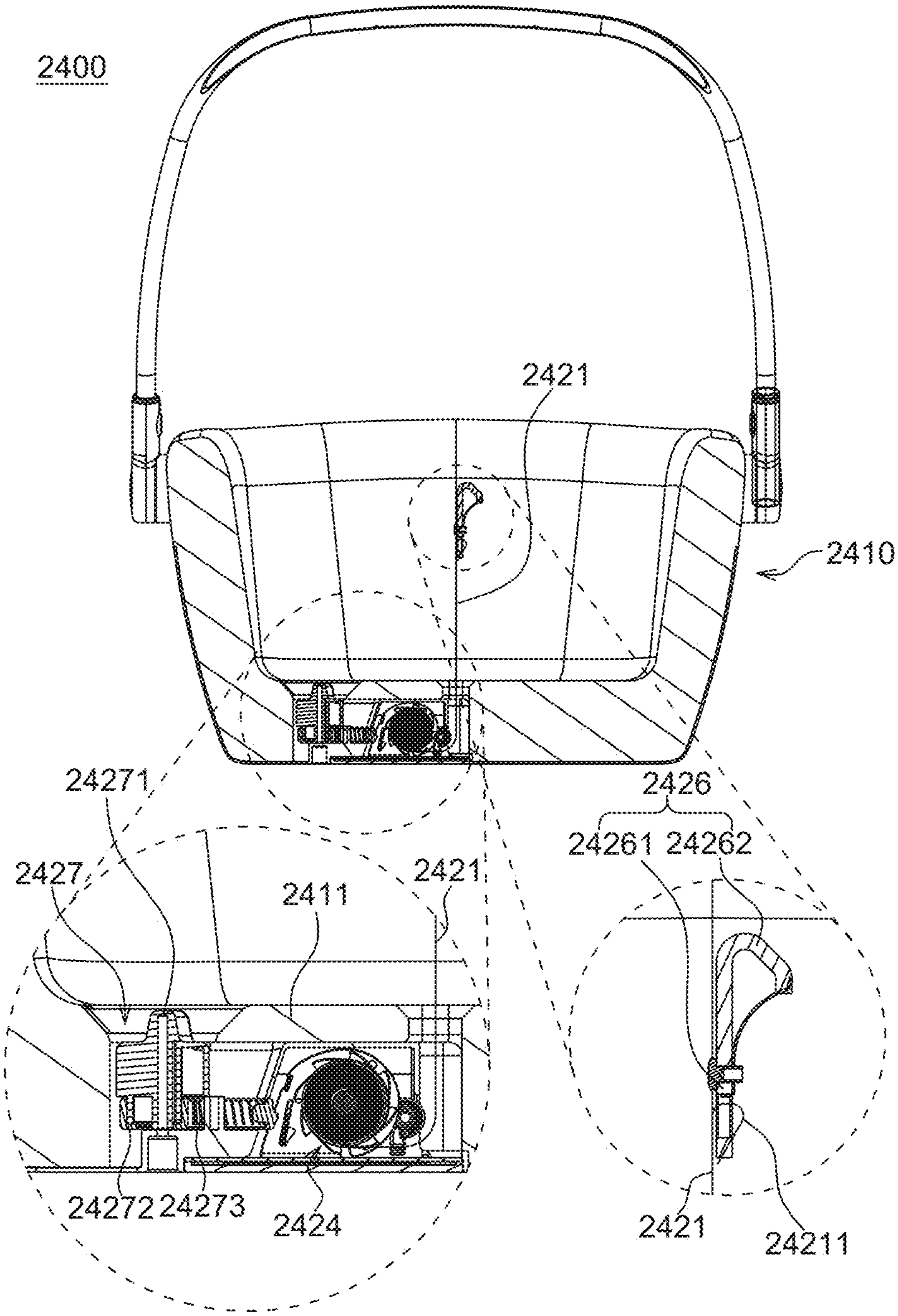
FIG. 15C is a schematic sectional view of the pet carrier according to the fourth embodiment of the second aspect of the present disclosure.
Figure 15D:
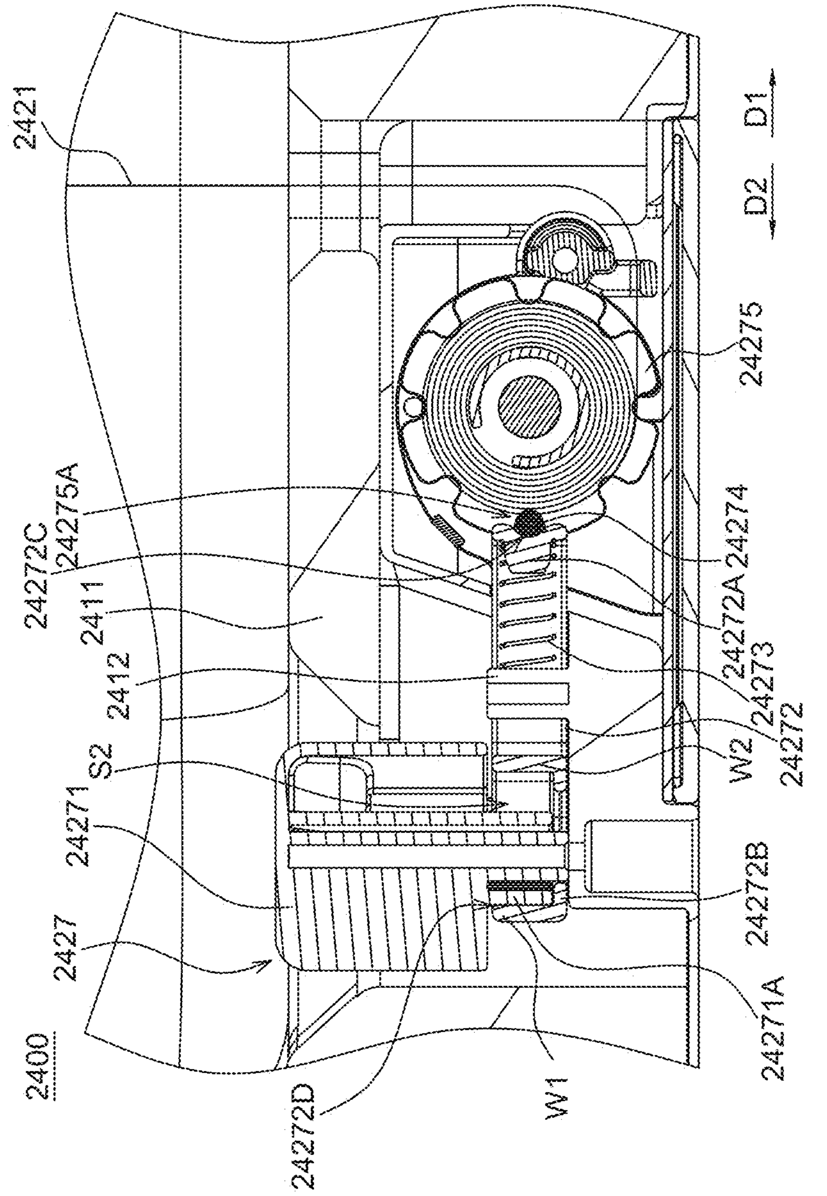
FIG. 15D and FIG. 15E are partial internal structural schematic views of the pet carrier according to the fourth embodiment of the second aspect of the present disclosure.
Figure 15E:
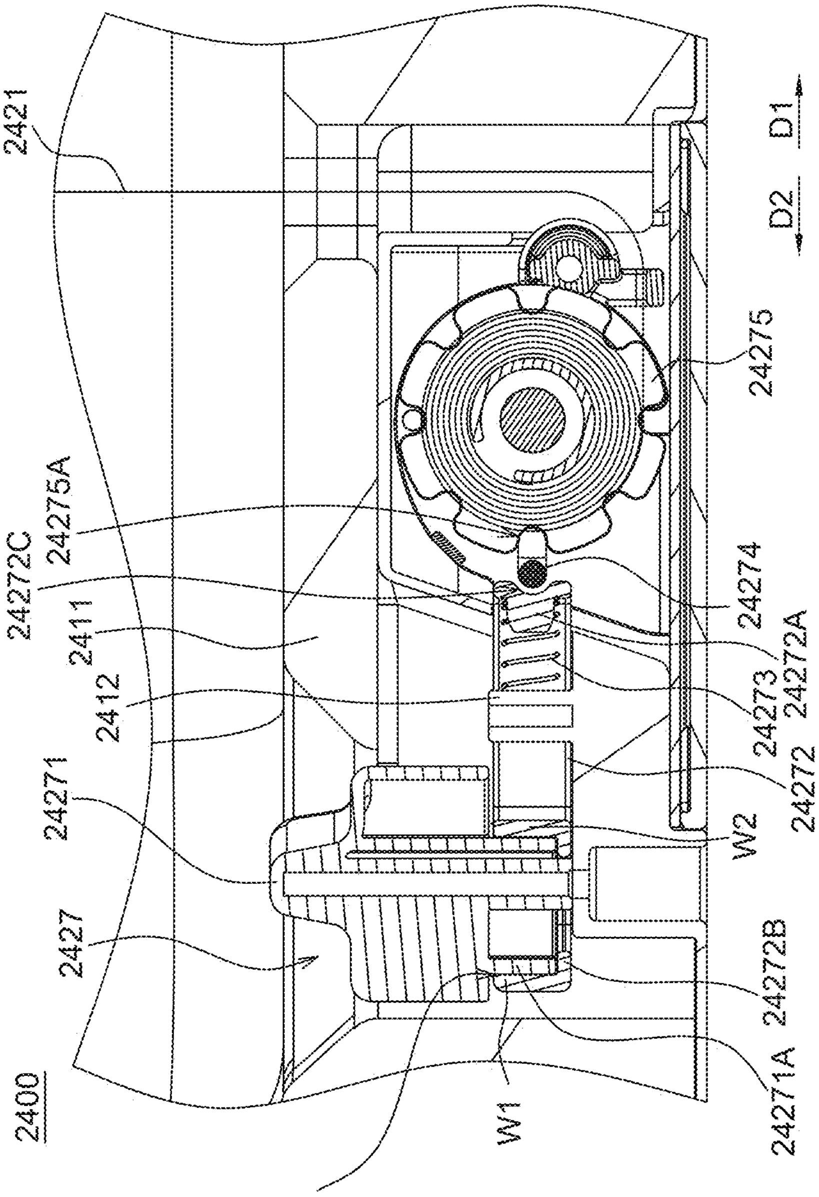
Figure 15F:
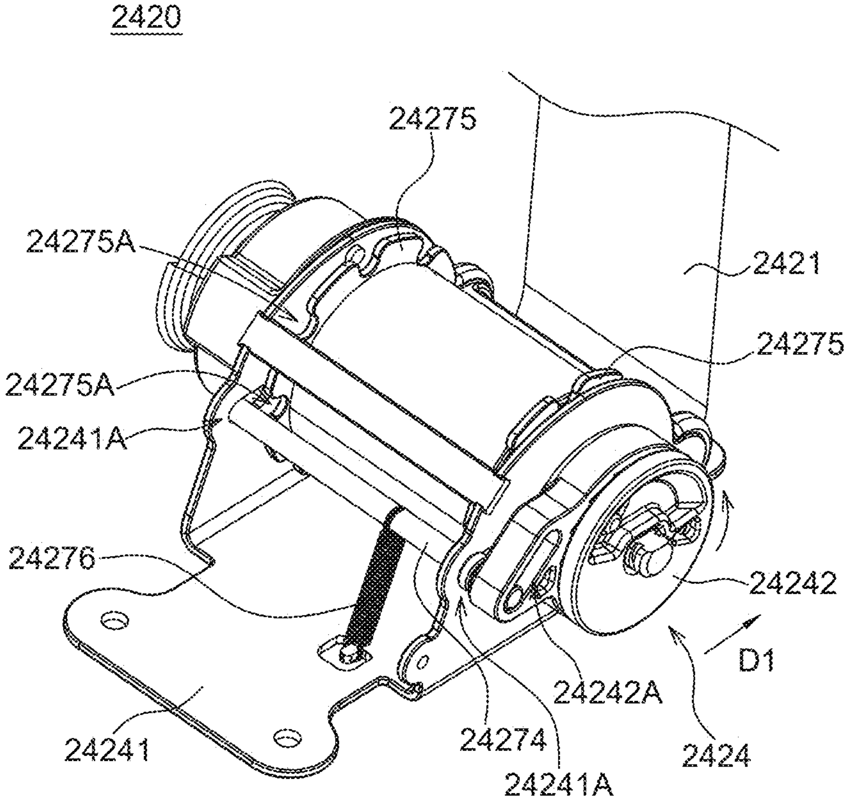
FIG. 15F is a partial structural schematic view of a binding device according to the fourth embodiment of the second aspect of the present disclosure.
Figure 15G:
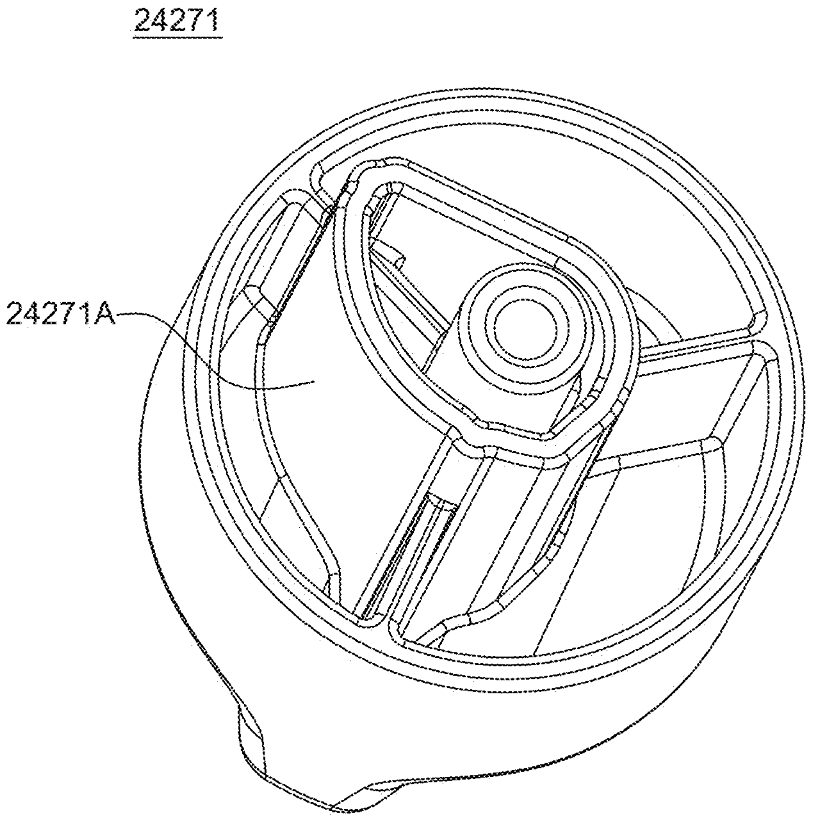
FIG. 15G is a schematic view of an operating element according to the fourth embodiment of the second aspect of the present disclosure.

Referring to FIGS. 15A to 15G, FIGS. 15A and 15B are schematic appearance views of a pet carrier according to a fourth embodiment of the second aspect of the present disclosure from different view angles. FIG. 15C is a schematic sectional view of the pet carrier according to the fourth embodiment of the second aspect of the present disclosure. FIGS. 15D and 15E are partial internal structural schematic views of the pet carrier according to the fourth embodiment of the second aspect of the present disclosure. FIG. 15F is a partial structural schematic view of a binding device according to the fourth embodiment of the second aspect of the present disclosure.

As shown in FIGS. 15A to 15G, the pet carrier 2400 of this embodiment includes a box body 2410 and a binding device 2420. Different from the pet carrier 2200 of the second embodiment, the binding device 2420 of this embodiment includes a hook 2426, but not include a buckle assembly. The hook 2426 is provided at a free end 24211 of the binding webbing 2421, and the hook 2426 buckles a connecting element on the pet vest, thereby enabling the binding webbing 2421 to match with the connecting element on the pet vest.

Figure 16:
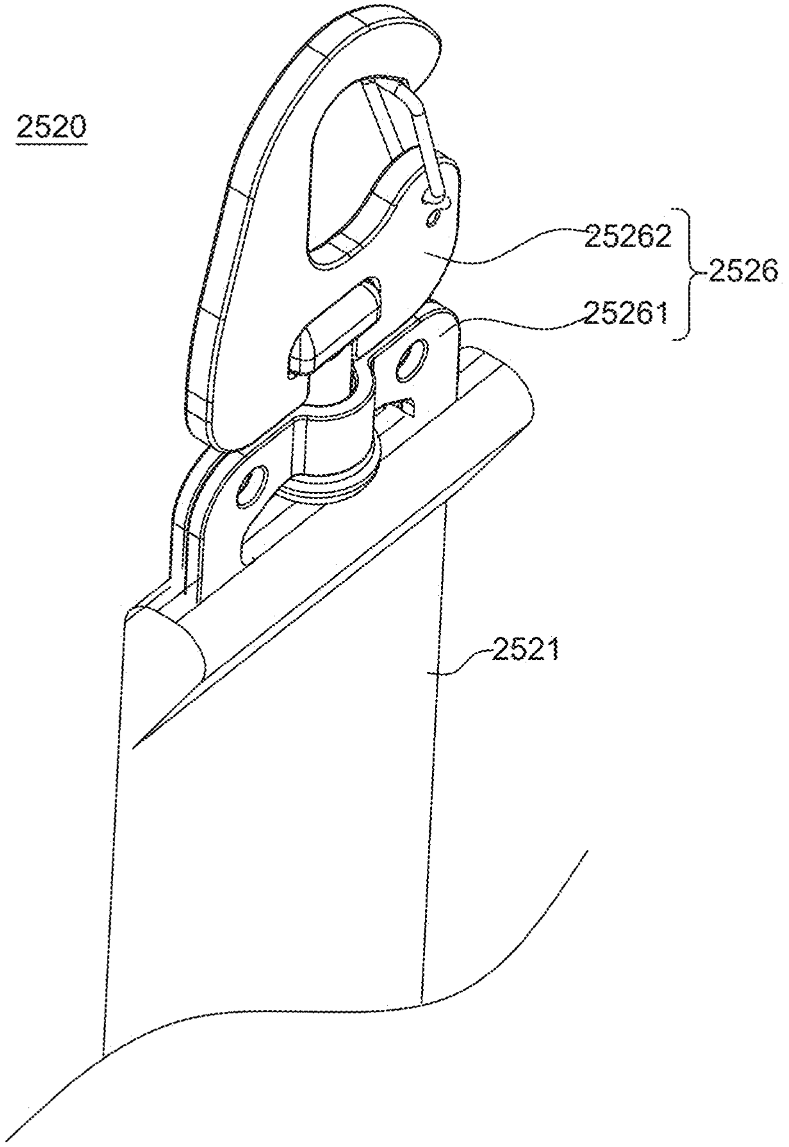
FIG. 16 is a partial structural schematic view of a binding device according to a fifth embodiment of the second aspect of the present disclosure.
Figure 17A:
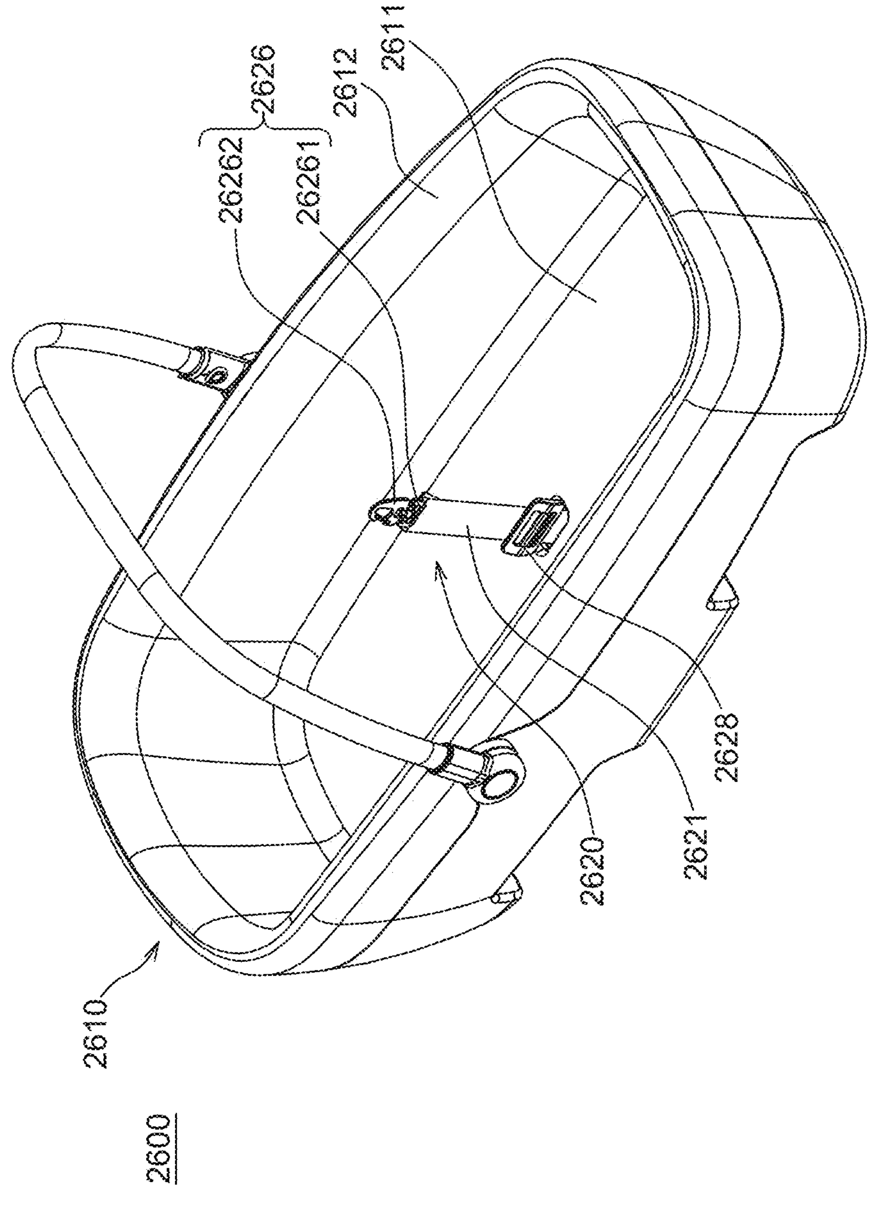
FIG. 17A is a schematic appearance view of a pet carrier according to a sixth embodiment of the second aspect of the present disclosure.
Figure 17B:
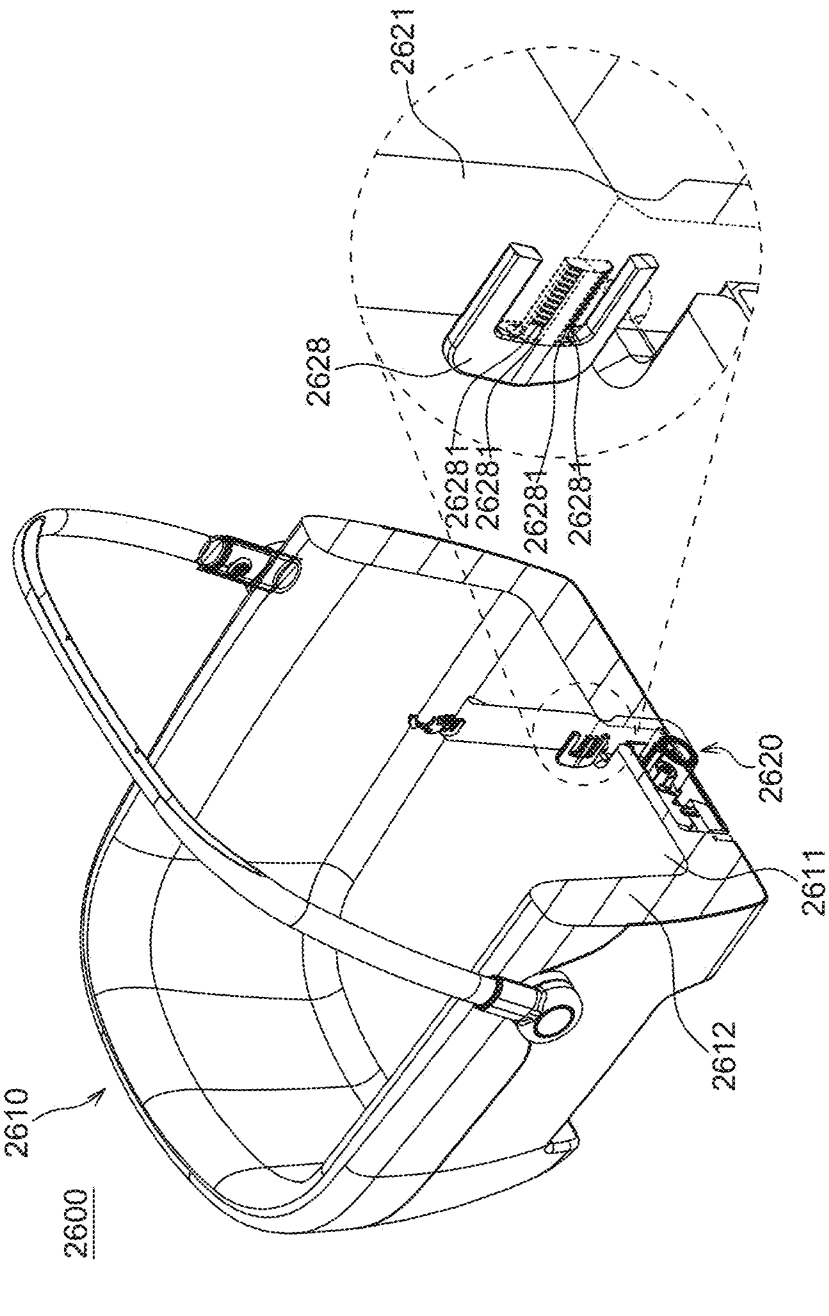
FIG. 17B is a schematic sectional view of the pet carrier according to the sixth embodiment of the second aspect of the present disclosure.
Figure 17C:
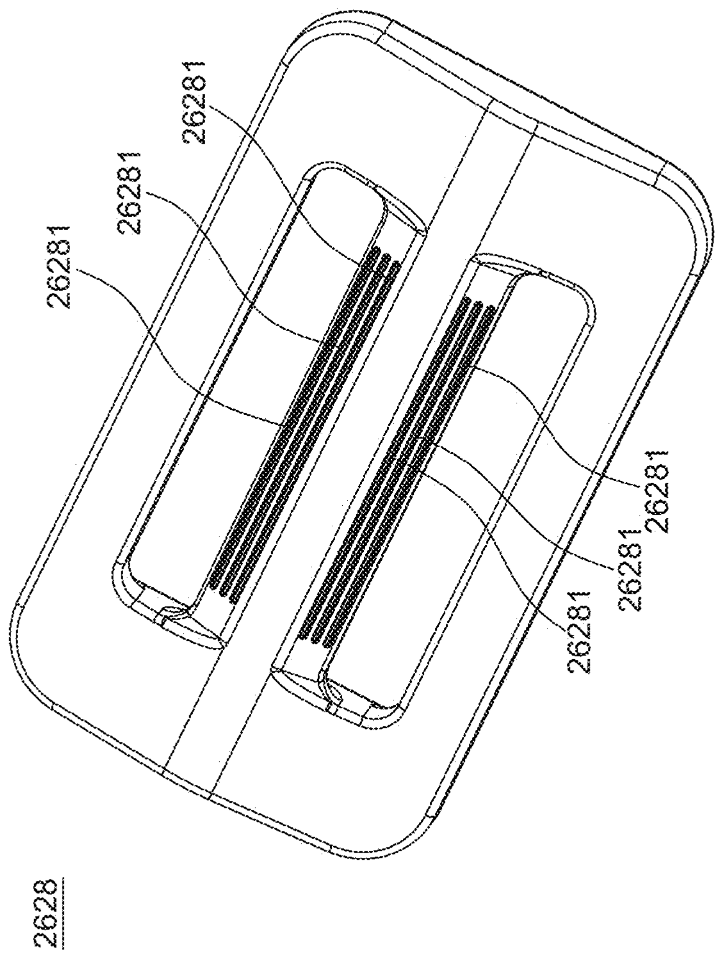
FIG. 17C and FIG. 17D are schematic view of a stopper according to the sixth embodiment of the second aspect of the present disclosure from different view angles.
Figure 17D:
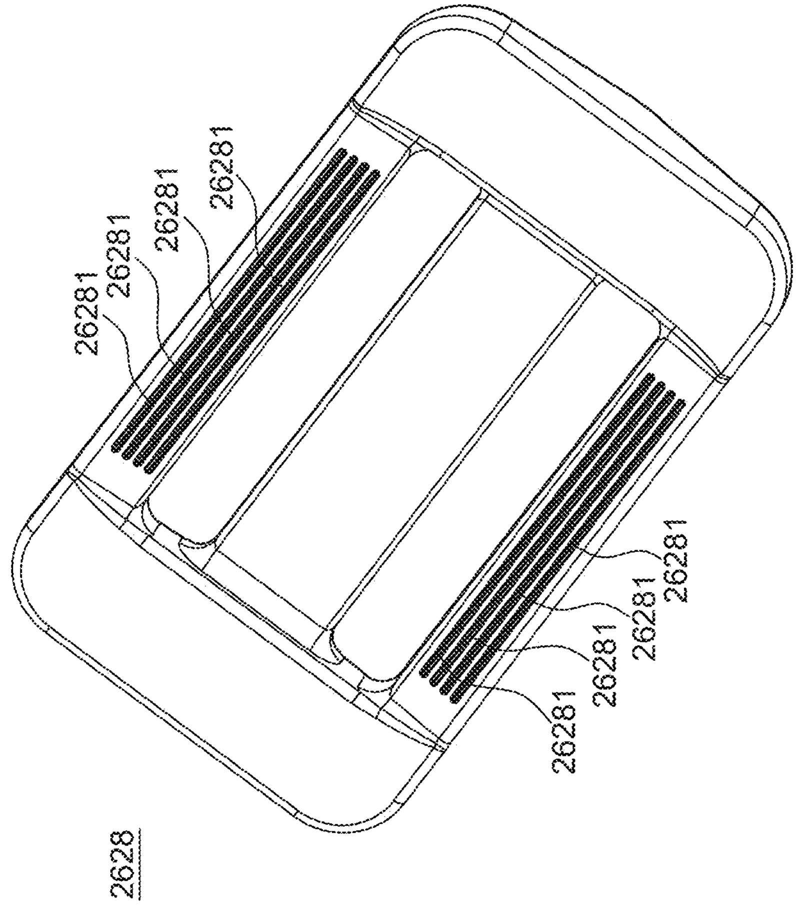

Specifically, the hook 2426 includes a connecting portion 24261 and a buckling portion 24262, the connecting portion 24261 is connected with a free end 24211 of the binding webbing 2421, and the buckling portion 24262 is fixedly connected with the connecting portion 24261 and used for fastening the connecting element on the pet vest, but the present disclosure is not limited thereto. For example, referring to FIG. 16, FIG. 16 is a partial structural schematic view of a binding device 2520 according to a fifth embodiment of the second aspect of the present disclosure. As shown in FIG. 16, the hook 2526 includes a connecting portion 25261 and a buckling portion 25262, the buckling portion 25262 of the hook 2526 is a rotary connecting portion 25261 to avoid winding and knotting the binding webbing 2521.

In addition, as shown in FIGS. 15A to 15G, the binding device 2420 further includes a locking device 2427, which is used to lock the retractor 2424, and the retractor 2424 cannot rotate, so that the retractor 2424 cannot wind up or release the binding webbing 2421.

Specifically, the locking device 2427 includes an operating element 24271, a driving element 24272, an elastic element 24273, a first locking element 24274, two second locking elements 24275 and a resetting element 24276. The two second locking elements 24275 are located on both sides of the retractor 2424 and are coaxially arranged with the retractor 2424, and each second locking element 24275 includes a plurality of locking notches 24275A. The operating element 24271 may be rotatably provided at the bottom portion 2411 of the box body 2410 and may be pivotally switched between a locking position as shown in FIG. 15D and an unlocking position as shown in FIG. 15E. The driving element 24272 is slidably provided at the bottom portion 2411 of the box body 2410 and includes a first end 24272A and a second end 24272B. The first end 24272A of the driving element 24272 is formed with a depression 24272C for matching with the first locking element 24274, and the second end 24272B of the driving element 24272 is formed with an accommodating slot 24272D for matching with the operating element 24271. The bottom portion 2411 of the box body 2410 is formed with a raised column 412 for the driving element 24272 to pass through and located between the first end 24272A and the second end 24272B. The elastic element 24273 is located between the first end 24272A of the driving element 24272 and the raised column 412, and abuts against the first end 24272A of the driving element 24272 and the raised column 412. The operating element 24271 includes a cam structure 24271A that is at least partially located in the accommodating slot 24272D. The cam structure 24271A may be pushed when the operating element 24271 rotates. The resetting element 24276 connects the first locking element 24274 and drives the first locking element 24274 to disengage from locking notch 24275A. When the operating element 24271 is switched from the unlocked position shown in FIG. 15E to the locking position shown in FIG. 15D, the elastic element 24273 is released to move the driving element 24272 in the first direction D1, so that the first end 24272A of the driving element 24272 drives the first locking element 24274 to engage with the corresponding locking notch 24275A in a first direction D1. In addition, when the operating element 24271 is switched from the unlocked position as shown in FIG. 15E to the locked position as shown in FIG. 15D, the cam structure 24271A only contacts with a first side wall W1 of the accommodating slot 24272D and does not contact with a second side wall W2 of the accommodating slot 24272D, that is, an avoidance space S2 is formed between the cam structure 24271A and the second side wall W2 of the accommodating slot 24272D to allow the driving element 24272 to move in a second direction D2 opposite to the first direction D1. When the first locking element 24274 engages with the corresponding locking notch 24275A, the retractor 2424 cannot be rotated. When the operating element 24271 is switched from the locking position shown in FIG. 15D to the unlocking position shown in FIG. 15E, the cam structure 24271A of the operating element 24271 pushes against the first side wall W1 of the accommodating slot 24272D to move the driving element 24272 in the second direction D2, so that the avoidance space S2 is gradually reduced until the second side wall W2 of the accommodating slot 24272D contacts with the cam structure 24271A. Therefore, the elastic element 24273 is elastically compressed, and the resetting element 24276 drives the first locking element 24274 to disengage from the corresponding locking notch 24275A in the second direction D2 to rotate the retractor 2424, that is, the pet carrier 2400 of this embodiment allows the user to operate the operating element 24271 of the locking device 2427 to lock the retractor 2424 according to actual needs, to limit the winding or extension of the binding webbing 2421, or to operate the operating element 24271 of the locking device 2427 to release the retractor 2424 to allow the binding webbing 2421 to be wound or extended. However, the structure of the locking device disclosed in the present disclosure is not limited thereto. For example, in another embodiment, the locking device may not include an elastic element and a resetting element, and the operating element is slidably provided at the bottom portion of the box body and used for sliding to drive the driving element to engage or disengage from the corresponding locking notch. Alternatively, in another embodiment, the locking device may only include a second locking element at one side of the retractor, and the second locking element includes one or more locking notches.

As shown in FIG. 15F, in this embodiment, both ends of the resetting element 24276 are respectively connected with the first locking element 24274 and the bracket 24241 of the retractor 2424, and a side of the bracket 24241 close to the second locking element 2475 is formed with sliding slots 24241A through which corresponding ends of the first locking element 24274 may slide, and the long axis direction of each sliding slots 24241A is parallel to the first direction D1. The side of the bracket 24241 is also provided with a revolving element 24242 which can rotate relative to the bracket 24241. A skewed slot 24242A is formed on the revolving element 24242, and an extending direction of the skewed slot 24242A is inclined relative to the first direction D1. When the binding webbing 2421 is pulled to rotate the revolving element 24242 in the arrow direction, through a coordination of the skewed slot 24242A, the sliding slot 24241A and the first locking element 24274, the first locking element 24274 may be moved along the first direction D1 to engage the locking notch 24275A, so that the binding webbing 2421 cannot extend.

Other structures of this embodiment are similar to those of the second embodiment, and also have similar diverse changes, which are not repeated here.

Furthermore, it can be understood that in another embodiment, the binding webbing connected with the hook may also pass through the adjuster without connecting the retractor.

Referring to FIGS. 17A to 17D again, FIG. 17A is a schematic appearance view of a pet carrier according to a sixth embodiment of the second aspect of the present disclosure, FIG. 17B is a schematic sectional view of the pet carrier according to the sixth embodiment of the second aspect of the present disclosure, and FIGS. 17C and 17D are schematic views of a stopper 2628 according to the sixth embodiment of the second aspect of the present disclosure from different view angles. As shown in FIG. 17A to FIG. 17D, the pet carrier 2600 of this embodiment includes a box body 2610 and a binding device 2620. Different from the pet carrier 2400 of the fourth embodiment, the hook 2626 of the binding device 2620 of this embodiment includes a connecting portion 26261 and a buckling portion 26262 that rotatably connects with the connecting portion 26261 to avoid winding and knotting the binding webbing 2621. That is, the hook 2626 of this embodiment is similar to the hook 2526 of the fifth embodiment, and the binding device 2620 includes a stopper 2628, but not include a locking device. The stopper 2628 is provided on the binding webbing 2621 to abut against the bottom portion 2611 of the box body 2610, to limit a winding length of the binding webbing 2621 wound by the retractor to avoid the length of the binding webbing 2621 in the accommodating space from being too short. Preferably, the length of the binding webbing 2621 in the accommodating space (that is, the length of the binding webbing 2621 exposed from the bottom portion 2611 of the box body 2610) may not exceed beyond a height of the peripheral wall 2612 of the box body 2610 protruding from the bottom portion 2611 (for example, between 30 cm and 40 cm, but not limited thereto).

Figure 18A:
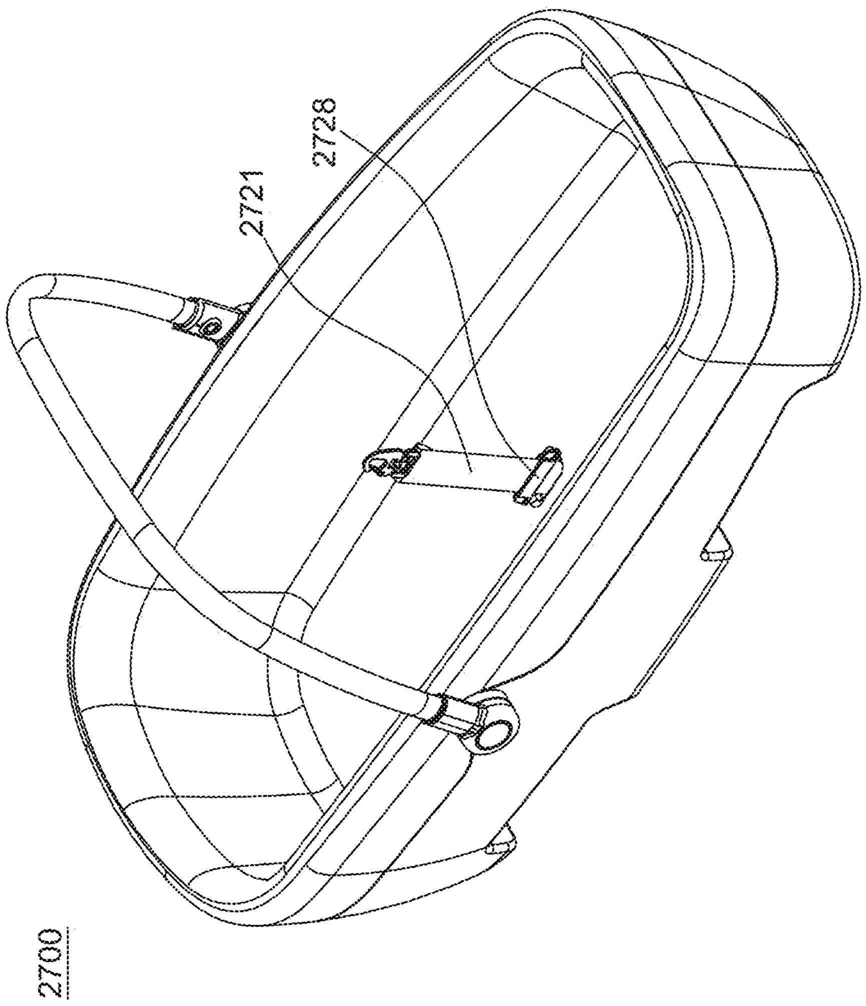
FIG. 18A is a schematic appearance view of a pet carrier according to a seventh embodiment of the second aspect of the present disclosure.
Figure 18B:
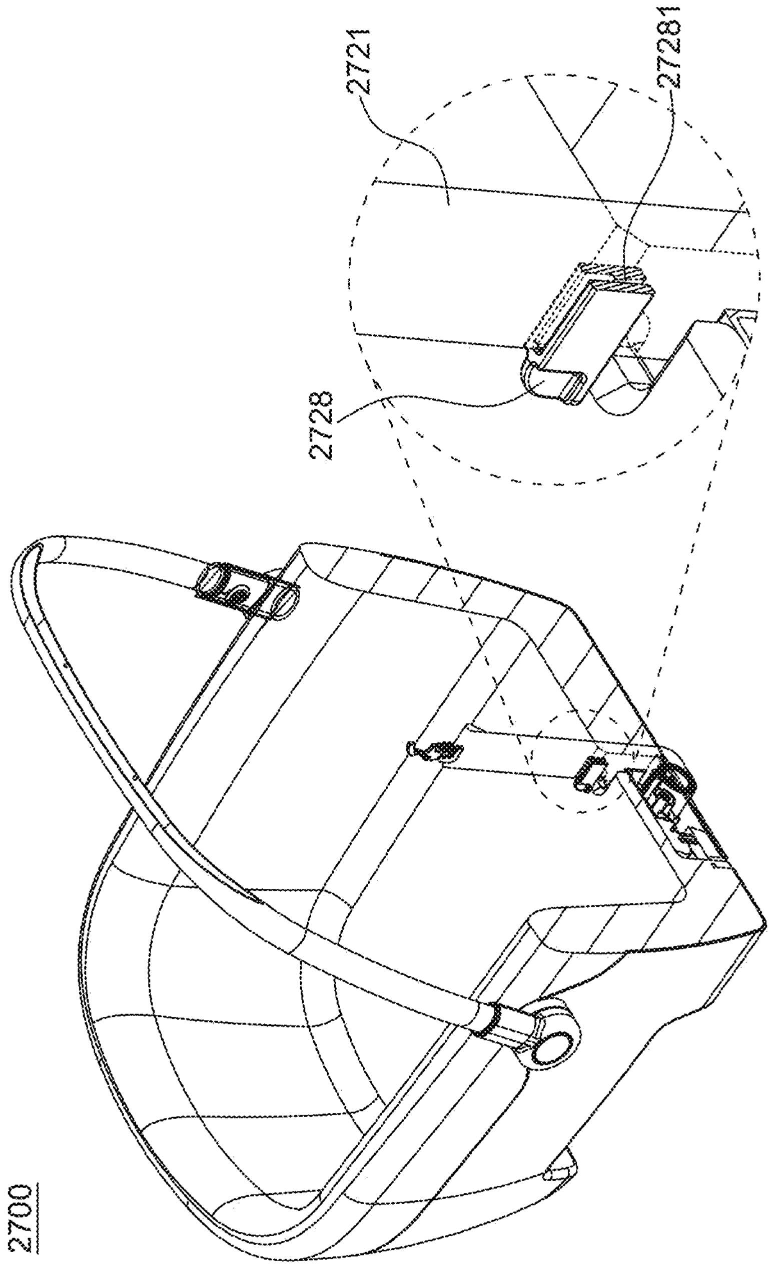
FIG. 18B is a schematic sectional view of the pet carrier according to the seventh embodiment of the second aspect of the present disclosure.
Figure 18C:
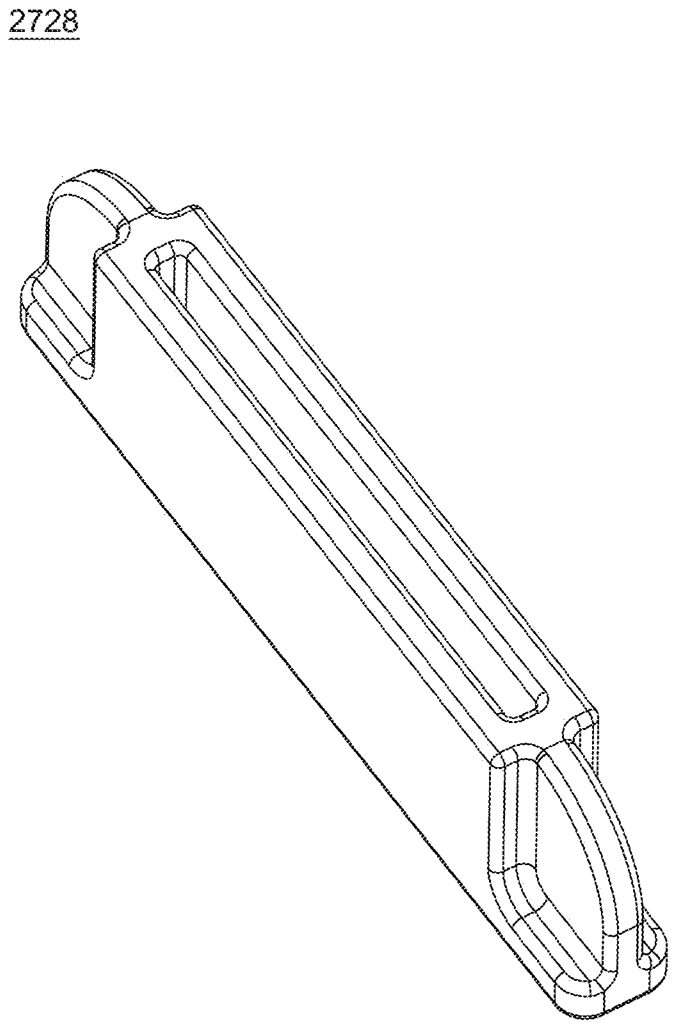
FIG. 18C and FIG. 18D are schematic views of a stopper according to the seventh embodiment of the second aspect of the present disclosure from different view angles.
Figure 18D:
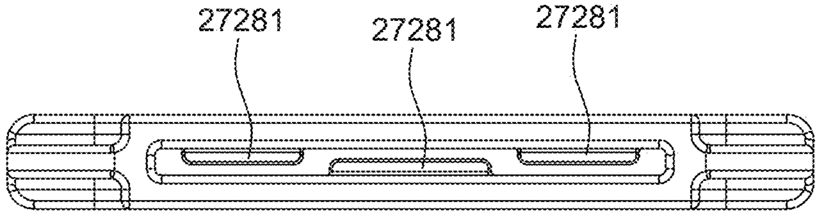
Figure 19A:
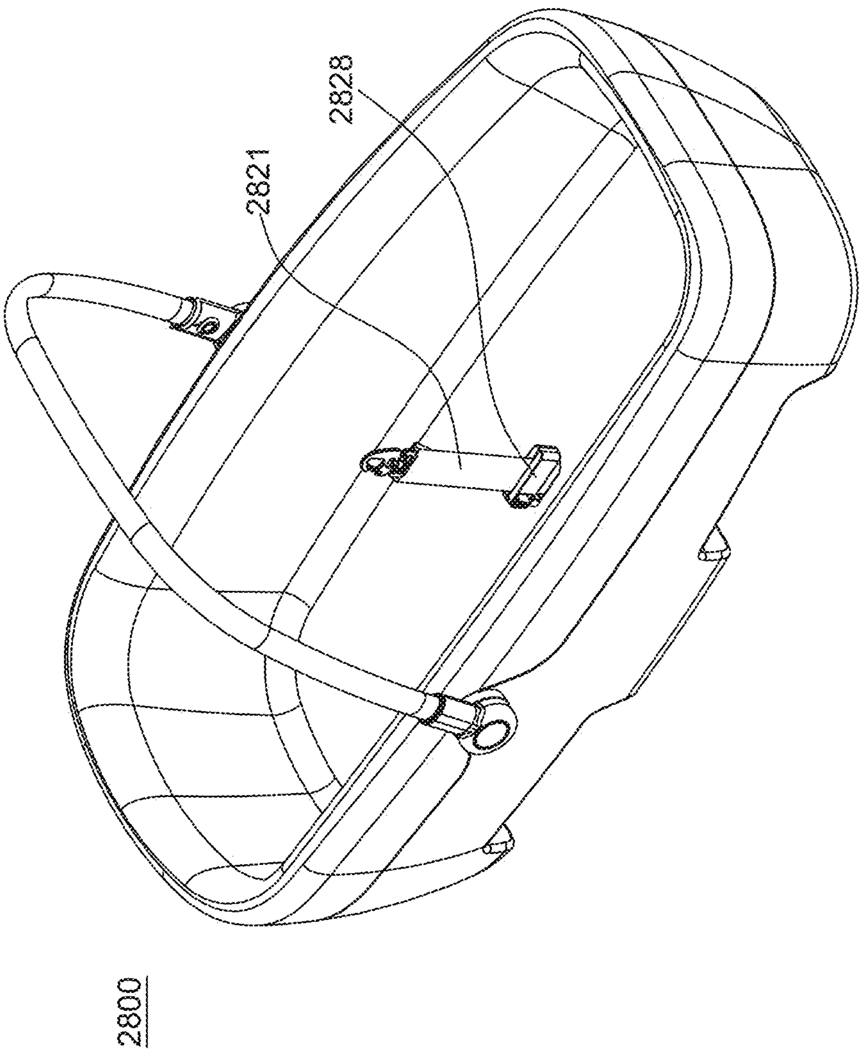
FIG. 19A is a schematic appearance view of a pet carrier according to an eighth embodiment of the second aspect of the present disclosure.
Figure 19B:
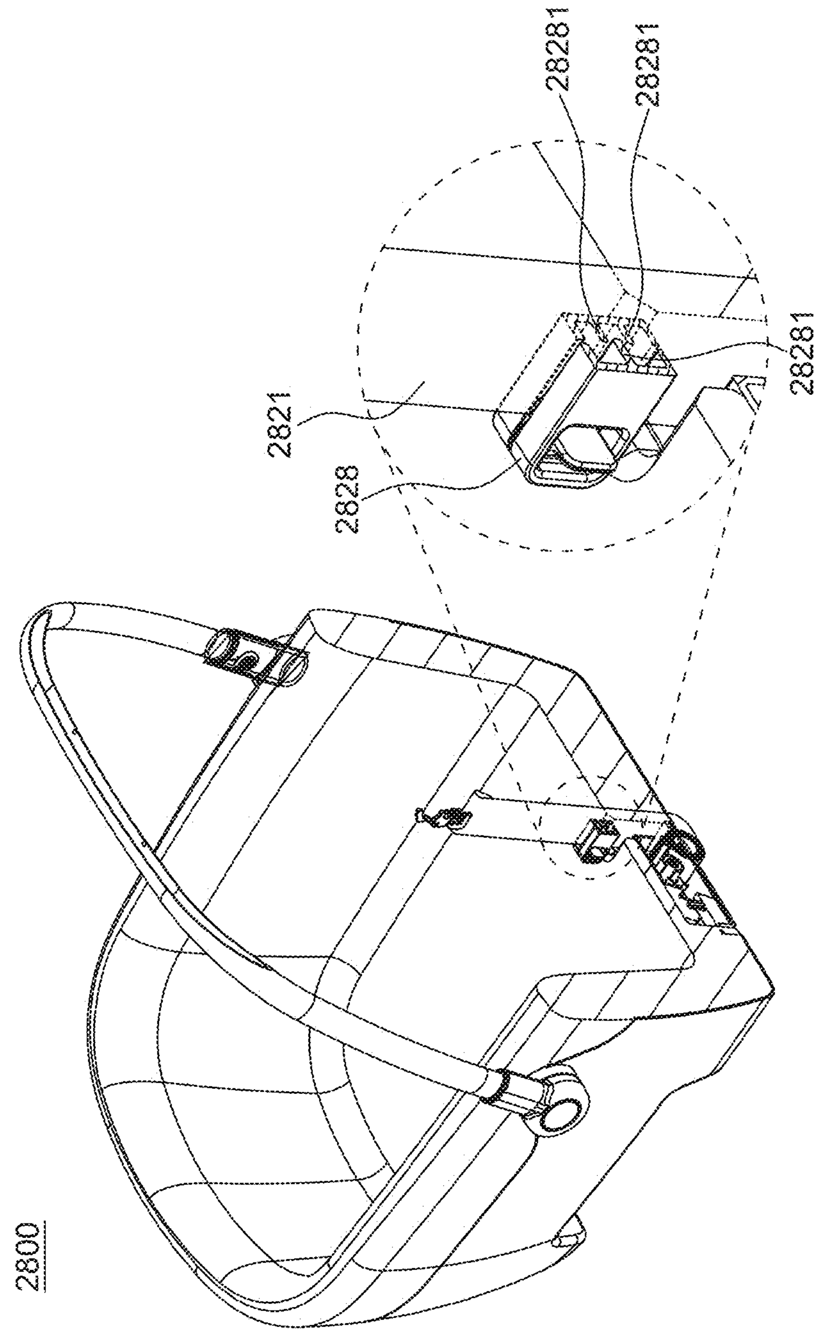
FIG. 19B is a schematic sectional view of the pet carrier according to the eighth embodiment of the second aspect of the present disclosure.
Figure 19C:
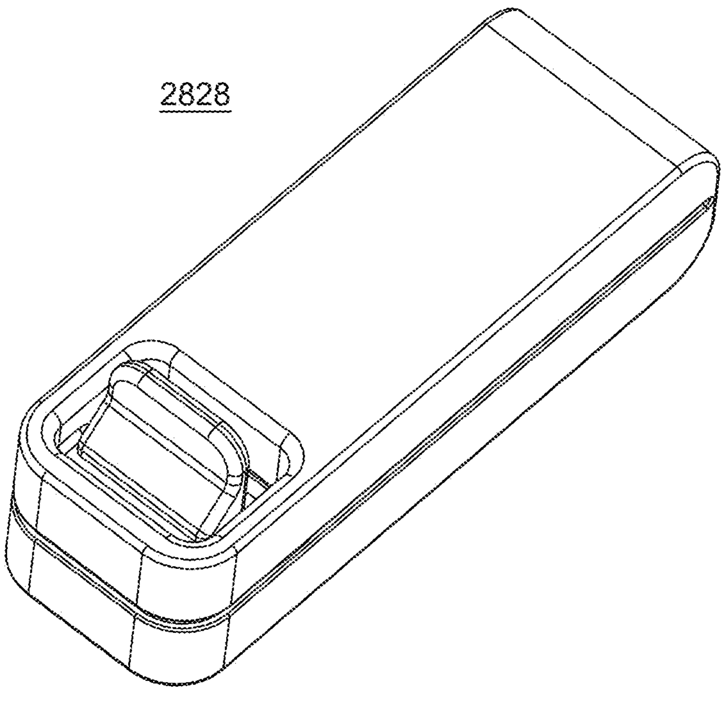
FIG. 19C is a schematic view of a stopper according to the eighth embodiment of the second aspect of the present disclosure.
Figure 19D:
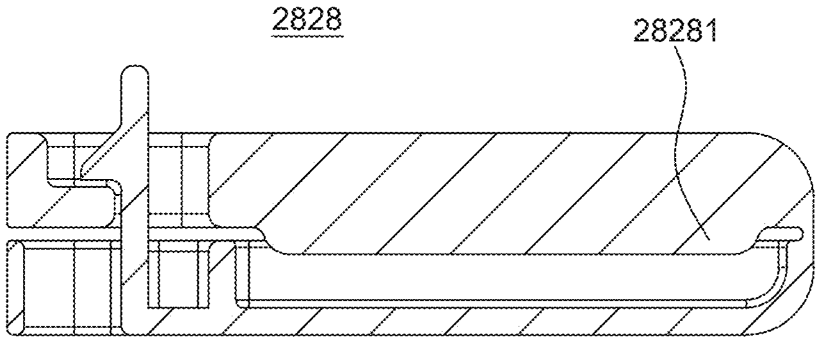
FIG. 19D is a schematic sectional view of the stopper according to the eighth embodiment of the second aspect of the present disclosure.

Specifically, the stopper 2628 may be a tri-glide webbing buckle, and a plurality of convex teeth 26281 are formed on the tri-glide webbing buckle, which may contact the binding webbing 2621 to increase a friction force of the tri-glide webbing buckle on the binding webbing 2621, so that the stopper 2628 may be positioned at any position on the binding webbing, but the structure of the stopper disclosed in the present disclosure is not limited thereto. For example, referring to FIG. 18A to FIG. 19D, FIG. 18A is a schematic appearance view of a pet carrier according to a seventh embodiment of the second aspect of the present disclosure, FIG. 18B is a schematic sectional view of the pet carrier according to the seventh embodiment of the second aspect of the present disclosure, and FIGS. 18C and 18D are schematic views of a stopper 2728 according to the sixth embodiment of the second aspect of the present disclosure from different view angles. FIG. 19A is a schematic appearance view of a pet carrier according to an eighth embodiment of the second aspect of the present disclosure, FIG. 19B is a schematic sectional view of the pet carrier according to the eighth embodiment of the second aspect of the present disclosure, FIG. 19C is a schematic view of a stopper according to the eighth embodiment of the second aspect of the present disclosure, and FIG. 19D is a schematic sectional view of the stopper according to the eighth embodiment of the second aspect of the present disclosure. As shown in FIG. 18A to FIG. 18D, unlike the stopper 2628 of the sixth embodiment, the stopper 2728 of this embodiment may be a webbing ring, and a plurality of convex teeth 27281 are formed on the webbing ring, and the plurality of convex teeth may be in contact with the binding webbing 2721 to increase the friction force exerted on the binding webbing 2721 by the webbing ring. As shown in FIG. 19A to FIG. 19D, unlike the stopper 2628 of the sixth embodiment, the stopper 2828 of this embodiment may be a webbing clip, and at least one convex tooth 28281 is formed on the webbing clip, and the convex tooth may be in contact with the binding webbing 2821 to increase the friction force acting on the binding webbing 2821 by the webbing clip.

Other structures of this embodiment are similar to those of that fourth embodiment and have similar variety, which are not repeated here.

In addition, it can be understood that in another embodiment, an elongation length of the binding webbing may also be limited by using a stop mechanism like a stopper or other mechanisms.

Compared with the prior art, the pet carrier of the second aspect of the present disclosure may be matched with the connecting element of the pet vest worn by the pet through the binding webbing penetrating the bottom opening, thereby limiting the pet in the accommodating space, so that the pet carrier of the second aspect of the present disclosure can improve the riding safety of the pet.

It should be noted that the pet carrier in the second aspect of the present disclosure may also be provided with an integrated fixing device (such as the "integrated fixing device" described in the embodiments of the first aspect of the present disclosure) to be installed on the vehicle seat, that is, it may be stably fixed to the vehicle seat directly through the integrated fixing device without matching with a separate fixing base or a base with a supporting leg.

In a third aspect of the present disclosure, there is also provided a pet travel system or an animal travel system, in particular, a pet travel system or an animal travel system for fixing a pet or an animal in a vehicle.

Specifically, the pet travel system includes a pet travel device for fixing a pet or an animal wearing a wearable item such as a chest harness or vest, and such a wearable item for a pet. The pet travel system according to the present disclosure may provide a secure support for the pet or the animal in the vehicle, to prevent the pet from being hit or injured due to sudden changes in vehicle speed.

Figure 20:
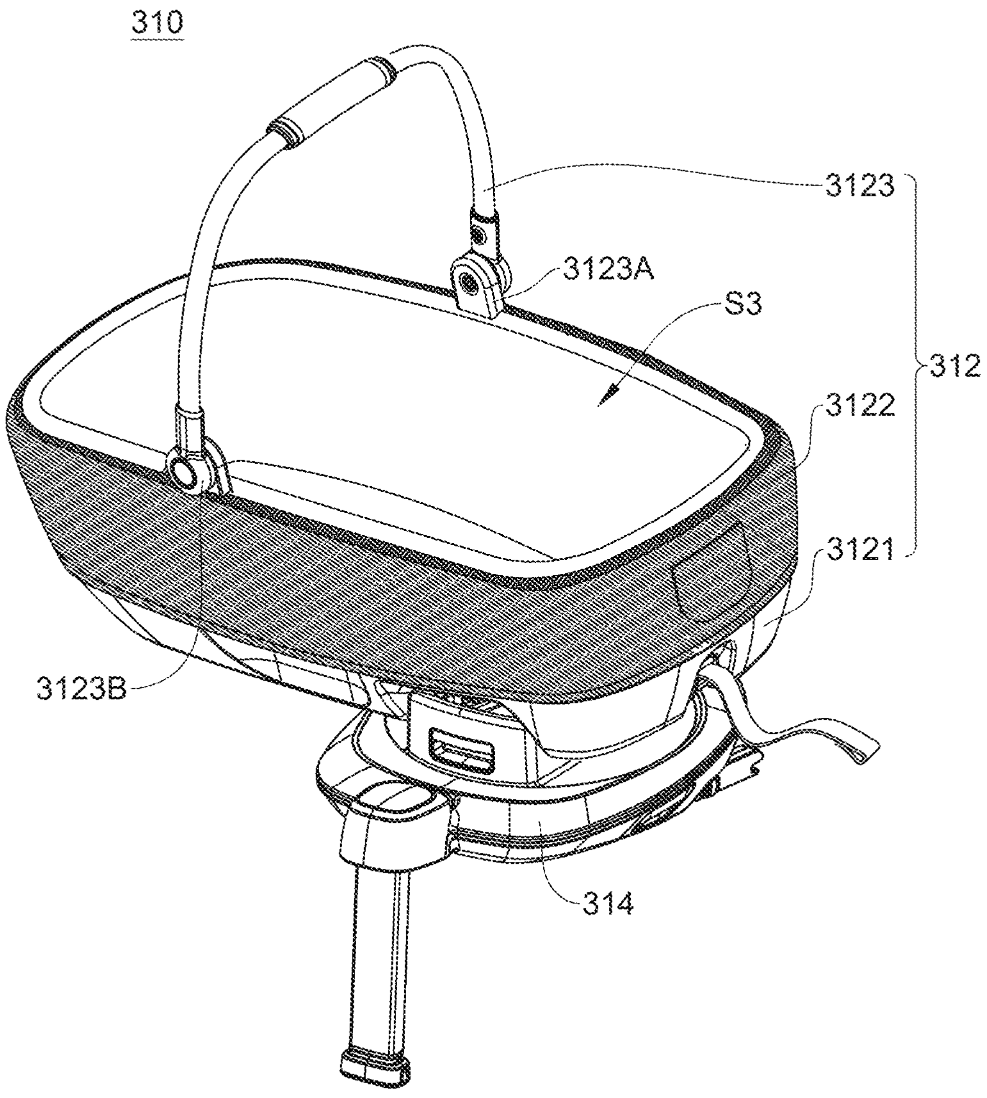
FIG. 20 is a perspective view schematically showing a pet travel device according to an embodiment of a third aspect of the present disclosure.

Referring to FIG. 20, the pet travel device 310 according to the present disclosure includes a pet carrier 312 and a base 314, and the pet carrier 312 may be installed and fixed on the base 314. The base 314 may be installed in a vehicle (not shown), and the pet carrier 312 may be mechanically installed with the base 314 through locking mechanisms (not shown) at the bottom portion of the pet carrier 312 and on the base 314, respectively. The pet carrier 312 mainly includes a seat portion 3121 and a box portion 3122 embed with the seat portion 3121 (also referred to as a "box body", similar to the "box body" in the first aspect and second aspect of the present disclosure), and may optionally include removable handles 3123 (also referred to as "carrying handles") coupled to opposite sides of the pet carrier 312 through pivots 3123A, 3123B (also referred to as an "attachment mechanism"). According to practical considerations and expectations, the seat portion 3121 is made of plastic, wood, metal or any material with a certain hardness, and has a function of being mounted to the base 314 through a locking rod (not shown). A box portion 3122 defining the accommodation space S3 for a pet may be made of a cushioning material or a foam material, such as EPP (expanded polypropylene) or EPS (expandable polystyrene), to reduce the impact on the pet accommodated in the box portion 3122 caused by the rapid change of vehicle speed. Alternatively, a height of the box portion 3122 may cover some or all of the pivots 3123A, 3123B to protect the pet's body or head from directly hitting the handle 3123.

Figure 21:
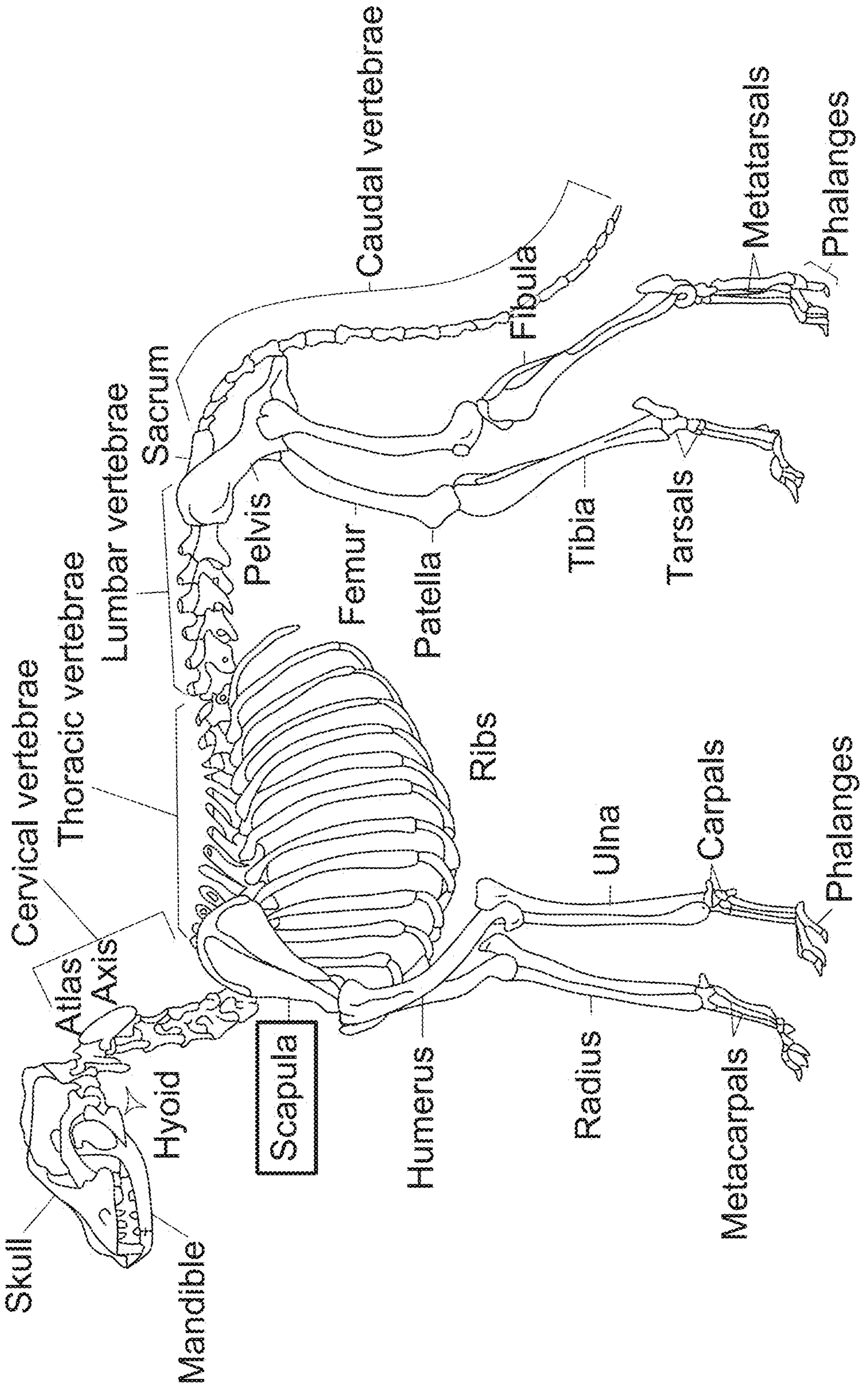
FIG. 21 schematically shows a bone structure of a dog to be fixed in a pet device according to the present disclosure.

According to the present disclosure, a pet or an animal (such as a dog) may be restrained and fixed in the box portion 3122 of the pet travel device 310 when wearing a wearable item such as a chest safety belt or a pet vest. The pet travel device 310 and the wearable item further described below are designed and constructed to provide stable and safe support for the pet by combining the pet travel device and the wearable item. More specifically, the pet travel system including the pet travel device 310 and the wearable item for the pet of the present disclosure may apply a supporting force to the body of the pet or the animal at certain positions, for example, at least at a position of the scapula, as shown in FIG. 21, to realize safe and stable support for the pet or the animal during the running of the vehicle.

Pet Carrier

Turning to FIGS. 22 to 34, these figures schematically illustrate pet travel devices, in particular pet carriers, according to various embodiments of the present disclosure. It should be noted that in these drawings, the handle of the pet carrier according to the present disclosure is omitted for the sake of clarity. Furthermore, the serial numbers of the embodiments, such as first, second, etc., are only used to distinguish these embodiments, and do not indicate any preference for these embodiments.

Figure 22:
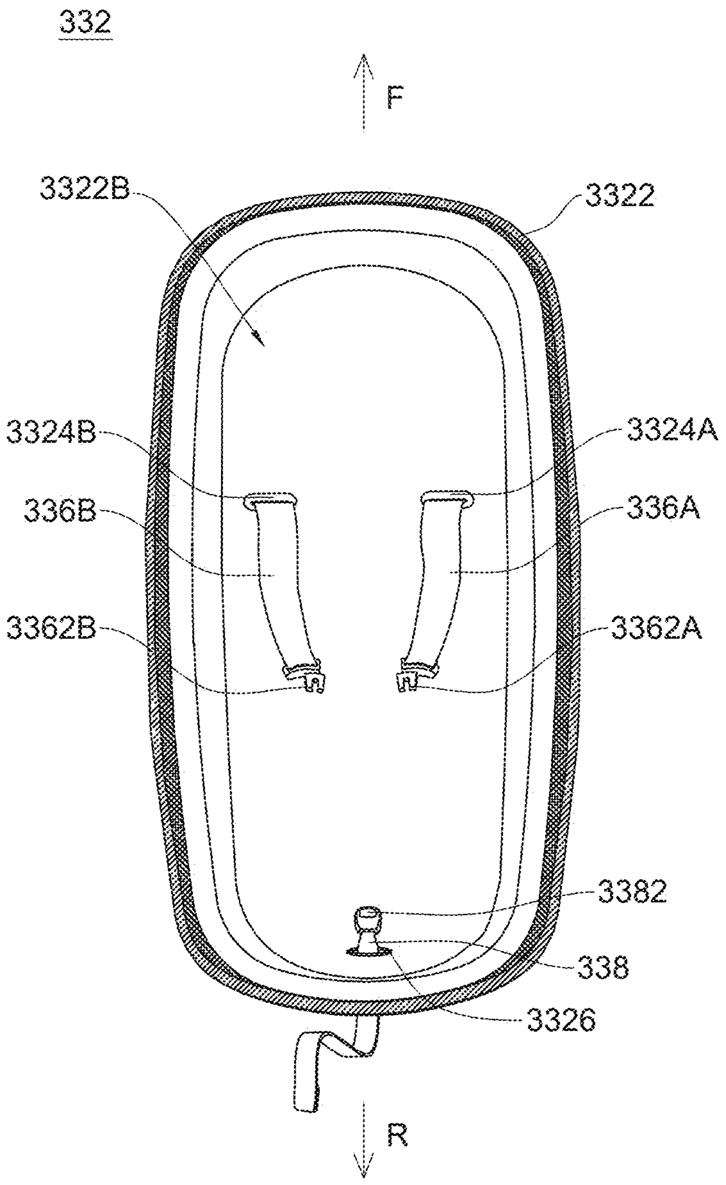
FIG. 22 schematically shows a top view of a pet carrier of a pet travel device according to a first embodiment of the third aspect of the present disclosure.

Referring to FIG. 22, a top view of a pet carrier 332 of a pet travel device according to a first embodiment of the third aspect of the present disclosure is schematically illustrated. As shown in the figure, the pet carrier 332 includes a box portion 3322 embedded with a seat portion (not shown) and a detachable handle (not shown). The box portion 3322 of the pet carrier 332 is substantially rectangular, and handle is coupled to opposite long sides of the pet carrier 332. In this embodiment, the handle is coupled to the pet carrier 332 at a position close to the front portion, in a direction indicated by an arrow F, of the pet carrier 332. For example, when the pet carrier 332 is mounted on a base (not shown) of a vehicle, the handle may be detached from the pet carrier 332.

In this embodiment, the pet carrier 332 includes two slots 3324A, 3324B (also referred to as a "bottom opening") formed on its bottom portion and penetrating through its bottom portion. More specifically, the slots 3324A, 3324B are formed and opened on the bottom portion 3322B of the box portion 3322 and penetrate through the seat portion of the pet carrier 332, so that the corresponding belts (hereinafter referred to as "shoulder belts") 336A, 336B may pass therethrough. The pet carrier 332 further includes a box belt 338, which protrudes from the slot 3326, is fixed on the bottom portion 3322B of the box portion 3322 and is located at a position near the rear portion (a direction indicated by an arrow R) of the pet carrier 332. In this embodiment, two shoulder belts 336A, 336B may be connected to the box belt 338 to restrain a pet or an animal in the box portion 3322. As shown in FIG. 22, the shoulder belts 336A, 336B include corresponding tongue elements 3362A, 3362B connected to the shoulder belts 336A, 336B at ends of the shoulder belts 336A, 336B, and the box belt 338 includes a buckle clip 3382 at its ends, so that the tongue elements 3362*a*, 3362B may be inserted into or clipped into the buckle clip 3382 to achieve buckling. Alternatively, the shoulder belts 336A, 336B may be latched to the box belt 338 by various buckling devices 3382, which include but not limited to a buckle clip, a cam lock, a fastener, a lock catch, a hasp, a snap lock and the like.

Figure 23:
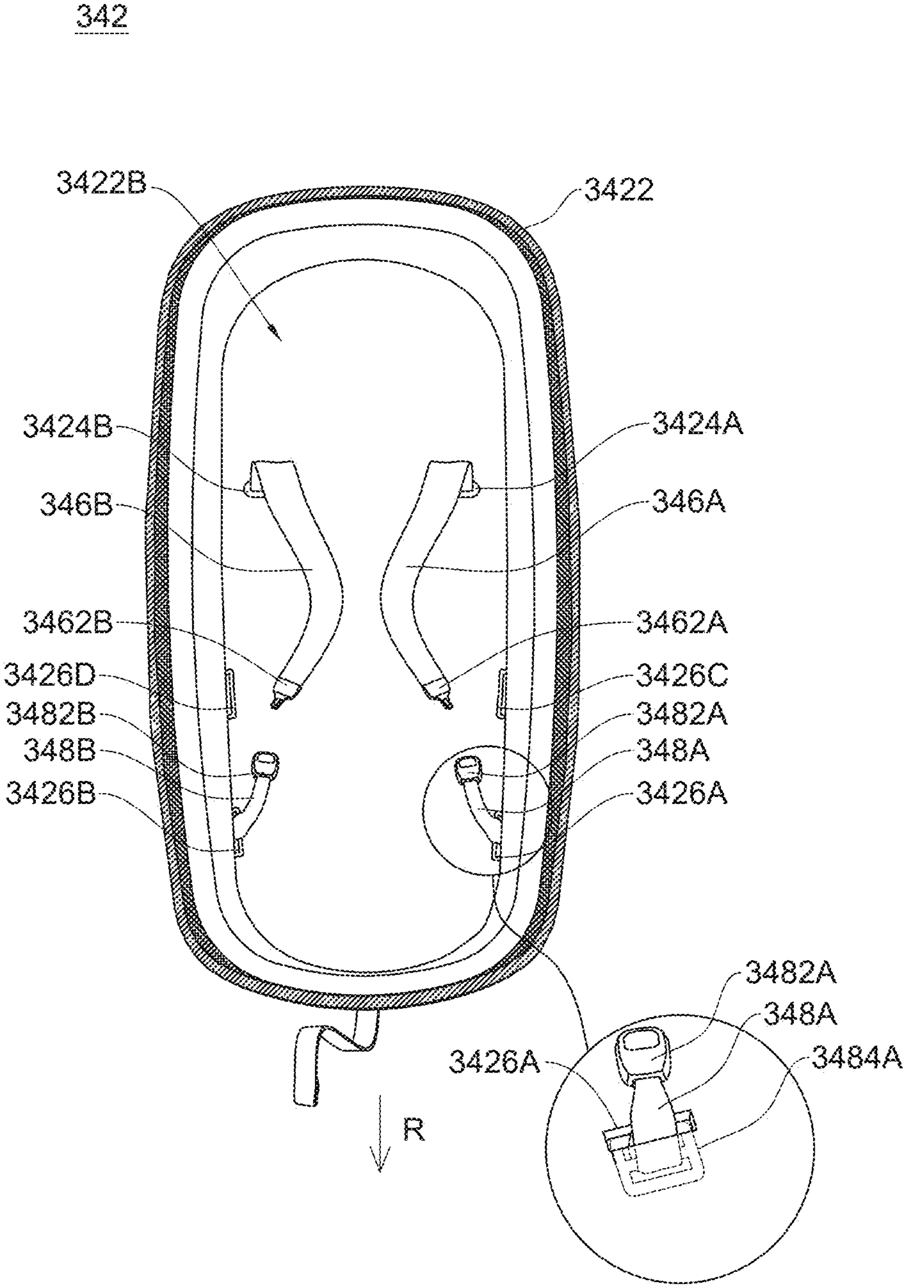
FIG. 23 schematically shows a top view of a pet carrier of a pet travel device according to a second embodiment of the third aspect of the present disclosure.

Referring to FIG. 23, a top view of a pet carrier 342 of a pet travel device according to a second embodiment of the third aspect of the present disclosure is schematically illustrated. The pet carrier 342 shown in the figure has a structure and construction similar to that of the pet carrier 332, and includes a box portion 3422, slots 3424A, 3424B formed on the bottom portion 3422B of the box portion 3422 of the pet carrier 342, shoulder belts 346A, 346B, and buckling devices such as tongue elements 3462A, 3462B corresponding to the shoulder belts 346A, 346B.

The pet carrier 342 is different from the pet carrier 332 in FIG. 22 in that, in this embodiment, the pet carrier 342 includes two box belts 348A, 348B that are constructed on opposite long sides of the box portion 3422 and located at a corresponding position near the rear portion (a direction indicated by an arrow R) of the pet carrier 342. More specifically, the pet carrier 342 includes slots 3426A, 3426B in pair (and optionally, slots 3426C, 3416D in pair), each of which is formed on a corresponding one of the opposite long sides of the box portion 3422 at a position near the rear portion. As shown in FIG. 23, the slots 3426A, 3426B in pair and the slots 3426C, 3426D in pair are formed on the corresponding long sides of the box portion 3422 and are spaced apart by a certain distance. The box belts 348A, 348B in pair may be arranged to optionally protrude from the slots 3426A, 3426B or from the slots 3426C, 3416D, depending on a size of the pet to be accommodated in the box portion 3422. In this embodiment, the slots 3426A, 3426B in pair and the slots 3426C, 346D in pair are both formed to penetrate the bottom portion 3422B of the box portion 3422 and the bottom portion of the seat portion (not shown), so that the box belts 348A and 348B in pair may protrude from the back (i.e., from the seat portion) of the pet carrier 342 and be exposed in the box portion 3422. When the box belts 348A, 348B are adaptively extended from the slots 3426A, 3426B in pair or from the slots 3426C, 3416D in pair, they may be held in place by the corresponding fixing members, such as fixing members 3484A.

Similarly, the shoulder belts 346A, 346B may be latched to the corresponding box belts 348A, 348B by various buckling devices 3482A, 3482B, including but not limited to a buckle clip, a cam lock, a fastener, a lock buckle, a snap, a snap lock and the like.

Figure 24:
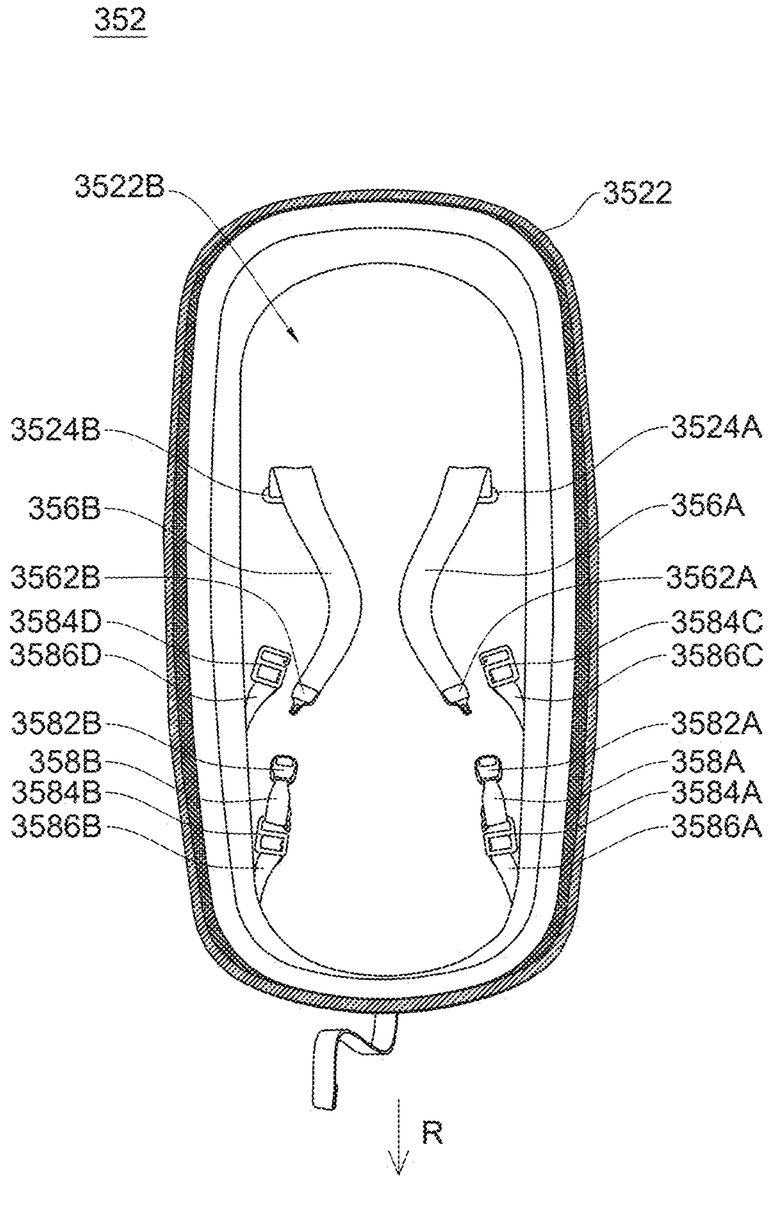
FIG. 24 schematically shows a top view of a pet carrier of a pet travel device according to a third embodiment of the third aspect of the present disclosure.

Referring to FIG. 24, a top view of a pet carrier 352 of a pet travel device according to a third embodiment of the third aspect of the present disclosure is schematically illustrated. The pet carrier 352 shown in the figure has a structure and construction similar to that of the pet carrier 342, and includes a box portion 3522, slots 3524A, 3524B formed on the bottom portion 3522B of the box portion 3522 of the pet carrier 352, shoulder belts 356A, 356B, and buckling devices such as tongue elements 3562A, 3562B of the corresponding shoulder belts 356A, 356B.

The pet carrier 352 is different from the pet carrier 342 of FIG. 23 in that in this embodiment, the box belts 358A, 358B are connected to corresponding adjusting belts 3586A, 3586B, or alternatively, to the corresponding adjusting belts 3586C, 3586D, to be fixed to the box portion 3522. More specifically, the adjusting belts 3586A and 3586B in pair (and optionally adjusting belts 3586C, 3586D in pair) are fixed to the bottom portion 3522B of the box portion 3522 at a position close to the rear portion (a direction indicated by an arrow R) of the pet carrier 352. As shown in FIG. 24, the paired adjusting belts 3586A, 3586B and the paired adjusting belts 3586C, 3586D are fixed on the corresponding long sides of the box portion 3522 and are spaced apart by a certain distance. A free end of each of the adjusting belts 3586A, 3586B, 3586C and 3586D is connected with ladder lock 3584A, 3584B, 3584C and 3584D, and connected to corresponding box belts 358A, 358B, and further connected to corresponding shoulder belts 356A, 356B. In other words, the shoulder belts 356A, 356B may be latched to the box belts 358A, 358B, which are optionally connected to the shoulder belts 3586A, 3586B or to the shoulder belts 3586C, 3586D, depending on the size of the pet to be accommodated in the box portion 3522.

Similarly, the shoulder belts 356A, 356B may be latched to the corresponding box belts 358A, 358B by various buckling devices 3582A, 3582B, including but not limited to buckle clips, cam locks, fasteners, lock buckles, snaps and snap locks.

Figure 25:
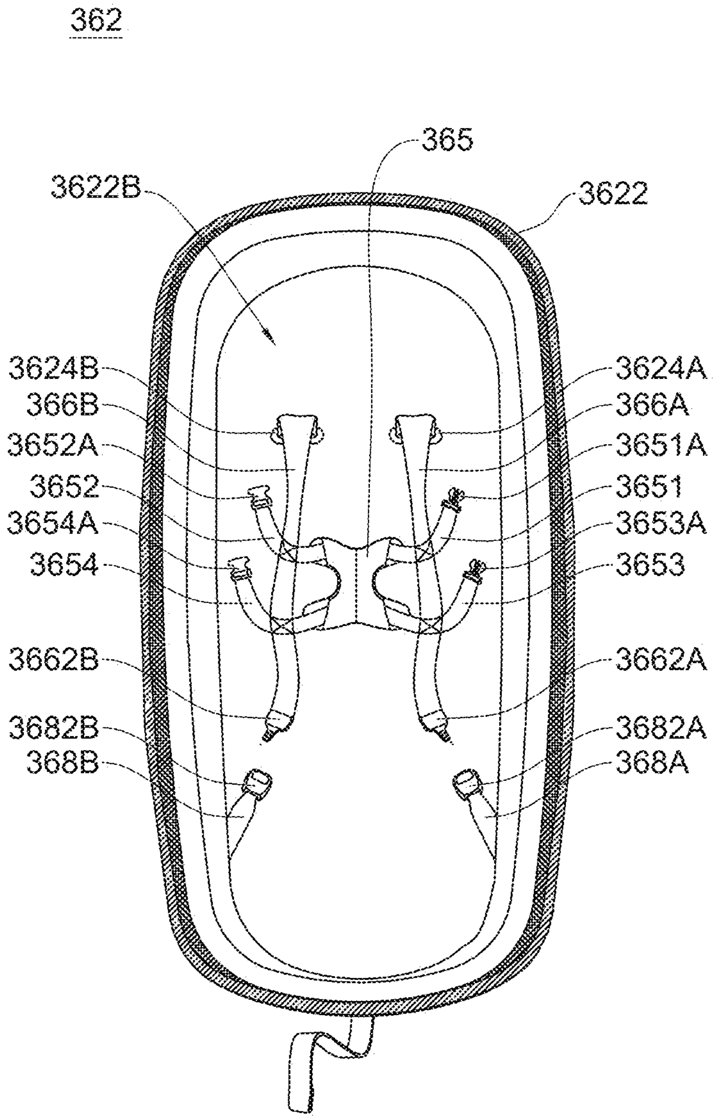
FIG. 25 schematically shows a top view of a pet carrier of a pet travel device according to a fourth embodiment of the third aspect of the present disclosure.

Referring to FIG. 25, a top view of a pet carrier 362 of a pet travel device according to a fourth embodiment of the third aspect of the present disclosure is schematically illustrated. The pet carrier 362 shown in the figure has a structure and construction similar to that of the pet carrier 352, including a box portion 3622, slots 3624A and 3624B formed on the bottom portion 3622B of the box portion 3622B of the pet carrier 362, and buckling devices such as tongue elements 3662A, 3662B of corresponding shoulder belts 366A, 366B. In addition, the design and construction (e.g., slots, adjusting buckles and adjusting belts with ladder locks) of the box belts as shown in FIG. 23 or FIG. 24 are applicable to the box belts 368A, 368B of this embodiment.

The pet carrier 362 is different from the pet carrier 352 of FIG. 24 in that in this embodiment, shoulder belts 366A, 366B are combined with a pet harness 365 (or a vest) for wearing on a pet or an animal. More specifically, the pet harness 365 includes, for example, four straps 3651 to 3654 protruding from a center of the pet harness 365. As shown in FIG. 25, in this embodiment, free ends of shoulder straps 3651, 3652 in pair are connected to a male buckle 3651A and a female buckle 3652A, respectively, so that the shoulder straps 3651, 3652 in pair may be buckled to surround a body of the pet or animal. Similarly, free ends of the back straps 3653, 3654 in pair are connected to the corresponding male buckle 3653A and female buckle 3654A, so that the paired back straps 3653, 3654 may be buckled to enclose the body of the pet or animal around the chest or belly. The straps 3651, 3653 are anchored to the shoulder belt 366A at determined positions of the straps 3651, 3653, such as centers of the straps 3651 and 3653, respectively. Similarly, the straps 3652, 3654 are anchored to the shoulder belt 366B at determined positions of the straps 3652, 3654, such as centers of the straps 3652, 3654, respectively. In this way, when the tongue elements 3662A, 3662B are inserted or engaged into the corresponding buckle clip 3682A, 3682B for fastening, the pet carrier 362 is allowed to provide relatively more stable and safe support for the pet.

It should be noted that when the pet confined in the pet carrier is unwilling or resistant to wearing the wearable item, or when the pet owner is unwilling to let his pet wear the wearable item, the pet carrier 362 with the wearable item integrated with the belts 366A, 366B may be used to carry the pet. By integrating wearable items such as the vest or the harness with the belts of the pet carrier, the discomfort and tension of the pet can be reduced.

Similarly, the shoulder belts 366A, 366B may be latched to the corresponding box belts 368A, 368B by various buckling devices, including but not limited to buckle clips, cam locks, fasteners, lock buckles, snaps, snap locks, and the like.

Figure 26A:
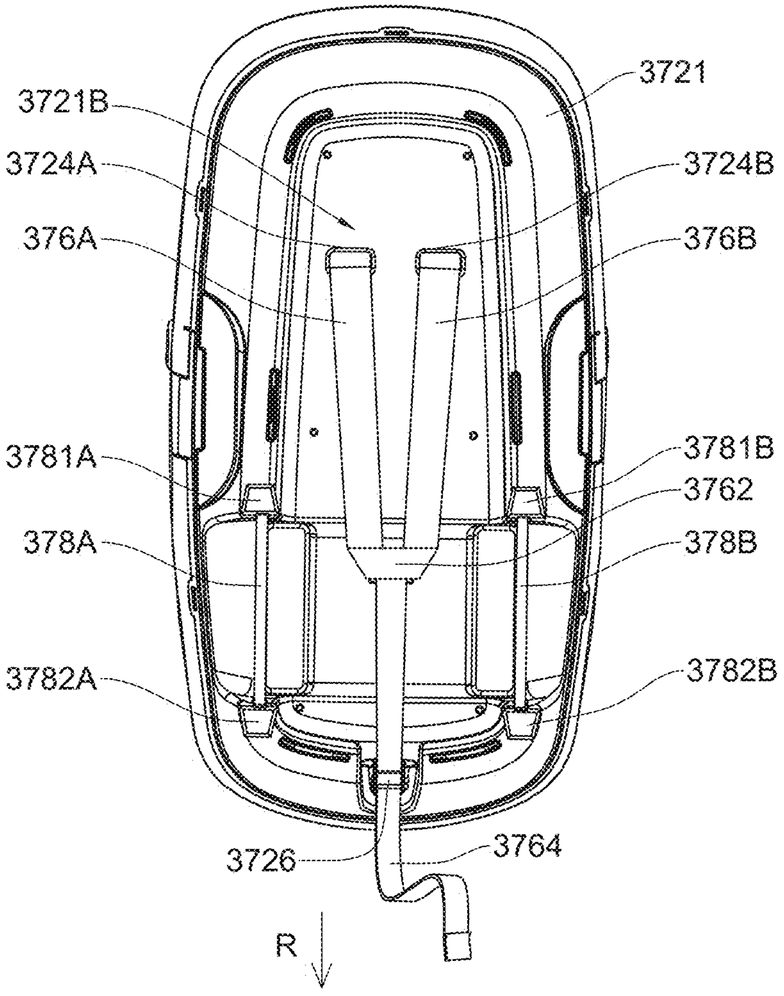
FIG. 26A schematically shows a bottom view of a pet carrier, especially a seat portion of the pet carrier, according to the first embodiment, the second embodiment, the third embodiment and the fourth embodiment of the third aspect of the present disclosure.
Figure 26B:
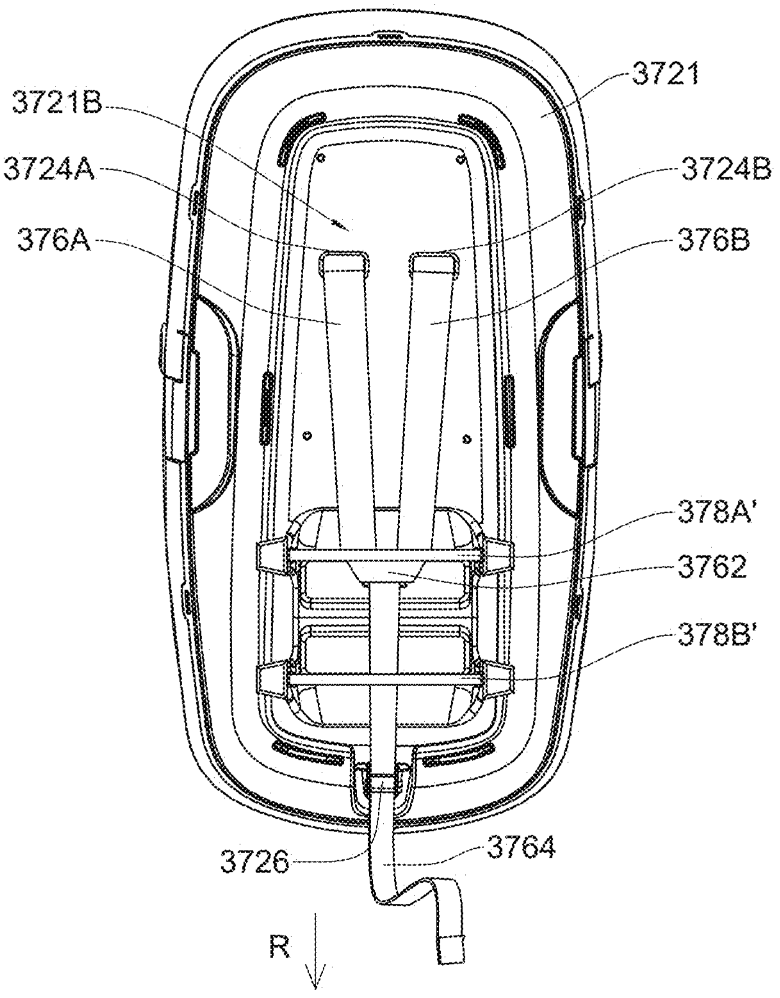
FIG. 26B schematically shows a bottom view of another pet carrier, especially a seat portion of the pet carrier, according to the first embodiment, the second embodiment, the third embodiment and the fourth embodiment of the third aspect of the present disclosure.

FIGS. 26A and 26B schematically show bottom views of pet carriers according to the first embodiment, the second embodiment, the third embodiment and the fourth embodiment of the third aspect of the present disclosure, especially a seat portion of the pet carriers (for example, pet carriers 332, 342, 352 and 362). More specifically, the seat portion 3721 shown in FIGS. 26A and 26B is adapted to the box portion 3322, 3422, 3522 or 3622, that is to say, the box portions 3322, 3422, 3522 and 3622 may be embedded in the seat portion 3721 of FIGS. 26A and 26B.

Figure 34:
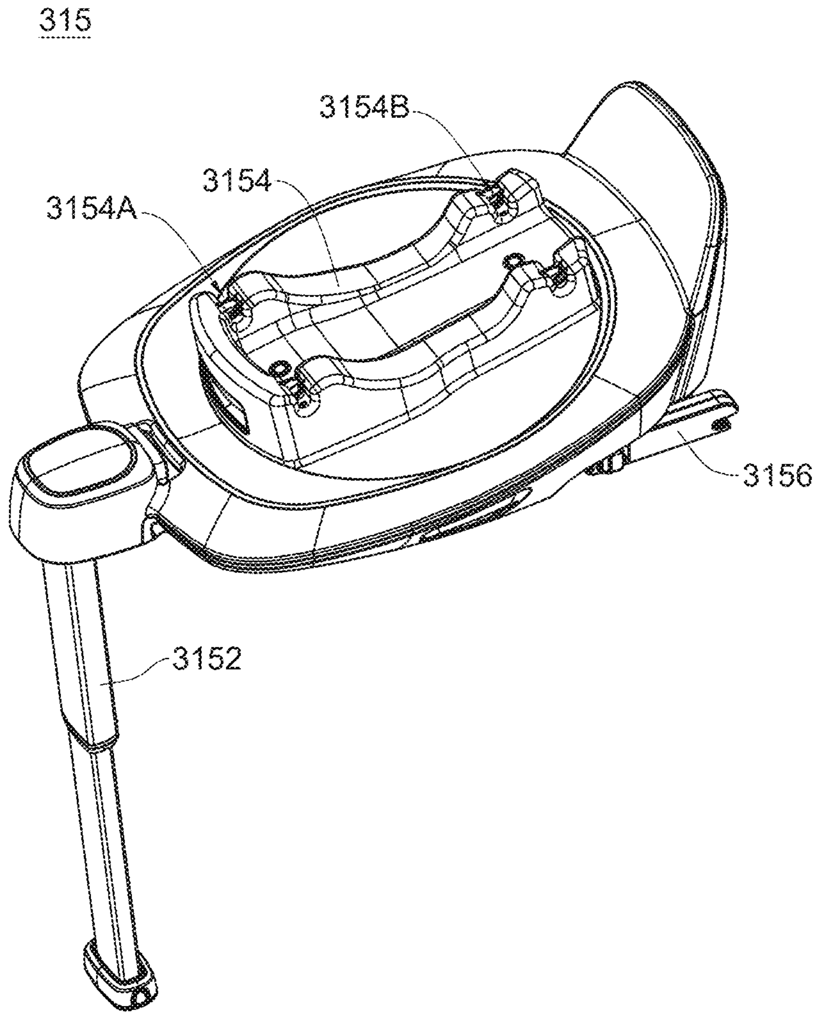
FIG. 34 schematically shows a perspective view of a base of a pet travel device according to an embodiment of the third aspect of the present disclosure.

The seat portion 3721 may be coupled to a base installed in a vehicle (not shown) by engaging two locking rods 378A, 378B on the bottom portion 3721B with a seat mounting portion of the base, for example, a seat mounting portion 3154 shown in FIG. 34. In this embodiment, two locking rods 378A, 378B are arranged in parallel at the long side of the seat portion 3721, and through the two locking rods 378A, 378B, the pet carrier may be coupled to the base in a transverse direction of the base (i.e., the direction indicated by an arrow R), parallel to the rear seat of the vehicle.

As shown in FIG. 26A, the seat portion 3721 includes two slots 3724A, 3724B, which penetrate through the bottom portion 3721B of the seat portion 3721 and the bottom portion of the box body portion (not shown). Two belts 376A, 376B (hereinafter referred to as "back belts") may pass through the corresponding slots 3724A, 3724B to protrude from slots (e.g., slots 3324A, 3324B, 3424A, 3424B, 3524A, 3524B and 3624A, 3624B) formed at the bottom portion of the box body. Two back belts 376A, 376B are anchored to a connecting portion 3762, and a fixing strap 3764 is connected to the connecting portion 3762. The connecting portion 3762 may be a separate connector, such as a T-shaped connecting element or a clamp, or may be formed by sewing two back belts 376A, 376B. The seat portion 3721 is located at a position near the rear portion of the pet carrier in the direction indicated by the arrow R, and a positioning buckle 3726 (also called a "fixing mechanism") is provided at the center of the short side of the seat portion 3721. The fixing strap 3764 passing through the positioning buckle 3726 may be fixed at a certain position, so that the length of the fixing strap 3764 is fixed after adjustment. In other words, by positioning the positioning buckle 3726, the tightness of the fixing strap 3764 and the back belts 376A, 376B may be adjusted to suit the pet or animal that may be fixed in the box body by the shoulder belts as described above.

In this embodiment, the bottom portion 3721B of the seat portion 3721 is provided with fixing blocks 3781A, 3782A, 3781*a* and 3782B at both ends of each of the locking rods 378A, 378B. More specifically, the fixing blocks 3781A, 3782A are located at both ends of the locking rod 378A, while the fixing blocks 3781B, 3782B are located at both ends of the locking rod 378B. When the locking rods 378A, 378B are attached to corresponding restraint portions of the seat mounting portion, for example, the corresponding restraint portions 3154A, 3154B of the seat mounting portion 3154 shown in FIG. 34, the locking rods 378A, 378B may be restricted from moving as they are blocked by the fixing blocks 3781A, 3782A and the fixing blocks 3781B, 3782B provided at both ends. In addition, by providing the fixing blocks 3781A, 3782A and the fixing blocks 3781B, 3782B at both ends, the fixing strength and stability of the locking rods 378A, 378B attached to the seat portion 3721 can be enhanced. In this embodiment, the fixing blocks 3781A, 3782A, 3781B and 3782B may be integrally formed with the seat portion 3721 of the pet carrier. Alternatively, the fixing block may be a separate structure that is appropriately attached to the seat portion of the pet carrier.

According to the present disclosure, the positioning buckle 3726 may allow a user (owner of a pet) to adjust the tightness of the back belt, and thus adjust the tightness of the shoulder belt and fixing the length of the fixing strap in a simple manner. To this end, the positioning buckle 3726 may include, but not limited to, a so-called "A-lock", a buckle or lock clip, a pulley lock, and the like. In this embodiment, the positioning buckle 3726 may be an "A-lock", which is known to those skilled in the art and is commonly used in existing safety seats.

Alternatively, the pet carriers (e.g., the pet carriers 332, 342, 352 and 362) may be combined with a base (not shown) installed in the vehicle through locking rods 378A', 378B' arranged in a direction transverse to the long side of the seat portion 3721, as shown in FIG. 26B. In other words, through the two locking rods 378A', 378B', the pet carrier may be combined with the base in a direction parallel to the base (i.e., in a direction transverse to the rear seat of the vehicle as indicated by the arrow R). In this embodiment, the fixing strap 3764 may be stored in a space between the bottom portion 3721B of the seat portion 3721 and the locking rods 378A', 378B' in pair to avoid swinging.

It should be noted that for a pet carrier, such as the pet carrier 342 shown in FIG. 23, having at least one pair of slots for the box belt, the slots in pair may be formed as penetrating through the bottom portion of the box portion (not shown) and the bottom portion 3721B of the seat portion

3721, respectively, so that the paired box belts, such as the box belts 348A, 348B, may protrude from the paired slots to be exposed in the box portion.

Figure 27:
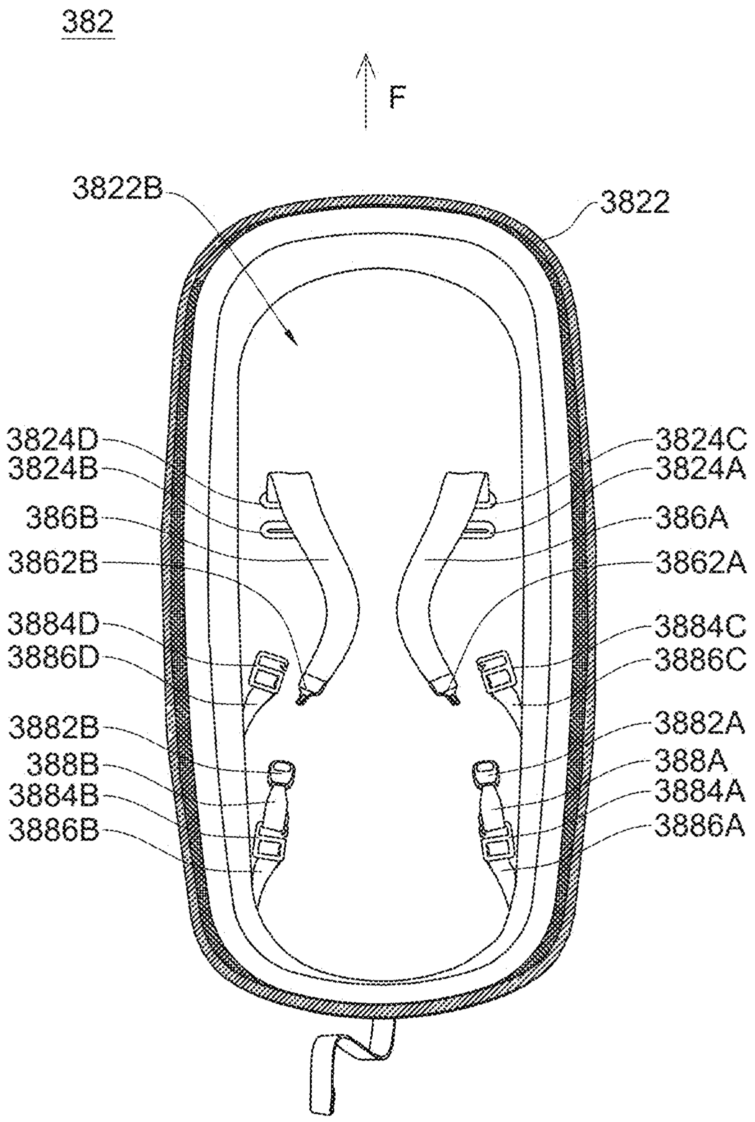
FIG. 27 schematically shows a top view of a pet carrier of a pet travel device according to a fifth embodiment of the third aspect of the present disclosure.

Referring to FIG. 27, a top view of a pet carrier 382 of a pet travel device according to a fifth embodiment of the third aspect of the present disclosure is schematically illustrated. The pet carrier 382 shown in the figure has a structure and construction similar to that of the pet carrier 352, including a box portion 3822, shoulder belts 386A, 386B, box belts 388A, 388B, adjustment belts 3886A to 3886D with corresponding ladder locks 3884A to 3884D connected to their free ends, and buckling devices such as tongue elements 3862A, 3862B and buckling devices such as buckle clips 3882A, 3882B corresponding to the shoulder belts 386A, 386B.

The pet carrier 382 is different from the pet carrier 352 of FIG. 24 in that in this embodiment, four slots 3824A to 3822*d* are formed on the bottom portion 3822B of the box portion 3822. The slots 3824C, 3824C in pair are formed at positions closer to the front portion (a direction indicated by the arrow F) of the pet carrier 382 than the slots 3824A, 3824B in pair. Two pairs of slots 3824A, 3824B and slots 3824C, 3824D are capable of adjusting the shoulder belts 386A, 386B to accommodate pets of different sizes. More specifically, when a size of a pet is relatively small, the shoulder belts 386A, 386B may selectively protrude from the slots 3824A, 3824B to be latched to the box belts 388A, 388B connected with the adjusting belts 3886C, 3886D. When the pet is relatively large, the shoulder belts 386A, 386B may protrude from the slots 3824C, 3824D to be latched to the box belts 388A, 388B connected with the adjusting belts 3886A, 3886B.

Similarly, the shoulder belts 386A, 386B may be latched to the corresponding box belts 388A, 388B by various buckling devices, including but not limited to buckle clips 3882A, 3882B, cam locks, fasteners, lock buckles, snaps, snap locks and the like.

Figure 28:
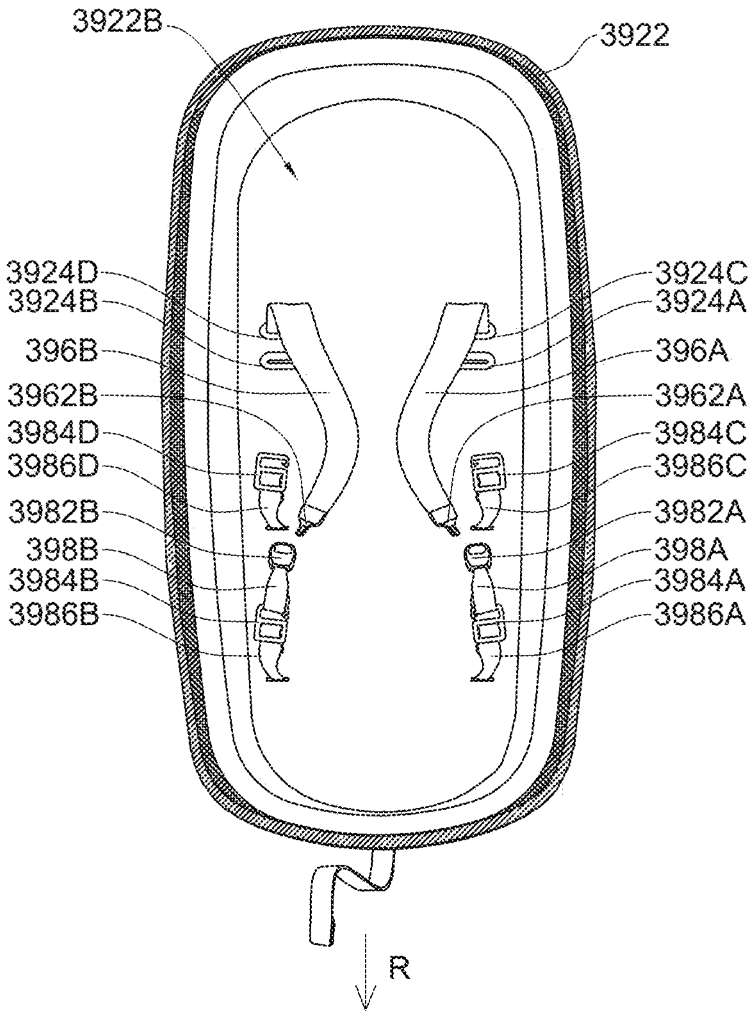
FIG. 28 schematically shows a top view of a pet carrier of a pet travel device according to a sixth embodiment of the third aspect of the present disclosure.

Referring to FIG. 28, a top view of a pet carrier 392 of a pet travel device according to a sixth embodiment of the third aspect of the present disclosure is schematically illustrated. The pet carrier 392 shown in the figure has a structure and configuration similar to that of the pet carrier 382, including a box portion 3922, shoulder belts 396A, 396B, slots 3924A to 3922D formed on the bottom portion 3922B of the box portion 3922B, buckling devices such as tongue elements 3962A, 3962B corresponding to the shoulder belts 396A, 396B, box belts 98A, 98B, and buckling devices such as buckle clips 3982A, 3982B.

The pet carrier 392 is different from the pet carrier 382 of FIG. 27 in that, in this embodiment, the adjusting belts 3986A to 3986D are provided on the bottom portion 3922B of the box portion 3922, rather than on opposite long sides of the box portion. As shown in FIG. 28, the adjusting belts 3986A, 3986B in pair are formed on the bottom portion 3922B of the box portion 3922, located at a position closer to the rear portion (the direction indicated by the arrow R) of the pet carrier 392 than the paired adjusting belts 3986C, 3986D. In this embodiment, a spacing between the paired adjusting belts 3986A, 3986B (or 3986C, 3986D) can be reduced. Compared with the above-mentioned pet carrier 382, the pet carrier 392 is more suitable for fixing pets with relatively thin bodies.

Similarly, the shoulder belts 396A, 396B may be latched to the corresponding box belts 98A, 98B by various buckling devices, including but not limited to buckle clips 3982A, 3982B, cam locks, fasteners, lock buckles, snaps, snap locks, and the like.

Figure 29:
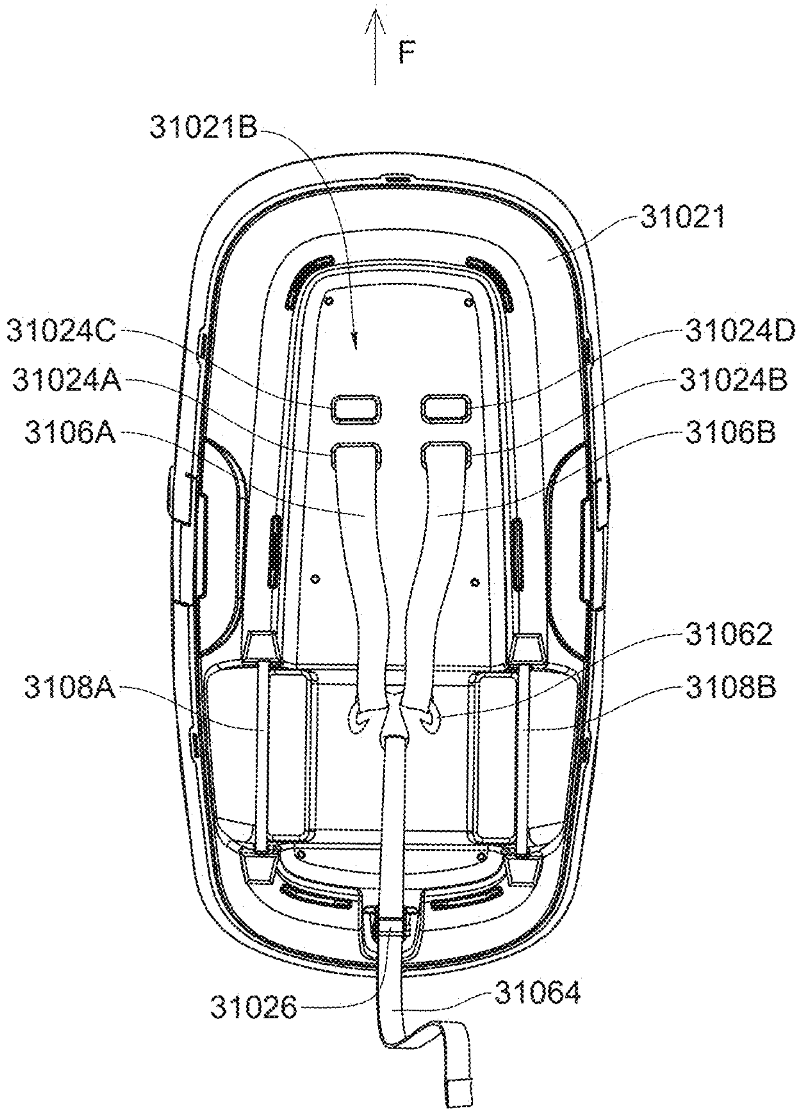
FIG. 29 schematically shows a bottom view of the pet carrier according to the fifth embodiment and the sixth embodiment of the third aspect of the present disclosure.

FIG. 29 schematically shows a bottom view of the pet carrier (for example, the pet carrier 382 or 392) according to the fifth embodiment and the sixth embodiment of the third aspect of the present disclosure. More specifically, the seat portion 31021 shown in FIG. 29 is adapted to the box portion 3822 or 3922, that is to say, the box portion 3822 or 3922 may be embedded in the seat portion 31021 of FIG. 29.

The seat portion 31021 may be combined to a base (not shown) installed in a vehicle through an engagement of two locking rods 3108A, 3108B provided on the bottom portion 31021B with a seat mounting portion of the base.

As shown in FIG. 29, the seat portion 31021 has a similar structure and configuration to the seat portion 3721 of FIGS. 26A and 26B, including back belts 3106A, 3106B, a fixing strap 31064 and a positioning buckle 31026. The seat portion 31021 shown in the figure is different from the seat portion 3721 shown in FIGS. 26A and 26B in that, in this embodiment, there are four slots 31024A to 31024D, which are formed on the bottom portion 31021B of the seat portion 31021 and penetrate through the bottom portion 31021B. The slots 31024C, 31024D in pair are formed at a position closer to the front portion (the direction indicated by the arrow F) of the seat portion 31021 than the slots 31024A, 31024B in pair. Two pairs of slots 31024A, 31024B and slots 31024C, 31024D are capable of adjusting the shoulder belt (not shown) to accommodate pets of different sizes. More specifically, when a size of a pet is relatively small, the shoulder belts 3106A, 3106B may selectively protrude from the slots 31024A, 31024B to protrude from slots (slots 3824A, 3824B as shown in FIG. 27 and slots 3924A, 3924B as shown in FIG. 28) formed at the bottom portion of the box body and thus be exposed here, taken as the aforementioned shoulder belts. Alternatively, when the size of the pet is relatively large, the shoulder belts 3106A, 3106B may selectively protrude from the slots 31024C, 31024D to protrude from the slots (such as the slots 3824C, 3824D shown in FIG. 27 and the slots 3924C, 3924D shown in FIG. 28) formed at the bottom portion of the box body and thus be exposed here, taken as shoulder belts.

In addition, in this embodiment, the connecting portion 31062 is a T-shaped connecting element that connects the two back belts 3106A, 3106B and the fixing strap 31064. More specifically, the two back belts 3106A, 3106B are connected to the connecting portion 31062 by passing two arms of the T-shaped connecting element through corresponding rings formed at the free end of each of the back belts 3106A, 3106B. The fixing strap 31064 is connected to the connecting portion 31062, especially to a pillar of the T-shaped connecting element, for quickly and easily changing the protrusion of the back belts 3106A, 3106B between different pairs of slots, for example, for making the back belts 3106A, 3106B protrude from the paired slots 31024A, 31024B, or for making the back belts 3106A, 3106B protrude from the paired slots 31024C, 31024D. As shown in FIG. 29, an adjustable fixing strap 31064, one end of which is connected to the connecting portion 31062, passes through the positioning buckle 31026 and is fixed at a certain position to fix a length of the adjusted fixing strap 31064. In other words, by positioning the buckle 31026, the tightness of the fixing strap 31064 and the back belts 3106A, 3106B can be adjusted to suit the pet or animal that may be fixed in the box portion by the shoulder belts as described above.

Similarly, in this embodiment, the positioning buckle 31026 is an "A-lock". However, the present disclosure is not limited thereto.

Figure 30:
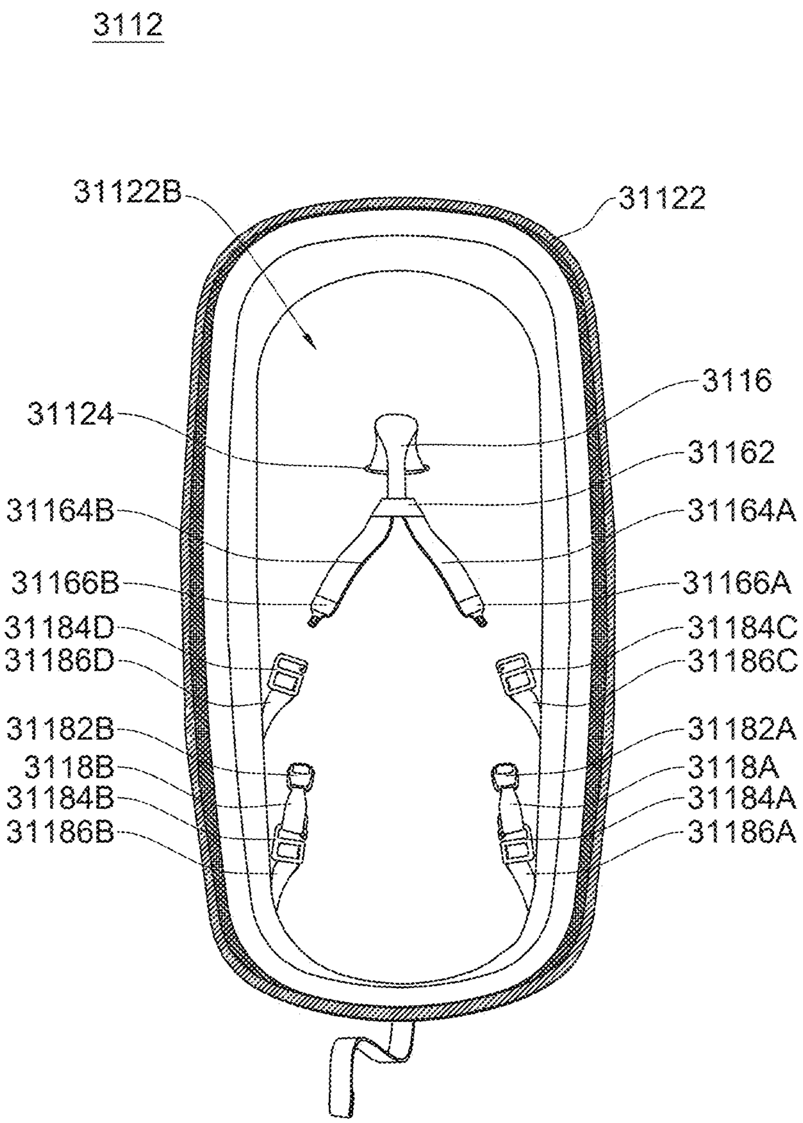
FIG. 30 schematically shows a top view of a pet carrier of a pet travel device according to a seventh embodiment of the third aspect of the present disclosure.

Referring to FIG. 30, a top view of a pet carrier of a pet travel device according to a seventh embodiment of the third aspect of the present disclosure is schematically illustrated. As shown in the figure, the pet carrier 3112 has a similar structure and construction to the pet carrier 352, including a box portion 31122 and buckling devices such as tongue elements 31166A, 31166B corresponding to shoulder sections 31164A, 31164B. In addition, the main design and structure of the box belt as shown in FIG. 24, for example, the adjusting buckle and the adjusting belt with the ladder lock, are applicable to the box belts 3118A, 3118B of this embodiment.

The pet carrier 3112 shown in the figure is different from the pet carrier 352 shown in FIG. 24 in that, in this embodiment, only one slot 31124 is formed on the bottom portion 31122B of the box portion 31122, and the shoulder belt is Y-shaped. More specifically, the Y-belt includes an extension section 3116 and two separate shoulder sections 31164A, 31164B that are connected to the extension section 3116 by a connecting portion 31162. The slot 31124 is formed to penetrate through the bottom portion 31122B and the seat portion (not shown) of the box portion 31122, so that the extension section 3116 of the Y-belt may protrude from the bottom portion of the seat portion and be connected to the shoulder sections 31164A, 31164B via the connecting portion 31162. The shoulder sections 31164A, 31164B include corresponding buckling devices, such as tongue elements 31166A, 31136*b* connected to their respective ends, for fixing to the fastening devices, such as buckle clips 31182A, 31182B of the respective box belts 3118A, 3118B. Similarly, shoulder sections 31164A, 31164B may be latched to paired box belts 3118A, 3118B that are optionally connected to adjusting belts 31186A, 31186B or to adjusting belts 31186C, 31186D, depending on the size of the pet to be accommodated in the box portion 31122.

Similarly, the shoulder sections 31164A, 31164B may be latched to the corresponding box belts 3118A, 3118B by various buckling devices, including but not limited to buckle clips, cam locks, fasteners, lock buckles, snaps and snap locks, and the like.

Figure 31:
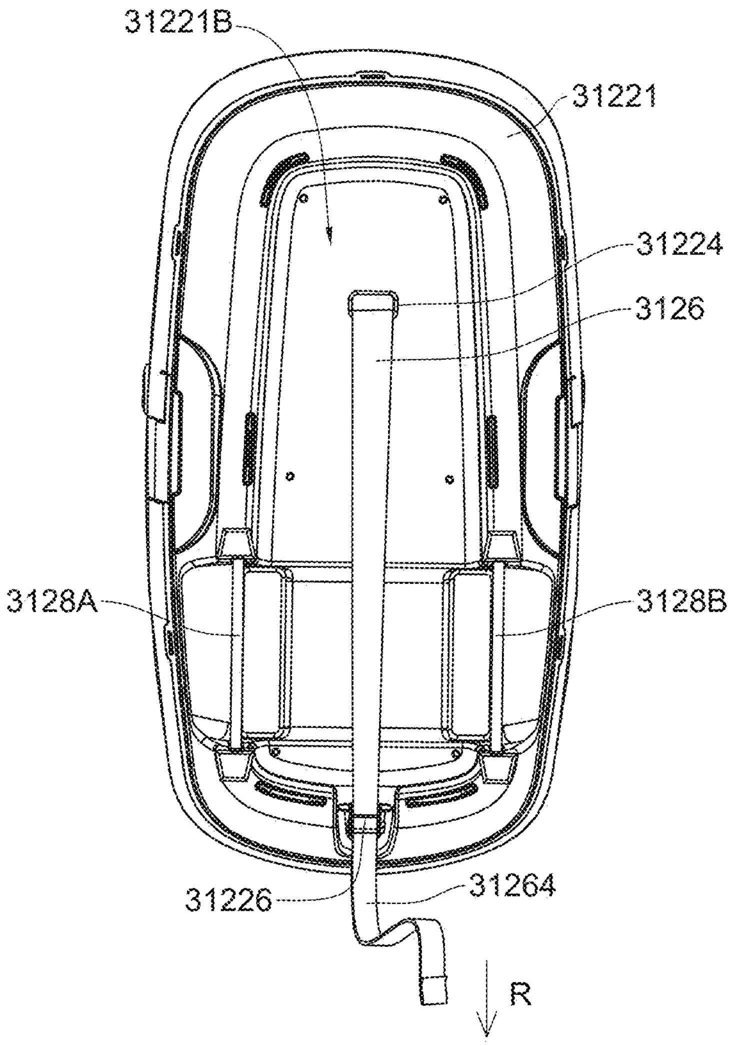
FIG. 31 schematically shows a bottom view of a pet carrier according to the seventh embodiment of the third aspect of the present disclosure.

FIG. 31 schematically shows a bottom view of a pet carrier (i.e., a pet carrier 3112) according to a seventh embodiment of the third aspect of the present disclosure. More specifically, the seat portion 31221 shown in FIG. 31 is adapted to the box portion 31122, that is to say, the box portion 31122 may be embedded in the seat portion 31221 shown in FIG. 31.

The seat portion 31221 may be combined to a base (not shown) installed in a vehicle through the engagement of two locking rods 3128A, 3128B provided on the bottom portion 31221B with the seat mounting portion of the base.

As shown in FIG. 31, the seat portion 31221 includes a slot 31224 penetrating through the bottom portion 31221B of the box portion 31122 and the bottom portion (not shown) of the box portion. The slot 31224 corresponds to the slot 31124 shown in FIG. 30. The belt (hereinafter referred to as the "back belt") 3126 may pass through the slot 31224, protrude from the slot 31124 formed on the bottom portion 31122B of the box portion 31122 (as shown in FIG. 30) and remain here taken as the extension section 3116 of the Y-belt as described above (as shown in FIG. 30). Similarly, at the center of the short side of the seat portion 31221, near the rear portion of the pet carrier (in the direction indicated by arrow R), the seat portion 31221 is provided with a positioning buckle 31226. The fixing strap 31264 passing through the positioning buckle 31226 may be fixed at a determined position, so that the length of the fixing strap 31264 is fixed after adjustment. In other words, by the positioning buckle 31226, the tightness of the fixing strap 31264 and the Y-belt may be adjusted to suit for the pet or the animal that may be fixed in the box portion through the shoulder portion of the Y-belt as described above.

Similarly, in this embodiment, the positioning buckle 31226 is an "A-lock" for the user (the owner of the pet) to adjust the tightness of the Y-belt and fix the length of the fixing strap in a simple way. However, the present disclosure is not limited thereto.

Figures 32, 32A, 32B:
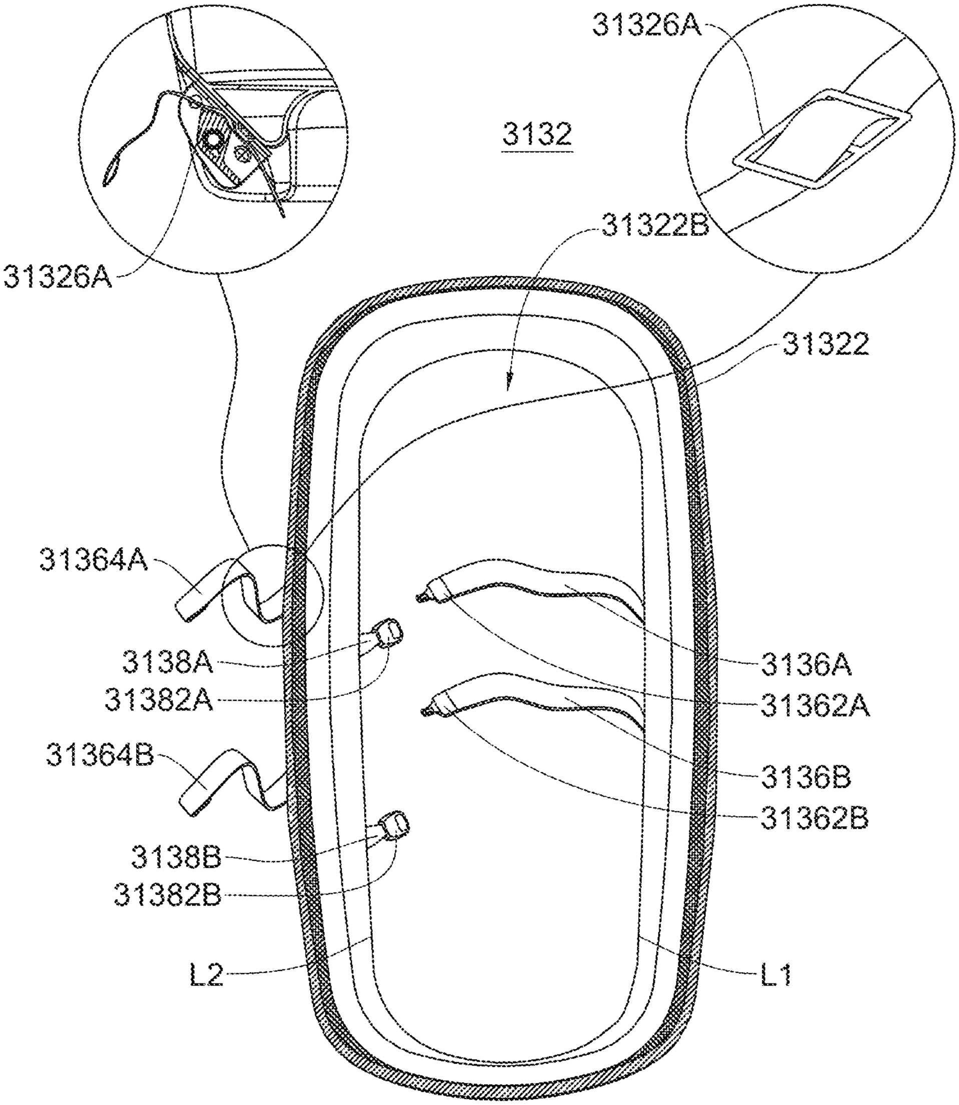
FIG. 32 schematically shows a top view of a pet carrier of a pet travel device according to an eighth embodiment of the third aspect of the present disclosure.
FIGS. 32A and 32B schematically show enlarged views of a positioning buckle of the pet carrier shown in FIG. 32.
Figure 33:
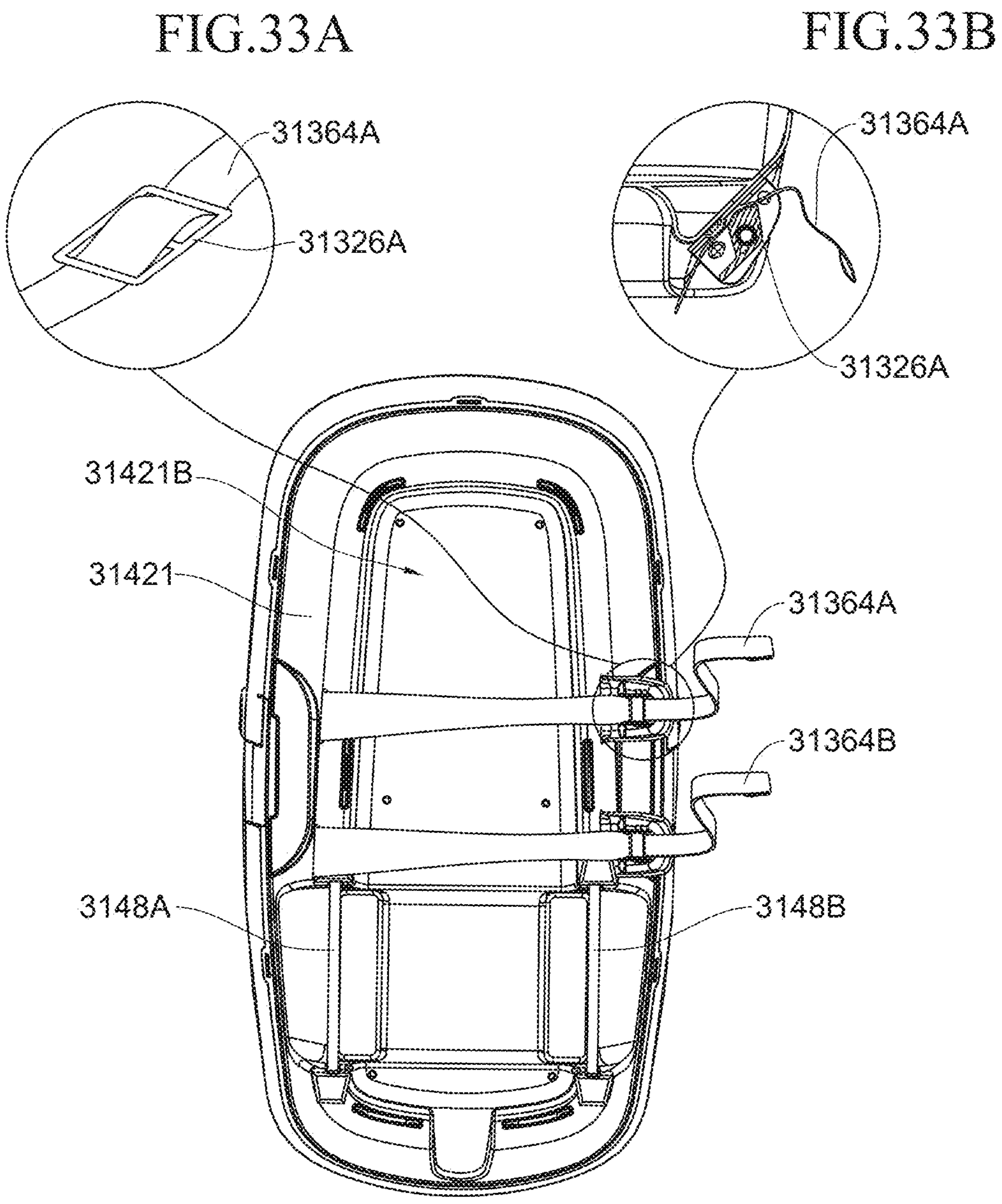
FIG. 33 schematically shows a bottom view of a pet carrier of the eighth embodiment of the third aspect of the present disclosure.

Referring to FIGS. 32 and 33, a pet carrier of a pet travel device according to an eighth embodiment of the third aspect of the present disclosure is shown, where FIG. 32 schematically shows a top view of a box portion 31322 of the pet carrier 3132 of this embodiment, and FIG. 33 schematically shows a bottom view of a seat portion 31421 of the pet carrier 3132 of this embodiment. In addition, FIGS. 32A, 32B, 33A and 33B schematically show enlarged views of various positioning buckles of the pet carrier, respectively. The seat portion 31421 may be combined to a base (not shown) installed in a vehicle through the engagement of two locking rods 3148A, 3148B provided on the bottom portion 31421B with a mounting mechanism of the base.

The pet carrier 3132 includes a box portion 31322 and a seat portion 31421 as shown in the figure, which is different from the pet carrier of the foregoing embodiment. As shown in FIG. 32, fastening belts 3136A, 3136B spaced apart from each other by a predetermined interval protrude from the seat portion 31421 through an interface between the bottom portion 31322B and a long side L1 of the box portion 31322. The fixing belts 3138A, 3138B are fixed on the other long side L2 (opposite to the side L1) at a predetermined interval therebetween. The fastening belts 3136A, 3136B are fixed to the fixing belts 3138A, 3138B by suitable buckling devices. Alternatively, the fixing belts 3138A, 3138B may adopt a structure and arrangement similar to that of the box belt in the foregoing embodiment (e.g., the box belt 348B in FIG. 23), that is, the fixing belts 3138A, 3138B may protrude from a slot or a bottom opening provided in the bottom portion 31322B and may be fixed on the bottom portion 31322B, specifically, for example, may be fixed at an interface between the bottom portion 31322B and the other long side L2.

As shown in FIG. 33, the two fixing straps 31364A, 31364B may pass through corresponding slots formed at an interface between the bottom portion 31421B and a long side L1 of the seat portion 31421 (or the box portion 31322), and may protrude from there to be exposed on the bottom portion 31322B as the fastening belts 3136A, 3136B as described above. The fixing straps 31364A, 31364B, having ends passing through the corresponding positioning buckle 31326A or 31326B, may be fixed at a determined position such that the lengths of the fixing straps 31364A, 31364B may be fixed after adjustment. In other words, by positioning the positioning buckles 31326A, 31326B, the tightness of the fixing straps 31364A, 31364B and the fastening belts 3136A, 3136B may be adjusted to suit for the pet or the animal to be fixed in the box portion by the shoulder belts as described above.

In this embodiment, the positioning buckles 31326A, 31326B may allow a user (an owner of a pet) to adjust the tightness of the fastening belt and fix the length of the fixing strap in a simple manner. To this end, the positioning buckle may include, but not limited to, the so-called "A-lock", a buckle clip or locking clip, a pulley lock, a cam buckle, a tri-glide buckle, etc. In this embodiment, the positioning buckles 31326A, 31326B may be cam buckles (i.e., the positioning buckles 31326A as shown in FIGS. 32A and 33A) or the tri-glide buckles (i.e., the positioning buckle 31326A as shown in FIGS. 32B and 33B).

It is worth noting that the webbing, belt and strap of the pet carrier according to the present disclosure may be made of the same material as the safety belt of the vehicle, and thus show increased safety strength.

Referring to FIG. 34, a perspective view of a base of a pet travel device according to an embodiment of the present disclosure is schematically illustrated.

The base 315 as shown in the figure may be installed in a vehicle (not shown), with a load leg 3152 of the base 315 in contact with a floor of the vehicle, and the pet carrier according to the present disclosure may be mechanically installed with the base 315 through locking mechanisms (e.g., two locking rods) on the bottom portion of the pet carrier (not shown). More specifically, the base 315 may be placed on a vehicle seat (not shown), such as its ISOFIX connector 3156 firmly attached to an anchoring point. The load leg 3152 of the base 315 may extend to the floor of the vehicle. Under the condition that the load leg 3152 is in complete contact with the vehicle floor pan, the base 315 may be firmly supported.

The base 315 includes a seat mounting portion 3154 for receiving and fixing the seat portion of the pet carrier so that the pet carrier may be firmly attached to the base 315. More specifically, the pet carrier according to the present disclosure may latch locking rods (e.g., locking rods 378A and 378B, 378A' and 378B', 3108A and 3108B, 3128A, 3128B, 3148A, 3148B as described above) provided on the bottom portion of the seat portion of the pet carrier to corresponding restraining portions 3154A, 3154B of the seat mounting portion 3154, so as to be firmly latched to the base. In an embodiment of the present disclosure, the seat mounting portion 3154 of the base 315 is rotatable, and thereby changing the direction of the pet carrier along with the rotation of the seat mounting portion 3154, for example, from a direction transverse to the vehicle seat to a direction parallel to the vehicle seat.

Figure 35:
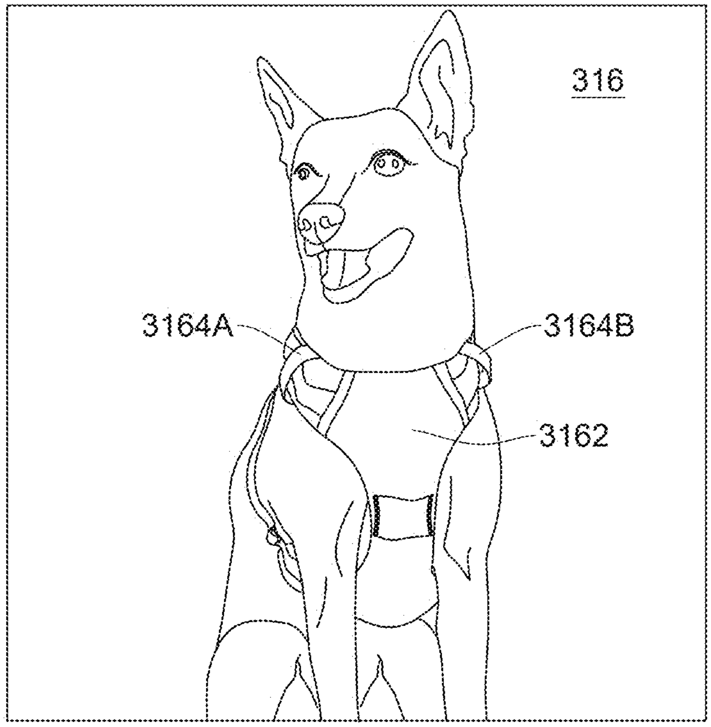
FIG. 35 schematically shows a dog wearing a wearable item according to the present disclosure.

In order to carry a pet through the pet travel device including the pet carrier and the base and fix the pet in the vehicle through the pet travel device, the pet owner may wear the pet with a wearable item, such as a pet vest 316 (also called a "pet harness"), including a chest pad 3162 and webbing rings 3164A, 3164B thereon, as shown in FIG. 35. Preferably, the wearable item is designed to be adapted to a pet carrier according to the present disclosure.

Wearable Item for Pet

According to the present disclosure, a wearable item, such as a pet vest or harness, may preferably be designed to be adapted to the pet carrier of the foregoing embodiment.

FIGS. 36A to 36F schematically illustrate perspective views of corresponding wearable items according to various embodiments of the present disclosure. It should be noted that a main structure of the wearable item is similar to the wearable item available in market known to those skilled in the art, which is not repeated here.

Figure 36A:
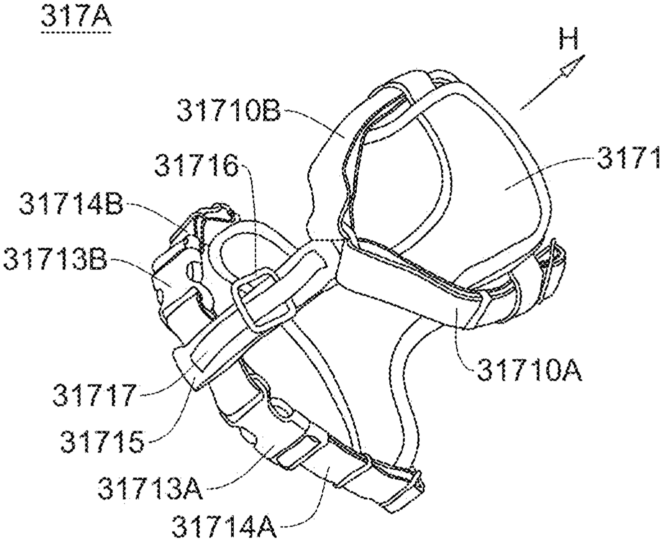
FIGS. 36A to 36F schematically show perspective views of corresponding wearable items according to various embodiments of the third aspect of the present disclosure.

The vest as shown in FIG. 36A may be close to the existing vest, that is to say, the vest in market may also be applied to the pet travel system of the present disclosure, and thereby providing a firm and stable support for the pet in a moving vehicle. The vest 317A shown in the figure includes a chest pad 3171, shoulder straps 31710A, 31710B protruding from an upper part of the chest pad 3171, and a central strap 31715 connecting the shoulder straps 31710A, 31710B with back straps 31714A, 31714B extending from a lower part of the chest pad 3171. The back straps 31714A, 31714B having corresponding clips 31713A, 31713B thereon may form a closed structure with the chest pad 3171 for surrounding an upper chest of the pet, and the back straps may form a closed structure with the chest pad 3171 for surrounding the belly of the pet. A webbing 31717 is provided on the central strip 31715 by sewing to form a ring with the central strip 31715. The webbing 31717 passes through the annular member 31716, so that the annular member 31716 can move along the webbing 31717 within a ring formed by the webbing 31717 and the central strip 31715. The pet's head when wearing the vest 317A may face the direction indicated by the arrow H.

Figure 36B:
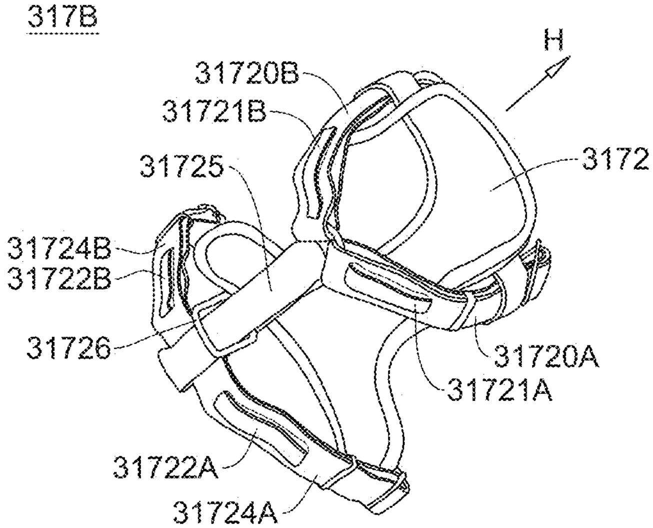

Referring to FIG. 36B, the structure and construction of the vest 317B shown in the figure are similar to those of the vest 317A shown in FIG. 36A, including a chest pad 3172, chest straps 31720A, 31720B, back straps 31724A, 31724B, and a central strap 31725 for connecting the chest straps 31720A, 31720B with the back straps 31724A, 31724B. The vest 317B shown in the figure is different from the vest 317A of FIG. 36A in that, in this embodiment, the central strap 31725 penetrates through the annular member 31726. In addition, there are webbings 31721A, 31721B attached to corresponding chest straps 31720A, 31720B and forming the corresponding rings, for example, and webbing rings 31722A, 31722B attached to corresponding back straps 31724A, 31724B by sewing and forming corresponding rings. The pet's head when wearing the vest 317B may face the direction indicated by the arrow H.

Figure 36C:
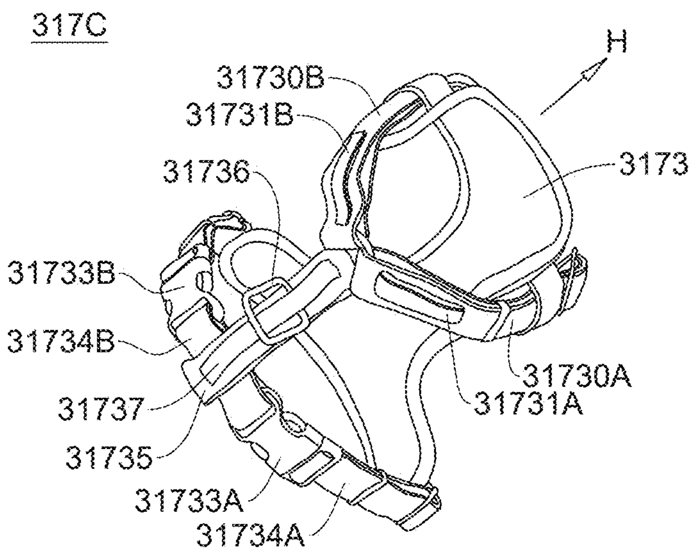

Referring to FIG. 36C, the vest 317C shown in the figure has a structure and configuration similar to that of the vest 317B of FIG. 36B, including a chest pad 3173, chest straps 31730A, 31730B, webbings 31731A, 31731B attached to the chest straps 31730A, 31730B, and back straps 31734A, 31734B. The difference between the two vests 317C, 317B is that, in this embodiment, the back straps 31734A, 31734B are provided with corresponding quick release buckles 31733A, 31733B, respectively, and the webbing 31737 is attached to the central strap 31735 by sewing, and passes through the annular member 31736, for example, so that in the case that a ring is formed by the webbing 31737 and the central strap 31735, the annular member may be movable. Similarly, the pet's head when wearing the vest 317C may face in the direction indicated by the arrow H.

Figure 36D:
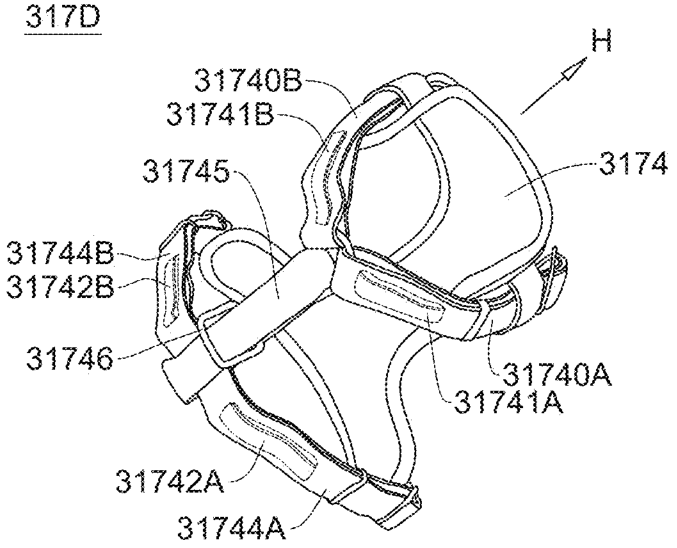

Referring to FIG. 36D, the vest 317D shown in the figure has a structure and construction similar to that of the vest 317B shown in FIG. 36B, including a chest pad 3174, chest straps 31740A, 31740B, back straps 31744A, 31744B, a central strap 31745, and an annular member 31746 passed by the central strap 31745. The difference between the two vests 317D, 317B is that, in this embodiment, the vest 317D and the webbing attached to the corresponding strap are not exposed. More specifically, webbing 31741A, 31741B are attached to the corresponding chest strap at a position of an inner surface of the strap, for example, by sewing. Webbings 31742A, 31742B are attached to the respective back straps at the position of the inner surface of the strap, for example, by sewing. In this way, a corresponding ring formed by the webbing and the chest strap or the back strap is located inside a strap body to reduce the possibility of being destroyed or damaged. In addition, the pet's head when wearing the vest 317D may face the direction indicated by the arrow H.

It should be noted that in the above-mentioned embodiments of FIGS. 36A to 36D, the "shoulder strap" and the "chest strap" may be called as the first strap, and the "back strap" may be called as the second strap, and the first strap and the second strap are provided at intervals.

Figure 36E:
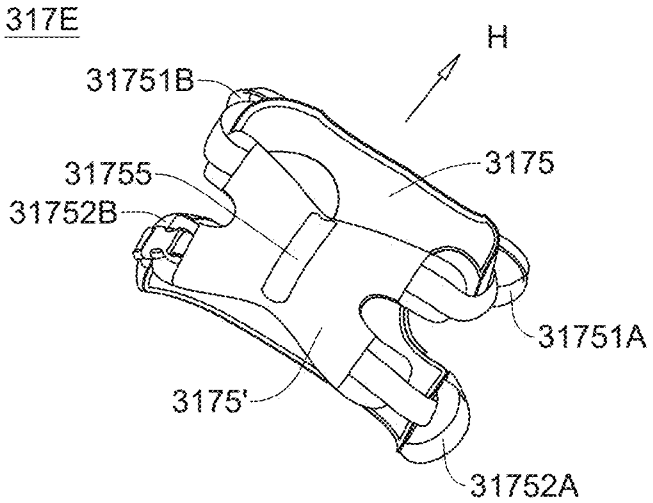

Referring to FIG. 36E, another type of vest according to an embodiment of the present disclosure is schematically illustrated. As shown in the figure, the vest 317E includes a chest pad 3175 and a back pad 3175' that are adjustably connected with each other through a corresponding strap, such as the existing vest known to those skilled in the art. In this embodiment, at a position corresponding to the corresponding strap for connecting the chest pad 3175 and the back pad 3175', webbings 31751A, 31751B, 31752A and 31752B attached to the chest pad 3175 and the back pad 3175' by sewing, for example, are provided, so that corresponding rings are formed by the strap and a pad body. In this embodiment, the corresponding strap may pass through the ring formed by the corresponding webbing and the pad body (of the chest pad 3175 and the back pad 3175'). In addition, there is a webbing 31755 attached to the back pad 3175' (especially a center of the back pad 3175'), by sewing and forming a central ring with the back pad 3175', for example. The pet's head when wearing the vest 317E may face the direction indicated by the arrow H.

Figure 36F:
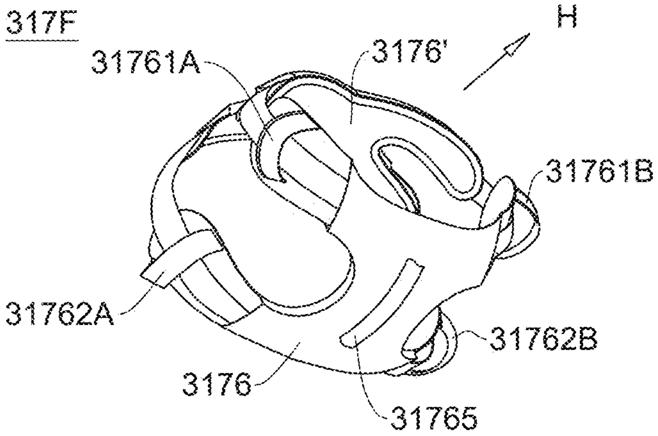

Referring to FIG. 36F, the vest 317F shown in the figure has a similar structure and construction to the vest 317E, including a chest pad 3176, a back pad 3176' and webbing 31761A, 31761B, 31762A and 31762B, which are attached to the chest pad 3176 and the back pad 3176' and form corresponding rings with them. In this embodiment, the vest 317F is different in that the webbing 31765 is attached to the chest pad 3176 (especially the center of the chest pad 3176) by sewing, for example, to form a central ring with the chest pad 3176. In addition, the pet's head when wearing the vest 317F may face the direction indicated by the arrow H.

According to the present disclosure, the webbing, belt and strap of the wearable item may be made of the same material as the safety belt of the vehicle, thereby showing increased safety strength.

It should be understood that the connection between strips, or the connection between strips and pads may be realized by any mechanism known to those skilled in the art, including but not limited to clips, and tri-glide buckles, etc.

Combination of Wearable Item and Pet Travel Device

The pet travel system according to the present disclosure includes a pet travel device and the wearable item as described above. The pet travel device according to the present disclosure may provide stable and safe support for the pet through the combination of various belts of the pet carrier and various straps/strips of the wearable item, especially when the pet wears the wearable item, such as the vest of the present disclosure, and the wearable item is properly adjusted in terms of tightness to adapt to the size of the pet in the moving vehicle.

Although not shown, according to some examples, the pet carrier may be in the form of a cradle or a cart, which has a structure and configuration corresponding to those shown and illustrated in the pet carrier of the pet travel device of the present disclosure above.

Figure 37:
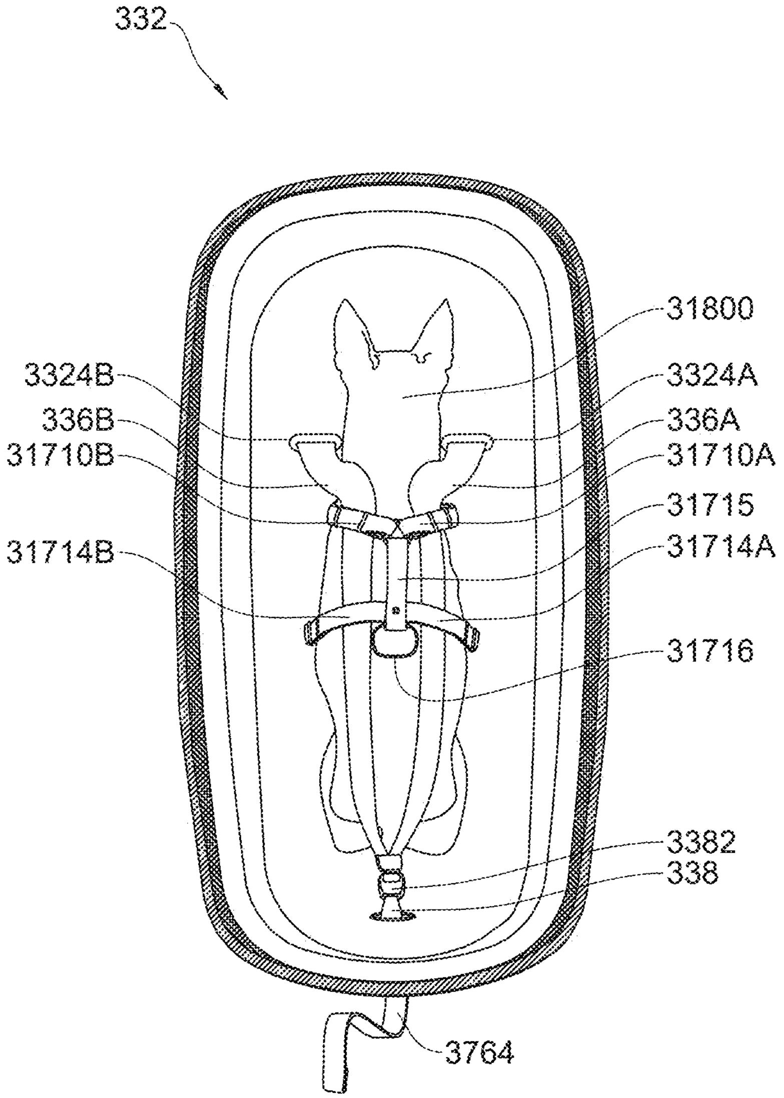
FIGS. 37 and 38 schematically show a pet travel system in use according to an embodiment of the third aspect of the present disclosure.
Figure 38:
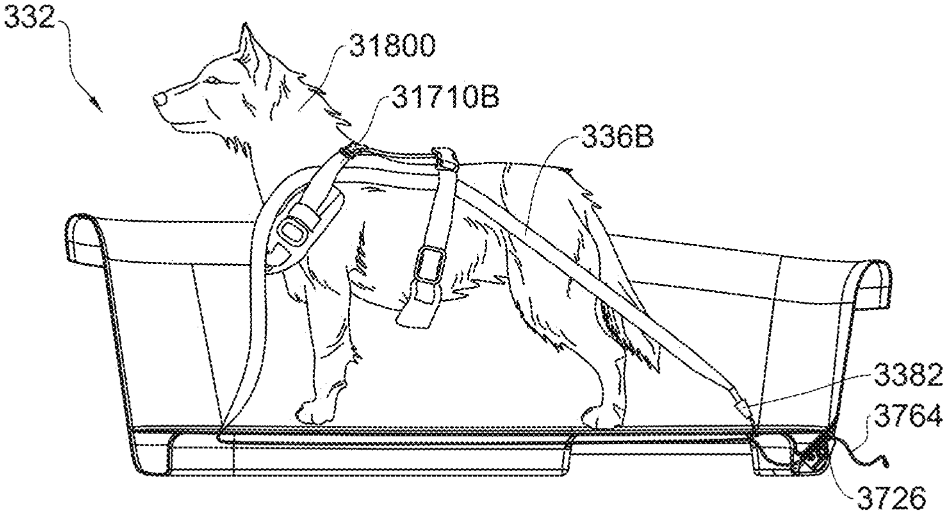

Referring to FIGS. 37 and 38, a pet travel system in use according to an embodiment of the present disclosure is schematically illustrated. In this embodiment, taking the pet carrier 332 and vest (vest 317A as shown in FIG. 36A) shown in FIG. 22 as an example, it may be explained how the combination of the belt of the pet carrier 332 and the strap or strip of the vest can provide a support for the pet confined in the box portion of the pet carrier 332. To avoid overshadowing the present disclosure, the figures may omit structures or components of the pet carrier 332 or vest that are not essential to understanding the strap/strip combination disclosed herein. Furthermore, to prevent redundancy, these non-essential elements will not be described in detail in the following.

As shown, FIG. 37 schematically shows a top view of a pet (such as a dog 31800) wearing the vest of FIG. 36A and being restrained in the box portion of the pet carrier 332 of FIG. 22, and FIG. 38 is a schematic side view of FIG. 37. In this embodiment, the shoulder belts 336A, 336B may protrude from the slots 3324A, 3324B, and may be pulled upward to extend along corresponding two front legs of the dog 31800, pass through a gap between the corresponding two shoulders of the dog 31800 and corresponding two shoulder straps 31710A, 31710B of the vest worn on the dog 31800, and pass through a gap between a back of the dog 31800 and two back straps 31714A, **31710*b* of the dog 31800. The shoulder belts 336A and 336B latch to the buckle clip 3382 via a tongue element (not shown), and thereby connecting to the box belt 338 of the pet carrier 332. The user (or the pet owner) may pull the adjusting belt 3764 to adjust its tightness and fix the adjusting belt 3764 with the positioning buckle 3726 after adjustment. Since the adjusting belt 3764 is connected to two back belts (i.e., back belts 376A, 376B as shown in FIGS. 26A and 26B), which are the same belts as the corresponding shoulder belts 336A, 336B of the pet carrier 332, the tightness of the shoulder belts 336A, 336B can be adjusted by pulling the adjusting belt 3764 to adapt to a body shape of the dog 31800**.

Alternatively, taking the pet carrier 332 shown in FIG. 22 and the vest (vest 317D shown in FIG. 36D) as an example, the shoulder belt 336A may pass through the corresponding ring formed by the webbing 31742A and the webbing 31741A, and the shoulder belt 336B may pass through the corresponding ring formed by the webbing 31742B and the webbing 31741B.

In this embodiment, two shoulder belts 336A, 336B extend parallel to each other along both sides of a vertebrae, and form four contact points with a pet vest worn on the dog 31800. Two contact points are shoulder points on the shoulder portion corresponding to a position of the dog's scapula, as shown in FIG. 21. For example, the shoulder belt forms a first contact point with the first strap of the pet vest, for example, a shoulder strap of the pet vest, which may be a chest strap in other embodiments. The other two contact points are back points on the middle back of the dog 31800, corresponding to both sides of the thoracic vertebrae, as shown in FIG. 21. For example, the shoulder belt forms a second contact point with the second strap of the pet vest, for example, a back strap of the pet vest. Compared with the existing transport cage or vest, four contact points, especially two shoulder points (i.e., the first contact point) allow the dog 31800 to be provided with relatively firm, stable and safe support.

Figure 39:
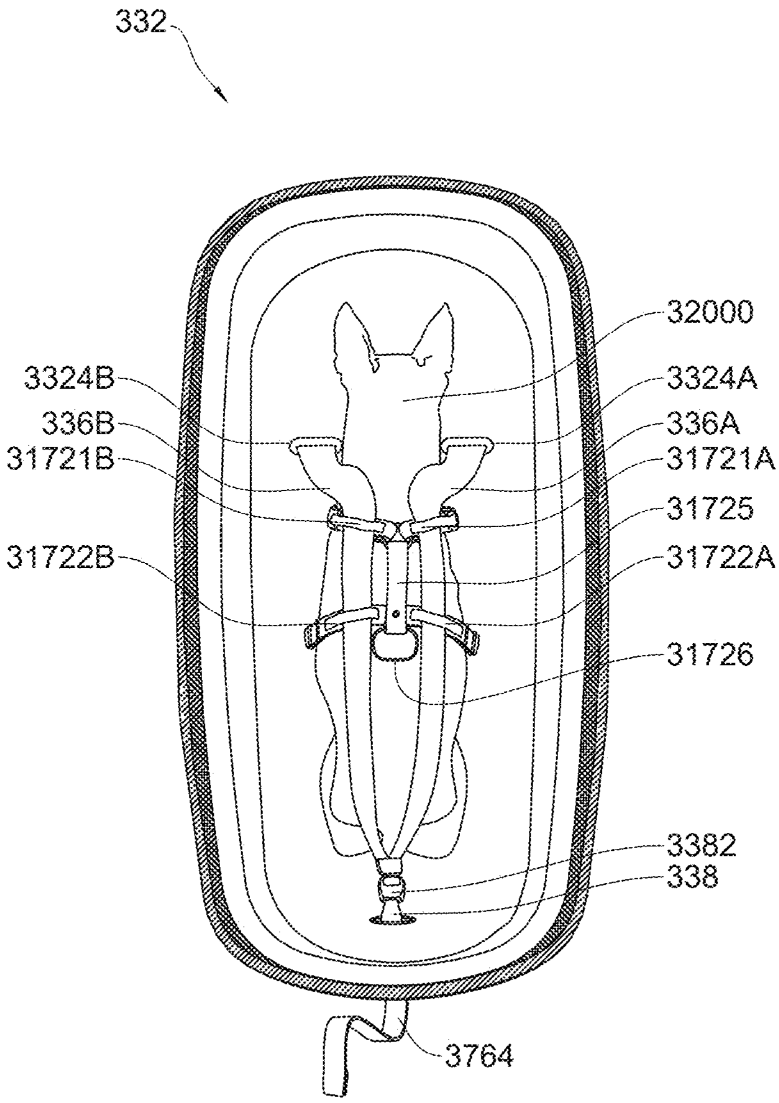
FIGS. 39 and 40 schematically show a pet travel system in use according to an embodiment of the third aspect of the present disclosure.
Figure 40:
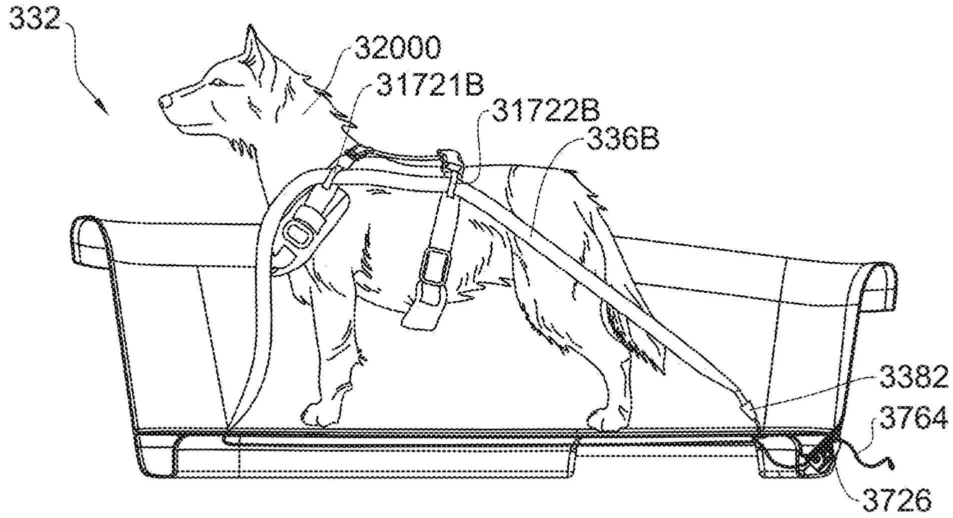

Referring to FIGS. 39 and 40, a pet travel system in use according to an embodiment of the present disclosure is schematically shown. In this embodiment, taking the pet carrier 332 shown in FIG. 22 and the vest shown in FIG. 36B as an example, it will be explained how the combination of the belt of the pet carrier 332 and the strap or strip of the vest can provide support for the pet confined in the box portion of the pet carrier 332. In order not to obscure the present disclosure, the structure or components of the pet carrier 332 or vest that are not necessary for the strap/strip combination of the present disclosure may not be shown in the figures and will not be redundantly described.

As shown, FIG. 39 schematically shows a top view of a pet (such as a dog 32000) restrained in the box portion of the pet carrier 332 of FIG. 22 wearing the vest of FIG. 36B, and FIG. 40 is a schematic side view of FIG. 39. In this embodiment, the shoulder belts 336A, 336B may protrude from the slots 3324A, 3324B, may be pulled upward to extend along the two front legs of the dog 32000, pass through corresponding rings formed by the shoulder strap and webbings 31721A, 31721B of the vest, pass through corresponding rings formed by the back strap and webbings 31722A, 31722B of the vest, and may be latched to the buckle clip 3382 through a tongue element (not shown), so as to be connected to the corresponding box belt 338 of the pet carrier 332. The user (or the pet owner) may pull the adjusting belt 3764 to adjust its tightness and fix the adjusting belt 3764 with the positioning buckle 3726 after adjustment. Since the adjusting belt 3764 is connected to two back belts (i.e., back belts 376A, 376B as shown in FIGS. 26A and 26B), which are the same belts as the corresponding shoulder belts 336A, 336B of the pet carrier 332, the tightness of the shoulder belts 336A, 336B may be adjusted by pulling the adjusting belt 3764 to adapt to the body shape of the dog 32000.

Similar to the embodiment shown in FIGS. 37 and 38, in this embodiment, two shoulder belts 336A, 336B extend parallel to each other along both sides of the vertebrae and form four contact points with a pet vest worn on the dog 32000. Two contact points are shoulder points on the shoulder portion (corresponding to the position of the dog's scapula, as shown in FIG. 21). For example, the shoulder belt forms the first contact point with the first strap of the pet vest (for example, the shoulder strap of the pet vest, which may also be the chest strap in other embodiments). The other two contact points are the back points in the middle back of the dog 32000, corresponding to both sides of the thoracic vertebrae, as shown in FIG. 21. For example, the shoulder belt forms a second contact point with the second strap of the pet vest, for example, the back strap of the pet vest. Compared with the existing transport cage or vest, four contact points, especially two shoulder points (i.e., the first contact point) allow providing relatively firm, stable and safe support for the dog 32000. Compared with the embodiment of FIGS. 37 and 38, the shoulder belts 336A, 336B according to the present embodiment are further confined in the ring formed by the webbing 31721A, 31721B, 31722A, 31722B and the corresponding shoulder straps (or chest straps) or back straps, so that the shoulder belts 336A, 336B may always be kept in place during the running of the vehicle.

Figure 41:
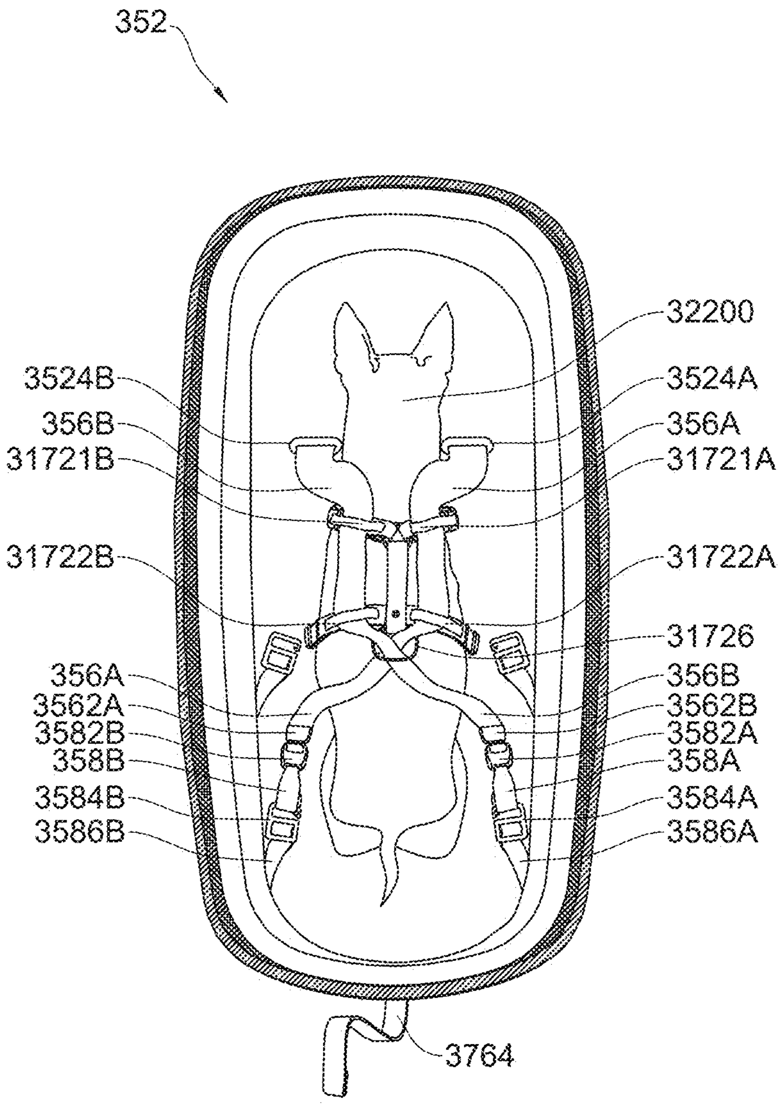
FIGS. 41 and 42 schematically show a pet travel system in use according to an embodiment of the third aspect of the present disclosure.
Figure 42:
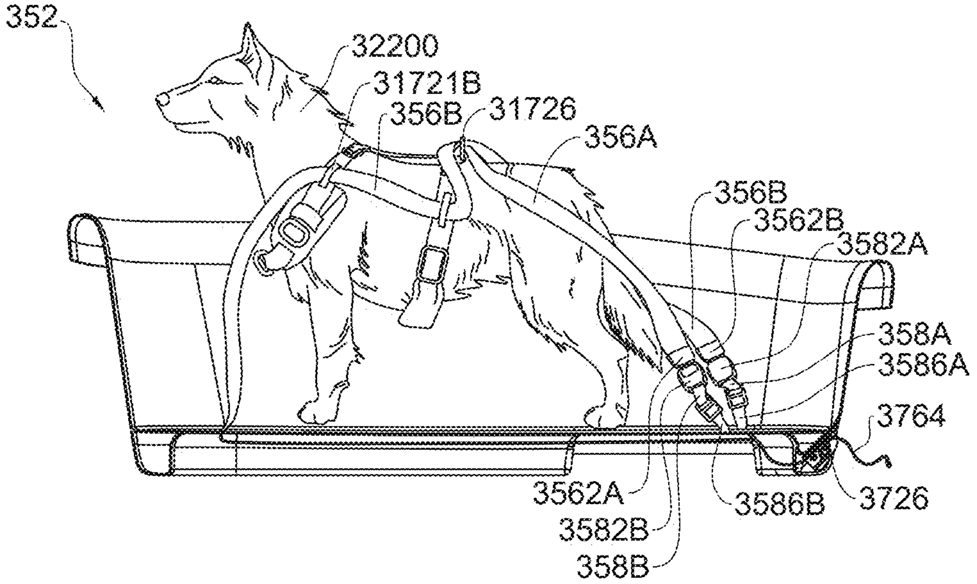

Referring to FIGS. 41 and 42, a pet travel system in use according to an embodiment of the present disclosure is schematically shown. In this embodiment, taking the pet carrier 352 shown in FIG. 24 and the vest shown in FIG. 36B as an example, it will be explained how the combination of the belt of the pet carrier 352 and the strap or strip of the vest can provide support for the pet confined in the box portion of the pet carrier 352. To ensure clarity in the present disclosure, the figures intentionally exclude structures or components of the pet carrier 352 and vest that are not integral to the strap/strip combination introduced by this disclosure. Additionally, to avoid redundancy, the detailed description will be omitted in the following.

As shown in the figure, FIG. 41 schematically shows a top view of a pet (such as a dog 32200) restrained in the box portion of the pet carrier 352 of FIG. 24 wearing the vest of FIG. 36B, and FIG. 42 is a schematic side view of FIG. 41. In this embodiment, the shoulder belts 356A, 356B may protrude from the slots 3524A, 3524B, may be pulled upward to extend along the corresponding two front legs of the dog 32200, pass through corresponding rings formed by the webbing 31721A, 31721B and the shoulder strap of the vest, pass through corresponding rings formed by the webbing 31722A, 31722B and the back strap of the vest, cross with each other and pass through the annular member 31726, and are latched to the buckle clips 3582B, 3582A by the corresponding tongue elements 3562A, 3562B, thereby being connected to the corresponding box belts 358B, 358A of the pet carrier 352. More specifically, since the shoulder belts 356A, 356B cross at the position of the annular member 31726, the shoulder belt 356A may be connected to the box belt 358B by the tongue element 3562A engaged in the buckle clip 3582A, and the shoulder belt 356B may be connected to the box belt 358A by the tongue element 3562B engaged in the buckle clip 3582A. Preferably, in this embodiment, for a relatively large dog 32200, the box belts 358A, 358B are connected to the adjusting belts 3586A, 3586B through ladder locks 3584A, 3584B, respectively.

Similarly, the user (or the pet owner) may pull the adjusting belt 3764 to adjust its tightness and fix the adjusting belt 3764 with the positioning buckle 3726 after adjustment. Since the adjusting belt 3764 is connected to two back belts (i.e., back belts 376A, 376B as shown in FIGS. 26A and 26B), which are the same as the corresponding shoulder belts 356A, 356B of the pet carrier 352, the tightness of the shoulder belts 356A, 356B may be adjusted by pulling the adjusting belt 3764 to adapt to the body shape of the dog 32200.

As shown in FIGS. 41 and 42, in this embodiment, two shoulder belts 356A, 356B first extend parallel to each other along both sides of the vertebrae, forming four contact points with a pet vest worn on the dog 32200 (i.e., two shoulder points (i.e., the first contact points) and two back points (i.e., the second contact points), as shown in FIG. 38 or FIG. 40), and then cross with each other to provide another at an intersection position around the annular member 31726. Two shoulder points are at the shoulder portion of the dog 32200, corresponding to the position of the dog's scapula, as shown in FIG. 21, and two back points are located at the middle back of the dog 32200, corresponding to both sides of the thoracic vertebrae, as shown in FIG. 21. In this embodiment, a third contact point is located approximately around the back, that is, at a position near the back strap. Compared with the existing transport cage or vest, four contact points, especially two shoulder points, allow providing relatively firm, stable and safe support for the dog 32200. Compared with the embodiment of FIGS. 39 and 40, according to this embodiment, a five-point support is formed at another contact point at the intersection position around the annular member 31726, thereby allowing an increased support for the dog 32200, which is safer for the dog 32200 in the moving vehicle.

Figure 43:
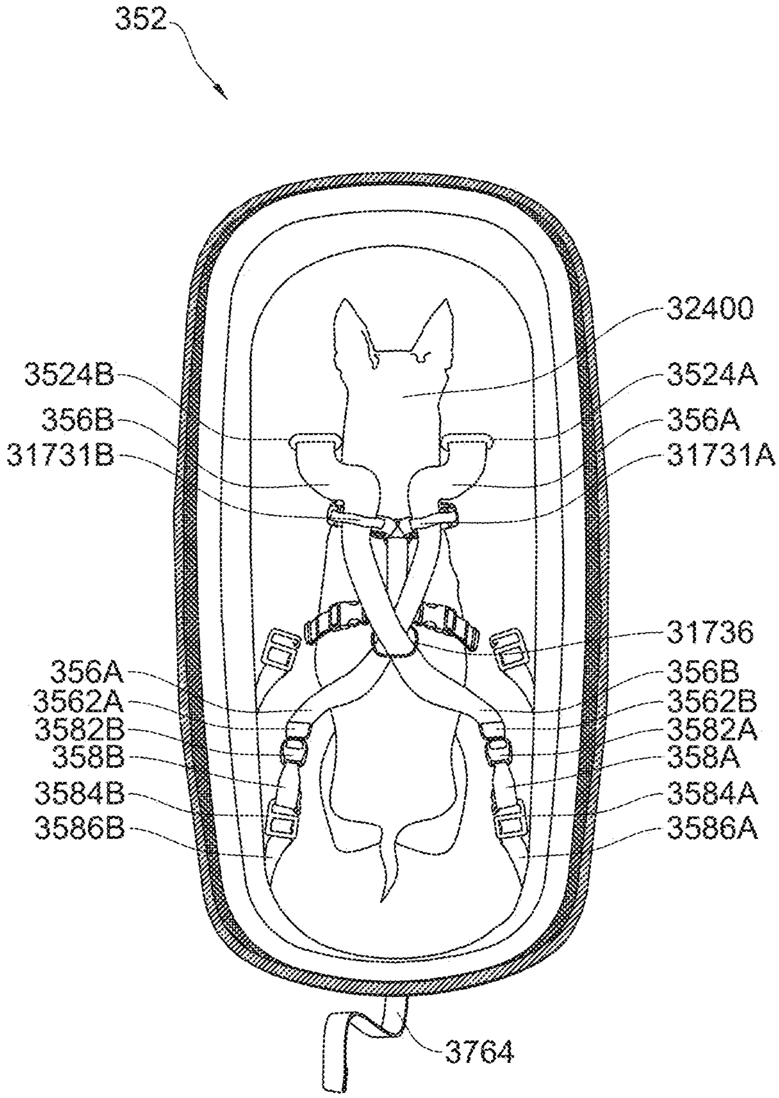
FIGS. 43 and 44 schematically show a pet travel system in use according to an embodiment of the third aspect of the present disclosure.
Figure 44:
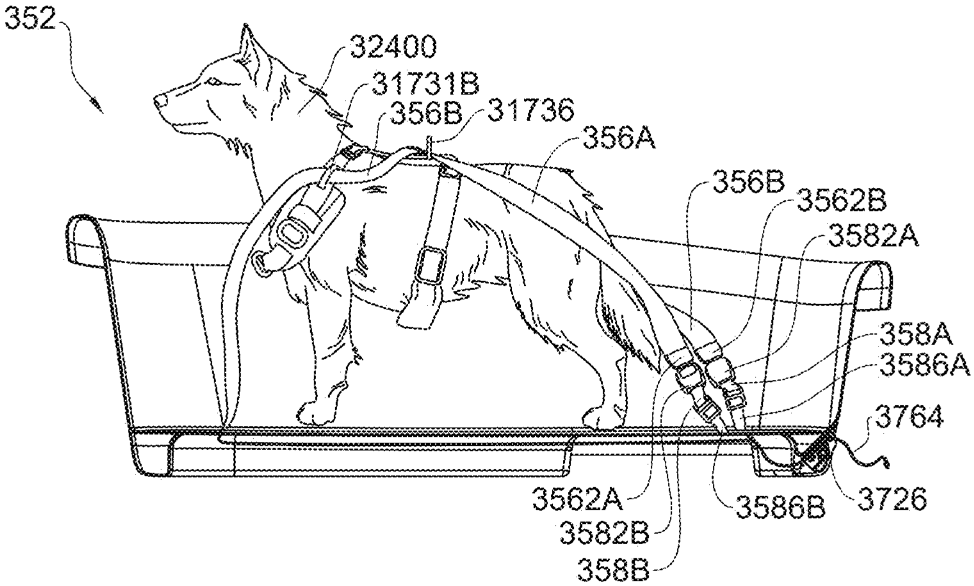

Referring to FIGS. 43 and 44, a pet travel system in use according to an embodiment of the present disclosure is schematically shown. In this embodiment, taking the pet carrier 352 shown in FIG. 24 and the vest shown in FIG. 36C as an example, it will be explained how the combination of the belt of the pet carrier 352 and the strap or strip of the vest can provide support for the pet confined in the box portion of the pet carrier 352. In order not to obscure the present disclosure, the structure or components of the pet carrier 352 or vest that are not necessary for the strap/strip combination of the present disclosure may not be shown in the drawings or redundantly described.

As shown, FIG. 43 is a top view schematically showing that a pet (such as a dog 32400) wears the vest of FIG. 36C and is restrained in the box portion of the pet carrier 352 of FIG. 24, and FIG. 44 is a schematic side view of FIG. 43.

In this embodiment, the shoulder belts 356A, 356B may protrude from the slots 3524A, 3524B, may be pulled upward to extend along respective two front legs of the dog 32400, pass through respective rings formed by the webbings 31731A, 31731B and the shoulder strap of the vest, cross with each other and pass through the annular member 31736, and may be latched to the buckle clips 3582B, 3582A with the respective tongue elements 3562A, 3562B, so as to be connected to the corresponding box belts 358B, 358A of the pet carrier 352. More specifically, since the shoulder belts 356A, 356B cross at the position of the annular member 31736, the shoulder belt 356A may be connected to the box belt 358B by the tongue element 3562A provided in the buckle clip 3582A, and the shoulder belt 356B may be connected to the box belt 358A by the tongue element 3562B provided in the buckle clip 3582*a*. In this embodiment, for a relatively large dog 32200, box belts 358A, 358B are preferably connected to the adjusting belts 3586A, 3586B through ladder locks 3584A, 3584B, respectively.

Similarly, the user (or the pet owner) may pull the adjusting belt 3764 to adjust its tightness and fix the adjusting belt 3764 with the positioning buckle 3726 after adjustment. Since the adjusting belt 3764 is connected to two back belts (i.e., back belts 376A, 376B shown in FIGS. 26A and 26B), which are same as the corresponding shoulder belts 356A, 356B of the pet carrier 352, the tightness of the shoulder belts 356A, 356B may be adjusted by pulling the adjusting belt 3764 to adapt to the body shape of the dog 32400.

As shown in FIGS. 43 and 44, in this embodiment, two shoulder belts 356A, 356B first extend parallel to each other along both sides of the vertebrae to form two contact points with a pet vest worn on the dog 32400, that is, two shoulder points, and then cross with each other to provide a third contact point at an intersection position around the annular member 31736. The shoulder point is on the shoulder portion of the dog 32400, corresponding to the position of the dog's scapula, as shown in FIG. 21, which allows to provide firm, stable and safe support for the dog 32400 compared with the existing transport cage or vest. According to this embodiment, the third contact point at the intersection position around the annular member 31736 also allows for increased support for the dog 32400 and is safer for the dog 32400 in the moving vehicle.

Figure 45:
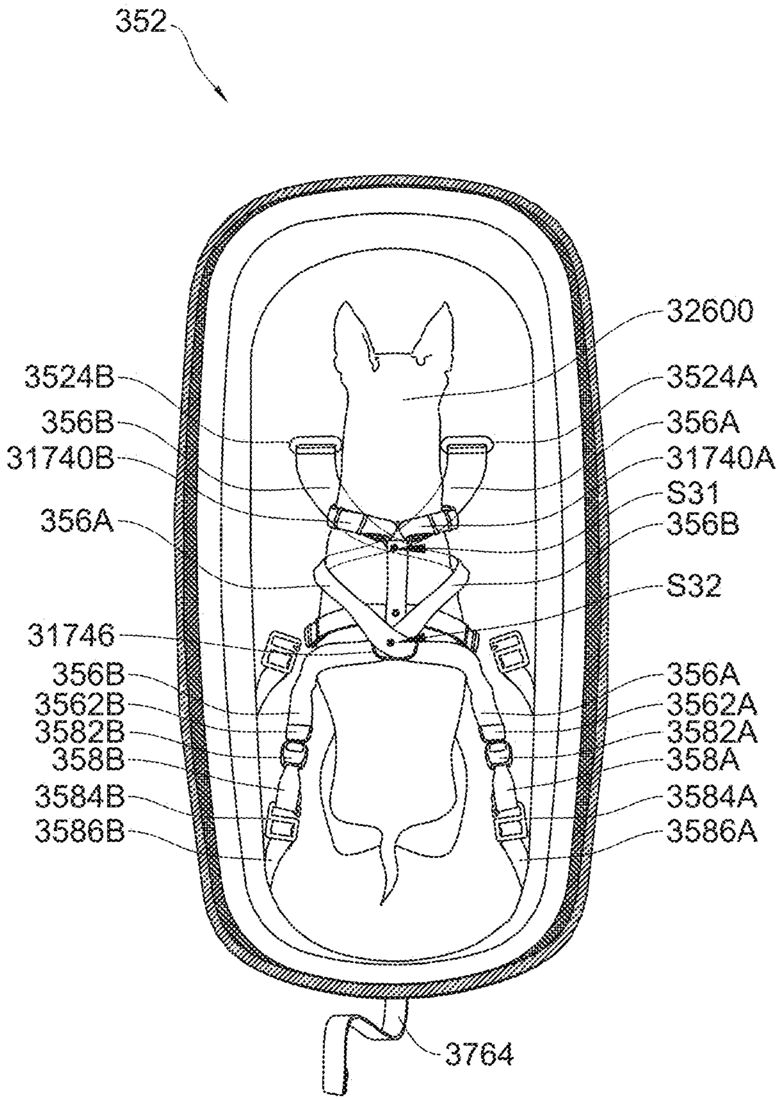
FIGS. 45 and 46 schematically show a pet travel system in use according to an embodiment of the third aspect of the present disclosure.
Figure 46:
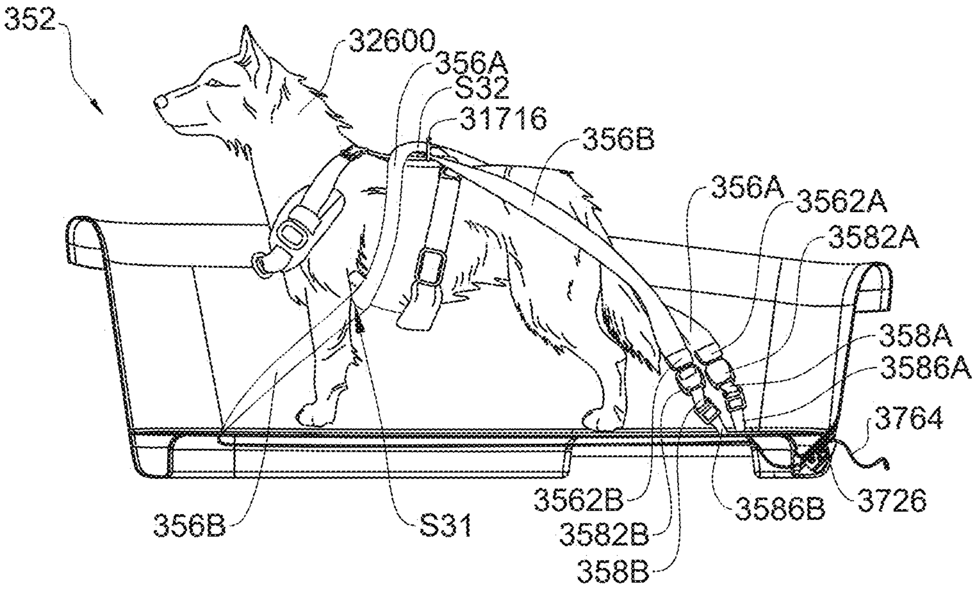

When a pet wears an existing vest similar to that shown in FIG. 36D, the shoulder belts of the pet carrier may also be crossed to increase the support for the pet. Referring to FIGS. 45 and 46, a pet travel system in use according to an embodiment of the present disclosure is schematically shown. In this embodiment, taking the pet carrier 352 shown in FIG. 24 and the vest shown in FIG. 36D as an example, it will be explained how the combination of the belt of the pet carrier 352 and the strap or strip of the vest can provide support for the pet confined in the box portion of the pet carrier 352. In order not to obscure the present disclosure, the structure or components of the pet carrier 352 or vest that are not necessary for the strap/strip combination of the present disclosure may not be shown in the drawings or redundantly described.

As shown, FIG. 45 is a top view schematically showing that a pet (such as a dog 32600) is restrained in the box portion of the pet carrier 352 of FIG. 24 and wears the vest of FIG. 36D, and FIG. 46 is a schematic side view of FIG. 45. In this embodiment, the shoulder belts 356A, 356B may protrude from the slots 3524A, 3524B, may be pulled upward to pass through a space between the two front legs of the dog 32600, and cross with each other at a position around the chest of the dog 32600, extend along the body of the dog 32600 to the back of the dog 32600, cross with each other again and extend through the annular member 31746, and may be latched to the buckle clips 3582A, 3582B with the respective tongue elements 3562A, 3562B, so as to be connected to the corresponding box belts 358B, 358A of the pet carrier. More specifically, due to the double crossing of the shoulder belts 356A, 356B at the chest of the dog 32600 and the position of the annular member 31716, respectively, the shoulder belt 356A may be connected to the box belt 358A by the tongue element 3562A provided in the buckle clip 3582A, and the shoulder belt 356B may be connected to the box belt 358B by the tongue element 3562B provided in the buckle clip 3582B. In this embodiment, for a relatively large dog 32600, the box belts 358A, 358B are preferably connected to the adjusting belts 3586A, 3586B through the ladder locks 3584A and 3584B, respectively.

In this embodiment, the shoulder belts 356A, 356B are not bound by any vest strap for supporting the dog 32600. On the contrary, by the double crossing of the shoulder belts 356A, 356B, two intersections S31, S32 in different planes are formed with respect to the dog 32600 (i.e., one intersection is located around the chest and the other intersection is located around the back). That is, when viewed from the head to the tail of the pet, the shoulder belts 356A, 356B first cross at a position close to the shoulder or chest (such as around the chest), that is, at a position (the intersection S31) close to the shoulder belt strap or chest strap (the first strap), then continue to extend, and again cross at a position around the back, that is, at a position (the intersection S32) close to the back strap (the second strap). The intersection S31 and the intersection S32 are formed as two third contact points between the shoulder belt and the pet vest, and the two third contact points are generally located at the central strap. More specifically, the two shoulder belts 356A, 356B are in direct contact with the shoulders of the dog 32600 on the chest side, thereby providing basic support for the dog 32600, and the intersection S31 formed around the chest of the dog 32600 and the intersection S32 formed around the back of the dog 32600 allow further support to be applied to the dog 32600 from different planes. In this embodiment, the shoulder belts support the dog 32600 in such a way that they are spirally wound around each other along the dog 32600, and therefore, there may be at least two intersections formed by belts extending along the body of the dog 32600. In this way, the present disclosure provides a relatively firm, stable and safe support for the dog 32600 compared with the existing transport cage or vest.

Figure 47:
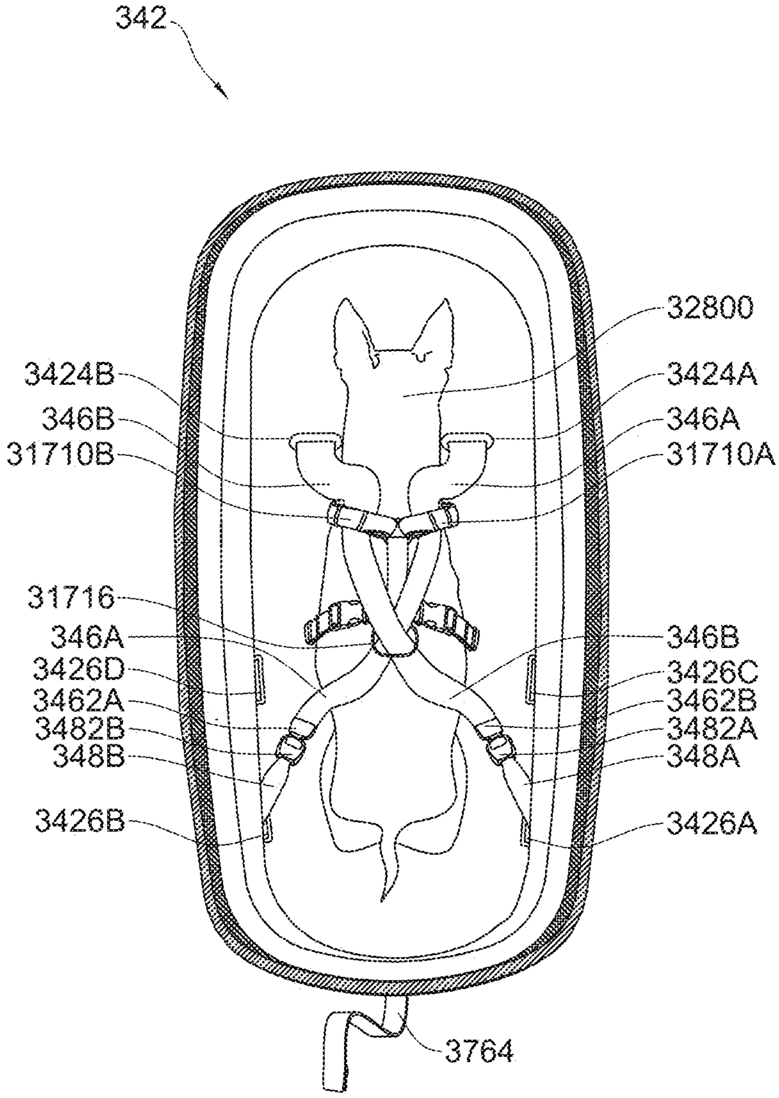
FIGS. 47 and 48 schematically show a pet travel system in use according to an embodiment of the third aspect of the present disclosure.
Figure 48:
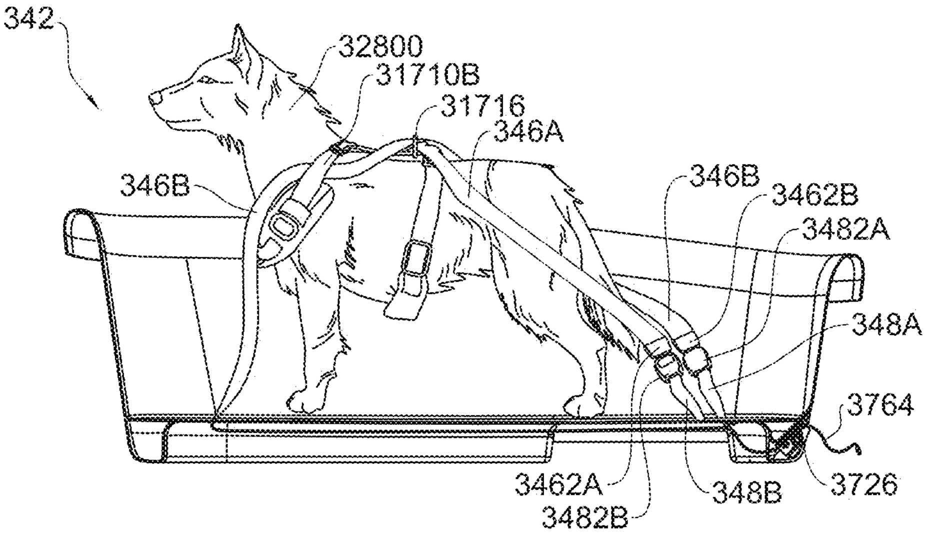

Referring to FIGS. 47 and 48, a pet travel system in use according to an embodiment of the present disclosure is schematically shown. In this embodiment, taking the pet carrier 342 and vest (vest 317A as shown in FIG. 36A) as an example, it will be explained how the combination of the belt of the pet carrier 342 and the strap or strip of the vest can provide support for the pet confined in the box portion of the pet carrier 342. In order not to obscure the present disclosure, the structure or components of the pet carrier 342 or vest that are not necessary for the strap/strip combination of the present disclosure may not be shown in the drawings and will not be redundantly described.

As shown, FIG. 47 is a top view schematically showing that a pet (such as a dog 32800) is restrained in the box portion of the pet carrier 342 of FIG. 23 and wears the vest of FIG. 36A, and FIG. 48 is a schematic side view of FIG. 47. In this embodiment, the shoulder belts 346A, 346B may protrude from the slots 3424A, 3424B, may be pulled upward to extend along respective two front legs of the dog 32800, pass through a gap between respective two shoulders of the dog 32800 and respective two shoulder straps 31710A, 31710B of the vest worn on the dog 32800, cross with each other and extend through the annular member 31716, and may be latched to the buckle clips 3582B, 3582A with the respective tongue elements 3562A, 3562B, so as to be connected to the corresponding box belts 358B, 358A of the pet carrier 342. More specifically, since the shoulder belts 346A, 346B cross at the position of the annular member 31716, the shoulder belt 346A may be connected to the box belt 348B by the tongue element 3462A provided in the buckle clip 3482B, and the shoulder belt 346B may be connected to the box belt 348A by the tongue element 3462B provided in the buckle clip 3482A.

Similarly, the user (or the pet owner) may pull the adjusting belt 3764 to adjust its tightness and fix the adjusting belt 3764 with the positioning buckle 3726 after adjustment. Since the adjusting belt 3764 is connected to two back belts (i.e., back belts 376A, 376B shown in FIGS. 26A and 26B), which are as same as the corresponding shoulder belts 346A, 346B of the pet carrier 342, the tightness of the shoulder belts 346A, 346B may be adjusted by pulling the adjusting belt 3764 to adapt to the body shape of the dog 32800.

As shown in FIGS. 47 and 48, in this embodiment, two shoulder belts 346A, 346B first extend parallel to each other along both sides of the vertebrae to form two contact points (i.e., first contact points, for example, two shoulder points) with a pet vest worn on the dog 32800, and then cross with each other to provide a third contact point at a crossing position around the annular member 31716. The shoulder point is on the shoulder of the dog 32800 (corresponding to the position of the dog's scapula, as shown in FIG. 21), which allows to provide firm, stable and safe support for the dog 32800 compared with the existing transport cage or vest. According to this embodiment, the third contact point at the crossing position around the annular member 31716 also allows for increased support for the dog 32800 and is safer for the dog 32800 in the moving vehicle. Therefore, even if the dog 32800 wears an existing vest similar to the vest 317A shown in FIG. 36A, the pet carrier 342 of the present disclosure can still provide relatively firm, stable and safe support for the dog 32800 compared with the existing transport cage or vest.

Figure 49:
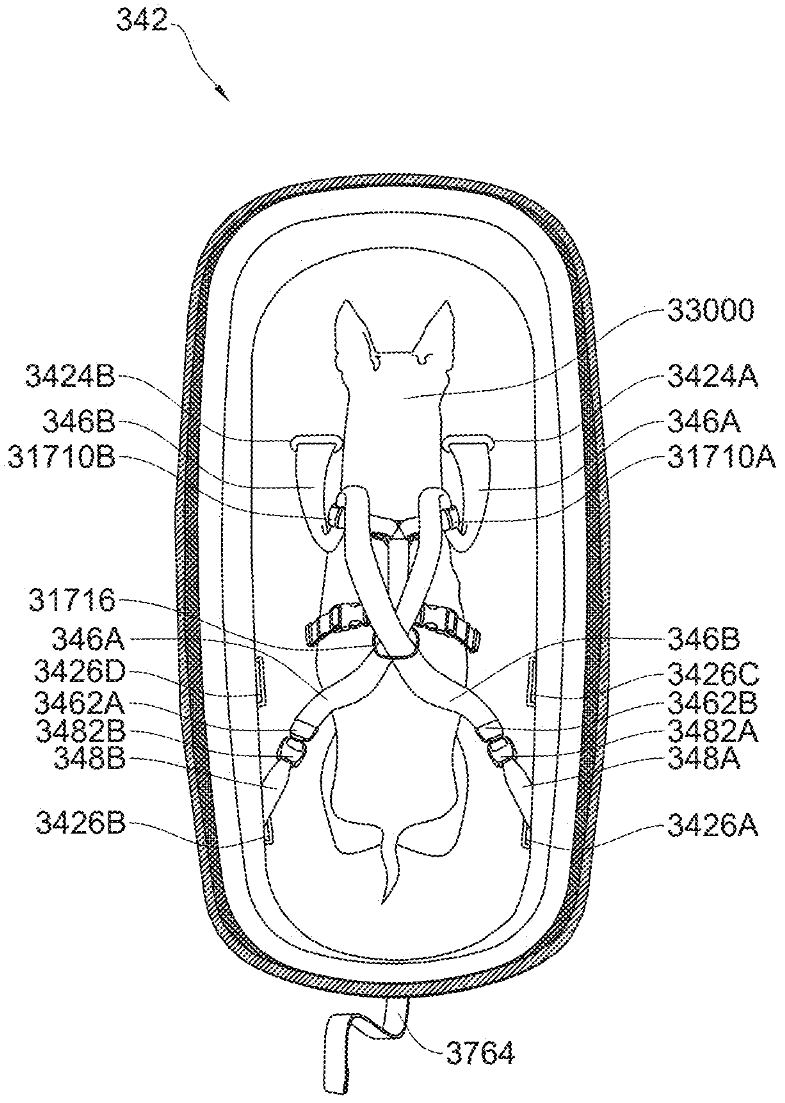
FIGS. 49, 49A and 49B schematically show a pet travel system in use according to an embodiment of the third aspect of the present disclosure.
Figure 49A:
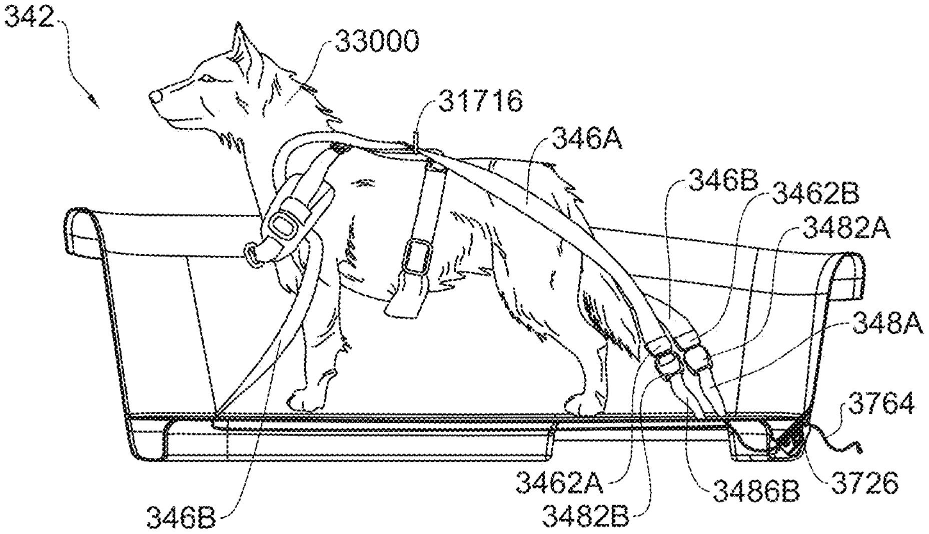
Figure 49B:
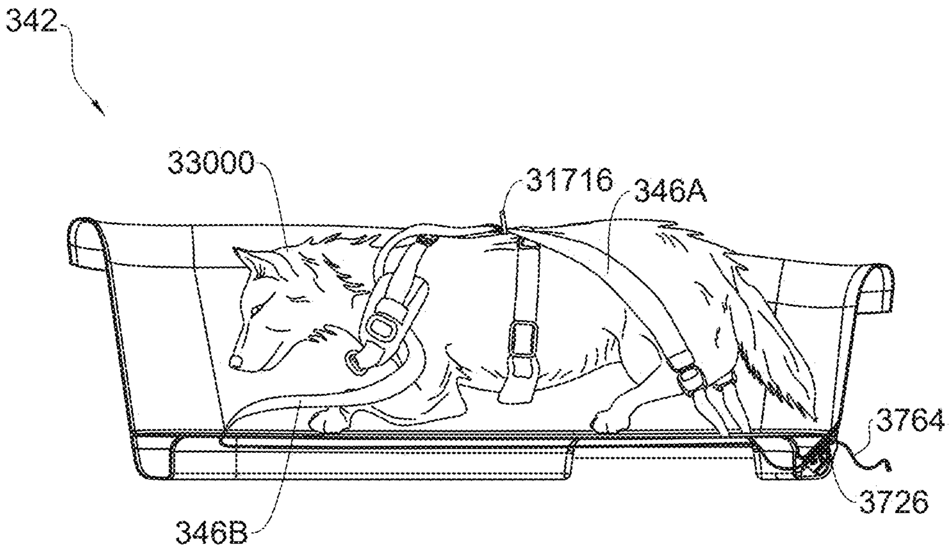

Referring to FIGS. 49, 49A and 49B, a pet travel system in use according to an embodiment of the present disclosure is schematically shown. In this embodiment, the pet carrier 342 and vest (vest 317A as shown in FIG. 36A) shown in FIG. 23 are also taken as an example to explain how the combination of the belt of the pet carrier 342 and the strap or strip of the vest provides support for the pet confined in the box portion of the pet carrier 342 in a different way from the embodiment shown in FIGS. 47 and 48. In order not to obscure the present disclosure, the structure or components of the pet carrier 342 or vest that are not necessary for the strap/strip combination of the present disclosure may not be shown in the drawings and will not be redundantly described.

As shown, FIG. 49 is a top view schematically showing that a pet (such as a dog 33000) is restrained in the box portion of the pet carrier 342 of FIG. 23 and wears the vest of FIG. 36A, while FIGS. 49A and 49B are schematic side views of FIG. 49, respectively showing that the dog 33000 is standing and lying in the pet carrier 342.

In this embodiment, the shoulder belts 346A, 346B may protrude from the slots 3424A, 3424B and be pulled upward to extend along the respective two front legs of the dog 33000. The shoulder belts 346A, 346B pass through gaps between the two shoulders of the dog 33000 and the two shoulder straps 31710A, 31710B of the vest worn on the dog 33000 from the lower and outer sides of the shoulder straps 31710A, 31710B, and extend to the periphery of two sides of the vertebrae of the dog 33000 along the shoulder straps 31710A, 31710B. The shoulder belts 346A, 346B further extend along the central strap of the vest, cross with each other and extend through the annular member 31716, and then are latched to the buckle clips 3482B, 3482A through the corresponding tongue elements 3462A, 3462B, thereby being connected to the corresponding box belts 348B, 348A of the pet carrier 342. More specifically, since the shoulder belts 346A, 346B cross at the position of the annular member 31716, the shoulder belt 346A may be connected to the box belt 348B by the tongue element 3462A provided in the buckle clip 3482B, and the shoulder belt 346B may be connected to the box belt 348A by the tongue element 3462B provided in the buckle clip 3482A.

The user (or the pet owner) may pull the adjusting belt 3764 to adjust its tightness and fix the adjusting belt 3764 with the positioning buckle 3726 after adjustment. Since the adjusting belt 3764 is connected to two back belts (i.e., back belts 376A, 376B shown in FIGS. 26A and 26B), which are same as the corresponding shoulder belts 346A, 346B of the pet carrier 342, the tightness of the shoulder belts 346A, 346B may be adjusted by pulling the adjusting belt 3764 to adapt to the body shape of the dog 33000.

Similarly, in this embodiment, the shoulder point (also called first contact points) is located at the shoulder of the dog 33000 (corresponding to the position of the dog's scapula, as shown in FIG. 21), which allows to provide firm, stable and safe support for the dog 33000 compared with the existing transport cage or vest. According to this embodiment, the third contact point at the intersection position around the annular member 31716 also allows for increased support for the dog 33000 and is safer for the dog 33000 in the moving vehicle. Therefore, even if the dog 33000 wears an existing vest similar to the vest 317A shown in FIG. 36A, the pet carrier 342 of the present disclosure can still provide relatively firm, stable and safe support for the dog 33000 compared with the existing transport cage or vest.

Figure 50:
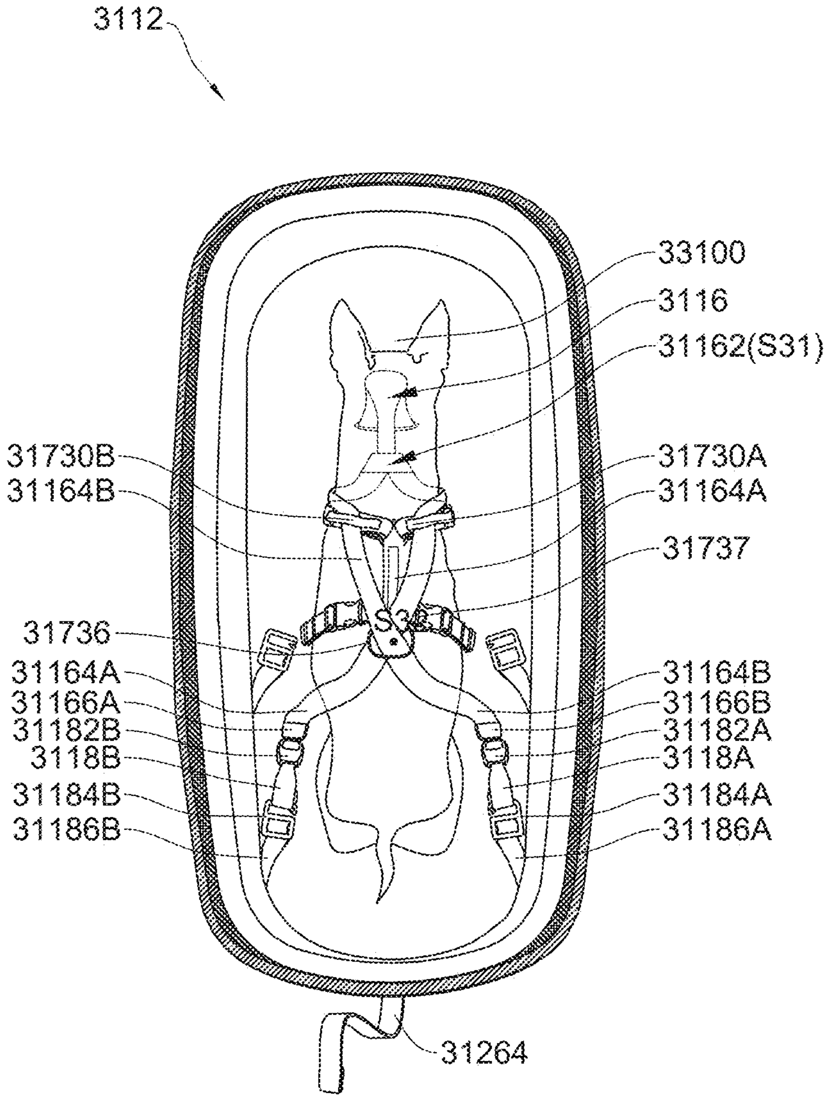
FIGS. 50 and 51 schematically show a pet travel system in use according to an embodiment of the third aspect of the present disclosure.
Figure 51:
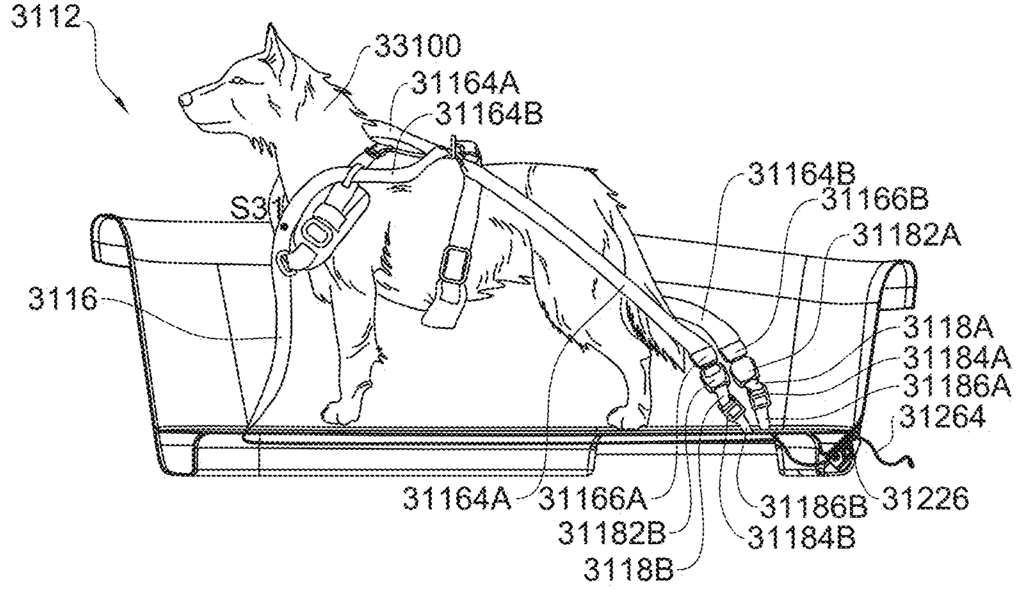

Referring to FIGS. 50 and 51, a pet travel system in use according to an embodiment of the present disclosure is schematically shown. In this embodiment, taking the pet carrier 3112 and vest (vest 317C as shown in FIG. 30) as an example, it will be explained how the combination of the belt of the pet carrier 3112 and the strap or strip of the vest can provide support for the pet confined in the box portion of the pet carrier 3112. In order not to obscure the present disclosure, the structure or components of the pet carrier 3112 or vest that are not necessary for the strap/strip combination of the present disclosure may not be shown in the drawings and are not redundantly described.

As shown, FIG. 50 is a top view schematically showing that a pet (such as a dog 33100) is restrained in the box portion of the pet carrier 3112 of FIG. 30 and wears the vest of FIG. 36C, and FIG. 51 is a schematic side view of FIG. 50. In this embodiment, an extension section 3116 of the Y-belt may protrude from the slot (i.e., the slot 31124 shown in FIG. 30) and may be pulled upward to extend along the chest of the dog 33100, and two separate shoulder sections 31164A, 31164B (which are connected to the extension section 3116 through the connecting portion 31162 protruding therefrom) extend along respective two shoulder straps 31730A, 31730B of the vest worn on the dog 32800, and pass through a respective ring formed by the webbings 31731A, 31731B. The two shoulder sections 31164A, 31164B cross with each other and extend through the annular member 31716, and then are latched to the buckle clips 31182B, 31182A with corresponding tongue elements, thereby being connected to the corresponding box belts 3118B, 3118A of the pet carrier 3112. More specifically, since the shoulder sections 31164A, 31164B intersect at the position of the annular member 31716, the shoulder section 31164A may be connected to the box belt 3118B by the tongue element provided in the buckle clip 31182B, and the shoulder section 31164B may be connected to the box belt 3118A by the tongue element provided in the buckle clip 31182A. Preferably, in this embodiment, for a relatively large dog 33100, the box belts 3118A, 3118B are connected to adjusting belts 31186A, 31186B through ladder locks 31184A, 31184B, respectively.

In this embodiment, the connecting portion 31162 may be used as an intersection on a chest plane of the dog 33100 (e.g., the intersection S31 as a third contact point), while the shoulder sections 31164A, 31164B form the second intersection S32 (i.e., another third contact point) on a back plane of the dog 33100. Therefore, even if the shoulder sections 31164A, 31164B are not constrained by any vest strap for supporting the dog 33100, the two intersections S31, S32 are located in different planes (i.e., one is located around the chest and the other is located around the back) with respect to the dog 33100, and stable supporting force is still allowed to be applied to the dog 33100 from different planes. In this way, the present disclosure allows providing a relatively firm, stable and safe support for the dog 33100 as compared with the existing transport cage or vest.

Figure 52:
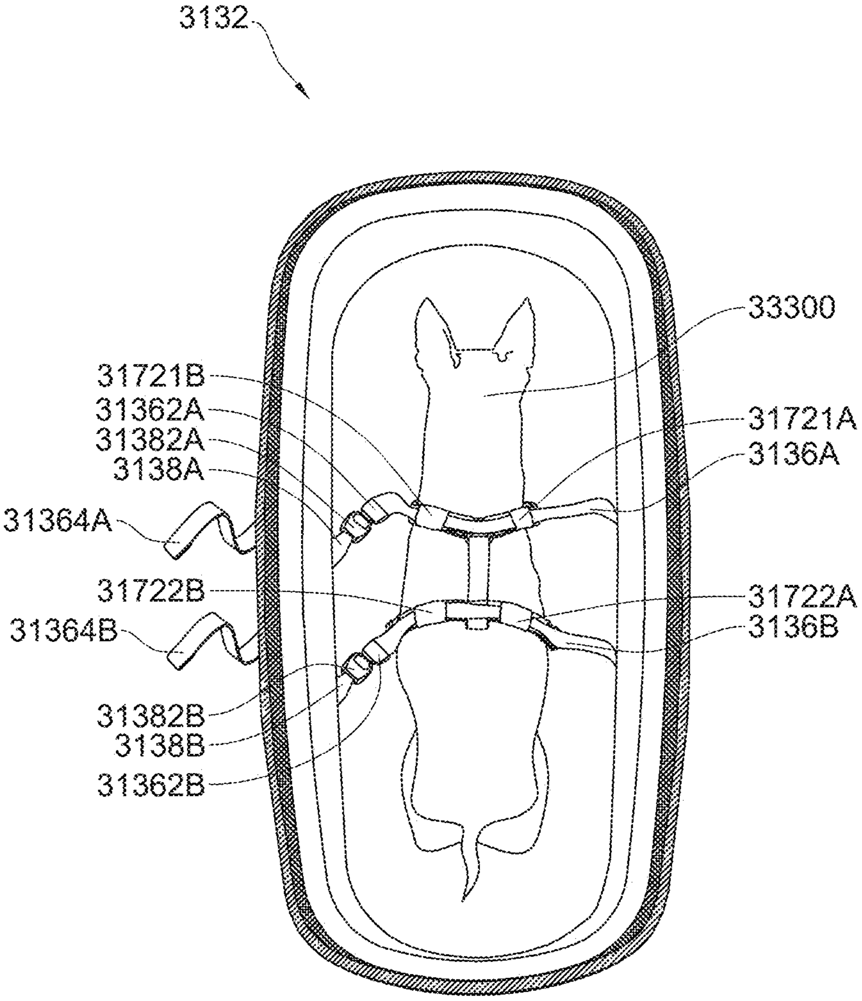
FIGS. 52 and 53 schematically show a pet travel system in use according to an embodiment of the third aspect of the present disclosure.
Figure 53:
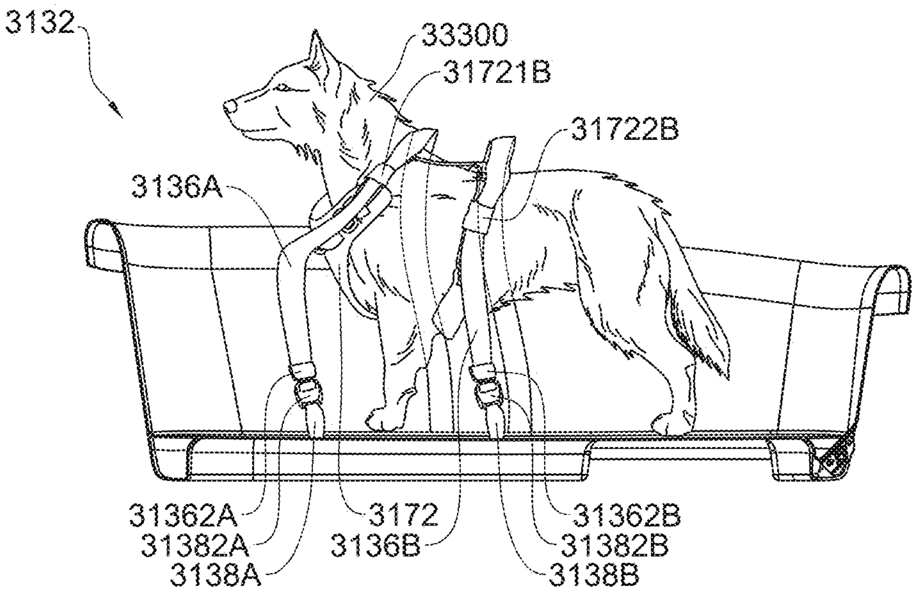

Referring to FIGS. 52 and 53, a pet travel system in use according to an embodiment of the present disclosure is schematically shown. In this embodiment, taking the pet carrier 3132 shown in FIG. 32 and the vest (similar to the vest shown in FIG. 36B, in which the fixing direction of the webbing on the shoulder belt and the back strap is different from the original fixing direction of the webbing in FIG. 36B) with webbing attached to the shoulder strap and its back strap as an example, it will be explained how the combination of the belt of the pet carrier 3132 and the strap or strip of the vest can provide support for the pet confined in the box portion of the pet carrier 3132. In order not to obscure the present disclosure, the structure or components of the pet carrier 3132 or vest that are not necessary for the strap/strip combination of the present disclosure may not be shown in the drawings and will not be redundantly described.

As shown in the figure, FIG. 52 is a top view schematically showing that a pet (such as a dog 33300) wears a vest (similar to the vest shown in FIG. 36B) and is restrained in the box portion of the pet carrier 3132 of FIG. 32, and FIG. 53 is a schematic side view of FIG. 52. In this embodiment, fastening belts 3136A, 3136B of the pet carrier 3132 spaced apart from each other by a predetermined interval protrude from the seat portion, pass through an interface between the bottom portion and one long side of the box portion of the pet carrier 3132, and are latched to fixing belts 3138A, 3138B fixed on opposite sides of the box portion of the pet carrier 3132. The fastening belt 3136A is pulled to pass through a ring formed by the webbing 31721A and a right shoulder strap of the vest, and then passes through a ring formed by the webbing 31721B and a left shoulder strap of the vest. The fastening belt 3136B is pulled upward to pass through the ring formed by the webbing 31722A and the right back strap of the vest, and then passes through the ring formed by the webbing 31722B and the left back strap of the vest. The fastening belts 3136A, 3136B may thus extend parallel to each other to be connected to the corresponding fixing belts 3138A, 3138B by the corresponding tongue elements 31362A, 31362B provided in the buckle clips 31382A, 31382B.

The user (or the pet owner) may pull the corresponding adjusting belts 31364A, 31364B to adjust their tightness, and fix the adjusting belts 31364A, 31364B with corresponding positioning buckles (not shown) after adjustment. Since the corresponding adjusting belts 31364A, 31364B are the same belt as the corresponding fastening belts 3136A, 3136B of the pet carrier 3132, the tightness of the fastening belt 3136 may be adjusted by pulling the corresponding adjusting belts 31364A, 31364B to adapt to the body shape of the dog 33300.

In this embodiment, the fastening belts 3136A, 3136B pass parallel to each other from one long side to an opposite long side of the pet carrier 3132, and contact with the shoulder strap and the back strap along the lengths of the fastening belts, and thereby forming two linear contact regions parallel to each other, including one linear contact region passing through the shoulder (corresponding to a position of the dog's scapula, as shown in FIG. 21) of the dog 33300 and another linear contact region passing through the middle back (corresponding to both sides of the thoracic vertebrae, as shown in FIG. 21) of the dog 33300. Compared with the existing transport cage or vest, the two linear contact regions, especially the regions passing through the two shoulder portions of the dog 33300, allow the dog 33300 to be provided with relatively firm, stable and safe support. In addition, the parallel configuration of the fastening belts 3136A, 3136B may provide a relatively large range of motion for the dog 33300, to avoid the dog 33300 from feeling uncomfortable due to excessive restriction.

Figure 54:
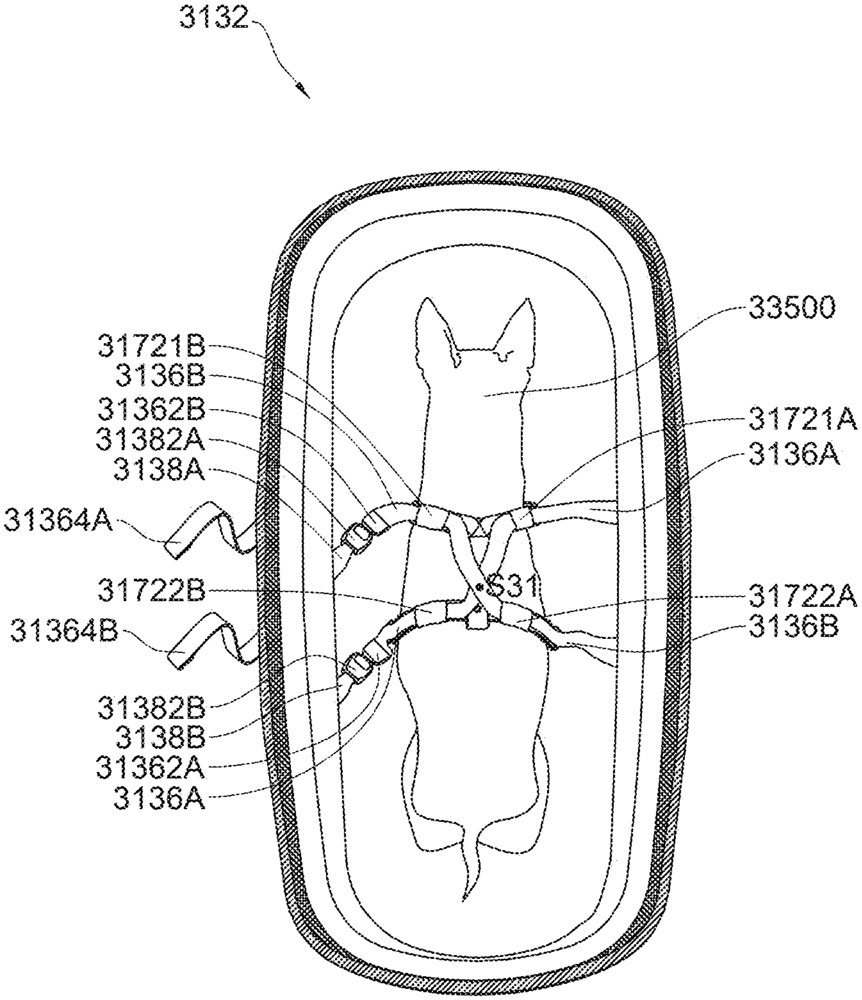
FIGS. 54 and 55 schematically show a pet travel system in use according to an embodiment of the third aspect of the present disclosure.
Figure 55:
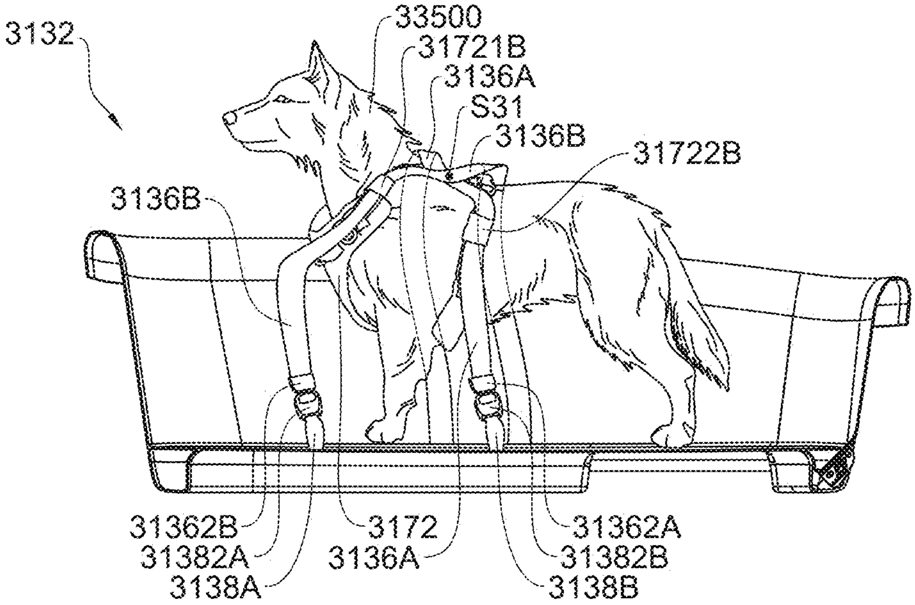

Referring to FIGS. 54 and 55, a pet travel system in use according to an embodiment of the present disclosure is schematically shown. In this embodiment, the pet carrier 3132 shown in FIG. 32 and the vest (vest 317B as shown in FIG. 36B) are also taken as an example to explain how the combination of the belt of the pet carrier 3132 and the strap or strip of the vest can provide support for the pet confined in the box portion of the pet carrier 3132 in a different way from the embodiment shown in FIGS. 52 and 53. In order not to obscure the present disclosure, the structure or components of the pet carrier 3132 or vest that are not necessary for the strap/strip combination of the present disclosure may not be shown in the drawings and will not be redundantly described.

As shown, FIG. 54 is a top view schematically showing that a pet (such as a dog 33500) wears a vest (similar to the vest shown in FIG. 36B, in which the fixing direction of the webbing on the shoulder strap and the back strap is different from the original fixing direction of the webbing in FIG. 36B) and is restrained in the box portion of the pet carrier 3132 of FIG. 32, and FIG. 55 is a schematic side view of FIG. 54. In this embodiment, the fastening belts 3136A, 3136B of the pet carrier 3132 spaced apart from each other by a predetermined interval protrude from the seat portion, pass through an interface between the bottom portion and one long side of the box portion of the pet carrier 3132, and are latched to the corresponding fixing belts 3138B, 3138A fixed on the opposite sides of the box portion of the pet carrier 3132. More specifically, the fastening belt 3136A is pulled up to pass through a ring formed by the webbing 31721A and the right shoulder strap of the vest, and then passes through a ring formed by the webbing 31722B and the left back strap of the vest. The fastening belt 3136B is pulled up to pass through the ring formed by the webbing 31722A and the right back strap of the vest, and then passes through the ring formed by the webbing 31721B and the left shoulder strap of the vest. In other words, the fastening belts 3136A, 3136B cross with each other at a position on the central strap of the vest to form the intersection S31 on the back (corresponding to a position on the vertebrae) of the dog 33300. The fastening belts 3136A, 3136B are connected to the corresponding fixing belts 3138B, 3138A by the corresponding tongue elements 31362A, 31362B provided in the buckle clips 31382B, 31382A.

Similarly, the user (or the pet owner) may pull the corresponding adjusting belts 31364A, 31364B to adjust their tightness, and fix the adjusting belts 31364A, 31364B with corresponding positioning buckles (not shown) after adjustment. Since the corresponding adjusting belts 31364A, 31364B are the same belt as the corresponding fastening belts 3136A, 3136B of the pet carrier 3132, the tightness of the fastening belts 3136A, 3136B may be adjusted by pulling the corresponding adjusting belts 31364A, 31364B to adapt to the body shape of the dog 33500.

In this embodiment, the fastening belt 3136A forms a first contact point (i.e., a shoulder point) with the vest worn on the dog 33500 by passing through the ring formed by the webbing 31721A and the right shoulder strap of the vest, and a second contact point (e.g., a back point) by passing through the ring formed by the webbing 31722B and the left back strap of the vest. Similarly, the fastening belt 3136B forms another second contact point (i.e., another back point) by passing through the ring formed by the webbing 31722A and the right back strap of the vest, and another first contact point (e.g., another shoulder point) by passing through the ring formed by the webbing 31721B and the left shoulder strap of the vest. The intersection of the fastening belts 3136A, 3136B provides a third contact point (i.e., the intersection S31) at the intersection position of the central strip. The two shoulder points are located at the corresponding shoulders of the dog 33500 (corresponding to the position of the dog's scapula, as shown in FIG. 21), which allows to provide firm, stable and safe support for the dog 33500 compared with the existing transport cage or vest. The intersection S31 according to this embodiment also allows increased support for the dog 33500. Such a five-point support (e.g., two shoulder points, two back points, and one intersection) allows for safer support for the dog 33500 in the moving vehicle.

Figure 56:
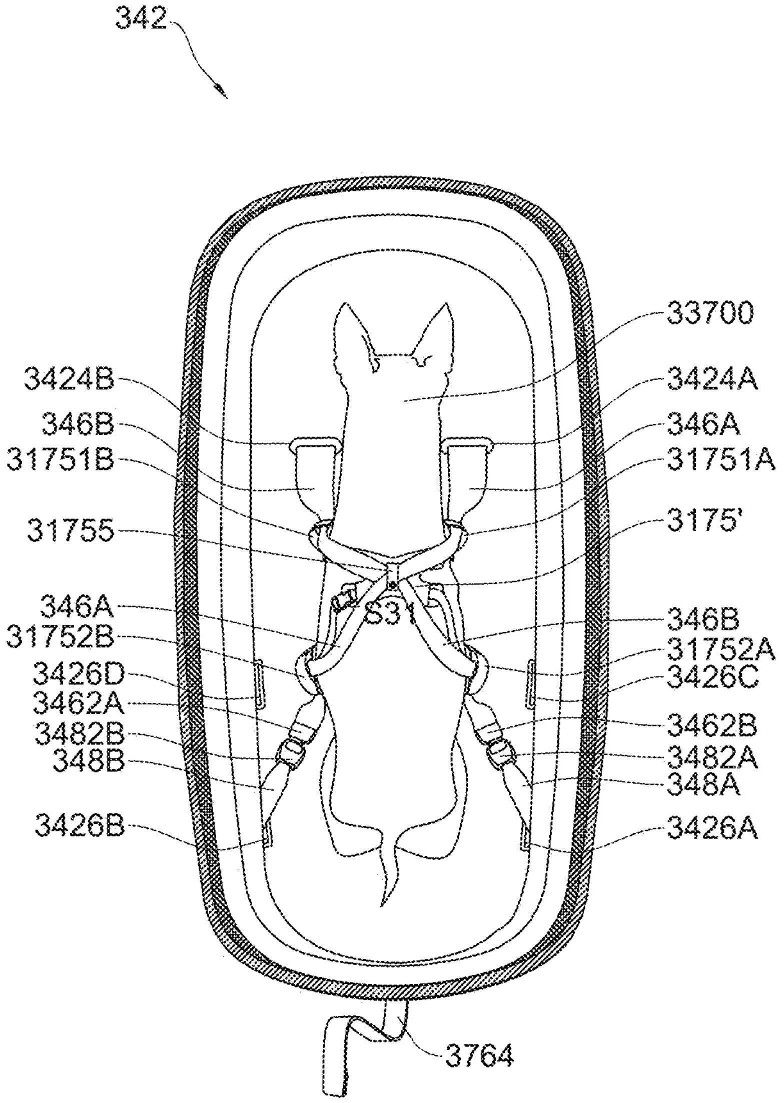
FIGS. 56 and 57 schematically show a pet travel system in use according to an embodiment of the third aspect of the present disclosure.
Figure 57:
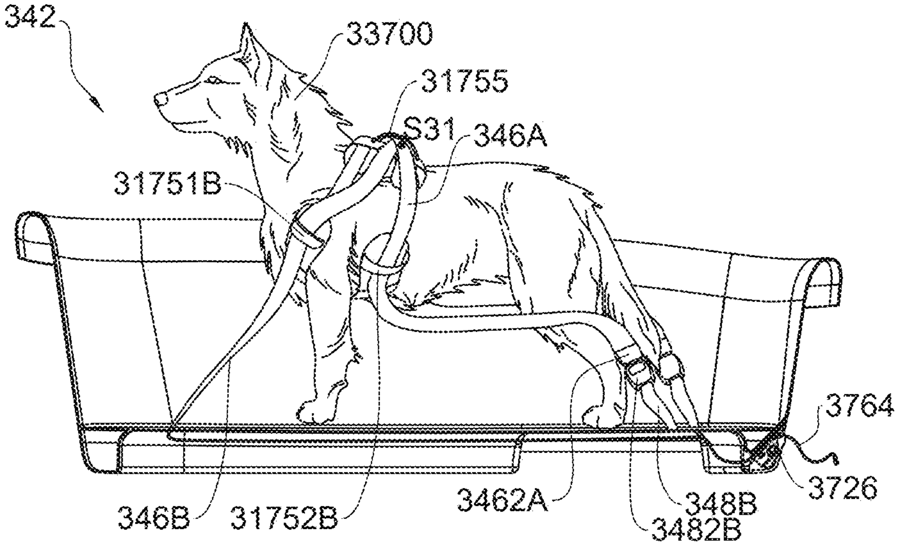

Referring to FIGS. 56 and 57, a pet travel system in use according to an embodiment of the present disclosure is schematically shown. In this embodiment, taking the pet carrier 342 shown in FIG. 23 and the vest (the vest 317E shown in FIG. 36E) as an example, it will be explained how the combination of the belt of the pet carrier 342 and the strap or strip of the vest can provide support for the pet confined in the box portion of the pet carrier 342. In order not to obscure the present disclosure, the structure or components of the pet carrier 342 or vest that are not necessary for the strap/strip combination of the present disclosure may not be shown in the drawings and will not be redundantly described.

As shown, FIG. 56 is a top view schematically showing that a pet (such as a dog 33700) wears the vest of FIG. 36E and is restrained in the box portion of the pet carrier 342 of FIG. 23, and FIG. 57 is a schematic side view of FIG. 56. In this embodiment, the shoulder belts 346A, 346B may protrude from the slots 3424A, 3424B, may be pulled upward to extend along the respective two front legs of the dog 33700, pass through the ring formed by the respective webbings 31751A, 31751B and the chest pad 3175 of the vest from a lower side of the strap, extend along the body of the dog 33700 to cross with each other at the position of the back of the dog 33700, and then pass through the ring formed by the corresponding webbings 31752B, 31752A and the back pad 3175' of the vest, and may be latched to the buckle clips 3482B, 3482A with the corresponding tongue elements 3462A, 3462B, thereby being connected to the corresponding box belts 348B, 348A of the pet carrier 342. More specifically, due to the intersection of the shoulder belts 346A, 346B at the intersection S31, the shoulder belt 346A may be connected to the box belt 348B by the tongue element 3462A provided in the buckle clip 3482B, and the shoulder belt 346B may be connected to the box belt 348A by the tongue element 3462B provided in the buckle clip 3482A. Preferably, the shoulder belts 346A, 346B may pass through the ring formed by the webbing 31755 and the back pad 3175' on the vest, and cross with each other in the ring to prevent the belts from moving easily.

Similarly, the user (or the pet owner) may pull the adjusting belt 3764 to adjust its tightness and fix the adjusting belt 3764 with the positioning buckle 3726 after adjustment. Since the adjusting belt 3764 is connected to two back belts (i.e., the back belts 376A, 376B shown in FIGS. 26A and 26B), which are the same belt as the corresponding shoulder belts 346A, 346B of the pet carrier 342, the tightness of the shoulder belts 346A, 346B may be adjusted by pulling the adjusting belt 3764 to adapt to the body shape of the dog 33700.

As shown in FIG. 56 and FIG. 57, in this embodiment, two shoulder belts 346A, 346B contact with the vest at four points to form four contact points, which include two shoulder points (i.e., the first contact point on the shoulder, corresponding to the position of the dog's scapula, as shown in FIG. 21) and two abdominal points around two sides of the hypogastrium of the dog 3700 (also called as "forth contact point" of the shoulder belt and the pet vest). In addition, the crossing of the belts 346A, 346B at the intersection S31 allows increased support for the dog 33700. In this five-point support mode, it is allowed to support the dog 33700 in the moving vehicle more safely.

Figure 58:
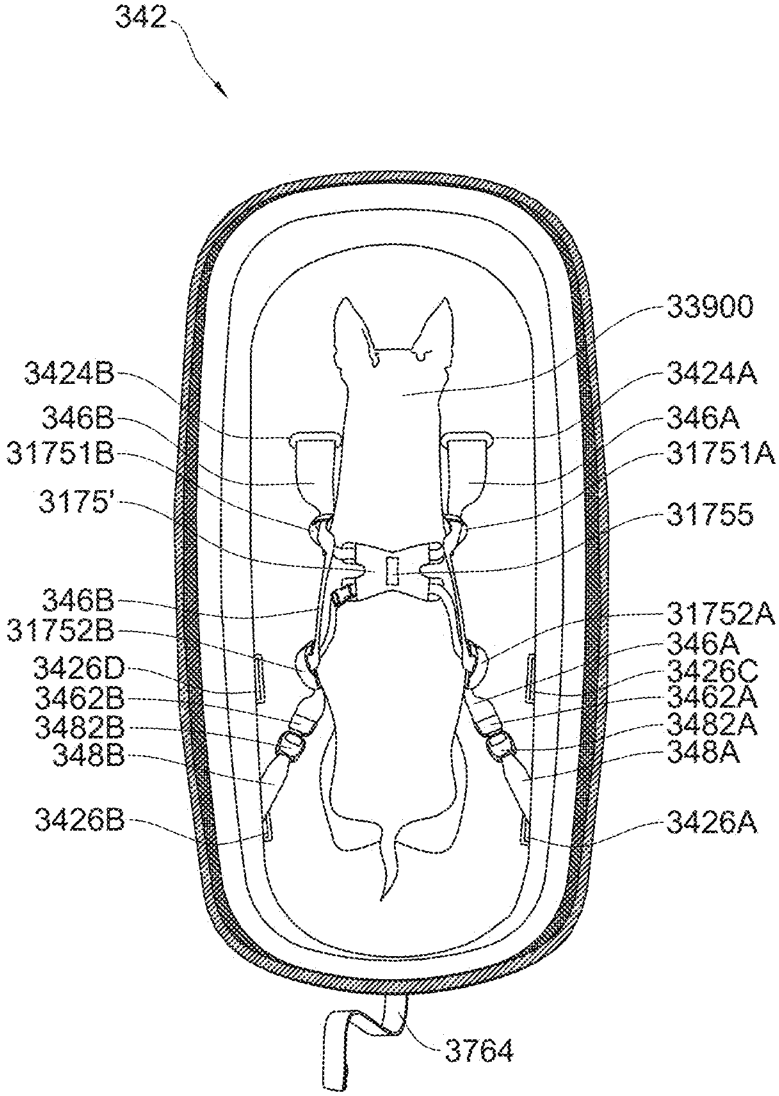
FIGS. 58 and 59 schematically show a pet travel system in use according to an embodiment of the third aspect of the present disclosure.
Figure 59:
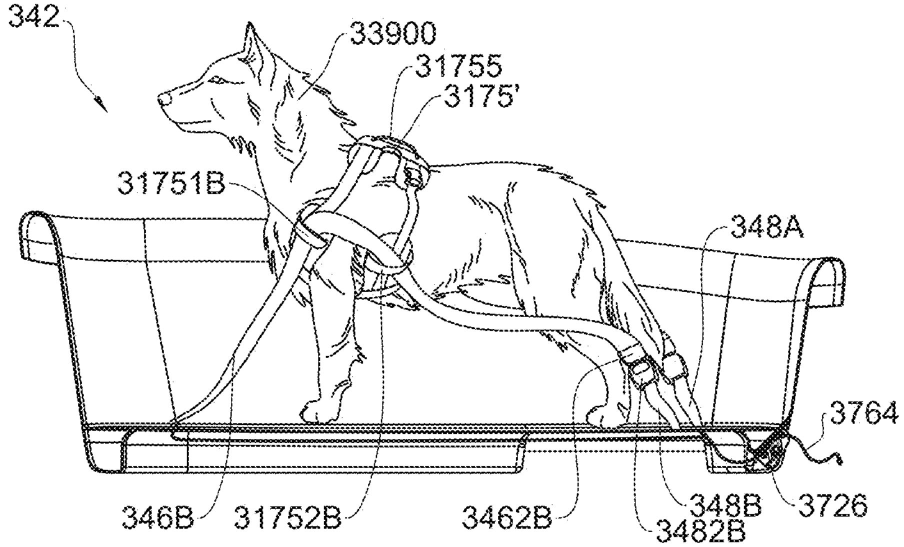

Referring to FIGS. 58 and 59, a pet travel system in use according to an embodiment of the present disclosure is schematically shown. In this embodiment, taking the pet carrier 342 and vest (vest 317E shown in FIG. 36E) shown in FIG. 23 as an example, it is explained how the combination of the belt of the pet carrier 342 and the strap or strip of the vest can provide support for the pet confined in the box portion of the pet carrier 342 in a different way from the embodiment shown in FIGS. 56 and 57. In order not to obscure the present disclosure, the structure or components of the pet carrier 342 or vest that are not necessary for the strap/strip combination of the present disclosure may not be shown in the drawings and will not be redundantly described.

As shown, FIG. 58 is a top view schematically showing that a pet (such as a dog 33900) wears the vest of FIG. 36E and is restrained in the box portion of the pet carrier 342 of FIG. 23, and FIG. 59 is a schematic side view of FIG. 58. In this embodiment, the shoulder belts 346A, 346B may protrude from the slots 3424A and 3424B, may be pulled upward to extend along the respective two front legs of the dog 33900, and pass through the ring formed by the respective webbings 31751A, 31751B and the chest pad 3175 of the vest from the lower side of the strap. The shoulder belts 346A, 346B may extend in the longitudinal direction along both sides of the body of the dog 33700, and pass through the ring formed by the corresponding webbings 31752A, 31752B and the chest pad 3175 of the vest, and may be latched to the buckle clips 3482A, 3482B with the corresponding tongue elements 3462A, 3462B, so as to be connected to the corresponding box belts 348A, 348B of the pet carrier 342.

Similarly, the user (or the pet owner) may pull the adjusting belt 3764 to adjust its tightness and fix the adjusting belt 3764 with the positioning buckle 3726 after adjustment. Since the adjusting belt 3764 is connected to two back belts (i.e., back belts 376A, 376B shown in FIGS. 26A and 26B), which are the same belt as the corresponding shoulder belts 346A, 346B of the pet carrier 342, the tightness of the shoulder belts 346A, 346B may be adjusted by pulling the adjusting belt 3764 to adapt to the body shape of the dog 33900.

In this embodiment, the shoulder belts 346A, 346B extend in parallel, compared with those shown in FIGS. 56 and 57, no intersection is formed in this embodiment. However, in this way, compared with the existing transport cages or vest, four contact points, especially two shoulder points, still allow to provide relatively firm, stable and safe support for the dog 33900.

It should be noted that the "shoulder belt" in the third aspect of the present disclosure is similar to the "binding webbing" in the second aspect of the present disclosure, and the "fastening belt" may also be regarded as another binding webbing. That is, the pet carrier of each embodiment of the third aspect may include a binding device having a binding webbing. The binding webbing may include the shoulder belt and/or the fastening belt, which pass through the slot at the bottom portion of the pet carrier to cooperate with a corresponding connecting element (such as a corresponding structure of the pet harness, the vest, etc.) of the wearable item and the like for the pet, so as to confine the pet in the accommodation space formed by the box portion (also called as "box body") of the pet carrier. Optionally, the box body (e.g., the binding device) may further include a box belt which protrudes from corresponding other slots at the bottom portion of the box portion, and further, the shoulder belt may be connected to the box belt to restrain the pet in the box portion.

In addition, the "ring" formed by the shoulder strap, the back strap and the center strap and the webbing of the vest in the third aspect of the present disclosure may correspond to the "connecting element" of the pet vest in the second aspect of the present disclosure.

Baseless-Securing of Pet Carrier and Vehicle

Although the above illustration relates to the pet travel device or the pet travel system, which includes a base for fixing the pet carrier to the vehicle, it should be noted that the pet carrier or pet travel system as shown in the figure may be fixed to the vehicle without a base. It can be understood by those skilled in the art that the pet carrier or the pet travel system according to the present disclosure may be fixed to the vehicle through an integrated anchoring system, or combined with a top strap anchoring system and an integrated anchoring system (as shown in FIG. 60 or FIG. 61), or fixed through a safety belt of an automobile (as shown in FIG. 62).

A pet travel device with a rigid anchoring system includes a storage compartment for storing anchors. Therefore, the anchor may not protrude outward from an outward facing side of a housing of the seat portion. A shape of the storage compartment may correspond to a shape of the anchor. A size of the storage compartment may also be set to be substantially similar to that of the anchor. The rigid anchoring system may be telescopically adjustable, which is formed along the side of the seat portion and is switched between a storage position and an operation position. When the rigid anchoring system is in the storage position, it will be completely arranged in the storage compartment space of the seat portion. In some embodiments, the rigid anchoring system further includes a cross member to adjust a distance between the anchors. When the rigid anchoring system is in the operation position, by releasing a button, the anchor may protrude from the housing of the seat portion by sliding or rotating for mounting to the vehicle seat. The seat portion also includes legs under the carrier or positioned in a space between the anchors. The legs may move between an unfolded mode and a folded mode. In the unfolded mode, the legs extend beyond the outer surface of the seat portion. The legs may be coupled to at least one of the anchors such that movement of one or two anchors may cause the legs to move relative to the pet carrier and the one or two anchors. The movement of the anchor may be different or opposite to the movement of the legs. For example, when the anchor rotates counterclockwise, the legs may rotate clockwise, and vice versa.

Figure 60:
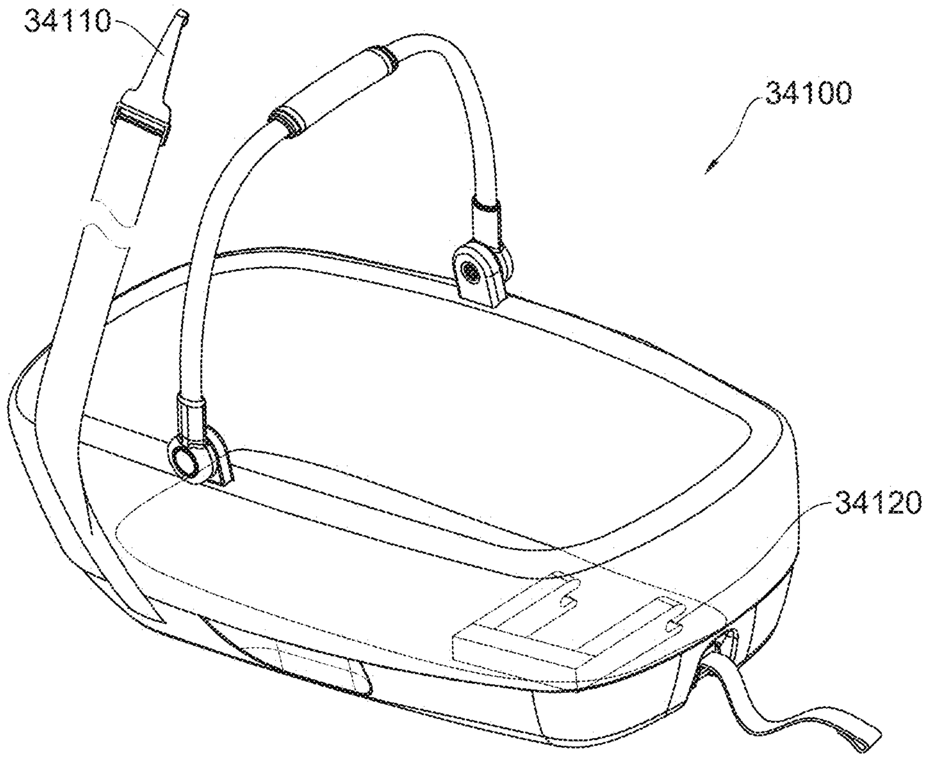
FIG. 60 schematically shows a perspective view of base-less-securing of a pet carrier to a vehicle according to an embodiment of the third aspect of the present disclosure.

FIG. 60 schematically shows a pet carrier 34100 with a combination of a soft latch system and a rigid latch system for fixing to a vehicle. As shown in the figure, the soft latch is a third anchoring point in addition to the integrated rigid anchoring system (such as ISOFIX connector 34120, which forms one or more anchoring points). The soft latch system includes one or more anchors that may be positioned diagonally relative to the rigid latch system. The soft latch system may be integrated with the rigid latch system provided on the opposite surface of the seat portion. In some embodiments, the rigid latch system further includes a rotatable anchor and an extendable legs as described above. The soft latch system includes a top strap and at least one anchor. The top strap is a piece of webbing used as a top strap, which is attached to the rear portion of the pet carrier 34100 by a crook 34110 at the end. The top strap may be tightened and fixed to the vehicle seat by the crook 34110.

Figure 61:
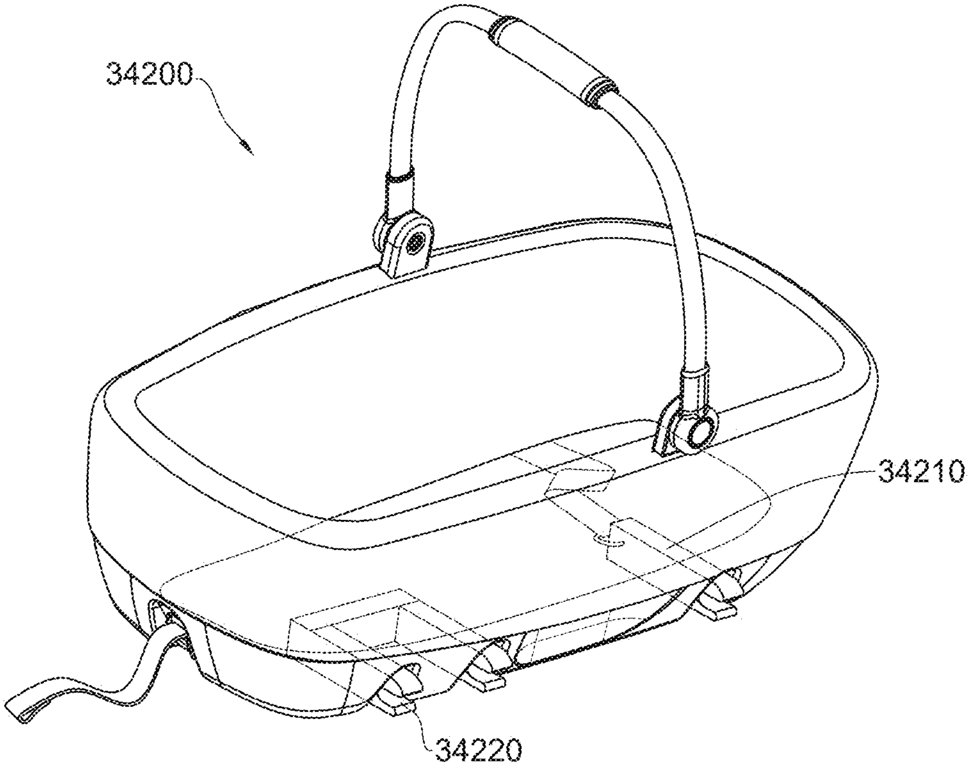
FIG. 61 schematically shows a perspective view of base-less-securing of the pet carrier to the vehicle according to another embodiment of the third aspect of the present disclosure.
Figure 62:
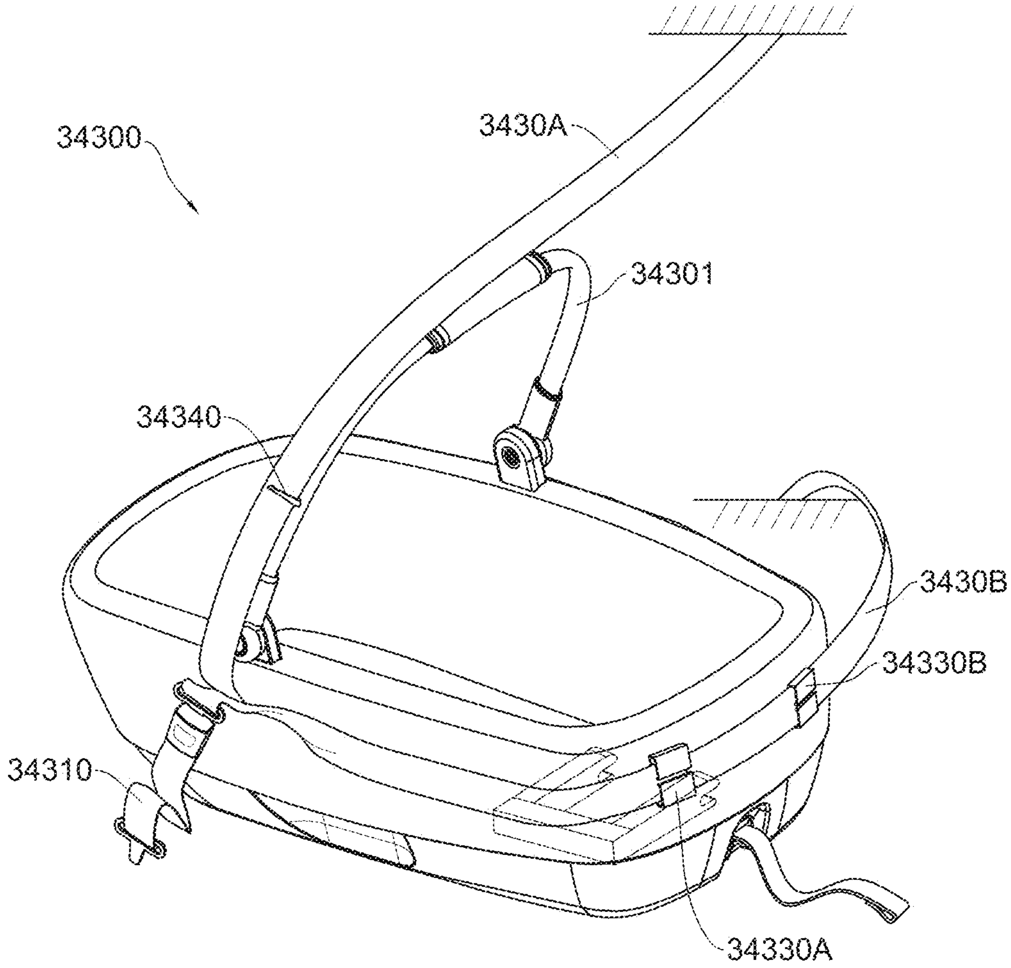
FIG. 62 schematically shows a perspective view of base-less-securing of the pet carrier to the vehicle according to yet another embodiment of the third aspect of the present disclosure.

FIG. 61 schematically shows a pet carrier 34200 with a combination of a soft latch system and a rigid latch system for fixing to a vehicle. The soft latch system and the rigid latch system may be provided at a same surface of the seat portion. The rigid latch system may also include a rotatable anchor and an extendable legs as described above. As shown in the figure, the pet carrier 34200 includes a length of webbing that is attached to the rear portion of the pet carrier 34200 through the ISOFIX connector 34210 (which may also be referred to as the second fixing device) to be fixed to the vehicle. In addition, the pet carrier 34200 further includes a rigid frame 34220 (which may also be referred to as the first fixing device) forming an ISOFIX, which has two connectors fixed to the vehicle.

FIG. 62 schematically shows that the pet carrier 34300 is fixed to the vehicle by a safety belt on the vehicle. As shown in the figure, the safety belt of an automobile may include a safety belt shoulder belt 3430A (also referred to as a safety belt chest belt) and a safety belt belly belt 3430B, which are connected to each other at ends to be engaged in a buckle. The safety belt shoulder belt 3430A may contact and extend along the handle 34301 of the pet carrier 34300, and the safety belt belly belt 3430B extends along the side periphery of the pet carrier 34300 under the guidance of the guide elements 34330A, 34330B. The guide elements 34330A, 34330B may be attachments of the pet carrier 34300 attached or fixed to the pet carrier 34300. Safety belts (i.e., both the safety belt shoulder belt 3430A and the safety belt belly belt 3430B) are connected to the extension strap 34310, which may be an attachment of the pet carrier 34300. The extension strap 34310 is further engaged in a buckle (not shown) fixed to the vehicle. In this embodiment, the safety belt shoulder belt 3430A may be fixed to the handle 34301 through an optional guide element 34340 (e.g., a clip) to be supported and not easily moved.

Certainly, the pet carrier or pet travel system in various embodiments of the third aspect of the present disclosure may also be provided with the "integrated fixing device" as described in the first aspect of the present disclosure, and the pet carrier or the pet travel system may be installed on the vehicle seat through the integrated fixing device.

In addition, it should be noted that other components or structures of various embodiments of the present disclosure may be arbitrarily or selectively combined with each other, without interfering with the structure (i.e., maintaining the structural integrity).

On the one hand, the present disclosure provides a carrier with an integrated fixing device and a corresponding fixing device. According to the present disclosure, a fixing device of the carrier is directly fixed or embedded in a bottom portion of a box body of a carrier, so the box body of the carrier itself may be directly and stably fixed to the vehicle seat without matching with another fixing base (or a base with a supporting leg) to complete the stable installation of the carrier in the vehicle.

The present disclosure also provides a vehicle with changeable fixing direction. With the integrated fixing device of the carrier disclosed in the present disclosure, the carrier may be quickly and easily fixed to a left side (i.e., behind the driver's seat) or a right side (i.e., behind the assistant seat) of the rear seat of the carrier according to the actual application requirements.

The present disclosure provides a carrier, which includes: a box body, including a bottom portion and a peripheral wall connected to the bottom portion, the box body defining a carrying space for accommodating an animal; and a first fixing device, including: a primary frame, combined with the bottom portion of the box body; a connecting frame, including a pair of longitudinal connecting brackets connected to the primary frame and movable relative to the primary frame; and a pair of connectors, connected to respective ends of the pair of longitudinal connecting brackets and extending out of a first side of the box body along with a movement of the connecting frame relative to the primary frame, the carrier being fixed to a vehicle seat through the pair of connectors.

In an embodiment, the connecting frame further includes a transverse rod which connects the pair of longitudinal connecting brackets.

In an embodiment, the box body further includes: at least one bottom board opening formed at the bottom portion and penetrates through the bottom portion for the fixing pulling belt to pass through; and a positioning buckle provided at a side of the bottom portion for a free end of the fixing pulling belt to pass through and form an adjusting end for adjusting a level of tightness of the fixing pulling belt.

In an embodiment, the carrier further includes a plurality of guide elements that are provided on an outer surface of the peripheral wall, and widths and sizes of the guide elements may be used for the safety belt of the vehicle seat to pass through and be positioned therein.

In an embodiment, the carrier further includes: a handle, two ends of which are movably connected to the first side and a second side opposite to the first side of the box body; and at least one guide element, provided on the handle, in which a width and a size of the at least one guide element may be used for the safety belt of the vehicle seat to pass through and be positioned therein.

In an embodiment, the two ends of the handle are pivots and are pivotally connected to the first side and the second side of the box body.

In an embodiment, the carrier further includes a second fixing device. The second fixing device includes: a belt portion, extending through the bottom portion of the box body; a connector, connected to an end of the belt portion and extending out of the first side of the box body for connecting to a corresponding fixing point of the vehicle seat; and an adjuster, fixedly provided on the second side relative to the first side of the box body, in which the other end of the belt portion is positioned by the adjuster.

In an embodiment, the carrier further includes an anchoring device for fixing the carrier to an anchoring point of the vehicle seat.

In an embodiment, the anchoring device includes: a tether, a first end of which is connected to the bottom portion of the box body; an adjuster, connected to the tether, in which a second end of the tether extends through the adjuster and is exposed from the adjuster; a connecting strap, a first end of which is connected to the adjuster; and a connecting element, connected to a second end of the connecting strap, in which the connecting element is used for being fixed to the anchoring point.

In an embodiment, the bottom portion of the box body is provided with a through hole, and the first end of the tether includes a fixing element, and the tether is engaged with the through hole through the fixing element.

The present disclosure discloses a carrier. The carrier includes: a box body, including a bottom portion and a peripheral wall connected to the bottom portion, and the box body defines a carrying space for accommodating an animal; the fixing device, combined with the bottom portion of the box body and provided in a first region of the bottom portion, in which the carrier is fixed to the vehicle seat through the fixing device; and a steering device, in which the fixing device is pivoted to the bottom portion of the box body through the steering device, and the fixing device may be pivoted to a second region of the bottom portion through the steering mechanism, and the first region is different from the second region.

In an embodiment, the fixing device includes: a primary frame; a connecting frame, including a pair of longitudinal connecting brackets which are connected to the primary frame and can move relative to the primary frame; and a pair of connectors, connected to respective ends of the pair of longitudinal connecting brackets and extending out of a first side of the box body along with a movement of the connecting frame relative to the primary frame, in which the carrier is fixed to the vehicle seat through the pair of connectors, and the primary frame is connected to the steering device to be pivoted to the bottom portion of the box body.

In an embodiment, the connecting frame further includes a transverse rod which connects the pair of longitudinal connecting brackets.

In an embodiment, the fixing device further includes a locking pin and an operating element, which are provided on the primary frame, and the primary frame is positioned at the bottom portion of the box body through the locking pin, and the operating element is used for unlocking the locking pin to release a positioning of the primary frame in the box body.

In an embodiment, the box body includes an annular guide rail formed on an outer surface of the bottom portion of the box body. The steering device includes: a pivot, two ends of which are connected to the primary frame; and a pair of guide lugs, provided on the pivot so that the pivot passe through it, and the guide lugs are engaged with the annular guide rail with their respective outer edge and may be displaced along the annular guide rail.

In an embodiment, the box body includes a circular groove formed on the outer surface of the bottom portion of the box body. The steering device includes: a circular turntable, accommodated in and rotatable in the circular groove; and a pivot, fixedly provided in a diameter direction of the circular turntable, and two ends of the pivot are connected to the primary frame.

In an embodiment, the fixing device further includes a pulling belt. One end of the pulling belt is connected to one of the primary frame or the connecting frame, and the pulling belt extends between the pivot and the outer surface of the bottom portion.

In an embodiment, the pulling belt has two connecting belts and an adjusting end, and the fixing device further includes a pair of locking pins, which are respectively engaged with an engagement hole of one corresponding of the pair of longitudinal connecting brackets; a pair of sliding blocks, which are respectively connected with corresponding one of the two connecting belts and are respectively connected with corresponding one of the pair of longitudinal connecting brackets through corresponding one of the pair of locking pins; and a reset spring, provided between the pair of sliding blocks; and the adjusting end may be operated to relatively displace the pair of sliding blocks and drive the pair of locking pins to disengage from an engagement with the pair of longitudinal connecting brackets, so as to unlock the engagement between the pair of longitudinal connecting brackets and the bottom portion of the box body.

In an embodiment, the carrier further includes an anchoring device for fixing the carrier to an anchoring point of the vehicle seat.

In an embodiment, the anchoring device includes: a tether, a first end of which is connected to the bottom portion of the box body; an adjuster, connected to the tether, where a second end of the tether extends through the adjuster and is exposed from the adjuster; a connecting strap, a first end of which is connected to the adjuster; and a connecting element, connected to a second end of the connecting strap, where the connecting element is used for being fixed to the anchoring point.

In an embodiment, the bottom portion of the box body is provided with a through hole, and the first end of the tether includes a fixing element, and the tether is engaged with the through hole through the fixing element.

In an embodiment, the carrier further includes a plurality of guide elements, which are provided on an outer surface of the peripheral wall of the box body, and widths and sizes of the guide elements may be used for the safety belt of the vehicle seat to pass through and be positioned therein.

In an embodiment, the carrier further includes: a handle, two ends of which are movably connected to the first side and a second side opposite to the first side of the box body; and at least one guide element, provided on the handle, where a width and a size of the at least one guide element may be used for the safety belt of the vehicle seat to pass through and be positioned therein.

In an embodiment, the box body further includes: at least one bottom board opening which is formed at the bottom portion and penetrates through the bottom portion for the fixing pulling belt to pass through; and a positioning buckle provided at a side of the bottom portion for a free end of the fixing pulling belt to pass through and form an adjusting end for adjusting a level of tightness of the fixing pulling belt.

The present disclosure provides a carrier, including: a box body, including a bottom portion and a peripheral wall connected to the bottom portion, where the box body defines a carrying space for accommodating an animal, and the box body includes at least one positioning structure formed on an outer surface of the bottom portion; and a fixing device, which includes: a connecting frame, including a pair of longitudinal connecting brackets and at least one transverse positioning rod connected between the pair of longitudinal connecting brackets; and a pair of connectors, respectively connected to each of the pair of longitudinal connecting brackets; where the fixing device is combined with the box body through the at least one transverse positioning rod of the connecting frame abutting against the at least one positioning structure of the box body.

In an embodiment, the at least one positioning structure includes a first positioning structure and a second positioning structure, and the at least one transverse positioning rod includes a first transverse positioning rod and a second transverse positioning rod connected between the pair of longitudinal connecting brackets.

In an embodiment, the at least one positioning structure has a T-shaped structure, and a first positioning slot and a second positioning slot are formed between the T-shaped structure and the outer surface of the bottom portion.

In an embodiment, the carrier further includes a plurality of guide elements, which are provided on an outer surface of the peripheral wall of the box body, and widths and sizes of the guide elements may be used for the safety belt of the vehicle seat to pass through and be positioned therein.

In an embodiment, the carrier further includes an anchoring device that is linked to the fixing device for fixing the carrier to an anchoring point of the vehicle seat.

In an embodiment, the anchoring device includes a first tether and a second tether, and respective first ends of the first tether and the second tether are respectively connected to respective combining ends of the pair of longitudinal connecting brackets; an adjuster, where respective second ends of the first tether and the second tether are connected to each other and extend through the adjuster to be exposed from the adjuster; a connecting strap, a first end of which is connected to the adjuster; and a connecting element, connected to a second end of the connecting strap, and the connecting element is used for being fixed to the anchoring point.

In an embodiment, the carrier further includes: a handle, two ends of which are movably connected to two sides of the box body; at least one guide element, provided on the handle, where a width and a size of the at least one guide element may be used for one of the first tether or the second tether of the anchoring device to pass through and be positioned therein.

The disclosure also provides a carrier, including a box body and a plurality of guide elements, where the plurality of guide elements are provided on an outer surface of the peripheral wall of the box body, and widths and sizes of the plurality of guide elements may be used for the safety belt of vehicle seat to pass through and be positioned therein.

In an embodiment, the carrier further includes: a handle, pivoted at two opposite sides of the box body; and at least one guide element, provided on the handle, where a width and a size of the at least one guide element may be used for the safety belt of the vehicle seat to pass through and be positioned therein.

In an embodiment, the carrier further includes an extension belt provided on an outer surface of the peripheral wall, and the extension belt connects the safety belt of the vehicle seat with a corresponding safety belt female buckle to fix the box body to the vehicle seat.

According to various embodiments of this aspect of the disclosure, the provided carrier with the integrated fixing device may be used as a transport device for transporting an animal or a pet.

Another aspect of the present disclosure provides a pet carrier, which includes a box body and a binding device, where the box body includes a bottom portion and a peripheral wall connected to the bottom portion, the bottom portion and the peripheral wall surround to define an accommodation space for accommodating a pet, and the bottom portion includes a bottom opening; and the binding device includes a binding webbing which penetrates through the bottom opening and is used for matching with a connecting element provided on a pet vest worn by the pet, so that the pet is limited in the accommodation space.

In an embodiment, the binding webbing penetrates through the connecting element, so that the binding webbing and the connecting element are mutually matched.

In an embodiment, the binding device further includes a buckle assembly, which includes a first buckle element and a second buckle element, where the first buckle element is provided at a free end of the binding webbing, and the second buckle element is provided at the bottom portion, and the free end of the binding webbing is detachably connected with the bottom portion through a fastening of the first buckle element and the second buckle element.

In an embodiment, the binding device further includes a hook, and the hook is provided at a free end of the binding webbing, and the hook buckles the connecting element, so that the binding webbing and the connecting element are mutually matched.

In an embodiment, the hook includes a connecting portion and a buckling portion, where the connecting portion is connected with the free end of the binding webbing, and the buckling portion is fixedly connected or rotationally connected with the connecting portion.

In an embodiment, the binding device further includes an adjuster, and the binding webbing penetrates through the adjuster, and an adjusting end of the binding webbing is exposed out of the adjuster, and the adjuster is used for adjusting and locking the binding webbing, so that the binding webbing cannot move relative to the adjuster.

In an embodiment, the bottom opening penetrates through the bottom portion, and the adjuster is provided on an outer surface of the box body and close to a side of the bottom portion.

In an embodiment, the binding device further includes a retractor, and the bottom portion further includes a cavity communicated with the bottom opening, where the retractor is accommodated in the cavity, and the adjusting end of the binding webbing is connected with the retractor.

In an embodiment, the binding device further includes a guide element which is close to the retractor and used for guiding the binding webbing to be close to a turning section of the retractor.

In an embodiment, the bottom portion further includes a body element and a rotating element which can rotate relative to the body element, the bottom opening and the cavity are formed in the rotating element, and the second buckle element is provided in the rotating element.

In an embodiment, the binding device further includes a locking device, and the locking device is used for locking the retractor so that the retractor cannot rotate, so that the retractor cannot roll up or release the binding webbing.

In an embodiment, the locking device includes an operating element, a driving element, an elastic element, a first locking element and a second locking element, where the second locking element is coaxially provided with the retractor, the second locking element includes a locking notch, and the operating element may be switched between a locking position and a unlocking position; and when the operating element is switched from the unlocking position to the locking position, the elastic element drives the driving element, so as to drive the first locking element to engage with the locking notch, and when the first locking element engages with the locking notch, the retractor is unable to rotate.

In an embodiment, the locking device further includes a resetting element, and the resetting element is connected with the first locking element and used for driving the first locking element to disengage from the locking notch.

In an embodiment, the operating element is rotatably provided on the bottom portion, and the operating element includes a cam structure which slides against the driving element when the operating element rotates.

In an embodiment, the binding device further includes a stopper, and the stopper is provided on the binding webbing and used for abutting against the bottom portion, so as to limit a winding length of the binding webbing wound by the retractor.

In an embodiment, the stopper is a webbing buckle, a webbing ring or a webbing clip.

In an embodiment, the pet carrier further includes a first engaging assembly, which is provided on the bottom portion, and the pet carrier is installed on a base through cooperation between the first engaging assembly and the base.

In an embodiment, the first engaging assembly includes a first engaging element and a second engaging element, and the first engaging element and the second engaging element are provided in parallel and at intervals.

In an embodiment, the pet carrier further includes a second engaging assembly, which is provided on the bottom portion, the first engaging assembly and the second engaging assembly are spaced from each other, the pet carrier is installed on the base through a cooperation of one of the first engaging assembly and the second engaging assembly with the base, and where the second engaging assembly includes a third engaging assembly and a fourth engaging assembly, and the third engaging element and the fourth engaging element are provided in parallel and at intervals.

In an embodiment, the pet carrier further includes a structural reinforcement, which is provided between the first engaging element and the second engaging element and is approximately parallel to a short axis direction of the box body.

In an embodiment, the pet carrier further includes a handle, and two ends of the handle are respectively pivotally connected to two sides of the peripheral wall.

In an embodiment, the connecting element is a fixing ring.

To this end, the pet carrier of this aspect of the present disclosure may be matched with the connecting element of the pet vest worn by the pet through the binding webbing penetrating the bottom opening, and thereby limiting the pet in the accommodating space, so the pet carrier of the present disclosure can improve the riding safety of the pet.

Yet another aspect of the present disclosure provides a pet carrier for fixing a pet wearing a wearable item. The pet carrier includes: a seat portion, with at least one bottom slot for a belt to pass through, and a positioning buckle provided on a short side of the seat portion far from the bottom slot for fixing the belt in a certain position; and a box portion, engaged with the seat portion, and having at least one slot formed on the bottom portion of the box portion and corresponding to the bottom slot, a belt protruding from the slot, and at least one fixing strap provided at a short side of the box portion, where when the pet wearing a wearable item is received in the box portion, the belt can form at least two contact points with the wearable item at a position around a shoulder of the pet.

In an embodiment, the wearable item may be integrated with the belt of the pet carrier, for example, by stitching.

The present disclosure further provides a pet travel device for a vehicle. The pet travel device includes: a base, provided with a load leg for being installed in the vehicle; and a pet carrier according to the first aspect of the present disclosure, where the base may be installed in the vehicle by bringing the load leg into contact with the bottom portion of the vehicle, and the pet carrier is installed on the base through its seat.

The present disclosure further provides a pet wearable item, which includes: a chest pad and a back pad, which are opposite to each other; four straps, used for connecting the chest pad and the back pad at four positions corresponding to four legs of a pet, and forming an accommodating space for the pet; and at least one band, connected to one of the chest pad, the back pad and the strap for forming a ring through which the belt of the pet carrier according to the first aspect of the present disclosure passes.

It should be noted that all the parameters, dimensions, materials and configurations described in the present disclosure are for illustrative purposes, and the actual parameters, dimensions, materials and/or configurations depend on the specific application or the application using the teachings of the present disclosure. It should be understood that the foregoing embodiments are mainly presented by way of illustration, and within the scope of the appended claims and their equivalents, the concepts and embodiments of the present disclosure may be realized otherwise than as specifically described and claimed. Embodiments of the present disclosure relate to each individual feature, component, product, material, assembly and/or method described above.

Furthermore, if such features, components, products, materials, assemblies and/or methods are not inconsistent with each other, any combination of two or more such features, components, products, materials, assemblies and/or methods is included in the scope of the invention of the present disclosure. Without departing from the scope of the present disclosure, other substitutions, modifications, changes and omissions may be made to the design, operating conditions and configuration structures of the corresponding components of the above embodiments. The use of numerical ranges does not exclude equivalents that fall outside the range that meets the same function in the same way to produce the same result.

Although certain examples have been described, these examples are not intended to limit the scope of the invention disclosed herein. Therefore, nothing in the above description means that any particular feature, characteristic, step, module or block is necessary or indispensable. In fact, the novel methods and systems described herein may be embodied in various other forms. Furthermore, various omissions, substitutions and changes may be made to the forms of the methods and systems described herein without departing from the inventive concepts disclosed herein. The appended claims and their equivalents are intended to cover forms or modifications that fall within the scope and spirit of the invention disclosed herein.

What is claimed is:

1. A carrier, comprising:

a box body, comprising a bottom portion and a peripheral wall connected to the bottom portion, the bottom portion and the peripheral wall defining an accommodating space for accommodating a pet; and a first fixing device, comprising:

a primary frame, connected to the bottom portion of the box body;

a connecting frame, comprising a first connecting bracket, the first connecting bracket being connected with the primary frame and movable relative to the primary frame; and a connector, connected to an end of the first connecting bracket and extending out of a long side of the box body along with a movement of the connecting frame relative to the primary frame, wherein the carrier is connected to a vehicle seat through the connector, wherein the carrier further comprises a second fixing device, which is different from the first fixing device; or wherein the carrier further comprises an anchoring device configured to fix the carrier to an anchoring point of the vehicle seat, and the anchoring device is different from the first fixing device.

2. The carrier according to claim 1, wherein a plurality of first connecting brackets and a plurality of connectors connected with respective ends of the plurality of first connecting brackets are provided, and the connecting frame further comprises at least one second connecting bracket, and the at least one second connecting bracket is connected between the plurality of first connecting brackets.

3. The carrier according to claim 2, wherein the first fixing device further comprises:

a pulling belt, connected to the at least one second connecting bracket and capable of being pulled to drive the connecting frame to move relative to the primary frame.

4. The carrier according to claim 2, wherein the box body further comprises at least one positioning structure formed at the bottom portion to position at least one second connecting bracket of the connecting frame so as to combine the first fixing device with the box body.

5. The carrier according to claim 1, wherein the carrier further comprises:

a steering device, wherein the first fixing device is pivotally connected to the bottom portion of the box body through the steering device and is pivotable between a first region and a second region of the bottom portion.

6. The carrier according to claim 1, wherein the first fixing device is located on one side of a center line of the long side of the box body, and the second fixing device or the anchoring device is located on the other side of the center line of the long side of the box body.

7. The carrier according to claim 1, wherein the long side of the box body comprises a first side and a second side that is opposite to the first side, and the first fixing device and the second fixing device extend out of the first side, or the first fixing device and the second fixing device extend out of the second side.

8. The carrier according to claim 1, wherein the long side of the box body comprises a first side and a second side that is opposite to the first side, and the second fixing device comprises:

a belt portion, extending through the bottom portion of the box body;

a connector, connected to one end of the belt portion and extending out of the first side, for connecting to a corresponding fixing point of the vehicle seat; and an adjuster, fixedly provided at the second side, wherein the other end of the belt portion is positioned by the adjuster.

9. The carrier according to claim 1, wherein the second fixing device is a flexible ISOFIX system.

10. The carrier according to claim 1, wherein the long side of the box body comprises a first side and a second side that is opposite to the first side, the one of the anchoring device and the first fixing device extend out of the first side, and the other of the anchoring device and the first fixing device extend out of the second side.

11. The carrier according to claim 1, wherein the anchoring device comprises:

a tether, a first end of which is connected to the bottom portion of the box body;

an adjuster, connected to the tether, wherein a second end of the tether extends through the adjuster and is exposed from the adjuster;

a connecting strap, a first end of which is connected to the adjuster; and a connecting element, connected to a second end of the connecting strap for being fixed to the anchoring point.

12. The carrier according to claim 11, wherein the bottom portion of the box body is provided with a through hole, and the first end of the tether comprises a fixing element, and the tether is engaged with the through hole through the fixing element.

13. The carrier according to claim 1, wherein, the anchoring device is linked to the first fixing device.

14. The carrier according to claim 13, wherein the first fixing device comprises two first connecting brackets and two connectors respectively connected with one end of each of the two first connecting brackets, and the anchoring device comprises:

a first tether and a second tether, wherein respective first ends of the first tether and the second tether are respectively connected to respective combining ends of the two first connecting brackets;

an adjuster, wherein respective second ends of the first tether and the second tether are connected to each other and extend through the adjuster to be exposed from the adjuster;

a connecting strap, a first end of which is connected to the adjuster; and a connecting element, connected to a second end of the connecting strap for being fixed to the anchoring point.

15. The carrier according to claim 1, further comprising:

a plurality of guide elements, provided on an outer surface of the peripheral wall of the box body, wherein the plurality of guide elements are configured to allow a safety belt of the vehicle seat to pass through and to be positioned in the plurality of guide elements.

16. The carrier according to claim 1, wherein, the box body further comprises at least one bottom opening which is formed at the bottom portion and penetrates through the bottom portion, and the carrier further comprises a binding device, wherein the binding device comprises a binding webbing, and the binding webbing penetrates through the at least one bottom opening and is used for matching with a connecting element provided on a pet vest worn by the pet at a contact point, so that the pet is limited in the accommodating space.

17. The carrier according to claim 16, wherein the binding device further comprises a retractor, the bottom portion is further provided with a cavity communicated with the at least one bottom opening, the retractor is accommodated in the cavity, and the adjusting end of the binding webbing is connected with the retractor.

18. The carrier according to claim 1, wherein the box body further comprises a plurality of bottom openings formed on the bottom portion and penetrating through the bottom portion, and the carrier further comprises a binding device, wherein the binding device comprises a plurality of binding webbings, and the plurality of binding webbings penetrate through the plurality of bottom openings and are respectively matched with a plurality of connecting elements provided on a pet vest worn by the pet at a plurality of contact points, so that the pet is limited in the accommodating space.

19. The carrier according to claim 18, wherein a number of the plurality of bottom openings is greater than a number of the plurality of binding webbings, and the box body further comprises:

at least one box belt, passing through other bottom openings which are not passed through by the plurality of binding webbings among the plurality of bottom openings, and fixed on the bottom portion of the box body, wherein respective free ends of the plurality of binding webbings are respectively connected to the at least one box belt, so as to bind the pet to the box body.

20. A carrier, comprising:

a box body, comprising a bottom portion and a peripheral wall connected to the bottom portion, the bottom portion and the peripheral wall defining an accommodating space for accommodating a pet; and a first fixing device, comprising:

a primary frame, connected to the bottom portion of the box body;

a connecting frame, comprising a first connecting bracket, the first connecting bracket being connected with the primary frame and movable relative to the primary frame; and a connector, connected to an end of the first connecting bracket and extending out of a long side of the box body along with a movement of the connecting frame relative to the primary frame, wherein the carrier is connected to a vehicle seat through the connector, wherein an axis of the first fixing device is displaced from a center line of the long side of the box body.

* * * * *